US012711167B2

(12) United States Patent
Rogynskyy et al.

(10) Patent No.: US 12,711,167 B2
(45) **Date of Patent: *Aug. 18, 2026**

(54) SYSTEMS AND METHODS FOR AUTOMATIC GENERATION OF DATASETS FOR RECORD OBJECTS USING MACHINE LEARNING ARCHITECTURES

(71) Applicant: People.ai, Inc., San Francisco, CA (US)

(72) Inventors: Oleg Rogynskyy, Menlo Park, CA (US); Sergey Surkov, Las Vegas, NV (US); Andrii Kvachov, Toronto (CA); Dmitry Starshov, San Francisco, CA (US)

(73) Assignee: People.ai, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,897

(22) Filed: Jul. 31, 2024

(65) Prior Publication Data

US 2025/0045313 A1 Feb. 6, 2025

Related U.S. Application Data

(60) Provisional application No. 63/672,201, filed on Jul. 16, 2024, provisional application No. 63/530,251, filed on Aug. 1, 2023.

(51) Int. Cl.

| | |
|---|---|
| ***G06F 16/00*** | (2019.01) |
| ***G06F 16/3329*** | (2025.01) |
| ***G06F 16/3332*** | (2025.01) |
| ***G06F 16/334*** | (2025.01) |
| ***G06N 3/0475*** | (2023.01) |

(52) U.S. Cl.
CPC ........ *G06F 16/334* (2019.01); *G06F 16/3329* (2019.01); *G06F 16/3334* (2019.01); *G06N 3/0475* (2023.01)

(58) Field of Classification Search
CPC ............... G06F 16/334; G06F 16/3334; G06F 16/3329; G06N 3/0475
USPC .......................................................... 707/769
See application file for complete search history.

(56) References Cited

U.S. PATENT DOCUMENTS

2018/0097749 A1* 4/2018 Ventura ................. H04L 51/216
2022/0365993 A1* 11/2022 Voisin ..................... G06F 40/30
2024/0403341 A1* 12/2024 Berglund ............ G06F 16/3326

* cited by examiner

*Primary Examiner* — Monica M Pyo
(74) *Attorney, Agent, or Firm* — EIP US LLP

(57) ABSTRACT

The present disclosure relates to systems and methods for automatic generation of datasets for record objects using one or more large language models. A system can identify a plurality of electronic activities. The system can generate, using one or more large language models, a first set of text strings from the electronic activities. The system can store, in one or more data structures, a first association between the first set of text strings and the record object. The system can identify a second electronic activity. The system can generate, using the one or more large language models, a second set of text strings based on data corresponding to the second electronic activity and the first set of text strings. The system can store, in the one or more data structures, a second association between the second set of text strings and the record object.

16 Claims, 33 Drawing Sheets

920

922

924

926

928

930

932

```
STATE
Today is day 48
Company Acme Co.
Acme Co. is a videogame developer.
Annual revenue: Thirty million dollars
72 employees, United States

Opportunity  Acme Co.
Type: New Business
Expected revenue: Twenty million dollars
Stage: Stage 1 - PG

Context clustered by topic
> Vendor Onboarding
day 7: John Doe shares onboarding doc with Adam (2
insights)

> Use Cases
day 32: Jane Doe suggests focusing on a simplified AE use
case (1 insight)

Context by participant
Mike Smith,
 * day: 33, Jane is asking John for a drink with her and
Max next week.
Paul White, Senior Director of Sales
* days 33-34: Mike and Jane are trying to schedule a
meeting (3 insights).

Recent activities:
 day 46, outbound email: Re: Globex Review
 * Jane is proposing a review and next steps for Globex.
 * Jane is asking Mike and Paul for their availability on
Thursday or Friday.

Participants:
Jane Doe, VP Commercial Sales at Acme Co. (inbound emails:
11, outbound emails: 15, meetings: 5, last activity: day
48)
John Smith, Development, Strategic at People.ai (inbound
emails: 15, outbound emails: 21, meetings: 10, last
activity: day 48)
```

FIG. 9B

SYSTEMS AND METHODS FOR AUTOMATIC GENERATION OF DATASETS FOR RECORD OBJECTS USING MACHINE LEARNING ARCHITECTURES

CROSS-REFERENCE TO RELATED APPLICATIONS

This application claims the benefit of priority to U.S. Provisional Application No. 63/530,251, filed Aug. 1, 2023, and U.S. Provisional Application No. 63/672,201, filed Jul. 16, 2024, the entirety of each of which is incorporated by reference herein.

BACKGROUND

An organization may attempt to manage or maintain a system of record associated with electronic communications at the organization. The system of record can include information such as contact information, logs, and other data associated with the electronic activities. Data regarding the electronic communications can be transmitted between computing devices associated with one or more organizations using one or more transmission protocols, channels, or formats, and can contain various types of information. For example, the electronic communication can include information about a sender of the electronic communication, a recipient of the electronic communication, and content of the electronic communication. The information regarding the electronic communication can be input into a record being managed or maintained by the organization. However, due to the large volume of heterogeneous electronic communications transmitted between devices and the challenges of manually entering data, inputting the information regarding each electronic communication into a system of record can be challenging, time consuming, and error prone.

SUMMARY

One aspect of the present disclosure relates to a system for automatic generation of summaries for record objects. The system can include one or more processors configured by machine-readable instructions. The one or more processors can be configured to: identify a plurality of electronic activities matched to a record object of a customer relationship management (CRM) system; generate, by inputting a first set of text strings of one or more text strings obtained from the plurality of electronic activities into one or more large language models, (i) a first set of topics, (ii) a first set of references indicating one or more subsets of the first set of text strings, each subset of text strings corresponding to a different topic of the first set of topics, and (iii) an attribute for each of the first set of topics, each attribute for a topic indicating a level of relevance of the topic to the record object; generate, by inputting a first subset of text strings of the first set of text strings corresponding to a first topic selected using the first set of references and based on the level of relevance of the first topic and a second set of text strings of the one or more text strings into the one or more large language models, a second set of topics; and transmit one or more topics of the second set of topics to a computing device for presentation.

In some embodiments, the one or more processors can be configured to generate the second set of topics by generating a second attribute for each of the second set of topics based on the inputting of the first subset of text strings into the one or more large language models, each second attribute indicating a level of relevance of a corresponding topic of the second set of topics to the record object.

In some embodiments, the one or more processors can be configured to generate, by inputting the plurality of electronic activities into the one or more large language models, the one or more text strings.

In some embodiments, the one or more processors can be configured to input the first set of text strings into the one or more large language models in response to determining a time interval is satisfied.

In some embodiments, the one or more processors can be configured to input the first set of text strings into the one or more large language models in response to determining a size of the one or more text strings satisfies a threshold.

In some embodiments, the one or more processors can be configured to store the second set of topics in a database; receive a query identifying the record object from a client device; generate a text response identifying a topic of the second set of topics based on the query by: retrieving one or more topics of the second set of topics from the database; and generating the text response by inputting the one or more topics and the query identifying the record object into the one or more large language models.

In some embodiments, the one or more processors can be configured to transmit the text response to the client device.

In some embodiments, the one or more processors can be configured to rank the first set of topics based on the level of relevance of each of the first set of topics; and select the first set of text strings based on the rankings of the first set of topics.

In some embodiments, the one or more processors can be configured to select the first set of text strings based on the level of relevance of each of the first set of topics satisfying a threshold.

In some embodiments, the one or more processors can be configured to store the second set of topics in a database; receive a request for one or more topics from a client device; retrieve the second set of topics from the database in response to receive of the request; and transmit the one or more topics of the retrieved second set of topics to the client device.

In some embodiments, the one or more processors can be configured to generate, by inputting the first set of text strings of the one or more text strings obtained from the plurality of electronic activities into the one or more large language models, (i) a first set of risks, (ii) a second set of references indicating one or more second subsets of the first set of text strings, each second subset of text strings corresponding to a different risk of the first set of risks, and (iii) an attribute for each of the first set of risks, each attribute for a risk indicating a level of the risk to the record object; and generate, by inputting a second subset of text strings of the first set of text strings corresponding to a first risk selected based on the level of the first risk and the second set of text strings of the one or more text strings into the one or more large language models, a second set of risks; and transmit one or more risks of the second set of risks to the computing device for presentation.

In some embodiments, the one or more processors can be configured to generate, by inputting the first set of text strings of the one or more text strings obtained from the plurality of electronic activities into the one or more large language models, (i) a first set of next steps for advancing the record object, (ii) a second set of references indicating one or more third subsets of the first set of text strings, each third subset of text strings corresponding to a different next step of the first set of next steps, and (iii) an attribute for each of the first set of next steps, each attribute for a next step indicating a level of importance of the next step to the record object; and generate, by inputting a second subset of text strings of the first set of text strings corresponding to a first next step selected based on the level of relevance of the first next step and the second set of text strings of the one or more text strings into the one or more large language models, a second set of next steps; and transmit one or more next steps of the second set of next steps to the computing device for presentation.

In some embodiments, the one or more processors can be configured to generate, by inputting the first set of text strings of the one or more text strings obtained from the plurality of electronic activities into the one or more large language models, (i) a first set of risks, (ii) a second set of references indicating one or more second subsets of the first set of text strings, each second subset of text strings corresponding to a different risk of the first set of risks, and (iii) an attribute for each of the first set of risks, each attribute for a risk indicating a level of the risk to the record object; and generate, by inputting a second subset of text strings of the first set of text strings corresponding to a first risk selected based on the level of the first risk and the second set of text strings of the one or more text strings into the one or more large language models, a second set of risks; and transmit the one or more risks of the second set of risks, the one or more next steps of the second set of next steps, and the one or more topics of the second set of topics to the computing device for presentation on a single user interface. In some embodiments, the first set of references can include a different numerical identifier for each text string of the first one or more subsets of text strings.

In some embodiments, the one or more processors can be configured to generate the second set of topics by: generating a second attribute for each of the second set of topics based on the input of the first subset of text strings into the one or more large language models, each second attribute indicating a level of relevance of a corresponding topic of the second set of topics to the record object; and wherein the one or more processors are further configured by the machine-readable instructions to: generate, by inputting a subset of text strings of the second set of text strings corresponding to a second topic selected based on the level of relevance of the second topic and a third set of text strings of the one or more text strings into the one or more large language models, a third set of topics; and transmit one or more topics of the third set of topics to the computing device or a second computing device for presentation.

In some embodiments, the one or more processors can be configured to instantiate a counter for each of a plurality of entities identified in the one or more text strings; increment the counter for each of the plurality of entities responsive to each identification of the entity in the one or more text strings; determine a set of entities of the plurality of entities based on each entity of set corresponding to a counter with a count that satisfies a selection criteria; and transmit identifications of the set of entities to the computing device for presentation.

In some embodiments, the one or more processors can be configured to select the one or more topics of the second set of topics based on a level of relevance attributed to the one or more topics.

In some embodiments, the one or more processors can be configured to select the one or more topics of the second set of topics based on the one or more topics being included in the second set of topics and not the first set of topics.

Another aspect of the present disclosure relates to a method for automatic generation of summaries for record objects. The method can include identifying, by one or more processors, a plurality of electronic activities matched to a record object of a customer relationship management (CRM) system; generating, by the one or more processors by inputting a first set of text strings of one or more text strings obtained from the plurality of electronic activities into one or more large language models, (i) a first set of topics, (ii) a first set of references indicating one or more subsets of the first set of text strings, each subset of text strings corresponding to a different topic of the first set of topics, and (iii) an attribute for each of the first set of topics, each attribute for a topic indicating a level of relevance of the topic to the record object; generating, by the one or more processors by inputting a first subset of text strings of the first set of text strings corresponding to a first topic selected based on the level of relevance of the first topic and a second set of text strings of the one or more text strings into the one or more large language models, a second set of topics; and transmitting, by the one or more processors, one or more topics of the second set of topics to a computing device for presentation.

In some embodiments, generating the second set of topics can include generating, by the one or more processors, a second attribute for each of the second set of topics based on the input of the first subset of text strings into the one or more large language models, each second attribute indicating a level of relevance of a corresponding topic of the second set of topics to the record object.

In some embodiments, the method can include generating, by the one or more processors by inputting the plurality of electronic activities into the one or more large language models, the one or more text strings.

Yet another aspect of the present disclosure relates to a system for automatic generation of summaries for record objects. The system can include one or more processors configured by machine-readable instructions. The one or more processors can be configured to: identify a plurality of electronic activities matched to a record object of a customer relationship management (CRM) system; generate, by inputting a first set of text strings of one or more text strings obtained from the plurality of electronic activities into one or more large language models, a first set of inferences and, for each inference of the first set of inferences: one or more references, each corresponding to a text string of a subset of the first set of text strings corresponding to the inference, and an attribute indicating a level of relevance of the inference to the record object; receive a selection of an inference of the first set of inference from a computing device; retrieve, using the one or more references corresponding to the selected inference, a subset of text strings of the first set of text strings corresponding to the inference; generate, by inputting the retrieved subset of text strings into the one or more large language models, a text output; and transmit the text output to a computing device for presentation.

In some embodiments, the one or more processors can be configured to generate the text output by generating a second attribute for the text output based on the inputting of the retrieved subset of text strings into the one or more large language models, each second attribute indicating a level of relevance of the text output to the record object.

In some embodiments, the one or more processors can be configured to generate, by inputting the plurality of electronic activities into the one or more large language models, the one or more text strings.

In some embodiments, the one or more processors can be configured to input the retrieved subset of the first set of text strings into the one or more large language models in response to determining a time interval is satisfied.

In some embodiments, the one or more processors can be configured to input the retrieved subset of the first set of text strings into the one or more large language models in response to determining a size of the one or more text strings satisfies a threshold.

In some embodiments, the one or more processors can be configured to store the first set of inferences in a database; receive a query identifying the record object from a client device; generate the text output based on the query by: retrieving one or more inferences of the first set of inferences from the database; and inputting the one or more retrieved inferences and the query identifying the record object into the one or more large language models to generate the text output.

In some embodiments, the one or more processors can be configured to transmit the text output to the client device.

In some embodiments, the one or more processors can be configured to rank the first set of inferences based on the level of relevance of each of the first set of inferences; and select the first set of text strings based on the rankings of the first set of inferences.

In some embodiments, the one or more processors can be configured to select the first set of text strings based on the level of relevance of each of the first set of inferences satisfying a threshold.

Yet another aspect of the present disclosure relates to a system. The system can include one or more processors configured by machine-readable instructions to identify a plurality of electronic activities matched with a record object of a customer relationship management (CRM) system; generate, by inputting data corresponding to the plurality of electronic activities into one or more large language models, a first set of text strings; store, in one or more data structures, a first association between the first set of text strings and the record object based on the match between the record object and the plurality of electronic activities; identify a second electronic activity that is matched with the record object subsequent to generating the first set of text strings; generate, using the one or more large language models, responsive to determining that the second electronic activity is matched with the record object or a time condition is satisfied, a second set of text strings based on data corresponding to the second electronic activity and the first set of text strings; and store, in the one or more data structures, a second association between the second set of text strings and the record object.

In some embodiments, the one or more processors are configured by the machine-readable instructions to generate the first set of text strings by generating, for each of the plurality of electronic activities, an activity summary of the electronic activity by inputting data of the electronic activity into the one or more large language models.

In some embodiments, the one or more processors are configured by the machine-readable instructions to generate the first set of text strings by selecting a subset of the first set of text strings; and generating, by inputting the subset of the first set of text strings in the one or more large language models, a subset summary for the subset of the first set of text strings.

In some embodiments, the one or more processors are configured by the machine-readable instructions to select the subset of the first set of text strings by selecting the subset of the first set of text strings based on each text string of the subset corresponding to a common time interval; or selecting the subset of the first set of text strings responsive to determining a size of the subset of text strings has reached at least a defined value.

In some embodiments, the one or more processors are configured by the machine-readable instructions to select the subset of the first set of text strings by selecting the subset of the first set of text strings responsive to determining each text string of the subset corresponds to a common context or identifies a common individual.

In some embodiments, the one or more processors are configured by the machine-readable instructions to generate the subset summary for the subset of text strings by assigning a summary identifier to a subset summary for the subset of text strings and a text string identifier to each of the text strings of the subset; and including the summary identifier and the text string identifier for each text string of the subset in the subset summary for the subset of the first set of text strings.

In some embodiments, the one or more processors are further configured by the machine-readable instructions to discard the plurality of electronic activities subsequent to generating the first set of text strings.

In some embodiments, the one or more processors are further configured by the machine-readable instructions to receive, via a chat interface, a request including a natural language query requesting information regarding the record object, the request comprising an identification of the record object; and generate, using the one or more large language models, a response to the natural language query containing the requested information using the identification of the record object and the stored association between the record object and the first set of text strings or the second set of text strings generated prior to the query.

In some embodiments, the one or more processors are further configured by the machine-readable instructions to generate the response to natural language query by retrieving one or more text strings from the second set of text strings and one or more object field-value pairs from the record object; and generating the response by inputting the retrieved one or more text strings and one or more object field-value pairs of the record object into the one or more large language models.

In some embodiments, the one or more processors are further configured by the machine-readable instructions to generate the second set of text strings by generating, by inputting data of the second electronic activity into the one or more large language models, a second text string summarizing the data of the second electronic activity; and inserting the second text string into the first set of text strings.

In some embodiments, the one or more processors are configured by the machine-readable instructions to store the record object of the CRM system as a shadow record object of a shadow CRM system stored in memory, the shadow CRM system mapped to an external CRM system stored in a remote computing system, and wherein the one or more processors are configured to identify the plurality of electronic activities matched with the record object of the CRM system by identifying the plurality of electronic activities matched with the shadow record object of the shadow CRM system.

Another aspect of the present disclosure relates to a method. The method may include identifying, by one or more processors, a plurality of electronic activities matched with a record object of a customer relationship management (CRM) system; generating, by the one or more processors, by inputting data corresponding to the plurality of electronic activities into one or more large language models, a first set of text strings; storing, by the one or more processors in one or more data structures, a first association between the first set of text strings and the record object based on the match between the record object and the plurality of electronic activities; identifying, by the one or more processors, a second electronic activity that is matched with the record object subsequent to generating the first set of text strings; generating, by the one or more processors, using the one or more large language models, responsive to determining that the second electronic activity is matched with the record object or a time condition is satisfied, a second set of text strings based on data corresponding to the second electronic activity and the first set of text strings; and storing, by the one or more processors, in the one or more data structures, a second association between the second set of text strings and the record object.

In some embodiments, generating the first set of text strings comprises generating, by the one or more processors for each of the plurality of electronic activities, an activity summary of the electronic activity by inputting data of the electronic activity into the one or more large language models.

In some embodiments, generating the first set of text strings comprises selecting, by the one or more processors, a subset of the first set of text strings; and generating, by the one or more processors by inputting the subset of the first set of text strings in the one or more large language models, a subset summary for the subset of the first set of text strings.

In some embodiments, selecting the subset of the first set of text strings comprises selecting, by the one or more processors, the subset of the first set of text strings based on each text string of the subset corresponding to a common time interval; or selecting, by the one or more processors, the subset of the first set of text strings responsive to determining a size of the subset of text strings has reached at least a defined value.

In some embodiments, selecting the subset of the first set of text strings comprises selecting, by the one or more processors, the subset of the first set of text strings responsive to determining each text string of the subset corresponds to a common context or identifies a common individual.

In some embodiments, generating the subset summary for the subset of text strings comprises assigning, by the one or more processors, a summary identifier to a subset summary for the subset of text strings and a text string identifier to each of the text strings of the subset; and including, by the one or more processors, the summary identifier and the text string identifier for each text string of the subset in the subset summary for the subset of the first set of text strings.

In some embodiments, the method further comprises discarding, by the one or more processors, the plurality of electronic activities subsequent to generating the first set of text strings.

Another aspect of the present disclosure relates to a system. The system can include one or more processors configured by machine-readable instructions to identify a plurality of electronic activities matched with a record object of a customer relationship management (CRM) system; generate, by inputting data corresponding to the plurality of electronic activities into one or more large language models, a set of text strings; store, in one or more data structures, an association between the set of text strings and the record object based on the match between the record object and the plurality of electronic activities; receive, via a chat interface, a request including a natural language query requesting information regarding the record object, the request comprising an identification of the record object; and generate, using the one or more large language models, a response to the natural language query containing the requested information using the identification of the record object and the stored association between the record object and the set of text strings generated prior to the query.

In some embodiments, the one or more processors are configured by the machine-readable instructions to generate the set of text strings by generating, for each of the plurality of electronic activities, an activity summary of the electronic activity by inputting data of the electronic activity into the one or more large language models.

In some embodiments, the one or more processors are further configured by the machine-readable instructions to generate the response to natural language query by retrieving one or more text strings from the set of text strings and one or more object field-value pairs from the record object; and generating the response by inputting the retrieved one or more text strings and one or more object field-value pairs of the record object into the one or more large language models.

In some embodiments, the one or more processors are configured by the machine-readable instructions to receive the request by receiving the identification based on a page of an application from which the natural language query was generated.

In some embodiments, the one or more processors are configured by the machine-readable instructions to receive the request by receiving the identification in the natural language query.

In some embodiments, the one or more processors are configured by the machine-readable instructions to store the record object of the CRM system as a shadow record object of a shadow CRM system stored in memory, the shadow CRM system mapped to an external CRM system stored in a remote computing system, and wherein the one or more processors are configured to identify the plurality of electronic activities matched with the record object of the CRM system by identifying the plurality of electronic activities matched with the shadow record object of the shadow CRM system.

In some embodiments, the one or more processors are further configured by the machine-readable instructions to transmit the generated response for presentation on the chat interface.

In another aspect, the present disclosure relates to a method comprising identifying, by one or more processors, a plurality of electronic activities matched with a record object of a customer relationship management (CRM) system; generating, by the one or more processors, by inputting data corresponding to the plurality of electronic activities into one or more large language models, a set of text strings; storing, by the one or more processors, in one or more data structures, an association between the set of text strings and the record object based on the match between the record object and the plurality of electronic activities; receiving, by the one or more processors via a chat interface, a request including a natural language query requesting information regarding the record object, the request comprising an identification of the record object; and generate, using the one or more large language models, a response to the natural language query containing the requested information using the identification of the record object and the stored association between the record object and the set of text strings generated prior to the query.

In some embodiments, generating the set of text strings comprises generating, by the one or more processors, for each of the plurality of electronic activities, an activity summary of the electronic activity by inputting data of the electronic activity into the one or more large language models.

In some embodiments, generating the response to natural language query comprises retrieving, by the one or more processors, one or more text strings from the set of text strings and one or more object field-value pairs from the record object; and generating, by the one or more processors, the response by inputting the retrieved one or more text strings and one or more object field-value pairs of the record object into the one or more large language models.

In some embodiments, receiving the request comprises receiving, by the one or more processors, the identification based on a page of an application from which the natural language query was generated.

In some embodiments, receiving the request comprises receiving, by the one or more processors, the identification in the natural language query.

BRIEF DESCRIPTIONS OF THE DRAWINGS

FIG. 9B illustrates an example story generated by the components of FIG. 9A according to embodiments of the present disclosure;

DETAILED DESCRIPTION

Figure 1:
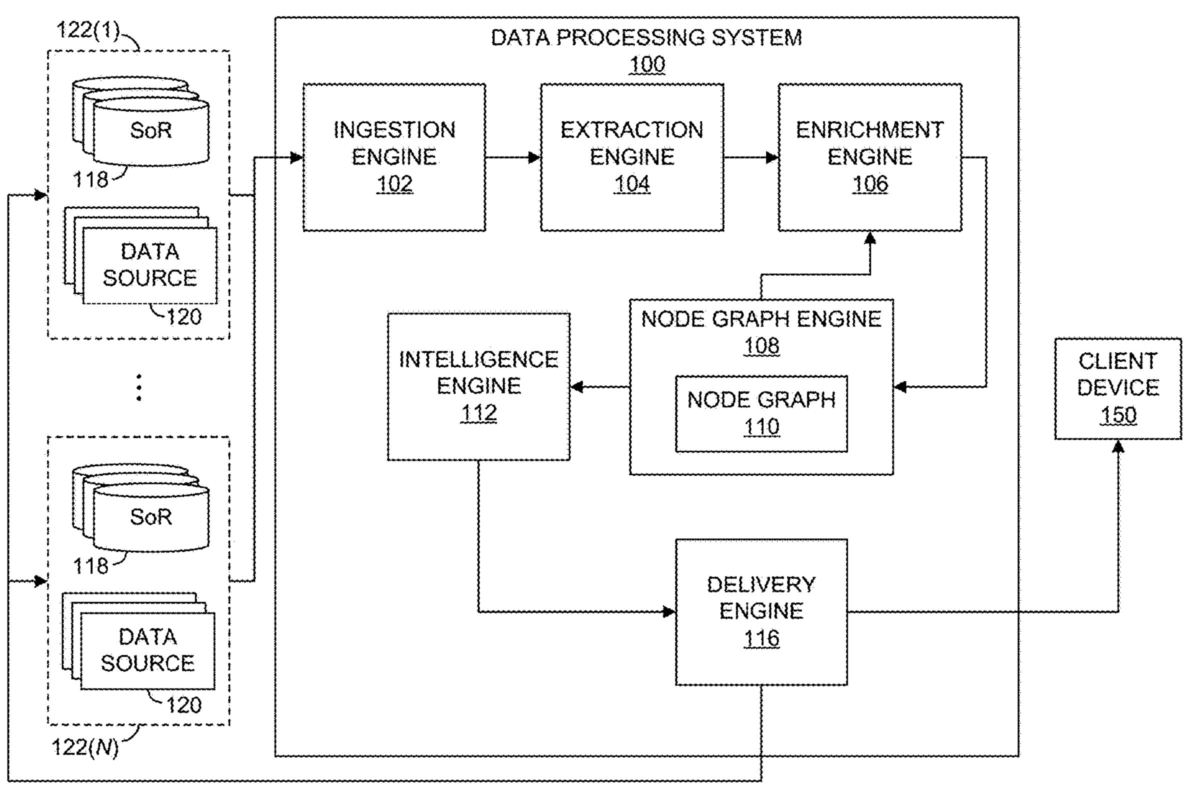
FIG. 1 illustrates a data processing system for aggregating electronic activities and synchronizing the electronic activities to one or more systems of record according to embodiments of the present disclosure.
Figure 2:
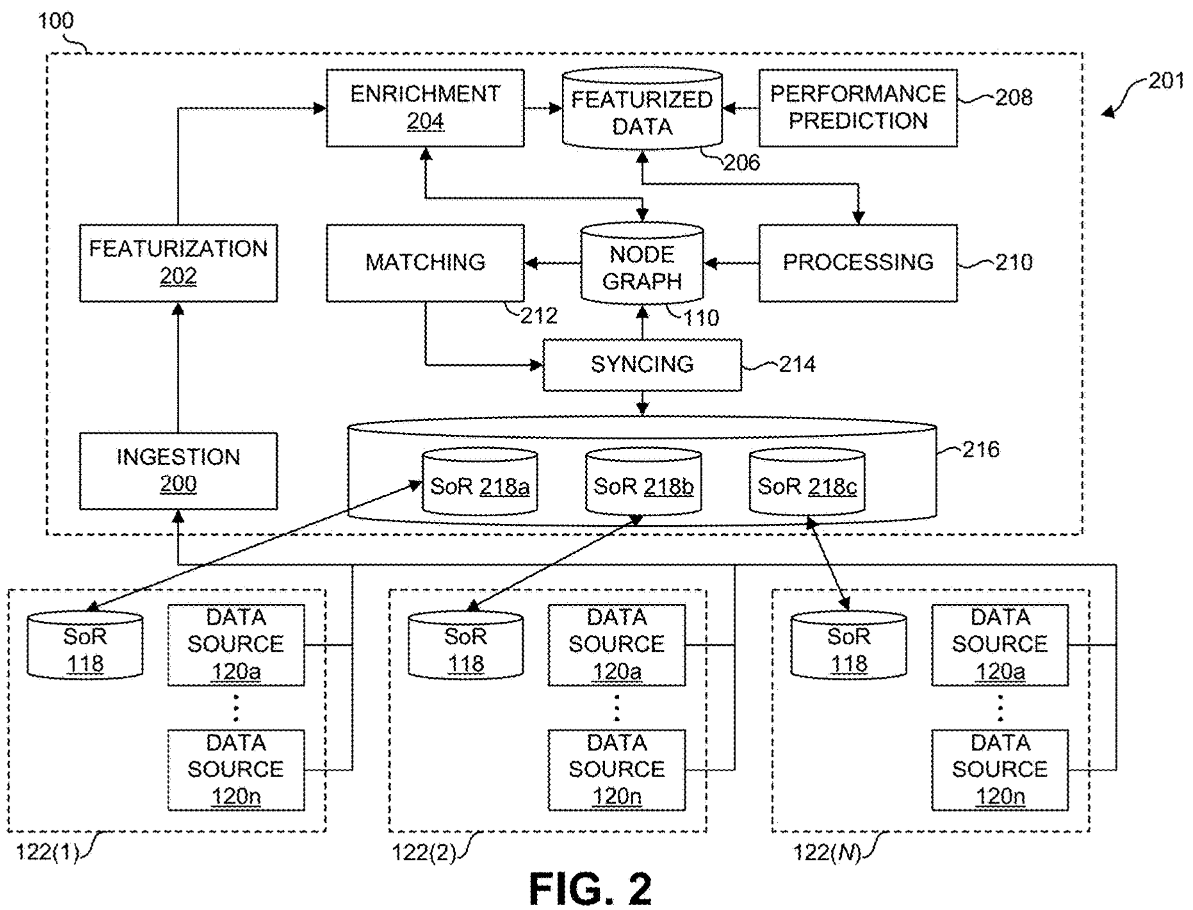
FIG. 2 illustrates a process flow diagram for constructing a node graph based on one or more electronic activities according to embodiments of the present disclosure.

FIGS. 1 and 2 illustrate a data processing system 100 and process flow 201 for aggregating electronic activities, processing the electronic activities to update node profiles of entities and to construct a node graph 110, and synchronizing the electronic activities and data to one or more systems of record 118. As a brief overview, the data processing system 100 may include an ingestion engine 102, an extraction engine 104, an enrichment engine 106, a node graph engine 108, an intelligence engine 112, and a delivery engine 114, among others. The ingestion engine 102 can be configured to ingest electronic activities associated with an entity, as described in greater detail below with reference to FIG. 3A. The entity can be a person, company, group of people, among others. In some embodiments, the entity can be any entity that is assigned an identifier configured to receive or transmit electronic activities. The extraction engine 104 can be configured to extract data from electronic activities, record objects, systems of record, and/or any other item or system that is ingested by ingestion engine 102, as described in greater detail below with reference to FIG. 3B. The enrichment engine 106 can be configured to configured to identify data extracted from electronic activities and update node graph 110 based on the extracted data, as described in greater detail below with reference to FIG. 3C. The node graph engine 108 can be configured to configured to generate, manage and update the node graph 110, as described in greater detail below with reference to FIG. 3D. The intelligence engine 112 can be configured to determine insights for a company, as described in greater detail below with reference to FIG. 3E.

A process flow 201 can be executed by the data processing system 100 that can receive electronic activities and other data from the data sources 120 a plurality of data source providers 122(1)-122(N). Each data source provider 122 can include one or more data sources 120(1)-120(N) and/or one or more system of record 118. Examples of data source providers 122 can include companies, universities, enterprises, or other group entities which enroll with or subscribe to one or more services provided by the data processing system 100. Each of the data source providers 122 can include one or more data sources 120 such as, for example electronic mail servers (e.g., electronic mail data sources 120) which store or include data corresponding to electronic mail (such as an exchange server), telephone log servers (e.g., telephone log data sources 120) which store or include data corresponding to incoming/outgoing/missed telephone calls, contact servers (e.g., contact data sources 120) which store or include data corresponding to contacts, other types of servers and end-user applications that are configured to store or include data corresponding to electronic activities (also referred to as "electronic activity data") or profile data relating to one or more nodes.

At step 200, the data processing system 100 can ingest electronic activity. The data processing system 100 can ingest electronic activities from the data sources 120 of the data source providers 122 (e.g., via the ingestion engine 102. At step 202, the data processing system 100 can featurize the ingested electronic activities. The data processing system 100 can featurize the ingested electronic activities by parsing and tagging the electronic activities. At step 204, and following featurizing the electronic activities at step 202, the data processing system 100 can store the featurized data. In some embodiments, the data processing system 100 can store the featurized data in a featurized data store. At step 206, the data processing system 100 can process the featurized data to generate a node graph 110 including a plurality of node profiles. The data processing system 100 can store the node graph(s) 110 in one or more databases or other data stores as shown in FIG. 2. The node graph 110 can include a plurality of nodes and a plurality of edges between the nodes indicating activity or relationships that are derived from a plurality of data sources that can include one or more types of electronic activities. The plurality of data sources 120 can further include systems of record 118, such as customer relationship management systems, enterprise resource planning systems, document management systems, applicant tracking systems, or other sources of data that may maintain electronic activities, activities, or records.

In some embodiments, at step 208, upon featurizing an ingested electronic activity, the data processing system 100 can enrich an existing node graph 110 to include any features that were extracted from the electronic activity. In other words, the data processing system 100 can update, revise, or otherwise modify (e.g., enrich) the node graph 110 based on newly ingested and featurized electronic activities. In some embodiments, the data processing system 100 can further maintain a plurality of shadow system of record 218(1)-(N) corresponding to systems of record 118 of the data source providers 122(1)-(N). The shadow systems of record 218 (1)-(N) may be maintained in a shadow system of record database 216. In some embodiments, at step 210, the data processing system 100 can synchronize data stored in the shadow system of record 218 to augment the node profiles. For instance, the data processing system 100 can utilize the shadow system of record 218 to augment the node profiles of the node graph 110 by synchronizing data stored in the shadow system of record 218 maintained by the data processing system 100. In some embodiments, at step 212, responsive to the data processing system 100 can further match the ingested electronic activities to one or more record objects maintained in one or more systems of record 118 of the data source provider 122 from which the electronic activity was received (e.g., via a data source 120) or the shadow system of records 218. The data processing system 100 can further synchronize the electronic activity matched to record objects to update the system of record 118 of the data source provider 122. In some embodiments, at step 214, the data processing system 100 can use the featurized data to provide performance predictions and generate other business process related outputs, insights, and recommendations.

The data processing system 100 may communicate with a client device 150 (e.g., a mobile device, computer, tablet, desktop, laptop, or other device communicably coupled to the data processing system 100). In some embodiments, the data processing system 100 can be configured to communicate with the client device 150 via the delivery engine 114. The delivery engine 114 can be or include any script, file, program, application, set of instructions, or computer-executable code that is configured to transmit, receive, and/or exchange data with one or more external sources. The delivery engine 114 may be or include, for instance, an API, communications interface, and so forth. In some embodiments, the delivery engine 114 may be configured to generate and transmit content, notifications, instructions, or other deliverables to the client device 150, to a system of record 118, and so forth. For instance, the delivery engine 114 may be configured to generate instructions for updating a system of record 118, notifications or prompts to a client device 150 associated with a node, and the like.

As described herein, electronic activity can include any type of electronic communication that can be stored or logged. Examples of electronic activities can include electronic mail messages, telephone calls, calendar invitations, social media messages, mobile application messages, instant messages, cellular messages such as SMS, MMS, among others, as well as electronic records of any other activity, such as digital content, such as files, photographs, screenshots, browser history, internet activity, shared documents, among others. Electronic activities can include electronic activities that can be transmitted or received via an electronic account, such as an email account, a phone number, an instant message account, among others.

Figures 4A, 4B, 4C:
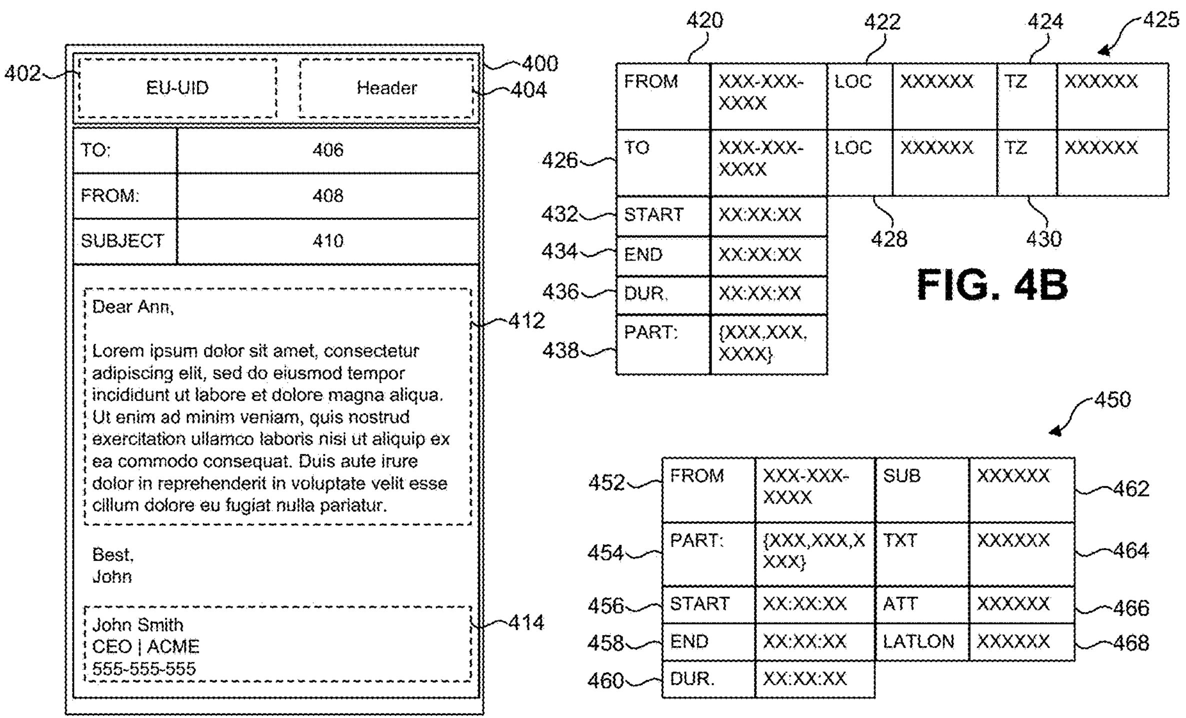
FIGS. 4A-4C illustrate various types of example electronic activities according to embodiments of the present disclosure.

Referring now to FIG. 4A, FIG. 4A illustrates an example electronic message 400. Each electronic message 400 may include an electronic activity unique identifier 402 and a message header 404. The message header 404 can include additional information relating to the transmission and receipt of the email message, including a time at which the email was sent, a message identifier identifying a message, an IP address associated with the message, a location associated with the message, a time zone associated with the sender, a time at which the message was transmitted, received, and first accessed, among others. Additionally, each electronic message 400 can identify one or more recipients 406, one or more senders 408. The electronic message 400 also generally includes a subject line 410, an email body 412, and an email signature 414 corresponding to the sender 408. The electronic message 400 can include additional data in the electronic message 400 or in the header or metadata of the electronic message 400.

Referring now to FIG. 4B, FIG. 4B illustrates an example call entry 425 representing a phone call or other synchronous communication (e.g., video call). The call entry 425 can identify a caller 420, a location 422 of the caller, a time zone 424 of the caller, a receiver 426, a location 428 of the receiver, a time zone 430 of the receiver, a start date and time 432, an end date and time 434, a duration 436 and a list of participants 538. In some embodiments, the times at which each participant joined and left the call can be included. Furthermore, the locations from which each of the callers called can be determined based on determining if the user called from a landline, cell phone, or voice over IP call, among others. The call entry 425 can also include fields for phone number prefixes (e.g., 800, 866, and 877), phone number extensions, and caller ID information.

Referring now to FIG. 4C, FIG. 4C illustrates an example calendar entry 450. The calendar entry 450 can identify a sender 452, a list of participants 454, a start date and time 456, an end date and time 458, a duration 460 of the calendar entry, a subject 462 of the calendar entry, a body 464 of the calendar entry, one or more attachments 466 included in the calendar entry and a location of event, described by the calendar entry 468. The calendar entry can include additional data in the calendar entry or in the header or metadata of the calendar entry 450.

The electronic activity can be stored on or at one or more data sources 120 for the data source providers 122. For example, the electronic activities can be stored on servers. The electronic activity can be owned or managed by one or more data source providers 122, such as companies that utilize the services of the data processing system 100. The electronic activity can be associated with or otherwise maintained, stored or aggregated by a data source 120, such as Google G Suite, Microsoft Office365, Microsoft Exchange, among others. In some embodiments, the electronic activity can be real-time (or near real-time) electronic activities, asynchronous electronic activity (such as emails, text messages, among others) or synchronous electronic activities (such as meetings, phone calls, video calls), or other activity in which two parties are communicating simultaneously.

A. Electronic Activity Ingestion

Figure 3A:
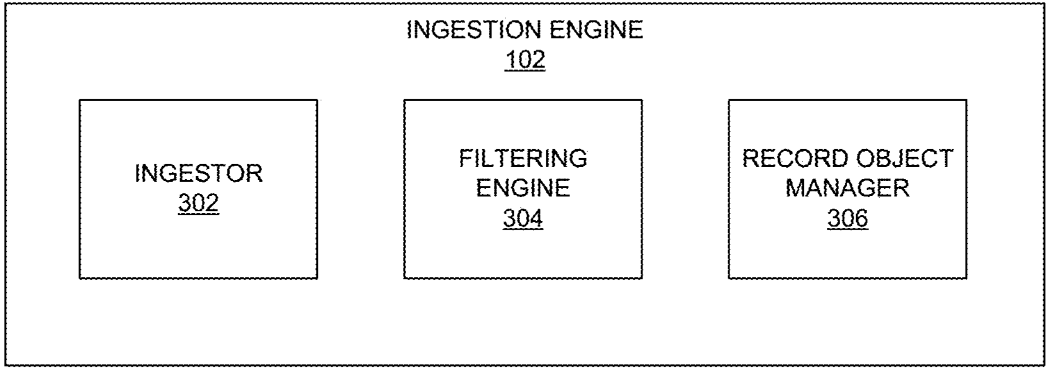
FIGS. 3A-3F illustrate detailed block diagrams of the components of the data processing system of FIG. 1 according to embodiments of the present disclosure.

Referring now to FIG. 3A, FIG. 3A illustrates a detailed block diagram of the ingestion engine 102. The ingestion engine 102 may be configured to ingest electronic activities and record objects. The ingestion engine 102 can include an ingestor 302, a filtering engine 304, and a record object manager 306. The ingestion engine 102 and each of the components of the ingestion engine 102 can be any script, file, program, application, set of instructions, or computer-executable code.

The ingestor 302 can be any script, file, program, application, set of instructions, or computer-executable code that is configured to enable a computing device on which the ingestor 302 is executed to perform one or more functions of the ingestor 302 described herein. The ingestor 302 can be configured to ingest electronic activities from the plurality of data source providers. The electronic activities may be received or ingested in real-time or asynchronously as electronic activities are generated, transmitted, or stored by the one or more data source providers.

The data processing system 100 or the ingestor 302 can ingest electronic activity from a plurality of different source providers. In some embodiments, the data processing system 100 or the ingestor 302 can be configured to manage electronic activities and one or more systems of record for one or more enterprises, organizations, companies, businesses, institutions or any other group associated with a plurality of electronic activity accounts. The data processing system 100 or the ingestor 302 can ingest electronic activities from one or more servers that hosts, processes, stores or manages electronic activities. In some embodiments, the one or more servers can be electronic mail or messaging servers. The data processing system 100 or the ingestor 302 can ingest all or a portion of the electronic activities stored or managed by the one or more servers. In some embodiments, the data processing system 100 or the ingestor 302 can ingest the electronic activities stored or managed by the one or more servers once or repeatedly on a periodic basis, such as daily, weekly, monthly or any other frequency.

The data processing system 100 or the ingestor 302 can further ingest other data that may be used to generate or update node profiles of one or more nodes maintained by the data processing system 100. The other data may also be stored by the one or more servers that hosts, processes, stores or manages electronic activities. This data can include contact data, such as names, addresses, phone numbers, company information, titles, among others.

The data processing system 100 can further ingest data from one or more systems of record. The systems of record can be hosted, processed, stored or managed by one or more servers of the systems of record. The systems of record can be linked or otherwise associated with the one or more servers that host, process, store or manage electronic activities. In some embodiments, both the servers associated with the electronic activities and the servers maintaining the systems of record may belong to the same organization or company.

The ingestor 302 can receive electronic activities and assign each electronic activity an electronic activity unique identifier (e.g., electronic activity unique identifier) to enable the data processing system 100 to uniquely identify each electronic activity. In some embodiments, the electronic activity unique identifier can be the same identifier as a unique electronic activity identifier included in the electronic activity. In some embodiments, the electronic activity unique identifier is included in the electronic activity by the source of the electronic activity or any other system.

The ingestor 302 can be configured to format the electronic activity in a manner that allows the electronic activity to be parsed or processed. In some embodiments, the ingestor 302 can identify one or more fields of the electronic activity and apply one or more normalization techniques to normalize the values included in the one or more fields. In some embodiments, the ingestor 302 can format the values of the fields to allow content filters to apply one or more policies to identify one or more regex patterns for filtering the content, as described herein.

The ingestor 302 can be configured to ingest electronic activities on a real-time or near real-time basis for accounts of one or more enterprises, organizations, companies, businesses, institutions or any other group associated with a plurality of electronic activity account with which the data processing system 100 has integrated. When an enterprise client subscribes to a service provided by the data processing system 100, the enterprise client provides access to electronic activities maintained by the enterprise client by going through an onboarding process. That onboarding process allows the data processing system 100 to access electronic activities owned or maintained by the enterprise client from one or more electronic activities sources. This can include the enterprise client's mail servers, one or more systems of record, one or more phone services or servers of the enterprise client, among other sources of electronic activity. The electronic activities ingested during an onboarding process may include electronic activities that were generated in the past, perhaps many years ago, that were stored on the electronic activities sources. In addition, in some embodiments, the data processing system 100 can be configured to ingest and re-ingest the same electronic activities from one or more electronic activities sources on a periodic basis, including daily, weekly, monthly, or any reasonable frequency.

The ingestor 302 can be configured to receive access to each of the electronic activities from each of these sources of electronic activity including the systems of record of the enterprise client. The ingestor 302 can establish one or more listeners, or other mechanisms to receive electronic activities as they are received by the sources of the electronic activities enabling real-time or near real-time integration.

As more and more data is ingested and processed as described herein, the node graph 110 generated by the data processing system 100 can continue to store additional information obtained from electronic activities as electronic activities are accessed by the data processing system 100. The additional information, as will be described herein, can be used to populate missing fields or add new values to existing fields, reinforce field values that have low confidence scores and further increase the confidence score of field values, adjust confidence scores of certain data points, and identify patterns or make deductions based on the values of various fields of node profiles of nodes included in the graph.

As more data is ingested, the data processing system 100 can use existing node graph data to predict missing or ambiguous values in electronic activities such that the more node profiles and data included in the node graph 110, the better the predictions of the data processing system 100, thereby improving the processing of the ingested electronic activities and thereby improving the quality of each node profile of the node graph 110, which eventually will improve the quality of the overall node graph 110 of the data processing system 100.

The data processing system 100 can be configured to periodically regenerate or recalculate the node graph 110. The data processing system 100 can do so responsive to additional data being ingested by the data processing system 100. When new electronic activities or data is ingested by the data processing system 100, the data processing system 100 can be configured to recalculate the node graph 110 as the confidence scores (as will be described later) can change based on the information included in the new electronic activities. In some embodiments, the ingestor 302 may re-ingest previously ingested data from the one or more electronic activity sources or simply ingest the new electronic activity not previously ingested by the data processing system 100.

B. Filtering Engine

The filtering engine 304 can be any script, file, program, application, set of instructions, or computer-executable code that is configured to enable a computing device on which the filtering engine 304 is executed to perform one or more functions of the filtering engine 304 described herein.

The filtering engine 304 can use information identified, generated or otherwise made available by a tagging engine 312 (described below). The filtering engine 304 can be configured to block, remove, redact, delete, or authorize electronic activities tagged or otherwise parsed or processed by the tagging engine 312. For example, the tagging engine 312 can be configured to assign tags to electronic activities, node profiles, systems of record 118, among others. The filtering engine 304 can be configured with a policy or rule that prevents ingestion of an electronic activity having a specific tag or any combination of tags, such as a personal tag, a credit card tag or a social security tag. By applying filtering rules or policies to tags assigned to electronic activities, node profiles, or records from the one or more systems of record, among others, the data processing system 100 can be configured to block, delete, redact or authorize electronic activities at the ingestion step or redact out parts or whole values of any of the fields in the ingested electronic activities.

C. Record Object Manager

The record object manager 306 can be any script, file, program, application, set of instructions, or computer-executable code that is configured to enable a computing device on which the record object manager 306 is executed to perform one or more functions of the record object manager 306 described herein. The record object manager 306 can be configured to maintain data regarding record objects of multiple systems of record and can be configured to augment information for a record object by extracting information from multiple record objects across a plurality of systems of record. The record object manager 306 can function as a system of record object aggregator that is configured to aggregate data points (e.g., electronic activities, record objects, etc.) from many systems of record, calculate the contribution score of each data point, and generate a timeline of the contribution score of each of those data points. The record object manager 306 or the data processing system 100 in general can then enrich the node graph 110 generated and maintained by the data processing system 100 by updating node profiles using the data points and their corresponding contribution scores. In certain embodiments, the record object manager 306 can be further configured to utilize the data from the node graph to update or fill in missing data in a target system of record provided the data in the node graph satisfies a predetermined confidence value.

Figure 3B:
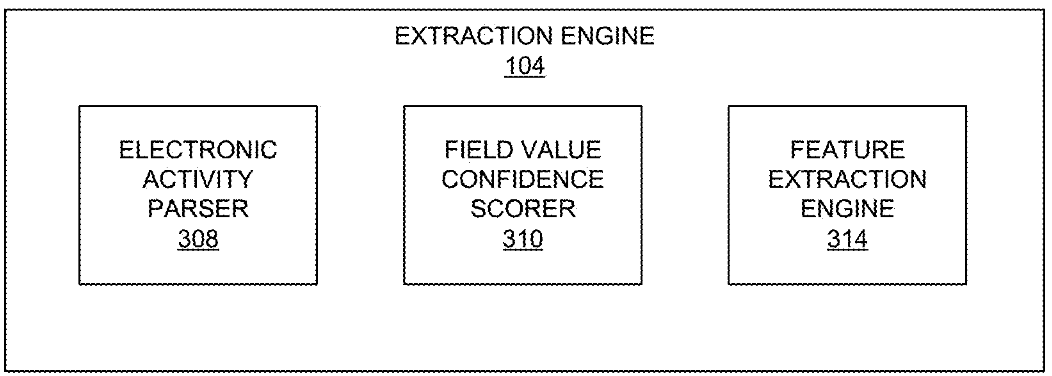

Referring now to FIG. 3B, FIG. 3B illustrates a detailed block diagram of the extraction engine 104. The extraction engine 104 may include electronic activity parser 308, field value confidence scorer 310, and/or feature extraction engine 314. Extraction engine 104 may be configured to extract data from electronic activities, record objects, systems of record, and/or any other item or system that is ingested by ingestion engine 102. The extraction engine 104 and each of the components of the extraction engine 104 can be any script, file, program, application, set of instructions, or computer-executable code.

D. Electronic Activity Parsing

The electronic activity parser 308 can be any script, file, program, application, set of instructions, or computer-executable code, which is configured to enable a computing device on which the electronic activity parser 308 is executed to perform one or more functions of the electronic activity parser 308 described herein.

The electronic activity parser 308 can be configured to parse the electronic activity to identify one or more values of fields to be used in generating node profiles of one or more nodes and associate the electronic activities between nodes for use in determining the connection and connection strength between nodes. The node profiles can include fields having name-value pairs. The electronic activity parser 308 can be configured to parse the electronic activity to identify values for as many fields of the node profiles of the nodes with which the electronic activity is associated.

The electronic activity parser 308 can be configured to identify each of the nodes associated with the electronic activity. In some embodiments, the electronic activity parser 308 can parse the metadata of the electronic activity to identify the nodes. The metadata of the electronic activity can include a To field, a From field, a Subject field, a Body field, a signature within the body and any other information included in the electronic activity header that can be used to identify one or more values of one or more fields of any node profile of nodes associated with the electronic activity. In some embodiments, non-email electronic activity can include meetings or phone calls. The metadata of such non-email electronic activity can include one or more participants of the meeting or call. In some embodiments, nodes are associated with the electronic activity if the node is a sender of the electronic activity, a recipient of the electronic activity, a participant of the electronic node, or identified in the contents of the electronic activity. The node can be identified in the contents of the electronic activity or can be inferred based on information maintained by the data processing system 100 and based on the connections of the node and one or more of the sender or recipients of the electronic activity.

The electronic activity parser 308 can be configured to parse the electronic activity to identify fields, attributes, values, or characteristics of the electronic activity. In some embodiments, the electronic activity parser 308 can apply natural language processing techniques to the electronic activity to identify regex patterns, words or phrases, or other types of content that may be used for sentiment analysis, filtering, tagging, classifying, deduplication, effort estimation, and other functions performed by the data processing system 100.

In some embodiments, the electronic activity parser 308 can be configured to parse an electronic activity to identify values of fields or attributes of one or more nodes. For instance, when an electronic mail message is ingested into the data processing system 100, the electronic activity parser 308 can identify a FROM field of the electronic mail message. The FROM field can include a name and an email address. The name can be in the form of a first name and a last name or a last name, first name. The electronic activity parser 308 can extract the name in the FROM field and the email address in the FROM field to determine whether a node is associated with the sender of the electronic mail message.

E. Node Field Value Confidence Scoring

The field value confidence scorer 310 can be any script, file, program, application, set of instructions, or computer-executable code, that is configured to enable a computing device on which the field value confidence scorer 310 is executed to perform one or more functions of the field value confidence scorer 310 described herein. The field value confidence scorer 310 can be configured to determine a confidence of each value of an attribute of a node profile. The confidence of a value is determined based in part on a number of electronic activities or sources that contribute to the value, time since each electronic activity provided support or evidence of the value, time since the field value in the source system of record was last modified or confirmed by a human operator, as well as the source of the electronic activity. Electronic activity that is received from mail servers or another source that does not involve manual entry may be assigned a greater weight (or trust/health score) than a source that involves manual entry, such as a customer relationship management tool.

The field value confidence scorer 310 can be configured to determine a confidence of each value of an attribute of a node profile. An attribute or field can have multiple candidate values and the value with the highest confidence score can be used by the data processing system 100 for confirming or validating the value of the field. The field value confidence scorer 310 can apply one or more scoring algorithms to determine the likelihood that each value is a correct value of the field. It should be appreciated that a value does not need to be current to be correct. In some embodiments, as new entities are onboarded into the system, electronic activities and systems of record corresponding to systems of record of the new entities can be processed by the data processing system 100. In processing these electronic activities and systems of record, some electronic activities can be associated with dates many years in the past. Such electronic activities are not discarded. Rather, the data processing system 100 processes such electronic activities and information extracted from these electronic activities are used to populate values of fields of node profiles. Since each data point is associated with a timestamp, the data point may provide evidence for a certain value even if that value is not a current value. One example of such a value can be a job title of a person. The person many years ago may simply have been an associate at a law firm. However, that person is now a partner at the firm. If emails sent from this person's email account are processed by the data processing system 100, more recently sent emails can have a signature of the person indicating he's a partner, while older emails will have a signature of the person indicating he's an associate. Both values, partner and associate are correct values except only partner is the current value for the job title field. The job title field can include one or more fields, for instance, a seniority field and a department field. A confidence score of the current value may be higher in some embodiments as data points that are more recent may be assigned a higher contribution score than data points that are older. Additional details about contribution scores and confidence scores are provided below.

In some embodiments, a node profile can correspond to or represent a person. As will be described later, such node profiles can be referred to as member node profiles. The node profile can be associated with a node profile identifier that uniquely identifies the node profile. Each node profile can include a plurality of attributes or fields, such as First name, Last name, Email, job title, Phone, LinkedIn URL, Twitter handle, among others. In some embodiments, a node profile can correspond to a company. As will be described later, such node profiles can be referred to as group node profiles. The group node profile can be similar to the member node profile of a person except that certain fields may be different, for example, a member node profile of a person may include a personal cell phone number while a group node of a company may not have a personal cell phone number but may instead have a field corresponding to parent company or child company or fields corresponding to CEO, CTO, CFO, among others. As described herein, member node profiles of people and group node profiles of companies for the most part function the same and as such, descriptions related to node profiles herein relate to both member node profiles and group node profiles. Each field or attribute can itself be a 3-dimensional array. For instance, the First name field can have two values: first name_1|first name_2, one Last name value, and three email address values email_A|email_B|email_C. Each value can have an Occurrence (counter) value, and for each occurrence that contributes to the Occurrence value, there is an associated Source (for example, email or System of record) value and an associated timestamp (for example, today, 3:04 pm PST) value. In this way, in some embodiments, each value of a field or attribute can include a plurality of arrays, each array identifying a data point or an electronic activity, a source of the data point or electronic activity, a time associated with the data point or electronic activity, a contribution score of the data point or electronic activity and, in some embodiments, a link to a record of the data point or electronic activity. It should be appreciated that the data point can be derived from a system of record. Since systems of records can have varying levels of trust scores, the contribution score of the data point can be based on the trust score of the system of record from which the data point was derived. Stated in another way, in addition to each field being a 3-dimensional array, in some embodiments, each value of a field can be represented as a plurality of arrays. Each array can identify an electronic activity that contributed to the value of the field, a time associated with the electronic activity and a source associated with the electronic activity. In certain embodiments, the sub-array of occurrences, sources and times can be a fully featured sub-array of data with linkage to where the data came from.

F. Feature Extraction

The feature extraction engine 314 of the extraction engine 104 can be any script, file, program, application, set of instructions, or computer-executable code, that is configured to enable a computing device on which the feature extraction engine 314 is executed to extract or identify features from one or more electronic activities and/or corresponding node profiles maintained by the data processing system 100 and use the extracted or identified features to generate corresponding feature vectors for the one or more electronic activities.

The feature extraction engine 314 can be a component of the electronic activity parser 308 or otherwise interface with the electronic activity parser 308 to parse electronic activities and extract features from electronic activities. For example, the electronic activity parser 308 can parse ingested electronic activities, such as, emails, calendar meetings, and phone calls. The feature extraction engine 314 can, for each electronic activity, extract various features from the electronic activity and in some embodiments, from one or more node profiles corresponding to the electronic activity that an electronic activity linking engine 328 (described below) can use to link the electronic activity to one or more record objects of the one or more systems of record. In some embodiments, before an electronic activity can be linked to a record object of a system of record, the electronic activity can be matched to one or more node profiles in the node graph. In this way, the feature extraction engine 314 can generate, based on the parsed data from the electronic activity parser 308, a feature vector for the electronic activity that can be used to link the electronic activity to a record object based on features extracted from the electronic activity as well as one or more node profiles of the node graph.

The feature vector can be an array of feature values that is associated with the electronic activity. The feature vector can include each of the features that were extracted or identified in the electronic activity by the feature extraction engine 314. For example, the feature vector for an email can include the sending email address, the receiving email address, and data parsed from the email signature. Each feature value in the array can correspond to a feature or include a feature-value pair. For example, the contact feature "John Smith" can be stored in the feature vector as "John Smith" or "name: John Smith" or "first name: John" "last name: Smith." As described herein, a matching engine 316 (described below) can use the feature vector to match or link the electronic activity to a record object. The feature vector can include information extracted from an electronic activity and also include information inferred from one or more node profiles of the data processing system 100. The feature vector can be used to link an electronic activity to at least particular record object of a system of record by matching the feature values of the feature vector to a record object. For instance, if the feature vector includes the values "John" for first name and "Smith" for last name, the matching engine 316 can link the electronic activity to a record object, such as a lead record object that includes the name "John Smith" assuming other matching conditions are also met.

Figure 3C:
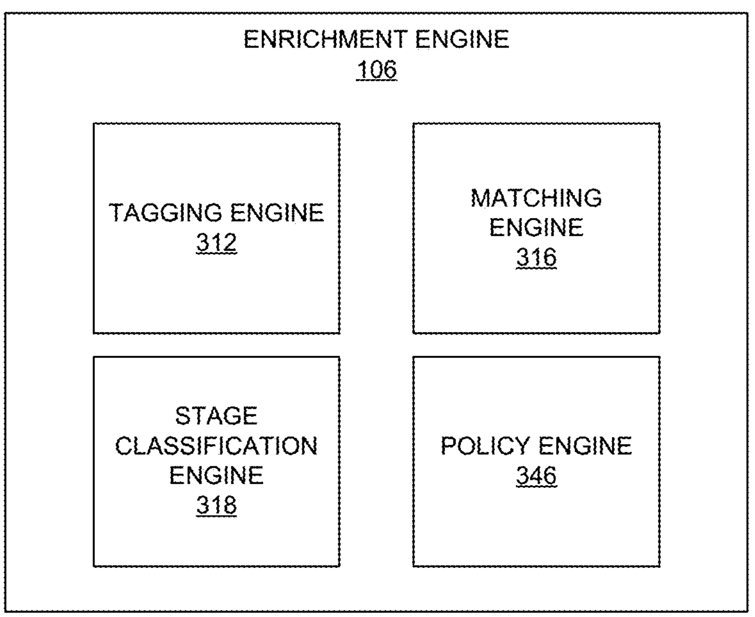

Referring now to FIG. 3C, FIG. 3C illustrates a detailed block diagram of the enrichment engine 106. The enrichment engine 106 may be configured to identify data extracted from electronic activities and update node graph 110 based on the extracted data. The enrichment engine 106 may include a tagging engine 312, matching engine 316, and/or a policy engine 346. The enrichment engine 106 and each of the components of the enrichment engine 106 can be any script, file, program, application, set of instructions, or computer-executable code.

G. Electronic Activity Tagging

The tagging engine 312 can be any script, file, program, application, set of instructions, or computer-executable code that is configured to enable a computing device on which the tagging engine 312 is executed to perform one or more functions of the tagging engine 312 described herein.

The tagging engine 312 can use information identified, generated or otherwise made available by the electronic activity parser 308. The tagging engine 312 can be configured to assign tags to electronic activities, node profiles, systems of record, among others. By having tags assigned to electronic activities, node profiles, records ingested from one or more systems of record, among others, the data processing system 100 can be configured to better utilize the electronic activities to more accurately identify nodes, and determine types and strengths of connections between nodes, among others. In some embodiments, the tagging engine 312 can be configured to assign a confidence score to one or more tags assigned by the tagging engine 312. The tagging engine 312 can periodically update a confidence score as additional electronic activities are ingested, re-ingested and analyzed. Additional details about some of the types of tags are provided herein.

The tagging engine 312 can assign one or more tags to electronic activities. The tagging engine 312 can determine, for each electronic activity, a type of electronic activity. Types of electronic activities can include meetings, electronic messages, and phone calls. For meetings and electronic messages such as emails, the tagging engine 312 can further determine if the meeting or electronic message is internal or external and can assign an internal tag to meetings or emails identified as internal or an external tag to meetings and emails identified as external. Internal meetings or emails may be identified as internal if each of the participants or parties included in the meeting or emails belong to the same company as the sender of the email or host of the meeting. The tagging engine 312 can determine this by parsing the email addresses of the participants and determining that the domain of the email addresses map to the domain name or an array of domain names, belonging to the same company or entity. In some embodiments, the tagging engine 312 can determine if the electronic activity is internal by parsing the email addresses of the participants and determining that the domain of the email addresses map to the same company or entity after removing common (and sometimes free) mail service domains, such as gmail.com and yahoo.com, among others. The tagging engine 312 may apply some additional logic to determine if emails belong to the same entity and use additional rules for determining if an electronic activity is determined to be internal or external. The tagging engine 312 can also identify each of the participants and determine whether a respective node profile of each of the participants is linked to the same organization. In some embodiments, the tagging engine 312 can determine if the node profiles of the participants are linked to a common group node (such as the organization's node) to determine if the electronic activity is internal. For phone calls, the tagging engine 312 may determine the parties to which the phone numbers are either assigned and determine if the parties belong to the same entity or different entities.

In some embodiments, the electronic activities are exchanged between or otherwise involve nodes (or the entities represented by the nodes). For example, the nodes can be representative of people or companies. In some embodiments, nodes can be member nodes or group nodes. A member node may refer to a node representative of a person that is part of a company or other organizational entity. A group node may refer to a node that is representative of the company or other organizational entity and is linked to multiple member nodes. The electronic activity may be exchanged between member nodes in which case the system is configured to identify the member nodes and the one or more group nodes associated with each of the member nodes.

The data processing system 100 can be configured to assign each electronic activity a unique electronic activity identifier. This unique electronic activity identifier can be used to uniquely identify the electronic activity. Further, each electronic activity can be associated with a source that provides the electronic activity. In some embodiments, the data source can be the company or entity that authorizes the data processing system 100 to receive the electronic activity. In some embodiments, the source can correspond to a system of record, an electronic activity server that stores or manages electronic activity, or any other server that stores or manages electronic activity related to a company or entity. As will be described herein, the quality, health or hygiene of the source of the electronic activity may affect the role the electronic activity plays in generating the node graph. The data processing system 100 can be configured to determine a time at which the electronic activity occurred. In some embodiments, the time may be based on when the electronic activity was transmitted, received or recorded. As will be described herein, the time associated with the electronic activity can also affect the role the electronic activity plays in generating the node graph.

H. Record Object Matching

The policy engine 346 can be any script, file, program, application, set of instructions, or computer-executable code that is configured to enable a computing device on which the policy engine 346 is executed to manage, store, and select matching strategies. The policy engine 346 can generate, manage, and store one or more matching strategy policies for each of the data source providers. For example, the policy engine 346 can generate matching strategy and restriction strategy policies for each division or group of users within a data source provider.

In some embodiments, a matching policy can include a data structure that indicates which matching strategies to apply to an electronic activity for a given data source provider. For example, the matching policy can include a list of matching strategies that are used to select record objects. The list of matching strategies can be manually created by a user or automatically generated or suggested by the system. In some embodiments, the policy engine 346 can learn one or more matching strategies based on observing how one or more users previously matched electronic activities to record objects. These matching strategies can be specific to a particular user, group, account, company, or across multiple companies. In some embodiments, the policy engine 346 can detect a change in linkages between one or more electronic activities and record objects in the system of record (for example, responsive to a user linking an electronic activity to another object inside a system of record manually). The policy engine 346 can, in response to detecting the change, learn from the detected change and update the matching strategy or create a new matching strategy within the matching policy. The policy engine 346 can be configured to then propagate the learning from that detected change across multiple matching strategies corresponding to one or more users, groups, accounts, and companies. The system can also be configured to find all past matching decisions that would have changed had the system detected the user-driven matching change before, and update those matching decisions retroactively using the new learning.

In some embodiments, the matching policy can also identify which restriction strategies to apply to an electronic activity for a given data source provider. For example, the matching policy can include a list of restriction strategies that are used to restrict record objects. The list of restriction strategies can be manually created by a user or automatically generated or suggested by the system. In some embodiments, the policy engine 346 can learn one or more restriction strategies based on observing how one or more users previously matched or unmatched electronic activities to record objects. These restriction strategies can be specific to a particular user, group, account, company, or across multiple companies. In some embodiments, the policy engine 346 can detect a change in linkages between one or more electronic activities and record objects in the system of record (for example, responsive to a user linking or unlinking an electronic activity to another object inside a system of record manually). The policy engine 346 can, in response to detecting the change, learn from the detected change and update the restriction strategy or create a new restriction strategy within the matching policy. The policy engine 346 can be configured to then propagate the learning from that detected change across multiple restriction strategies corresponding to one or more users, groups, accounts, and companies. The system can also be configured to find past matching decisions that would have changed had the system detected the user-driven restriction change before, and update those matching decisions retroactively using the new learning.

The policy engine 346 can update the matching policy with input or feedback from the data source provider with which the matching policy is associated. For example, the data source provider can provide feedback when an electronic activity is incorrectly linked and the matching policy can be updated based on the feedback. Updating a matching policy can include reordering the matching strategies, adding matching or restriction strategies, adjusting individual matching strategy behavior, removing matching strategies, or adding restriction strategies.

Figure 3D:
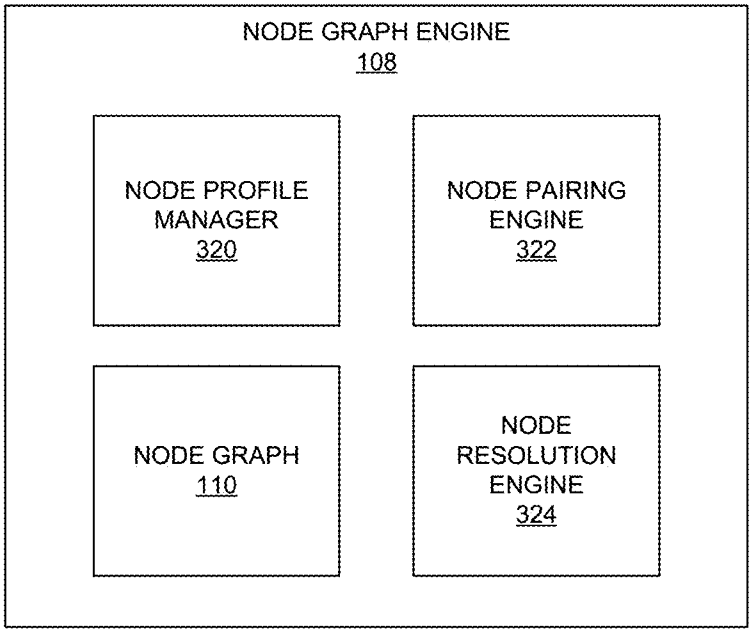

Referring now to FIG. 3D, FIG. 3D illustrates a detailed block diagram of the node graph engine 108. The node graph engine 108 may be configured to store and manage the node graph 110 and node profiles that are associated with the node graph 110. Node graph engine 108 may include a node profile manager 320, a node pairing engine 322, and a node resolution engine 324. The node graph engine 108 and each of the components of the node graph engine 108 can be any script, file, program, application, set of instructions, or computer-executable code designed or implemented to generate, modify, update, revise, and store node graph 110 (e.g., in one or more databases or data structures).

I. Node Profiles

The node profile manager 320 can be any script, file, program, application, set of instructions, or computer-executable code that is configured to enable a computing device on which the node profile manager 320 is executed to perform one or more functions of the node profile manager 320 described herein. The node profile manager 320 is configured to manage node profiles associated with each node. Node profiles of nodes are used to construct a node graph that includes nodes linked to one another based on relationships between the nodes that can be determined from electronic activities parsed and processed by the data processing system 100 as well as other information that may be received from one or more systems of record.

Figure 5:
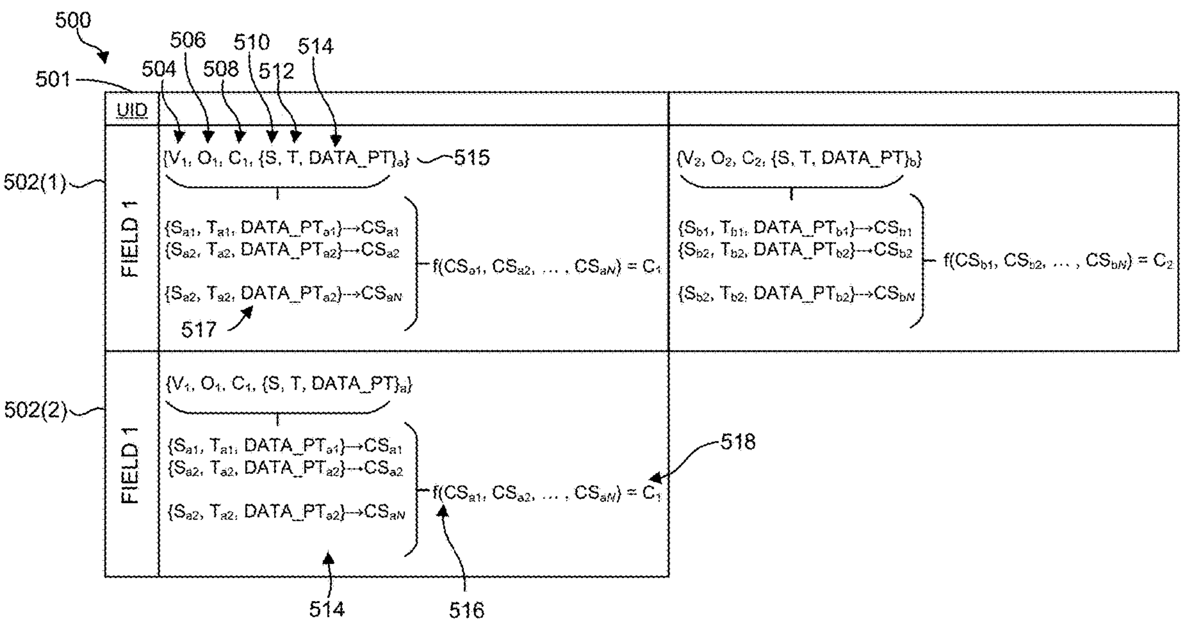
FIG. 5 illustrates a representation of a node profile of a node according to embodiments of the present disclosure.

Referring briefly to FIG. 5, depicted is a representation of a node profile 500 of a node. The node profile 500 may be generated by the node profile manager 320 (e.g., based on electronic activities). The node profile 500 can include a unique node identifier 501 and one or more fields 502(1)-502(N) (generally referred to as fields 502). Each field 502 can include one or more value data structures 503. Each value data structure 503 can include a value (V) 504, an occurrence metric (O) 506, a confidence score (C) 508, and an entry 510 corresponding to the electronic activity which was used for identifying the value 504. Each entry 510 can identify a data source (S) 512 from which the value 504 was identified (for instance, a data source 120 corresponding to a system of record or a data source 120 of an electronic activity), a number of occurrences of the value that appear in the electronic activity, a time 512 associated with the electronic activity, and a data point identifier 514 (e.g., identifying the electronic activity, such as an electronic activity unique identifier).

In some embodiments, the node profile manager 320 can be configured to compute the occurrence metric 506 based on the number of times a particular value 504 is identified in a group of electronic activities or systems of record. Hence, the occurrence metric 506 can identify or correspond to a number of times that value is confirmed or identified from electronic activities or systems of record. The node profile manager 320 can be configured to update the occurrence metric each time the value is confirmed. In some embodiments, the electronic activity can increase the occurrence metric of a value more than once. For instance, for a field such as name, the electronic activity parser 308 can parse multiple portions of an electronic activity. In some embodiments, parsing multiple portions of the electronic activity can provide multiple confirmations of, for example, the name associated with the electronic activity. In some embodiments, the occurrence metric is equal to or greater than the number of electronic activities or systems of record that contribute to the value. The node profile manager 320 further maintains an array including the plurality of entries 517.

The node profile manager 320 can be configured to maintain a node profile for each node that includes a time series of data points for value data structures 503 that is generated based on electronic activities identifying the respective node. The node profile manager 320 can maintain, for each field of the node profile, one or more value data structures 503. The node profile manager 320 can maintain a confidence score 508 for each value of the field. As described herein, the confidence score of the value can be determined using information relating to the electronic activities or systems of record that contribute to the value. The confidence score for each value can also be based on the below-described health score of the data source from which the value was received. As more and more electronic activities and data from more systems of record are ingested by the data processing system 100, values of each of the fields of node profiles of nodes will become more enriched thereby further refining the confidence score of each value.

In some embodiments, the node profile can include different types of fields for different types of nodes. Member node profiles and group node profiles may have some common fields but may also include different fields. Further, member node profiles may include fields that get updated more frequently than group nodes. Examples of some fields of member node profiles can include i) First name; ii) Last name; iii) Email; iv) job title; v) Phone; vi) Social media handle; vii) LinkedIn URL; viii) website; among others. Each of the fields can be a 3-dimensional array. In some embodiments, each field corresponds to one or more name value pairs, where each field is a name and each value for that field is a value. Examples of some fields of group nodes can include i) Company or Organization name; ii) Address of Company; iii) Phone; iv) Website; v) Social media handle; vi) LinkedIn handle; among others. Each of the fields can be a 3-dimensional array. In some embodiments, each field corresponds to one or more name value pairs, where each field is a name and each value for that field is a value.

The node profile manager 320 can maintain, for each field of each node profile, a field data structure that can be stored as a multidimensional array. The multidimensional array can include a dimension relating to data points that identify a number of electronic activities or system of records that contribute to the field or the value of the field. Another dimension can identify the source, which can have an associated trust score that can be used to determine how much weight to assign to the data point from that source. Another dimension can identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. These dimensions can be used to determine a confidence score of the value as will be described herein.

In some embodiments, the node profile manager 320 can be configured to compute the confidence score 508 as a function 518 of a number of occurrences of the value 504 included in an electronic activity. For example, the confidence score 508 of the value 504 may increase as the number of occurrences of the value 504 included in the electronic activity increases. In some embodiments, the node profile manager 320 can assign a contribution score (CS) to each entry 510 corresponding to a particular value (e.g., a data point). The contribution score can be indicative of the data point's contribution towards the confidence score 508 of the value. In some embodiments, the contribution score of an entry 510 can decay over time as the data point becomes staler. The contribution scores of each of the data points derived from electronic activities and systems of record can be used to compute the confidence score 508 of the value 504 of a field 502 of the node profile 500.

Each of the values 504 included in the node profile 500 can be supported by one or more data points or entries 510. Data points can be pieces of information or evidence that can be used to support the existence of values of fields of node profiles. A data point can be an electronic activity, a record object of a system of record, or other information that is accessible and processable by the data processing system 100. In some embodiments, a data point can identify an electronic activity, a record object of a system of record, or other information that is accessible and processable by the data processing system 100 that serves as a basis for supporting a value in a node profile. Each data point can be assigned its own unique identifier. Each data point can be associated with a source of the data point identifying an origin of the data point. The source of the data point can be a mail server, a system of record, among others. Each of these data points can also include a timestamp. The timestamp of a data point can identify when the data point was either generated (in the case of an electronic activity such as an email) or the record object that serves as a source of the data point was last updated (in the case when the data point is extracted from a system of record). Each data point can further be associated with a trust score of the source of the data point. The trust score of the source can be used to indicate how trustworthy or reliable the data point is. The data point can also be associated with a contribution score that can indicate how much the data point contributes towards a confidence score of the value associated with the data point. The contribution score can be based on the trust score of the source (which can be based in part on a health score of the source) and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

The table below illustrates various values for various fields and includes an array of data points that contribute to the respective value. As shown in the table, the same electronic activity can serve as different data points for different values. Further, the table illustrates a simplified form for the same of convenience and understanding. Different values can be supported by different number of data points. As will be described below, it can be challenging to match electronic activities to node profiles.

Field: First Name
Value: John [Confidence Score] = 0.8

| DP # | DP ID | TimeStamp | ActivityID | Source | Trust Score | Contribution Score |
|---|---|---|---|---|---|---|
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |
| DP 4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |

Field: First Name
Value: Jonathan [Confidence Score] = 0.78

| DP # | DP ID | TimeStamp | ActivityID | Source | Trust Score | Contribution Score |
|---|---|---|---|---|---|---|
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP3: | DP ID343 | 3/1/2018 1 pm ET | EA-017 | Email | 100 | 0.7 |
| DP4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |

Field: Title
Value: Director [Confidence Score] = 0.5

| DP # | DP ID | TimeStamp | ActivityID | Source | Trust Score | Contribution Score |
|---|---|---|---|---|---|---|
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID243 | 3/1/2017 1 pm ET | EA-117 | Email | 100 | 0.65 |
| DP 4: | DP ID543 | 3/1/2018 1 pm ET | SOR-087 | CRM | 5 | 0.05 |

Field: Title
Value: CEO [Confidence Score] = 0.9

| DP # | DP ID | TimeStamp | ActivityID | Source | Trust Score | Contribution Score |
|---|---|---|---|---|---|---|
| DP 1: | DP ID343 | 3/1/2018 1 pm ET | EA-017 | Email | 100 | 0.7 |
| DP 2: | DP ID458 | 7/1/2018 3 pm ET | EA-098 | Email | 100 | 0.8 |
| DP 3: | DP ID425 | 3/18/2018 2 pm ET | SOR-015 | CRM | 65 | 0.54 |

Field: Company
Value: Acme [Confidence Score] = 0.6

| DP # | DP ID | TimeStamp | ActivityID | Source | Trust Score | Contribution Score |
|---|---|---|---|---|---|---|
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |

-continued

| Field: Company<br>Value: NewCo [Confidence Score] = 0.9 | | | | | | |
|---|---|---|---|---|---|---|
| DP # | DP ID | TimeStamp | ActivityID | Source | Trust Score | Contribution Score |
| DP 1: | DP ID458 | 7/1/2018 3 pm ET | EA-098 | Email | 100 | 0.8 |
| DP 2: | DP ID654 | 7/18/2018 2 pm ET | EA-127 | Email | 100 | 0.85 |
| DP 3: | DP ID876 | 8/1/2018 1 pm ET | EA-158 | Email | 100 | 0.9 |

| Field: Cell Phone<br>Value: 617-555-2000 [Confidence Score] = 0.95 | | | | | | |
|---|---|---|---|---|---|---|
| DP # | DP ID | TimeStamp | ActivityID | Source | Trust Score | Contribution Score |
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |
| DP 4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |
| DP 6: | DP ID654 | 7/18/2018 2 pm ET | EA-127 | Email | 100 | 0.85 |
| DP 7: | DP ID876 | 8/1/2018 1 pm ET | EA-158 | Email | 100 | 0.9 |

As a result of populating values of fields of node profiles using electronic activities, the node profile manager 320 can generate a node profile that is unobtrusively generated from electronic activities that traverse networks. In some embodiments, the node profile manager 320 can generate a node profile that is unobtrusively generated from electronic activities and systems of record.

J. Matching Electronic Activity to Node Profiles

The node profile manager 320 can be configured to manage node profiles by matching electronic activities to one or more node profiles. Responsive to the electronic activity parser 308 parsing the electronic activity to identify values corresponding to one or more fields or attributes of node profiles, the node profile manager 320 can apply an electronic activity matching policy to match electronic activities to node profiles. In some embodiments, the node profile manager 320 can identify each of the identified values corresponding to a sender of the electronic activity to match the electronic activity to a node profile corresponding to the sender.

Using an email message as an example of an electronic activity, the node profile manager 320 may first determine if the parsed values of one or more fields corresponding to the sender of the email message match corresponding values of fields. In some embodiments, the node profile manager 320 may assign different weights to different fields based on a uniqueness of values of the field. For instance, email addresses may be assigned greater weights than first names or last names or phone numbers if the phone number corresponds to a company.

In some embodiments, the node profile manager 320 can use data from the electronic activity and one or more values of fields of candidate node profiles to determine whether or not to match the electronic activity to one or more of the candidate node profiles. The node profile manager 320 can attempt to match electronic activities to one or more node profiles maintained by the node profile manager 320 based on the one or more values of the node profiles. The node profile manager 320 can identify data, such as strings or values from a given electronic activity and match the strings or values to corresponding values of the node profiles. In some embodiments, the node profile manager 320 can compute a match score between the electronic activity and a candidate node profile by comparing the strings or values of the electronic activity match corresponding values of the candidate node profile. The match score can be based on a number of fields of the node profile including a value that matches a value or string in the electronic activity. The match score can also be based on different weights applied to different fields. The weights may be based on the uniqueness of values of the field, as mentioned above. The node profile manager 320 can be configured to match the electronic activity to the node with the best match score. For example, the best match score can be the highest or greatest match score. In some embodiments, the node profile manager 320 can match the electronic activity to each candidate node that has a match score that exceeds a predetermined threshold. Further, the node profile manager 320 can maintain a match score for each electronic activity to that particular node profile, or to each value of the node profile to which the electronic activity matched. By doing so, the node profile manager 320 can use the match score to determine how much weight to assign to that particular electronic activity. Stated in another way, the better the match between the electronic activity and a node profile, the greater the influence the electronic activity can have on the values (for instance, the contribution scores of the data point on the value and as a result, in the confidence scores of the values) of the node profile. In some embodiments, the node profile manager 320 can assign a first weight to electronic activities that have a first match score and assign a second weight to electronic activities that have a second match score. The first weight may be greater than the second weight if the first match score is greater than the second match score. In some embodiments, if no nodes are found to match the electronic activity or the match score between the email message and any of the candidate node profiles is below a threshold, the node profile manager 320 can be configured to generate a new node profile to which the node profile manager assigns a unique node identifier 501. The node profile manager 320 can then populate various fields of the new node profile from the information extracted from the electronic activity parser 308 after the electronic activity parser 308 parses the electronic activity.

In addition to matching the electronic activity to a sender node, the node profile manager 320 is configured to identify each of the nodes to which the electronic activity can be matched. For instance, the electronic activity can be matched to one or more recipient nodes using a similar technique except that the node profile manager 320 is configured to look at values extracted from the TO field or any other field that can include information regarding the recipient of the node. In some embodiments, the electronic activity parser 308 can be configured to parse a name in the salutation portion of the body of the email to identify a value of a name corresponding to a recipient node. In some embodiments, the node profile manager 320 can also match the electronic activity to both member nodes as well as the group nodes to which the member nodes are identified as members.

In some embodiments, the electronic activity parser 308 can parse the body of the electronic activity to identify additional information that can be used to populate values of one or more node profiles. The body can include one or more phone numbers, addresses, or other information that may be used to update values of fields, such as a phone number field or an address field. Further, if the contents of the electronic activity includes a name of a person different from the sender or recipient, the electronic activity parser 308 can further identify one or more node profiles matching the name to predict a relationship between the sender and/or recipient of the electronic activity and a node profile matching the name included in the body of the electronic activity.

The node profile manager 320 can be configured to identify a node that has fields having values that match the values included in the node profile of the node.

K. Node Profile Value Prediction and Augmentation

The node profile manager 320 can be configured to augment node profiles with additional information that can be extracted from electronic activities or systems of record or that can be inferred based on other similar electronic activities or systems of record. In some embodiments, the node profile manager 320 can determine a pattern for various fields across a group of member nodes (such as employees of the same company). For instance, the node profile manager 320 can determine, based on multiple node profiles of member nodes belonging to a group node, that employees of a given company are assigned email addresses following a given regex pattern. For instance, [first name].[last name] @ [company domain].com. As such, the node profile manager 320 can be configured to predict or augment a value of a field of a node profile of an employee of a given company when only certain information or limited of the employee is known by the node profile manager 320.

As described herein, the node profile manager 320 can be configured to use information from node profiles to predict other values. In particular, there is significant interplay between dependent fields such as phone numbers and addresses, and titles and companies, in addition to email addresses and names, among others.

Figure 6:
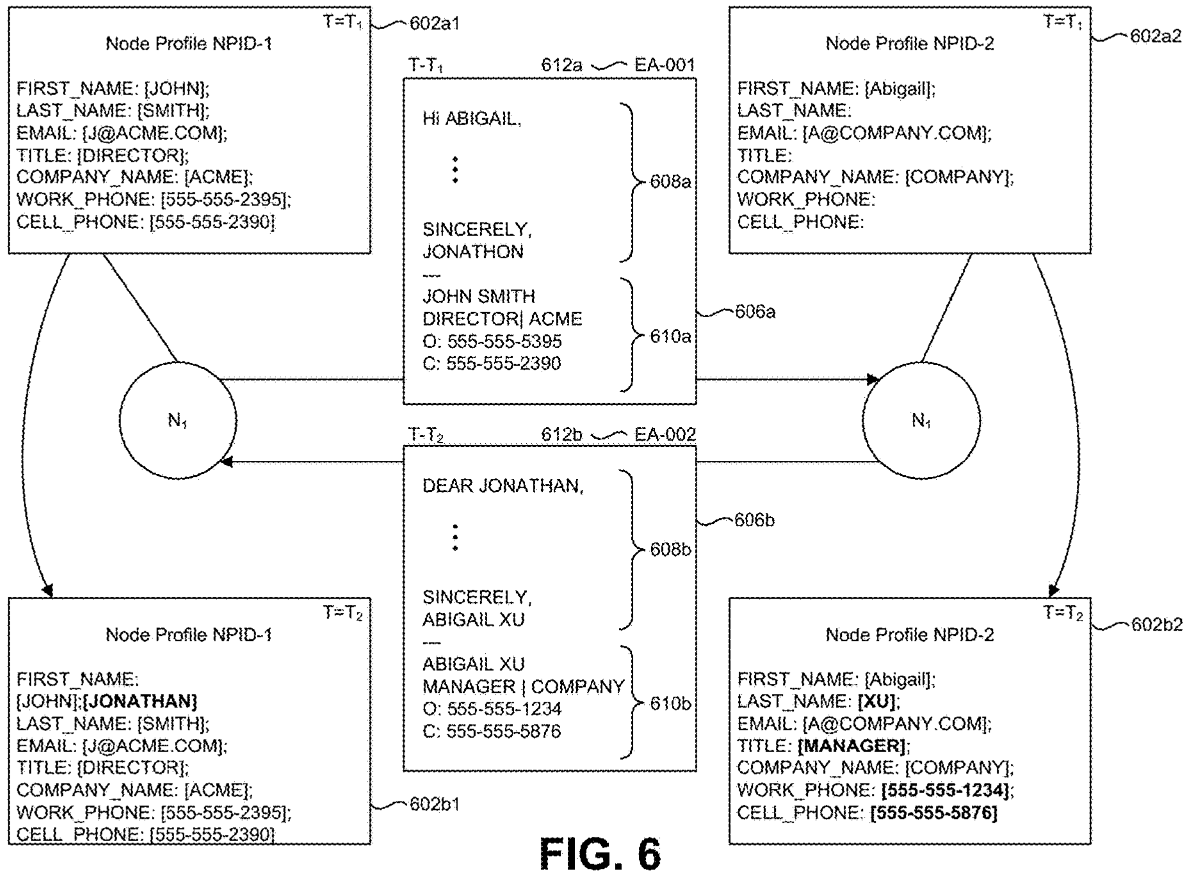
FIG. 6 illustrates a block diagram of a series of electronic activities between two nodes according to embodiments of the present disclosure.

For example, referring now to FIG. 6, FIG. 6 illustrates a series of electronic activities between two nodes. As described herein, a first node N1 and a second node N2 may exchange a series of electronic activities 602. FIG. 6 also shows a representation of two electronic activities 602*a*, 602*b* and representations of two node profiles 604*a*, 604*b* of the two nodes at two different states (e.g., 604*a*1, 604*a*2, 604*b*1, 604*b*2) according to embodiments of the present disclosure.

In FIG. 6, a first electronic activity 602*a* sent at a first time, T=T1, and a second electronic activity 602*b* sent at a second time, T=T2, are shown. The first electronic activity 602*a* includes or is associated with a first electronic activity identifier 606*a* ("EA-001"). The second electronic activity 602*b* includes or is associated with a second electronic activity identifier 606*b* ("EA-002"). The data processing system 100 can assign the first electronic activity identifier 606*a* to the first electronic activity 602*a* and the second electronic activity identifier 606*b* to the second electronic activity 602*b*. In some embodiments, the data processing system 100 can assign the first and the second electronic activities' unique electronic activity identifiers to allow the data processing system 100 to uniquely identify each electronic activity processed by the data processing system 100. Collectively, the first and second electronic activities can be referred to herein as electronic activities 602 or individually as electronic activity 602. Each electronic activity can include corresponding metadata, as described above, a body 608*a* and 608*b*, and a respective signature 610*a* and 610*b*. The signatures 610*a* and/or 610*b* may be included in the body 608 of the respective electronic activity 602.

The second electronic activity 602*b* can be sent as a response to the first electronic activity 602*a*. The data processing system 100 can determine that the second electronic activity 602*b* is a response to the first electronic activity 602*a* using one or more response detection techniques based on, for example, signals included in the electronic activity 602 including the metadata of the electronic activity, the subject line of the electronic activity, the participants of the electronic activity 602, and the body of the electronic activity 602. For instance, the data processing system 100 can determine that the second electronic activity 602*b* has a timestamp after the first electronic activity 602*a*. The data processing system 100 can determine that the second electronic activity 602*b* identifies the sender of the first electronic activity 602*a* as a recipient of the second electronic activity 602*b*. The data processing system 100 can determine that the second electronic activity 602*b* includes a subject line that matches one or more words of the subject line of the first electronic activity 602*a*. In some embodiments, the data processing system 100 can determine that the second electronic activity 602*b* includes a subject line that includes a string of characters of the subject line of the first electronic activity 602*a* and the string of characters is preceded by "RE:" or some other predetermined set of characters indicating that the second electronic activity 602*b* is a reply. In some embodiments, the data processing system 100 can determine that the body of the second electronic activity 602*b* includes the body of the first electronic activity 602*a*. The data processing system 100 can also determine that the second electronic activity 602*b* is a response to the first electronic activity 602*a* based on the participants included in both the electronic activities 602*a*, 602*b*. Furthermore, in some embodiments, the data processing system 100 can determine if the second electronic activity 602*b* is a forward of the first electronic activity 602*a* or a reply all of the first electronic activity 602*a*.

FIG. 6 also includes representations of two node profiles 604*a*, 604*b* associated with the first node N1 and the second node N2 at two different times, $T=T_1$ and $T=T_2$. The node profile 604*a* corresponds to the first node N1, who is the sender of the first electronic activity 602*a* and recipient of the second electronic activity 602*b*. Similarly, the node profile 604*b* corresponds to the second node N2, who is the recipient of the first electronic activity 602*a* and the sender of the second electronic activity 602*b*. The node profile manager 320 may update the node profiles 604*a*, 604*b* at a first time instance (e.g., node profile 604*a*1, node profile 604*b*1) following ingestion of the first electronic activity 602*a*. Similarly, the node profile manager 320 may update the node profiles 604*a*, 604*b* at a second time instance (node profile 604*a*2, node profile 604*b*2) after the first and second electronic activities 602*a* and 602*b* were ingested by the data processing system 100.

In some embodiments, as described herein, the node profile manager 320 of the data processing system 100 can maintain, for each value of each field of each node profile, a value data structure that can be stored as a multidimensional array. The multidimensional array can include a list of entries identifying data points that identify electronic activities or systems of record that contribute to the value of the field. Each data point can be associated with a source. For emails or other electronic activities, the source can be a mail server of a data source provider. For record objects, the source of the record object can be a system of record of the data source provider. Each source of a respective data point can have an associated trust score that can be used to determine how much weight to assign to the data point from that source. Each data point can also identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. The source of the data point and the time the data point was generated, last accessed, updated or modified, can be used to determine a contribution score of the data point, which can be used to determine the confidence score of the value. In some embodiments, the node profile manager 320 can generate, compute or assign a contribution score to each data point. The contribution score can be indicative of the data point's contribution towards the confidence score of the value. The contribution score of a data point can decay over time as the data point becomes staler. The contribution scores of each of the data points derived from electronic activities and systems of record can be used to compute the confidence score of the value of a field of the node profile.

Each of the node profiles 604 can include fields and corresponding values. For example, in the first node profile 604*a*, the field "First Name" is associated with the value "JOHN" and "JONATHAN," since the node ended the body 608*a* as "JOHN" but includes "JONATHAN" in the signature block 610. The first node profile 604*a* also includes the field "Title" which is associated with the value "Director." As shown in FIG. 6, the values of the first and last name and cell phone number remain the same at both time instances $T_1$ and $T_2$ for the node profile 604*a* (e.g., node profile 604*a*1 and 604*a*2 are the same).

On the other hand, and in another example, in the second node profile 604*b*, the field "First Name" is associated with the value Abigail. The second node profile 604*b* does not include the field "Title" as that information may not have been available to the data processing system 100. It should be appreciated that in the event the value was already associated with the field, the data processing system 100 can update the value data structure of the value by adding an entry identifying the electronic activity. In this way, the electronic activity serves as a data point that supports the value and can increase the confidence score of the value, which can further improve the accuracy of the information included in the node profile. At the second time instance $T_2$, the second node profile 604*b*2 was updated after the first and second electronic activities 602*a* and 602*b* were ingested. For example, the field "First Name" is associated with the value "ABAGAIL" based on the first electronic activity 602*a* and now includes "ABBY," since the node ended the body 608*a* as "ABBY." Additionally, the field "Title" is now associated with the value "Manager." The values of the "Work Phone No" and "Cell Phone No" fields have new values associated with them.

The value data structure of the value J@acme.com corresponding to the email field of the first node profile can be updated to include an entry identifying the second electronic activity 602*b*. The data processing system 100 can be configured to update the field-value pair of the first node profile 604*a* corresponding to email: J@acme.com, even though J@acme.com is a value previously associated with the email field of the first node profile 604*a*. The data processing system 100 can use the second electronic activity 602*b* to update the node profile 604*a* by not only adding new values, but also by updating the value data structures of existing values of the first node profile 604*a* to include entries identifying the second electronic activity 602*b*. By doing so, the data processing system 100 can continuously maintain the accuracy of the data included in the node profiles 604 and identify which values are still current and which values are now stale based on the last time a data point supported the particular value. As described herein, the data processing system 100 can be configured to generate respective contribution scores to each entry included in the value data structure of a value and use the respective contribution scores of each entry of the value data structure to determine a confidence score of the value of the field of the node profile. The data processing system 100 can further be configured to dynamically update the contribution scores and the confidence score based on a current time as the contribution scores of data points can change with time. In some embodiments, the contribution scores of data points can decrease with time as the data point becomes older.

L. Node Profile Inferences

Certain information about a node can be inferred by the data processing system 100 based on information included in electronic activities ingested by the data processing system 100. For instance, the node profile manager 320 or the tagging engine 312 can infer if a person has left a job or switched jobs if the occurrence counter for a first value stops increasing or the frequency at which the occurrences of the first value appear has been reduced and the occurrence counter for a second value is increasing or the occurrences are more recent or are received from a source that has a higher trust score indicating that the person has changed email addresses, which can indicate that the person has switched jobs. In certain embodiments, the data processing system 100 can determine if the second value corresponds to an email address corresponding to another employer or another company. In some embodiments, the data processing system 100 can determine if the domain name of the email address corresponds to a list of known domain names corresponding to personal, non-work email addresses (for instance, gmail.com, outlook.com), among others. In some embodiments, the data processing system 100 can determine if the domain name is associated with a predetermined minimum number of accounts with the same domain name. The node profile manager 320 can look at relevancy of Source, recency of time and Occurrences to determine whether to update the email field from the first email (Email_A) to the second email (Email_B).

In some embodiments, the field value confidence scorer 310 described herein can provide mechanisms to confirm validity of data using multiple data sources. For instance, each electronic activity can be a source of data. As more electronic activities are ingested and increase the occurrence of a value of a data field, the system can confirm the validity of the value of the field based on the number of occurrences. As such, the system described herein can compute a validity score of a value of a field of a node profile based on multiple data sources. For instance, the system can determine how many data sources indicate that the job title of the person is VP of Sales and can use the health score of those sources to compute a validity score or confidence score of that particular value. In addition, the timestamp associated with each electronic activity can be used to determine the validity score or confidence score of that particular value. More recent electronic activities may be given greater weight and therefore may influence the validity score of the particular value more than electronic activity that is much older.

The electronic activity that is generated and ingested in real-time or near real-time can be assigned a greater weight as the electronic activity has no bias, whereas data input manually into a system of record may have some human bias. In certain embodiments in which data is imported from systems of records, the weight the data has on a confidence score of the value is based on a trust score of the system of record from which the data is imported.

In some embodiments, the field value confidence scorer 310 can determine a confidence score of a data point based on the data sources at any given time. A data point can be a value of a field. For example, "VP, product" can be a value for a job title of a node profile. The field value confidence scorer 310 can utilize the electronic activities ingested in the system to determine how many electronic activities have confirmed that the value for the job title is VP of Product for that node in the email signatures present in those electronic activities. In some embodiments, the field value confidence scorer 310 can take into account a recency of the activity data and the source type or a health score of the source type to determine the confidence score of the value of the field. In some embodiments, the node profile manager 320 can determine a current value of a field based on the value of the field having the highest confidence score.

M. Node Connections

The node pairing engine 322 can be any script, file, program, application, set of instructions, or computer-executable code that is configured to enable a computing device on which the node pairing engine 322 is executed to perform one or more functions of the node pairing engine 322 described herein. The node pairing engine 322 can compute a connection strength between nodes based on one or more electronic activities associated with both of the nodes. More of the recent electronic activity between the two nodes will indicate a greater connection strength. Moreover, with different tags assigned to those electronic activities, the node pairing engine 322 can further determine the relationship between the two nodes and the context in which the two nodes are connected. For instance, two nodes may be connected through their work on one or more opportunities or one node may report to the second node, among others. The context behind the relationships can be derived from the electronic activity associated with the two nodes as well as other electronic activity associated with each node independent of the other node. In certain embodiments, the node pairing engine 322 can use metadata from the electronic activities to infer connection strength or relationships. For instance, the node pairing engine 322 can compute an average time a node takes to respond to another node and use the average time to respond to determine a connection strength. In some embodiments, the average time to respond is inversely proportional to the strength of the connection. Furthermore, the node pairing engine 322 can look at other information relating to the electronic activities to infer connection strengths. If a node responds to another node outside of business hours can be an indicator of connection strength or connection relationships.

The node pairing engine 322 can determine a connection strength between nodes at a given point in time across a timeline. As the nodes exchange further electronic activity, the connection strength can increase. The system is configured to determine the connection strength at a particular time period by filtering the electronic activities based on their respective times. In certain embodiments, the node pairing engine 322 can recalculate a connection strength between nodes responsive to a trigger. In some embodiments, the trigger can be based on a confidence score falling below a predetermined threshold indicating that the confidence in a particular value is unstable or unusable. For instance, the trigger can be satisfied or actuated when the node pairing engine 322 determines that the confidence score of a particular value of a field, such as a current employer of a person is below a predetermined confidence score (indicating that the person may no longer be at a particular company). In certain embodiments, certain changes to values in fields can trigger recalculating a connection strength irrespective of activity volume, for instance, when a new value under the employer field is added in the node.

In some embodiments, the node pairing engine 322 can determine a connection strength between two nodes by identifying each of the electronic activities that associate the nodes to one another. In contrast to other systems that may rely on whether a node has previously connected with another node, the node pairing engine 322 can determine a connection strength at various time periods based on electronic activities that occur before that time period. In particular, the node pairing engine 322 can determine staleness between nodes and take the staleness to determine a current connection strength between nodes. As such, the node pairing engine 322 can determine a temporally changing connection strength. For instance, the node pairing engine 322 can determine how many interactions recently between the two nodes. The node pairing engine 322 can determine whether the connection between the two nodes is cold or warm based on a length of time since the two nodes were involved in an electronic activity or a number of electronic activity transmitted between two nodes. For instance, the node pairing engine 322 can determine that the connection strength between two nodes is cold if the two nodes have not interacted for a predetermined amount of time, for instance a year. In some embodiments, the predetermined amount of time can vary based on previous electronic activity or past relationships by determining additional information from their respective node profiles. For instance, former colleagues at a company may not have a cold connection strength even if they do not communicate for more than a year.

N. Node Resolution

The node resolution engine 324 can be any script, file, program, application, set of instructions, or computer-executable code that is configured to enable a computing device on which the node resolution engine 324 is executed to perform one or more functions of the node resolution engine 324 described herein.

The node resolution engine 324 is configured to resolve nodes to which electronic activities are to be linked or otherwise associated. The node resolution engine 324 can use the parsed information from the electronic activity to identify values included in node profiles to determine a match score between the electronic activity and a given node profile. The node resolution engine 324 can match the electronic activity to one or more node profiles based on a match score between the electronic activity and each of the node profiles exceeding a certain threshold. Different fields are assigned different weights based on the uniqueness of each value. In some embodiments, the uniqueness of each value can be determining how many node profiles include the same value for the given field relative to the total number of node profiles.

In some embodiments, the node resolution engine 324 may match the electronic activity to the nodes between which the electronic activity occurred. The node resolution engine 324 or the node pairing engine can establish an edge between the two nodes corresponding to the electronic activity.

In some embodiments, the node resolution engine 324 may not be able to determine if the electronic activity matches any of the existing node profiles maintained by the node profile manager 320.

In some embodiments, the node resolution engine 324 can perform identity resolution or deduplication based on one or more unique identifiers associated with a node profile. For instance, if one system of record provides a first email address, uniquename@example1.com and another system of record provides a second email address, uniquename@example2.com, while there is not a direct match, the node resolution engine 324 can resolve the two identifiers if there is a statistically significant number of matching or near matching fields, tags, or other statistical resemblances.

Figure 3E:
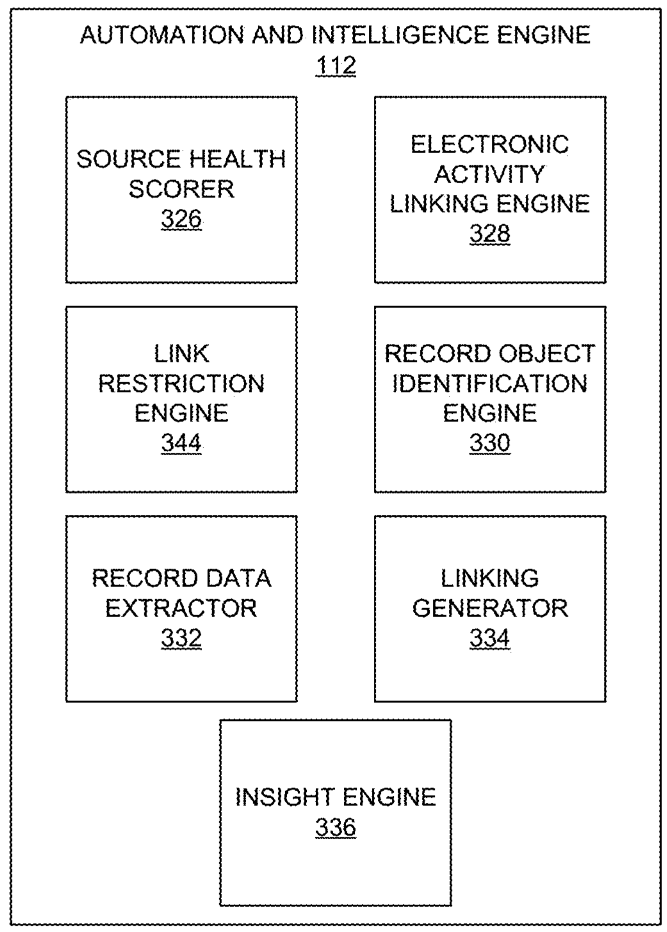
Figure 3F:
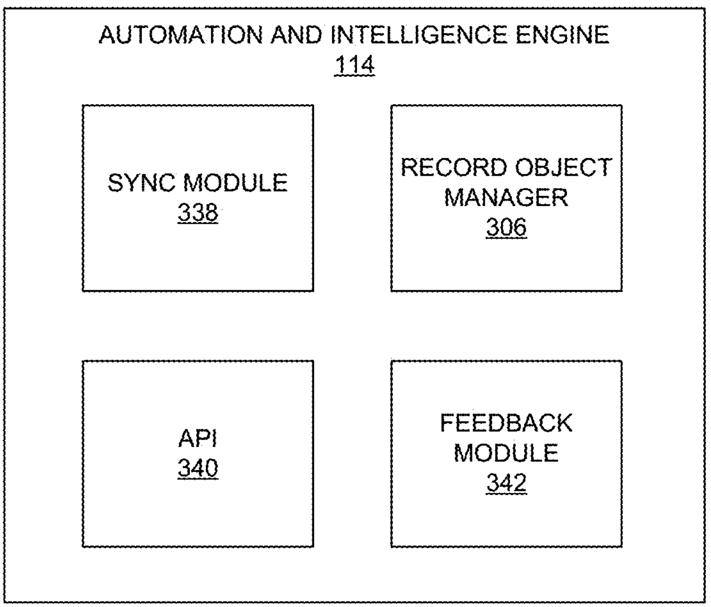

Referring now to FIG. 3E, FIG. 3E illustrates a detailed block diagram of the automation and intelligence engine 112. The automation and intelligence engine 112 may include a source health scorer 326, an electronic activity linking engine 328, a record object identification engine 330, record data extractor 332, a linking generator 334, and an insight engine 336, and a link restriction engine 344. The automation and intelligence engine 112 can further include a sync module 338, an API 340, and a feedback module 342, as shown in FIG. 3F. In some embodiments, the automation and intelligence engine 112 can further include or be communicably coupled to the record object manager 306. The automation and intelligence engine 112 and each of the components of the automation and intelligence engine 112 can be any script, file, program, application, set of instructions, or computer-executable code. The insight engine 336 can be any script, file, program, application, set of instructions, or computer-executable code that is configured to determine insights for a company. For instance, the data processing system 100 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others.

O. Source Health Scores Including Field-Specific Health Scores, Overall Health Scores and Determining Trust Scores Based on Health Scores The source health scorer 326 can be any script, file, program, application, set of instructions, or computer-executable code that is configured to enable a computing device on which the source health scorer 326 is executed to perform one or more functions of the source health scorer 326 described herein. The source health scorer 326 is configured to access a system of record and retrieve data stored in the system of record. The source health scorer 326 can then identify each record object stored in the system of record and determine, for each record object, a number of missing values of fields. The source health scorer 326 can then generate a field-specific score for each field indicating a health or quality of each field of the system of record. The source health scorer 326 can further determine an overall health score for the source based on the field-specific scores of each field. In some such embodiments, the overall health score is based on missing field values.

The source health scorer 326 can further be configured to determine if the values of fields of record objects are accurate by comparing the values to node profiles maintained by the node profile manager 320 or to record objects maintained by the record object manager 306. Based on the number of values that are inconsistent with the values maintained by data processing system 100, the source health scorer 326 can generate a health score for the system of record.

The source health scorer 326 can similarly generate a health score for each system of record. The source health scorer 326 can then compare the health score of a given system of record to the aggregate health scores of a plurality of systems of record to determine a relative trust score of the system of record. In some embodiments, the source health scorer 326 can assign different weights or scores to different types of systems of record. The source health scorer 326 may assign lower health scores to data included in a system of record that is generated using manual entry relative to node profiles that are automatically populated or generated by the data processing system 100 based on electronic activities.

Further, different types of sources can include emails, or email signatures within an email, one or more systems of record, among many other source types. The trust score of a source can be determined based on the health score of the source, at least in the case of a system of record. In some embodiments, the trust score assigned to electronic activity such as an email can be greater than a trust score assigned to a data point derived from a system of record as the system of record can be manually updated and changed. Additional details regarding the health score of a system of record are described below.

In some embodiments, the health score of a system of record maintained by a data source provider can be determined by comparing the record objects of the system of record with data that the system has identified as being true. For instance, the data processing system 100 can identify, based on confidence scores of values (as described below) of fields, that certain values of fields are true. For instance, the system may determine that a value is true or correct if multiple data points provide support for the same value. In some embodiments, the multiple data points may for example, be at least 5 data points, at least 10 data points, or more. The data processing system 100 can then, for a value of a field of a record object of the system of record, compare the value of the system of record to the value known to the system to be true. The system can repeat this for each field of a record object to determine if any values of a record object are different from the values the system knows to be true. In some embodiments, when determining the health score, the system may only compare those values of fields of record objects of the system of record that the system has a corresponding value that the system knows is true. For instance, the system may know that a phone number of a person "John Smith" is 617-555-3131 and may identify such a number as true based on multiple data points. However, the system may not know an address of the person John Smith. In such an instance, the system may only compare the phone number of the record object corresponding to John Smith to determine the health score of the system of record but not compare the address of the person John Smith as the system does not know the address of John Smith. Furthermore, even if the node profile of John Smith had an address but the confidence score of the address was below a predetermined threshold, the system would not compare the address from the system of record to the address of the node profile since the system does not have enough confidence or certainty that the address is true. As such, the system can be configured to determine the health score of a system of record by comparing certain values of record objects of the system of record to values the system knows as true or above a predetermined confidence score. In this way, in some embodiments, the health score of the system of record is based on an accuracy of the data included in the system of record rather than how complete the system of record is not.

The health score of a system of record can be an overall health score that can be based on aggregating individual field-specific health scores of the system of record. It should be appreciated that the data processing system 100 can assign different weights to each of the field-specific health scores based on a volume of data corresponding to the respective field, a number of values that does not match values the data processing system 100 knows to be true, among others.

The data processing system 100 can compute trust scores for data points based on the health score of a system of record. In some embodiments, the data processing system 100 can compute the trust score based on the overall health score of the system of record that is the source of the data point. However, in some embodiments, it may be desirable to configure the data processing system 100 to provide more granularity when assigning a trust score to a system of record that is the source of the data point. For instance, a company may meticulously maintain phone numbers of record objects but may not be so meticulous in maintaining job titles of record objects such that the field-specific health score for the phone number field of the system of record is much better than the field-specific health score for the job title field and also better than the overall health score of the system of record determined based on the aggregate of the respective field-specific health scores of fields of the system of record. In some embodiments, as will be described herein, if a data point supporting a phone number of a node profile is provided by the system of record, the data processing system 100 may be configured to determine a trust score for the data point based on the field-specific health score of the field "phone number" for the system of record rather than the overall health score of the system of record, which is lower because the field-specific health score of the field "job title" of the system of record is much lower than the field-specific health score of the field "phone number." By determining trust scores based on the field-specific health scores of systems of record, the data processing system 100 may be able to more accurately rely on the data point and provide a more accurate contribution score of the data point as will be described herein.

P. Linking Electronic Activity to Systems of Record Data

Enterprises and other companies spend significant amount of resources to maintain and update one or more systems of records. Examples of systems of records can include customer relationship management (CRM) systems, enterprise resource planning (ERP) systems, document management systems, applicant tracking systems, among others. Typically, these systems of records are manually updated, which can result in multiple issues. First, the information that is updated into the systems of records can be incorrect either due to human error or in some cases, malicious intent. Second, the information may not be updated in a timely manner. Third, employees may not be motivated enough to even update the systems of records, resulting in systems of records that include outdated, incorrect, or incomplete information. To the extent that enterprises rely on the data included in their systems of records to make projections or predictions, such projections and predictions may also be inaccurate as the data relied upon is also inaccurate. The present disclosure aims to address these challenges that enterprises face with their existing systems of records. In particular, the present disclosure describes systems and methods for linking electronic activities to record objects included in one or more systems of record. Electronic activities, such as electronic mail, phone calls, calendar events, among others, can be used to populate, update, and maintain states of record objects of systems of record. As electronic activities are exchanged between users, these electronic activities can be parsed to not only update a node graph as described above, but further update shadow record objects for one or more systems of records of enterprises that have provided access to such systems of record to the data processing system 100. As described herein, the shadow record objects can be synced with the record objects of the one or more systems of records of the enterprises. In some embodiments, the electronic activities can be used to directly update the one or more systems of records of the enterprises without first updating a shadow record object. As described herein, and also referring to FIG. 3E, the updating of record objects with electronic activity can refer to updating record objects within systems of record 118 and/or shadow record objects within the shadow systems of record 218. By way of the present disclosure, the data processing system 100 can use the electronic activities to populate, maintain, and update states of record objects of systems of record 118 and/or shadow systems of record 218.

The data processing system 100 can include the electronic activity linking engine 328, which is configured to link electronic activities to record objects of one or more systems of record. By linking the electronic activities to such record objects, the electronic activity linking engine 328 can be configured to update states of one or more record objects based on the electronic activities. The electronic activity linking engine 328 can be any script, file, program, application, set of instructions, or computer-executable code, that is configured to enable a computing device on which the electronic activity linking engine 328 is executed to perform one or more functions of the electronic activity linking engine 328 described herein.

Linking electronic activities to record objects can also be referred to as matching or mapping the electronic activities to record objects. Linking the electronic activities to the record objects can provide context to the electronic activities. The linked electronic activities can be stored in association with one or more record objects to which the electronic activity is linked in a system of record. Linking an electronic activity to a record object can provide context to the electronic activity by indicating what happened in the electronic activity or record object, who was involved in the electronic activity or record object, and to what contact, node, person or business process, the electronic activity or record object should be assigned. Linking the electronic activity to the record object can indirectly provide context as to why the electronic activity occurred. In some embodiments, linking an electronic activity to or with a record object of a system of record can include storing, in one or more data structures, an association between the electronic activity and the record object.

Although the description provided herein may refer to record objects and business processes corresponding to customer relationship management systems, it should be appreciated that the present disclosure is not intended to be limited to such systems of records but can apply to many types of systems of record including but not limited to enterprise resource planning systems, document management systems, applicant tracking systems, among others. For the sake of clarity, the electronic activities can be matched to record objects directly without having to link the electronic activities to node profiles. In some embodiments, the electronic activities can be matched to node profiles and those links can be used to match some of the electronic activities to record objects.

The electronic activity linking engine 328 can use metadata to identify a data source provider associated with an ingested electronic activity and identify a corresponding system of record. The electronic activity linking engine 328 can match the electronic activity to a record object of the corresponding system of record. The electronic activity linking engine 328 can include, or otherwise use, a tagging engine, such as the tagging engine 312 described above, to determine and apply tags to the ingested electronic activities. The electronic activity linking engine 328 can include the feature extraction engine 314 to extract features from the electronic activities that can be used to link electronic activities with one or more record objects of systems of records. In some embodiments, some of the features can include values corresponding to values stored in one or more node profiles maintained by the data processing system 100. The features, however, can include other information that may be used in conjunction with information also included in node profiles to link the electronic activity to one or more record objects included in one or more systems of record.

The electronic activity linking engine 328 can include the record object identification engine 330 to identify which record object or objects within a system of record to match a given electronic activity. In some embodiments, the electronic activity linking engine 328 can include the policy engine 346. The policy engine 346 can maintain policies that include strategies for matching the electronic activities to the record objects. The electronic activity linking engine 328 can include a link restriction engine 344 that can apply one or more policies from the policy engine 346 when linking electronic activities to record objects. The link restriction engine 344 can limit which record objects can be linked with each other. The electronic activity linking engine 328 can link the electronic activity to the record object identified by the record object identification engine 330. The record object identification engine 330 can determine or select one or more record objects to which an electronic activity should be linked or matched.

Figure 7:
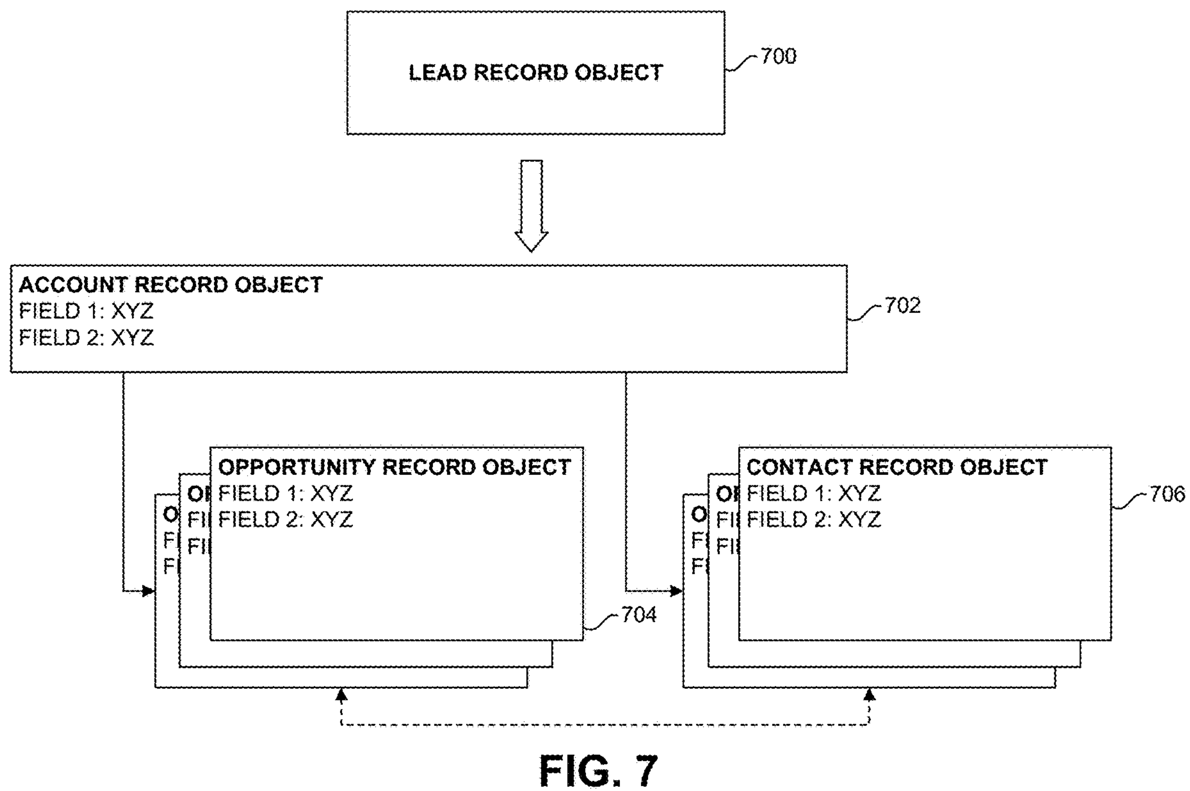
FIG. 7 illustrates a plurality of example record objects, and their interconnections according to embodiments of the present disclosure.

Referring further FIG. 3E and also to FIG. 7, the data processing system 100 can operate various record objects, such as the record objects illustrated in FIG. 7, and their interconnections. The record objects shown in FIG. 7 can be record objects or data records of a system of record, such as a customer relationship management (CRM) system. It should be appreciated that other types of systems of records and record objects may exist and can be integrated with the data processing system 100. For instance, other systems of records can include Applicant Tracking Systems (ATS), such as Lever, located in San Francisco, CA or Talend by Talend Inc., located in Redwood City, CA, enterprise resource planning (ERP) systems, customer success systems, such as Gainsight located in Redwood City, CA, Document Management Systems, among others.

The systems of record can be one or more of shadow systems of record of the data processing system 100 or the systems of record of the data source providers. Additional details relating to the shadow systems of record of the data processing system 100 are provided below. As illustrated in FIG. 7, the record objects can include a lead record object 700, an account record object 702, an opportunity record object 704, or a contact record object 706. Each of the different types of record objects can generally be referred to as record objects.

Each record object can be a data structure or data file into which data is stored or associated. The lead record object 700 can be a low quality object that includes unqualified contact information typically received through a web inquiry. A lead record object can correspond to one or more stages. Upon reaching a final "Converted" stage, a lead record object can be converted in a one-to-many relationship into a Contact record object (person), an Account record object (company, if new, or added to existing account) and an Opportunity record object (if there is an opportunity for a deal here or added as contact role into existing opportunity).

For example, the lead record object 700 can include the contact information for a lead or prospective buyer. The lead record object 700 can include fields, such as, Address, City, Company, CompanyDunsNumber, Description, Email, Industry, NumberOfEmployees, Phone, job title, and Website, among others.

The account record object 702 can be a data structure that includes fields associated with an account that is held with the data source provider. The fields can include AccountNumber, BillingAddress, Description, Industry, Fax, DunsNumber, LastActivityDate, MasterRecordId, Name, NumberOfEmployees, Ownership, Website, YearStarted, and IsPersonAccount, among others. A system of record can include an account record object 702 for each of the data provider's customers. The system of record can include multiple account record objects 702 for a given customer. For example, the system of record can include an account record object 702 for each division of a given customer. The account record object 702 can be stored with one or more opportunity record objects 704.

In some embodiments, the CRM can include partner record objects, which can also be referred to as partner account record objects. A partner account record object can be similar to an account record object. The partner account record object can include an additional field to designate the record object as a partner account record object rather than a standard account record object. The partner account record object can be an account record object that is associated with a partner to the data source provider. For example, the partner account record object can be an account record object for a distributor of the data source provider that distributes goods to the company of the account record object.

The opportunity record objects 704 can be data structures that include a plurality of fields for a given opportunity. The opportunity can indicate a possible or planned deal with a customer for which an account record object is already stored in the system of record. The opportunity record objects 704 can include fields such as AccountId, Amount, CampaignId, CloseDate, Description, ExpectedRevenue, Fiscal, HasOpenActivity, IsClosed, IsWon, LastActivityDate, Name, OwnerId, StageName, Territory2Id, and Type, among others. One or more contact record objects 706 can be associated with the account record object 702. The contact record objects 706 can be data structures that include fields associated with a contact. The contact record object 706 can include fields such as FirstName, LastName, AccountId, Department, Email, Fax, WorkPhone, HomePhone, MobilePhone. StreetAddress, City, State, Country, DoNotCall, and HasOptedOutOfEmail, among others.

One or more contact record objects 706 can be associated with an opportunity record object 704 via an Opportunity Contact Role (OCR). For example, a lead to sell a service to a potential customer can convert into an opportunity record object 704 when the customer begins the negotiation process to purchase the service. A contact record object 706 can be generated for each of the customer's employees involved in the purchase. Each of the contact record objects 706 can be associated with the opportunity record object 704 for the sale via Opportunity Contact Roles, which contain their own metadata about involvement of specific individuals in the opportunity, such as their Role in this particular opportunity or whether they are the Primary Contact of the Account in this Opportunity.

In some embodiments, a lead record object 700 can be converted into an account record object 702, an opportunity record object 704, and/or a contact record object 706. For example, a lead record object 700 can be converted into a new contact record object 706, account record object 702, and/or opportunity record object 704 after a predetermined number and nature of electronic activities are associated with the lead record object 700. Continuing this example, the lead record object 700 can be generated based on a web inquiry from an interested party (lead) or via a cold email being sent to a potential new customer. If the customer responds and passes qualification criteria, the lead record object 700 can be converted into a new contact record object 706, account record object 702, and opportunity record object 704. In some embodiments, the lead record object 700 can be converted into a, for example, contact record object 706 that can get attached to or linked with an existing account record object 702 and an existing opportunity record via an Opportunity Contact Role.

The fields of each of the different record object types can include hierarchical data or the fields can be linked together in a hierarchical fashion. The hierarchical linking of the fields can be based on the explicit or implicit linking of record objects. For example, a contact record object can include a "Reports To" field into which an identifier of the contact can be stored. The "Reports To" field can indicate an explicit link in a hierarchy between two contact record objects (e.g., the first contact record object to the contact record object of the person identified by the "Reports To" field). In another example, the linking of the record objects can be implicit and learned by the electronic activity linking engine 328. For example, the electronic activity linking engine 328 can learn if multiple customers have the same value for a "Parent Account" field across multiple system of record sources with high trust score and derive a statistically significant probability that a specific account belongs to (e.g., is beneath the record object in the given hierarchy) another account record object.

The record object identification engine 330 can include one or more matching models (not shown). A matching model can be trained or programmed to aid in matching electronic activities to record objects to allow the electronic activity linking engine 328 to link the electronic activities to the matched record objects. For example, the record object identification engine 330 can include or use one or more matching models to assist, aid or allow the electronic activity linking engine 328 to match electronic activities to record objects. In some embodiments, each of the one or more matching models can be specific to a particular data source provider, electronic activity type, or record object type. In some embodiments, the record object identification engine 330 can include a single matching model that the record object identification engine 330 can use to match electronic activities ingested by the data processing system 100 to any number of a plurality of record objects of a plurality of systems of records. In some embodiments, the matching models can be data structures that include rules or heuristics for linking electronic activities with record objects. The matching models can include matching rules (which can be referred to as matching strategies) and can include restricting rules (which can be referred to as restricting strategies or pruning strategies). The record object identification engine 330 can use the matching strategies to select candidate record objects to which the electronic activity could be linked and use the restricting strategies to refine, discard, or select from the candidate record objects. In some embodiments, the matching models can include a data structure that includes the coefficients for a machine learning model for use in linking electronic activities with record objects.

In some embodiments, the matching model used to link electronic activities to one or more record objects can be trained using machine learning or include a plurality of heuristics. For example, as described above the feature extraction engine 314 can generate a feature vector for each electronic activity. The matching model can use neural networks, nearest neighbor classification, or other modeling approaches to classify the electronic activity based on the feature vector. In some embodiments, the record object identification engine 330 can use a subset of an electronic activity's features to match the electronic activity to a record object.

In some embodiments, the record object identification engine 330 can use matching models trained with machine learning to match, for example, the electronic activity to a record object based on a similarity of the text in and the sender of the electronic activity with the text in and sender of an electronic activity previously matched to a given electronic activity. In some embodiments, the matching model can be updated as electronic activities are matched to record objects. For example, a matching model can include one or more rules to use when matching an electronic activity to a record object. If a user matches an electronic activity to a record object other than the record object to which the electronic activity linking engine 328 matched the electronic activity, record object identification engine 330 can update the matching model to alter or remove the rule that led to the incorrect matching.

In some embodiments, once an electronic activity is matched with a record object, a user can accept or reject the linking. Additionally, the user can change or remap the linking between the electronic activity and the record object. In some embodiments, the matching model can include a plurality of heuristics with which the record object identification engine 330 can use to link an electronic activity to one or more record objects. The heuristics can include a plurality of matching algorithms that are encapsulated into matching strategies. The record object identification engine 330 can apply one or more matching strategies from the matching models to the electronic activity to select which record object (or record objects) to link with the electronic activity. In some embodiments, the record object identification engine 330 can use the matching strategies to select candidate record objects to which the electronic activity can be linked. The record object identification engine 330 can use a second set of strategies (e.g., restricting strategies) to prune the candidate record objects and select to which of the candidate record objects the electronic activity should be linked.

The application of each strategy to an electronic activity can result in the selection of one or more record objects (e.g., candidate record objects). The selection of which matching strategies to apply to an electronic activity can be performed by the policy engine 346. The policy engine 346 is described further below, but briefly, the policy engine 346 can generate, manage or provide a matching policy for each of the data source providers 122. The policy engine 346 can generate the matching policy automatically. The policy engine 346 can generate the matching policy with input or feedback from the data source provider 122 to which the matching policy is associated. For example, the data source provider (for example, an administrator at the data source provider) can provide feedback when an electronic activity is incorrectly linked and the matching policy can be updated based on the feedback.

A given matching policy can include a plurality of matching strategies and the order in which the matching strategies should be applied to identify one or more record objects to which to link the electronic activity. The record object identification engine 330 can apply one or more of the plurality of matching strategies from the matching models, in a predetermined order specified or determined via the matching policy, to identify one or more candidate record objects. The record object identification engine 330 can also determine, for each matching strategy used to identify a candidate record object, a respective weight that the record object identification engine 330 should use to determine whether or not the candidate record object is a good match to the electronic activity. The record object identification engine 330 can be configured to compute a matching score for each candidate record object based on the plurality of respective weights corresponding to the matching strategies that were used to identify the candidate record object. The matching score can indicate how closely a record object matches the electronic activity based on the one or more matching strategies used by the record object identification engine 330.

One or more of the matching strategies can be used to identify one or more candidate record objects to which the electronic activity linking engine 328 can match a given electronic activity based on one or more features (e.g., an email address) extracted from the electronic activity or tags assigned to the electronic activity. In some embodiments, the features can be tags assigned by the tagging engine 312. In some embodiments, the electronic activity can be matched to a node profile that is already matched to a record object, thereby allowing the record object identification engine 330 to match the electronic activity to a record object previously matched or linked to a node profile with which the electronic activity may be linked. In addition, the matching strategies can be designed or created to identify candidate record objects using other types of data included in the data processing system, or one or more systems of record, among others. In some embodiments, the matching strategies can be generated by analyzing how one or more electronic activities are matched to one or more record objects, including using machine learning techniques to generate matching strategies in a supervised or unsupervised learning environments.

Figure 8:
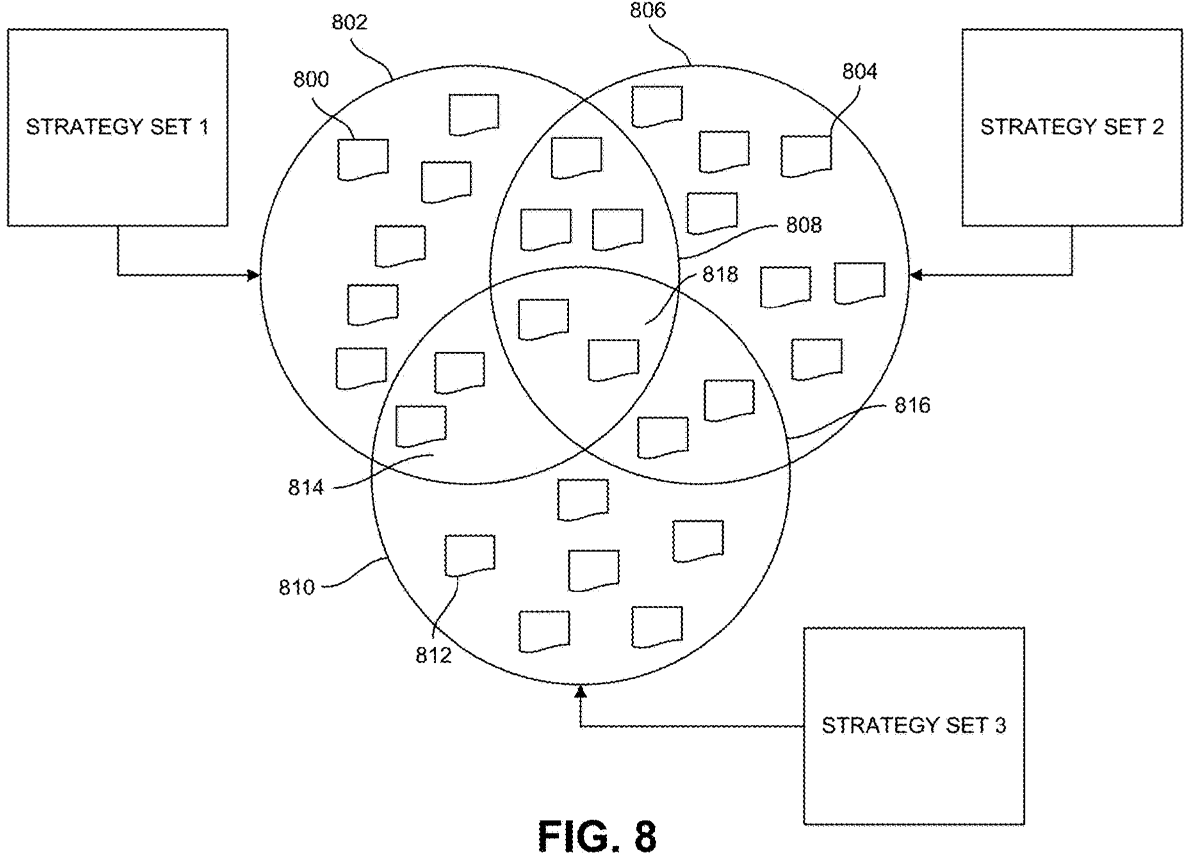
FIG. 8 illustrates the restriction of groupings of record objects according to embodiments of the present disclosure.

Subsequent strategies can be applied to prune or restrict the record objects that are selected as potential matches (e.g., candidate record objects). For example, and also referring to FIG. 8, FIG. 8 illustrates the restriction, separation, grouping, or identification of a first grouping 800 of record objects 802 with a second grouping 804 of record objects 806 and a third grouping 808 of record objects 810. The record object identification engine 330 can apply a first set of strategies 812 to identify, determine, or otherwise select the first grouping 800 of record objects 802. Similarly, the record object identification engine 330 can apply a second set of strategies 814 to select the second grouping 804 of record objects 806. The first set of strategies 812 can be or include, for instance, seller-based strategies for identifying record objects with which to match an electronic activity based on seller information. The second set of strategies 814 can similarly be or include, for instance, buyer-based strategies for identifying record object with which to match an electronic activity based on buyer information. The first and second strategies 812, 814 may be applicable to all record objects of the systems of record maintained or accessed by the data processing system 100. In other words, upon determining to match an electronic activity to a record object, the record object identification engine 330 can apply the first and second strategies 812, 814 to the electronic activity the record objects which may correspond thereto (e.g., candidate record objects). In the example shown in FIG. 8, the record object identification engine 330 can identify a subset of record objects 816 which satisfy both the first and second strategies 812, 814 (e.g., the subset of record objects 816 which are included in both the first grouping 800 and second grouping 804).

In some embodiments, the record object identification engine 330 can apply a third set of strategies 818 to identify the third grouping 808 of record objects 810. Similar to the first and second set of strategies 812, 814, the third set of strategies 818 may be exclusionary strategies which are designed or configured to exclude or restrict matching electronic activities to particular record objects. The third set of strategies 818 may function as a filter of the candidate record objects which satisfy both the first and second strategies 812, 814. The record object identification engine 330 can apply the third set of strategies 818 to each of the record objects (e.g., at substantially the same time as applying the first and second set of strategies 812, 814). The record object identification engine 330 can apply the third set of strategies 818 to the subset of record objects 816. The record object identification engine 330 can apply the third set of strategies 818 to identify a number of record objects 820 from the subset 816 which are to be excluded from matching. Hence, the record object identification engine 330 can be configured to identify a set of candidate record objects 822 which satisfy both the first and second set of strategies 812, 814, and are not excluded by the third set of strategies 818.

In some embodiments, the record object identification engine 330 can group or link contact record objects on one or both sides of a business process into groups. The record object identification engine 330 can use the groups in the matching strategies. For example, the record object identification engine 330 can group users on a seller side into account teams and opportunity teams. Account teams can indicate a collection of users on the seller side that collaborate to close an initial or additional deals from a given account. Opportunity teams can be a collection of users on the seller side that collaborate to close a given deal. The record object identification engine 330 can add a user to an account or opportunity team by linking the contact record object of the user to the given account team record object or opportunity team record object. The record object identification engine 330 can use account team-based matching strategies or opportunity team-based matching strategies to select record objects with which the electronic activity can be matched.

In some embodiments, at periodic intervals, the record object identification engine 330 can process the electronic activities linked with account record objects and opportunity record objects to generate account teams and opportunity teams, respectively. For a given account record object, the record object identification engine 330 can count the number of times that a seller side user interacts with the account record object (for example, is included in an electronic activity that is linked or matched to the account record object). For example, the record object identification engine 330 can count the number of times the user was included on an email or sent an email that was linked with the account record object. If the count of the interactions is above a predetermined threshold, the record object identification engine 330 can add the user to an account team for the account record object. In some embodiments, the count can be made over a predetermined time frame, such as within the last week, month, or quarter. The record object identification engine 330 can perform a similar process for generating opportunity teams. In some embodiments, the account teams and opportunity teams can be included in the matching and restriction strategies used to match an electronic activity with a record object. Conversely, if the count of the interactions of a particular user is below a predetermined threshold within a predetermined time frame (for example, a week, a month, three months, among others), the record object identification engine 330 can remove the user from the account team or the opportunity team.

In some embodiments, the record object identification engine 330 can select record objects with which to match a first electronic activity based on a second electronic activity. The second electronic activity can be an electronic activity that is already linked to a record object. The second electronic activity can be associated with the first electronic activity. For example, the data processing system 100 can determine that the first and second electronic activities are both emails in a threaded email chain. The system can determine the emails are in the same thread using a thread detection policy. The thread detection policy can include one or more rules for detecting a thread by comparing subject lines and participants of a first email and a second email or in some embodiments, by parsing the contents of the body of the second email to determine if the body of the second email includes content that matches the first email and email header information of the first email is included in the body of the second email. If the second electronic activity is an earlier electronic activity that is already matched to a given record object, the record object identification engine 330 can match the first electronic activity to the same record object.

The tagging engine 312 can generate or add tags to electronic activities based on information generated or otherwise made available by the record object identification engine 330 and the matching engine 316. The tagging engine 312 can generate a tag array that includes each of the plurality of tags assigned or associated with a given electronic activity. By having tags assigned to electronic activities the data processing system 100 can be configured to better utilize the electronic activities to more accurately identify nodes and record objects to which the electronic activity should be linked.

In addition to the above described tags, the tagging engine 312 can assign tags to an electronic activity based on the output of the record object identification engine 330 and/or matching model, among other components of the system described herein. For example, the tagging engine 312 can add one or more tags indicating to which record objects the record object identification engine 330 returned as candidate record objects for the electronic activity.

The linking generator 334 can be any script, file, program, application, set of instructions, or computer-executable code that is configured to enable a computing device on which the linking generator 334 is executed to link electronic activities to record objects. As described above, the data processing system 100 can generate and maintain a shadow system of record for each of a data source provider's system of record. The data source provider's system of record can be referred to as a master system of record or tenant-specific system of record. The linking generator 334 can select a record object from a record object array and link the electronic activity to the selected record object in the shadow system of record. For example, the record object identification engine 330 can use the confidence scores of the record objects in the record object array to select a record object with which to match the electronic activity.

By linking the electronic activities to record objects, the system can generate metrics regarding the electronic activities. The metrics can include engagement metrics for users, employees, specific deals or opportunities, managers, companies, or other parties associated with a system of record. The engagement metrics can indicate amongst other things how likely an opportunity (or deal) is to close successfully (or unsuccessfully) or whether the number of contacts in the account are sufficiently engaged with the sales representative to prevent the account from disengaging with the company. The engagement metrics can provide an indication of an employee's productivity and can indicate whether the user should receive additional training or can indicate whether the user is on track to achieve predefined goals. The metrics can be calculated dynamically as the electronic activities are matched to nodes and record objects or the metrics can be calculated in batches, at predetermined intervals. Metrics can also be based on the content or other components of the electronic activity in addition to or in place of the linking of the electronic activity to a node and record object.

The stages of opportunity record objects can be based on the contacts present or involved on both sides of a deal. For example, as a deal advances to higher stages, more senior people may be included in the electronic activities. The stage of the deal can be based on the identification or introduction of an opportunity contact role (OCR) champion. In some embodiments, an administrator or user of the system of record can link the opportunity record object with a contact record object and designate the contact of the contact record object as an opportunity contact role. The champion can be a person on the buyer side of the deal that will support and provide guidance about the deal or opportunity to the seller side. In some embodiments, the OCR champion can be selected based on one or more rules. For example, the one or more rules can include setting the person identified as the VP of sales (or other specific role) as the OCR champion. In some embodiments, the OCR champion can be selected based on historical data. For example, the historical data can indicate that in 90% of the past deals a specific person or role was the OCR champion. Based on the historical data, when the person is added as a recipient of an electronic activity, the person can be identified as the OCR champion. The OCR champion can also be identified probabilistically based on tags associated with the electronic activities linked to the opportunity record object or content within the electronic activities.

In some embodiments, OCRs can be configurable by the company on an account by account basis. Depending on the type, size or nature of the opportunity, the customer or account involved in the opportunity may have different types and numbers of OCRs involved in the opportunity relative to other opportunities the same customer is involved in. Examples of OCRs can include "Champion," "Legal," "Decision Maker," "Executive sponsor" among others.

The data processing system 100 can be configured to assign respective opportunity contact roles to one or more contacts involved in an opportunity. The data processing system 100 can be configured to determine the opportunity contact role of a contact involved in the opportunity based on the contact's involvement. In some embodiments, system 100 can determine the contact's role based on a function the contact is serving. The function can be determined based on the contact's title, the context of electronic activities the contact is involved in, and other signals that can be derived from the electronic activities and node graph. In addition, the data processing system 100 can assign the contact a specific opportunity contact role based on analyzing past deals or opportunities in which the contact has been involved and determining which opportunity contact role the contact has been assigned in the past. Based on historical role assignments, the data processing system 100 can predict which role the contact should be assigned for the present opportunity. In this way, the data processing system 100 can make recommendations to the owner of the opportunity record object to add contacts to the opportunity or assign the contact an opportunity contact role.

In some embodiments, the data processing system 100 can determine that a contact should be assigned an opportunity contact role of "Executive Sponsor." The system may determine this by parsing electronic activities sent to and from the contact and identify, using NLP, words or a context that corresponds to the role of an Executive sponsor. In addition, the system can determine if the contact has previously been assigned an opportunity contact role of executive sponsor in previous deals or opportunities. The system can further determine the contact's title to determine if his title is senior enough to serve as the Executive sponsor.

In some embodiments, the electronic activity linking engine 328 can use a sequential occurrence of electronic activities to determine contact record objects that should be linked or associated with an opportunity record object. The electronic activity linking engine 328 can also determine the roles of people associated with the contact record objects linked to an opportunity. The identification of people associated with opportunity and account record objects (and their associated roles) can be used to determine stage classification, group of contacts on the buyer side that are responsible for the purchase, and for many other use cases. In some embodiments, the sequential occurrence of electronic activities can be used to determine the role or seniority of users involved in a business process. For example, initial emails linked with an opportunity record object can involve relatively lower-level employees. Later emails linked to the opportunity record object can include relatively higher-level employees, such as managers or Vice Presidents. The electronic activity linking engine 328 can also identify the introduction of contacts in a chain of electronic activities, such as a series of email replies or meeting invites, to determine a contact's participation and role in a business process. For example, the electronic activity linking engine 328 can use NLP and other methods to identify the introduction of a manager as a new OCR based on an email chain.

Q. Systems of Record Data Extraction

The record data extractor 332 can be any script, file, program, application, set of instructions, or computer-executable code, that is configured to enable a computing device on which the record data extractor 332 is executed to perform one or more functions of the record data extractor 332 described herein.

The record data extractor 332 can be configured to extract data from one or more records of one or more systems of record. The record data extractor 332 can identify record objects included in a system of record and extract data from each of the record objects, including values of particular fields. In some embodiments, the record data extractor 332 can be configured to extract values of fields included in the record object that are also included in the node profile maintained by the data processing system 100.

The insight engine 336 can be any script, file, program, application, set of instructions, or computer-executable code, that is configured to enable a computing device on which the insight engine 336 is executed to perform one or more functions of the insight engine 336 described herein.

The insight engine 336 can be configured to process electronic activities and record objects of one or more systems of record of a company to determine insights for the company. For instance, the insight engine 336 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others. Additional details relating to the insights are described herein.

In some embodiments, the insight engine 336 can be configured to generate performance profiles for a company. In some embodiments, the performance profile can be a performance profile of an employee of the company. In some embodiments, the performance profile can be a performance profile of a department of the company, a group within a department, or individual employees of the company. The insight engine 336 can generate the performance profiles using data accessible by the data processing system 100. In some embodiments, the insight engine 336 can generate the performance profiles using all data including electronic activities and systems of record accessible by the data processing system 100 from multiple companies. In some other embodiments, the insight engine 336 can generate the performance profiles for a company only using data provided by the company to the data processing system 100. In some embodiments, the insight engine 336 can be configured to generate certain types of performance profiles for employees, groups, departments of a company that has provided access to the data processing system 100 while generating other types of reports or insights for other node profiles of the data processing system 100 that are not employees of the company.

The insight engine 336 can be configured to predict employee success at a company or in a job role. The insight engine 336 can, based on an analysis of electronic activities as well as information stored in one or more systems of record, predict the success of the member node. For example, the insight engine 336 can generate a performance profile for the member node. The performance profile can be a statistics driven performance profile. The performance profile can be based on electronic activities and information stored in one or more systems of record. For example, the performance profile can be based on a number or amount of electronic activities associated with the member node during a time interval, a type of the electronic activities, the amount of time the member node spends generating or preparing the electronic activities (e.g., amount of time spent writing an email), the recipients of the email, natural language processing of the email, etc.

For example, the insight engine 336, using job history and performance history reconstructed from an internal member node graph, can generate a performance score, purchasing preference, decision making power, interests or other information for the member node. By syncing information associated with the systems of record and electronic activities with the member node graph, the data processing system 100 can generate or extrapolate types of opportunities or features on the public profile.

For example, the insight engine 336 can determine that a member node performs medical device sales, the member node's territory is the northeast region, the member node prefers or is more successful when doing in-person sales, the member node prefers or more successful when doing CEO level sales, or an average deal size or amount. To do so, the insight engine 336 can parse or featurize information corresponding to tasks or activities (e.g., deals) associated with the member node (e.g., a salesperson or other knowledge worker) that is derived from one or more record objects stored in the one or more systems of record (e.g., extracted by the record data extractor 332). By parsing or generating features from the record objects, the data processing system 100 can update a member node profile to reflect various performance information derived by the insight engine 336 from record objects in one or more systems of record as well from electronic activities. The insight engine 336 can generate various outputs corresponding to insights derived from record objects in one or more systems of record and electronic activities. The insights can include a performance score or performance grade indicating how well a member node has performed or may perform in general, at a type of task, in a specific job or under certain circumstances of a job or job environment, as determined by the communications metadata, extracted from the node graph.

As noted above, the automation and intelligence engine 112 may include a sync module 338, an API 340, and/or a feedback module 342. The automation and intelligence engine 112 and each of the components of the automation and intelligence engine 112 can be any script, file, program, application, set of instructions, or computer-executable code. The record object manager 306 may be implemented as described above to update record objects of systems of record and/or receive information from record objects of various systems of record. For example, the record object manager 306 can update contact record objects with updated contact information from node profiles. The sync module 338 can be any script, file, program, application, set of instructions, or computer-executable code and be configured to periodically synchronize with data source providers and/or data sources so information can be shared between the data processing system 100 and the corresponding data source providers and/or data sources. In some embodiments, the sync module 338 enables various data source providers and/or data sources to share information with each other. The API 340 can be any application programming interface that is configured to enable the data processing system 100 to communicate with one or more systems of record, electronic mail servers, telephone log servers, contact servers, and/or other types of servers and end-user applications that may receive or maintain electronic activity data or profile data relating to one or more nodes. The feedback module 342 can be any script, file, program, application, set of instructions, or computer-executable code that is configured to receive feedback from one or more client devices that can be used to update one or more systems of record. The feedback can be used to train any of the modules and/or models of the data processing system 100.

As described herein and supplemental to the description of various terms provided above, electronic activities can include emails, electronic calendar events, electronic meetings, phone call logs, instant messages, other any other electronic communications generated by a node, received by a node, exchanged between nodes or otherwise stored on an electronic server configured to provide electronic activities to the data processing system 100.

An individual or member node can be an electronic representation of a user, person, account of a person or user, an employee, a bot, or any other entity that may have an account or an identifier that the data processing system can generate a node profile for. A group node can be an electronic representation of an enterprise, a company, an organization, an employer, a team of employees or people, or a plurality of member nodes that can be treated as a single entity. A node profile can be an electronic representation of a profile of a member node or a group node. The node profile can include fields. Each field can include one or more values. An example field can be an email address. An example value can be john.smith@example.com. A value of a field can include an array of data points identifying occurrences of the value. Each value can have a confidence score. A data point can identify an electronic activity or other piece of information that contributes the value to the field. The data point can include or identify a source of the electronic activity, a trust score of the source of the data point, a time or recency of the electronic activity and a contribution score. The source of the electronic activity can be a mail server, a system of record, or any other repository of electronic activities.

A trust score of the source of the data point can indicate a trustworthiness of the source of the data point. The trust score of the source can be based on a completeness of system of record maintained by the source. The trust score can also serve as an indication of how reliable the source may be.

A contribution score of the data point can indicate how much the data point contributes towards a confidence score of the value associated with the data point. The contribution score can be based on the trust score of the source, a health score of the source, and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

A confidence score generally relates to a level of confidence that a certain piece of information is accurate. As used herein, a confidence score of a piece of information, such as an assigned tag, a value of a field of a node profile, a stage classification prediction, a record object match, can indicate a level of confidence that the piece of information is accurate. The confidence score of the piece of information can change based on a temporal basis. A node profile can include a first email address corresponding to a first job and a second email corresponding to a subsequent job. Each of the two email addresses are at respective points in time, accurate and valid. As the person switches jobs, the first email address is no longer valid but the confidence score associated with the email address can in some embodiments, remain high indicating that the first email address belongs to the node profile. Similarly, the second email address also belongs to the node profile and therefore also has a high confidence score. After the system determines that the second email address is active and functioning, the system can assign a higher confidence score to the second email address relative to the first email address since the contribution scores provided by recent data points (for example, recent electronic activities identifying the second email address) can contribute towards the higher confidence score. Similarly, any tags that are assigned to electronic activities identifying bounce back activity related to the first email address (indicating that the first email address is no longer active) can reduce the confidence score of the first electronic activity.

The health score of the source can indicate a level of health of the source. The health of the source can include a completeness of the source (for example, a system of record), an accuracy of the data included in the source, a frequency at which the data in the source is updated, among others.

A connection strength between two nodes can be based on the electronic activities associated with both the nodes. In some embodiments, each electronic activity can be used by the system to determine a connection strength between the two nodes. The contribution of each electronic activity towards the connection strength can diminish over time as older electronic activities may indicate a past connection but do not indicate a current status of the connection strength between the two nodes.

The time decaying relevancy score of an electronic activity can indicate how relevant the electronic activity is for determining a connection strength between two nodes exchanged between or otherwise associated with the two nodes. The connection strength between two nodes can be based on the time decaying relevancy scores of the electronic activities exchanged between or otherwise associated with the two nodes.

As further described herein, electronic activities can be linked to or matched to record objects. Record objects can be maintained in a shadow system of record maintained by the data processing system 100 or in some embodiments, linked or matched to record objects maintained in master system of records that are maintained by customers or enterprises.

R. Systems and Methods for Automatically Generating Stories Using One or More Large Language Models The systems and methods described herein can perform automatic story generation for record objects (e.g., opportunity record objects). The stories can be generated based on data of electronic activities that have been matched to the record objects and/or data of the record objects themselves. Electronic activities can be matched to record objects using the systems and methods described herein or through any other system and method. The record objects can be record objects stored in a CRM system. A conventional system may extract data of record objects and apply a set of rules to analyze the data and determine characteristics or statuses of the accounts and/or opportunities associated with the record objects. The system may do so to determine the parties involved in an opportunity and/or a current state of the opportunity. In some cases, electronic activities may not include data that satisfies any rules that can be used to determine characteristics of an opportunity associated with a record object. In such cases, the system may not be able to provide or generate any insights regarding the opportunity or actions to take based on such insights.

A system may attempt to generate insights regarding an opportunity by implementing large language models to do so. Such a system may input the different electronic activities for an opportunity into a large language model with instructions to generate different types of recommendations. However, such a system may face multiple difficulties in accurately and efficiently generating recommendations in this manner. For example, large language models are often limited by the amount of text the models can ingest. Given the large number of electronic activities that may correspond to an opportunity, a large language model may not be able to ingest each of the electronic activities and therefore may be limited in the amount of data the model may use to generate recommendations. In another example, large language models are prone to "hallucinations." Typical causes of hallucinations may be lack of context, misleading prompts, rare or uncommon inputs, exploiting biases, noise in the input data, and attempts at creative writing. Inputting large amounts of electronic activities into a large language may meet each of these criteria given the variations and unpredictability in both the format and the content of the electronic activities on a large scale. Accordingly, a system that attempts to generate insights and actions to perform using large language models may often be faced with unpredictable and incomplete outputs.

A computer implementing the systems and methods described herein may overcome the aforementioned technical deficiencies. For example, the computer may implement (e.g., store and/or use) one or more large language models that have been trained to generate different types of outputs regarding opportunities. The computer can identify multiple electronic activities that have been matched to a record object. The record object may be an opportunity record object associated with an opportunity account and may be stored in a system of record (e.g., CRM system). The computer can input the electronic activities into one or more large language models to generate one or more text strings for each electronic activity. The text strings can be or include insights indicating the content of the respective electronic activities. The computer can input the text strings into the one or more large language models to sort the text strings into different topics. The computer can input the text strings into the one or more large language models, in some cases as sorted into the different topics, to output text summaries for the electronic activities. The computer can input the text summaries into the one or more large language models to generate a textual output (e.g., a story). The textual output can describe a status, stage, or other characteristics of the opportunity associated with the record object. The computer can input the textual output into the one or more large language model to generate one or more recommendations regarding the opportunity. By first generating the textual output and then using the textual output to generate recommendations for an opportunity, the computer can generate insights based on complete and succinct data and reduce hallucinations by the large language models being used to perform the process.

By way of the present disclosure, the system and method described herein provide a compression algorithm, sequence, or mechanism for compressing content included in electronic activities by generating insights using a LLM and applying a temporal schema that prioritizes certain electronics activities based on the timestamp associated with the electronic activity such that more recent electronic activities may be weighted more heavily in the compression mechanism. In this way, the story generated using the compression mechanism retains relevant insights from the electronic activities matched to the opportunity and prioritizes certain insights based on recency.

In some embodiments, when generating the text summaries, the computer can input identifications of participants of the electronic activities into the one or more large language models with the one or more text strings and/or topics. The participants can be the individuals that are identified in the electronic activities as the senders of the electronic activities, can be the receivers of the electronic activities, or can be identified in the bodies of the electronic activities. In one example, the computer can input the participants into the one or more large language models as separate inputs from the text strings. The computer can use the systems and methods described herein to extract the identifications (e.g., the names) of the participants from the electronic activities and input the identifications into the one or more large language models with the text strings. In another example, the computer can input the identifications of the participants into the large language model by inputting the text strings containing the identifications of the participants into the large language model. By including the identifications of the participants in the input to the large language models, the computer can generate text summaries that provide context regarding the opportunity associated with the record and indicate the individuals that are involved and their activity.

In some embodiments, when generating the textual output, the computer can input data from the record object into the one or more large language models with the text summaries. For example, the computer can retrieve data regarding the entities (e.g., the companies, groups, or organizations) involved in the opportunity associated with the record object and/or a status or stage of the opportunity. The computer can input such data into the one or more large language models with the text summaries and the one or more large language models can generate a textual output or story based on the data from the record object and the text summaries. The textual output can be analyzed (e.g., by another large language model implemented by the computer) to generate recommendations for next actions to perform or any analysis of the current state of the opportunity. Because of the processing that is performed in generating the textual output and/or the retrieval of the data of the record object itself, the textual output can be used to generate more accurate and more detailed recommendations (e.g., and reduce hallucinations) for next steps for the opportunity than if only the electronic activities were used to generate the recommendations.

In some embodiments, in performing the systems and methods described herein, the computer can implement a cascade of large language models that are each trained to generate text in a format that can then be used as input into another large language model. For example, the computer can generate the text strings from the electronic activities matched to the record object using a first large language model, generate the text summaries based on the text strings using a second large language model, and then generate the textual output (e.g., the story) using a third large language model. In doing so, the computer can generate a formatted textual output that was built on multiple layers of data from different large language models and different sources. The textual output can be used to generate a textual output with more context regarding any events that were identified in the electronic activities that can then be used to generate recommendations or further analysis.

Further, by using the one or more language models to generate a textual output, the computer can generate a textual output that can be used for a diverse set of analytics and/or recommendations. When using multiple large language models, each large language model may be separately trained to generate specific data regarding the opportunity that can be used by another large language model. Using this hierarchical large language model system can further improve the accuracy and content of the textual outputs the computer can generate for different record objects compared with any rule-based system and can reduce hallucinations compared with large language models that generate recommendations based on electronic activities on themselves.

Figure 9A:
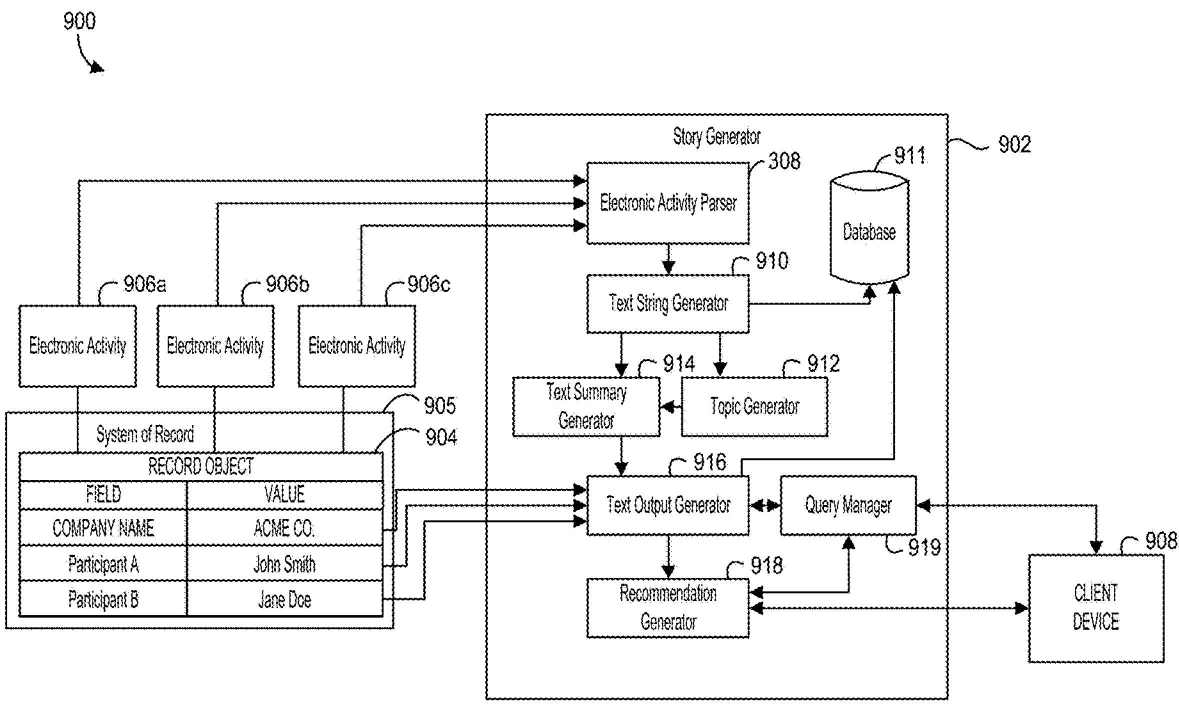
FIG. 9A illustrates a block diagram of an example system for automatically generating a story using one or more large language models according to embodiments of the present disclosure.

Referring now to FIG. 9A, a block diagram of a system 900 for automatically generating stories using one or more large language models, according to embodiments of the present disclosure. Some of the components of the system 900 may correspond to components of the data processing system 100 of FIG. 1. The system 900 can automatically generate textual outputs (e.g., stories) for record objects based on data of electronic activities matched to the record objects and/or data of the record objects themselves. The system 900 can include a story generator 902. Although not shown, the system 900 may also include a data processing system (e.g., the data processing system 100), of which the story generator 902 may be a component. The story generator 902 can be any script, file, program, application, set of instructions, or computer-executable code that is configured to enable a computing device on which the story generator 902 is executed to perform one or more functions of the story generator 902 described herein. The story generator 902 may be the same as, be similar to, or be a component of the insight engine 336, shown and described with reference to FIG. 3E.

As described in further detail below, the story generator 902 can be configured to use one or more large language models (e.g., neural networks or transformers) to generate textual outputs (e.g., stories) indicating different characteristics of an opportunity associated with a record object 904 (e.g., an opportunity record object). The story generator 902 can parse electronic activities 906*a-c* (together, the electronic activities 906 and, individually, the electronic activity 906) that have been matched to (e.g., associated with, linked to, or otherwise determined to pertain to) the record object 904 to extract data from the electronic activities 906. The story generator 902 can also extract data from the record object 904. The story generator 902 can use one or more large language models to generate a textual output indicating characteristics of the opportunity associated with the record object 904 based on the extracted data from the electronic activities 906 and/or the record object 904. The story generator 902 can transmit the textual output to a client device 908, and the client device 908 can display the textual output and/or the story generator 902 can further process the textual output to generate recommendations and/or insights regarding the opportunity. The story generator 902 can transmit the recommendations to the client device 908. The client device 908 can include a processor and memory and can be or include any type and/or number of computing devices.

The record object 904 can be stored in a system of record 905. The system of record 905 can be the same as or similar to the system of record 118, shown and described with reference to FIG. 1. The system of record 905 can be, include, or be a component of a CRM system. The record object 904 can be an account record object or an opportunity record object.

For example, the record object 904 can be an account record object and include fields associated with an account that is held with a data source provider. Such an account record object can be stored in the systems of record of the data source provider. As an account record object, the record object 904 can include fields can such as AccountNumber, Domain name, Postal Code, Company Name, BillingAddress, Description, Industry, Fax, DunsNumber, LastActivityDate, MasterRecordId, Name, NumberOfEmployees, Ownership, Website, YearStarted, and IsPersonAccount, among others. The record object 904 can be stored or linked with one or more opportunity record objects.

In some cases, the record object 904 can be an opportunity record object. An opportunity record object can be a data structure that includes one or more fields for a given opportunity. An opportunity can indicate a possible or planned deal with a customer for which an account record object is already stored in a system of record. As an opportunity record object, the record object 904 can include fields such as AccountId, Amount, CampaignId, CloseDate, Description, ExpectedRevenue, Fiscal, HasOpenActivity, IsClosed, IsWon, LastActivity Date, Name, OwnerId, Role, StageName, Territory2Id, and Type.

The electronic activities 906 can be any type of electronic communication between individuals. The electronic activities 906 can include, for example, real-time (or near real-time) electronic activities, asynchronous electronic activity (such as emails, text messages, among others) or synchronous electronic activities (such as meetings, phone calls, video calls), or any other electronic communication between two or more parties. The electronic activities 906 can include text or voice messages between the different parties.

The story generator 902 can include the electronic activity parser 308, a text string generator 910, a database 911, a topic generator 912, a text summary generator 914, a text output generator 916, a recommendation generator 918, and/or a query manager 919. The components 308-918 of the story generator 902 can operate to generate a textual output (e.g., a story) regarding the record object 904 based on data in electronic activities 906 that have been matched to the record object 904 and/or data of the record object 904 itself. The story generator 902 can perform the process described herein using a single large language model or multiple large language models. The large language model or large language models can be connected with adapters to facilitate performing the process.

The electronic activity parser 308 can be any script, file, program, application, set of instructions, or computer-executable code that is configured to identify or extract data from electronic activities. The electronic activity parser 308 can parse (e.g., identify or extract) values from the electronic activities 906. The electronic activity parser 308 can parse values from the electronic activities 906 responsive to determining the electronic activities 906 are matched to the record object 904. For example, the electronic activity parser 308 can identify the record object 904 from the system of record 905 storing the record object 904. The electronic activity parser 308 can retrieve or identify electronic activities 906 matched to the record object 904 responsive to a condition being satisfied (e.g., responsive to a set time interval ending (e.g., detecting a set time interval ending) from the last time the story generator 902 generated a story for the record object 904 or responsive to receiving a user input indicating to generate a textual output for the record object). The electronic activity parser 308 can identify the electronic activities 906 by identifying stored associations (e.g., links or other relationships) between the record object 904 and the electronic activities 906. The electronic activity parser 308 can identify any number of electronic activities 906 matched to the record object 904. The electronic activity parser 308 can input the identified electronic activities 906 into the text string generator 910.

The text string generator 910 can be or include one or more large language models. A large language model can be a neural network, a transformer, or any other machine learning model capable of automatically generating text based on an input. A large language model of the text string generator 910 may be trained to generate one or more text strings for individual electronic activities. For example, the story generator 902 can feed (e.g., separately feed) the electronic activities 906 into the text string generator 910. In doing so, the story generator 902 can input the body, subject line, and/or any address lines of the electronic activities 906 into the text string generator 910. The text string generator 910 can generate one or more text strings based on the electronic activities 906, such as by applying the parameters and/or weights of the text string generator 910 to the electronic activities 906. In doing so, the text string generator 910 can generate 1-N text strings for each electronic activity 906, where N can be any number (e.g., the text string generator 910 can generate any number of text strings based on individual electronic activities 906).

The text strings generated by the text string generator 910 can be or include insights for the electronic activities 906. The insights can indicate the context or content of the electronic activities 906. For example, the text string generator 910 can generate insights such as actions that are described in an electronic activity 906, responsibilities that are established in an electronic activity 906, the subject of an electronic activity 906, or a summary of an electronic activity 906. In some embodiments, in cases in which the text string generator 910 is not able to generate an insight for an electronic activity 906, the text string generator 910 can generate a text string (e.g., only a single text string) indicating no insights could be determined.

The text string generator 910 can be a few-shot prompt large language model or a zero-shot prompt large language model. For example, the text string generator 910 can be a generic large language model that has been trained to generate insights based on the electronic activities 906 using examples of insights from other electronic activities. Both the electronic activities 906 and the examples can be inserted into the text string generator 910 and the text string generator 910 can generate (e.g., automatically generate) one or more text strings based on the electronic activities 906 and the examples. In doing so, the text string generator 910 can view the examples as guides for the type of output (e.g., guides to generate insights for the electronic activities) to generate based on the electronic activities 906.

In another example, the text string generator 910 can be a large language model that has been specifically trained to generate insights in text strings. The text string generator 910 can be trained to do so by using supervised learning or unsupervised learning training techniques, for example, to adjust any internal weights and/or parameters to specifically generate insights based on input electronic activities. The training can enable the text string generator 910 to automatically generate text string insights for individual electronic activities with or without examples to guide the output (e.g., using a few-shot prompt or a zero-shot prompt). As referenced herein, a few-shot prompt can include a one-shot prompt. The text string generator 910 can generate one or more text strings as output responsive to receiving the electronic activities 906 as input. The story generator 902 can input text strings generated by the text string generator 910 into the topic generator 912.

The text string generator 910 can store text strings (e.g., insights) that the text string generator 910 generates in the database 911. The database 911 can be a database (e.g., a relational database) with a semantic index. The semantic index can include word embeddings (e.g., vectors) in which words with similar meanings are represented closer to each other than other words. The text string generator 910 can store the text strings in the database 911 as vectors (e.g., the text string generator 910 can generate the embeddings, such as using machine learning techniques or a defined algorithm). The text string generator 910 can store the vectors in the database 911 with metadata regarding the text strings such as date, account identifications, opportunity identification, and references to any identities in the text strings from which the vectors were generated. In some embodiments, the text string generator 910 can store the electronic activities from which the text strings were generated and/or the text strings themselves in the database 911. The electronic activities and/or the text strings can be stored as metadata of the vectors, in some embodiments.

The topic generator 912 can be or include one or more large language models that are configured to generate and/or modify a list of topics for a system of record. Topics can identify the general subject matter, content, or context of groups of text strings. The topic generator 912 can be or include a generic large language model or a large language model that has been trained to generate topics based on one or more electronic activities. As a generic large language model, few-shot prompting techniques may be used to cause the topic generator 912 to generate topics for electronic activities. As a trained large language model, zero-shot prompts and/or few-shot prompts can be used to cause the topic generator 912 to generate topics. Advantageously, using a trained large language model that can receive zero-shot prompts can enable the large language model to receive larger inputs of data to be analyzed, such as because the large language model may not need to process the examples that guide the output in addition to the input to be analyzed.

The topic generator 912 can generate a list of topics for one or more opportunity record objects of the system of record 905. To do so, the story generator 902 can identify text strings (e.g., insights) that the text string generator 910 has generated for the electronic activities for a specific deal type or a specific product and input the text strings into the topic generator 912. The topic generator 912 may generate a list of topics based on the input text strings (e.g., generate a list of topics for a specific opportunity type and/or product). In some embodiments, the topic generator 912 may include the text strings that correspond to the list of topics in the list (e.g., the topics can be headings of text and the topic generator 912 can place the text strings that correspond to the topics under the respective headings).

The topic generator 912 can generate topics for a time period (e.g., a predetermined time period). For example, the story generator 902 may only retrieve electronic activities from the system of record 905 that correspond to a timestamp within a defined time period (e.g., a day, a week, a month, a year, or any other time period). The story generator 902 can input the electronic activities into the topic generator 912, and the topic generator 912 can output or generate topics based on the input electronic activities. The topic generator 912 can generate topics at defined intervals in this manner.

The topic generator 912 can generate topics upon connection with the system of record 905. For example, the data processing system hosting the story generator 902 can connect with the system of record 905 (e.g., establish a connection with the system of record 905 by performing a handshaking operation through an application programming interface (API)). Responsive to doing so, the electronic activity parser 308 can identify the different record objects (e.g., opportunity record objects and/or account record objects) for different opportunities in the system of record 905 and identify the electronic activities that are matched to the record objects in the system of record 905. The electronic activity parser 308 can identify electronic activities that correspond to times within a defined time period (e.g., within a defined time period prior to the current time) instead of every electronic activity, which can cause the topics to be more relevant as well as reduce the processing resources required to generate the topics. The text string generator 910 can generate text strings (e.g., insights) for the different electronic activities, and the story generator 902 can feed the text strings into the topic generator 912. Based on the text strings, the topic generator 912 can automatically generate topics in a list of topics that each correspond to a different grouping of text strings (e.g., based on the context or content of the text strings). In some embodiments, the topic generator 912 can generate the list of topics and indicate the input text strings that correspond to the different topics (e.g., by including the text strings under the respective topics in the list).

The topic generator 912 can generate topics by opportunity type and/or product (e.g., product type or a specific product). For example, in some embodiments, prior to inserting the text strings into the topic generator 912, the story generator 902 can sort the text strings by deal type or product. The story generator 902 can sort the text strings based on the type of opportunity (e.g., deal type), such as a business deal, a financial deal, a real estate deal, a sales deal, a government deal, a technology deal, an entertainment deal, an employment deal, a retail deal, or a trade deal, or a type of product, such as a consumer good, food and beverage, automotive, health and wellness, home improvement, beauty and personal care, entertainment, sports and recreation, financial, or industrial and business, to which the electronic activities pertain and from which the text strings were generated. The story generator 902 can determine the types of opportunities or products from a value or flag in the respective record objects for the opportunities. The story generator 902 can separately input the text strings into the topic generator 912 for each opportunity type and/or product type to generate topics for specific opportunity types and/or products. In some embodiments, electronic activities may correspond to an opportunity type and a product, multiple opportunity types, and/or multiple product types. In such cases, text strings generated from such electronic activities can be input into the topic generator 912 for each opportunity type and/or product type to which the electronic activities correspond. The topic generator 912 can generate the topics for each opportunity type and/or product type and the story generator 902 can store the topics in memory (e.g., in a database). The topic generator 912 can store the topics with a flag or setting that indicates the types of opportunity and/or product types for which the topics were generated. The story generator 902 can generate and/or store such topics at set intervals (e.g., weekly) based on electronic activities from the corresponding intervals.

Upon generating a list of topics, the story generator 902 can sort and/or deduplicate the topics. For example, the story generator 902 can sort the topics based on one or more rules (e.g., cause the topics to be in alphabetical order, cause the topics that correspond with the most electronic activities to be first in the list, etc.). The story generator 902 can also remove any topics for which the topic generator 912 generated duplicates (e.g., exact duplicates or topics that are similar in subject matter). In removing the topics, the story generator 902 can aggregate the text strings for each duplicate of a topic into a single topic to maintain an accurate record of the text strings that correspond to a specific topic.

In some embodiments, the topic generator 912 can automatically sort and/or deduplicate the topics. For example, the topic generator 912 can include a large language model (e.g., a large language model separate from the large language model that generates the list of topics) that can be configured to compress lists of topics. The large language model may have been trained to sort and/or deduplicate lists of topics using few-shot and/or zero-shot prompting (e.g., automatically sort and/or deduplicate lists of topics using only lists of topics as input). The topic generator 912 can execute the large language model and the large language model can automatically make a list of topics shorter by removing exact duplicates. In the same execution or in a second execution, the large language model can remove topics that are similar (e.g., topics that are similar in subject matter). In some embodiments, the topic generator 912 can iteratively compress a list of topics until the list of topics includes a defined number (e.g., a maximum defined number) of topics or number of topics below a threshold. The topic generator 912 can generate such compressed lists of topics for each opportunity type and/or product and store the lists in memory.

A user can edit the lists of topics. For example, subsequent to the topic generator 912 generating a list of topics, the story generator 902 can transmit the list of topics to a client device (e.g., the client device 908). The client device 908 can display the list of topics at a user interface. A user accessing the client device can view the list of topics. Via the user interface, the user can select one or more topics from the list of topics to use to generate textual outputs (e.g., stories) and/or one or more topics from the list of topics not to use to generate textual outputs. The client device can transmit the respective selections back to the story generator 902. The story generator 902 can receive the selections and assign flags or settings to the topics of the list indicating the topics to use for textual output generation and/or the topics not to use for textual output generation. The user can similarly edit lists of topics for any opportunity type and/or product.

The story generator 902 can identify a list of topics to use to generate a textual output (e.g., a story) for the record object 904. For example, the story generator 902 can query the system of record 905 and/or the record object 904 to identify any flags or values that indicate a type of opportunity and/or a product for the opportunity associated with the record object 904. The story generator 902 can identify such flags or values from object-value pairs stored in the record object 904, for example. The story generator 902 can identify one or more flags or values indicating the opportunity types and/or products and identify any lists of topics that correspond to the opportunity types and/or products of the record object 904. The text summary generator 914 can generate one or more text summaries for the topics of the identified list or lists of topics.

The text summary generator 914 can be or include one or more large language models that are configured to generate text summaries for record objects. Text summaries can be or include summaries (e.g., reflections) of text strings that correspond to common topics, common participants, and/or common groups (e.g., common group entities, such as a business or organization). The text summary generator 914 can be or include a generic large language model or a large language model that has been trained to generate text summaries based on text strings that correspond to different topics and/or participants of electronic activities and/or opportunities. As a generic large language model, few-shot prompting techniques may be used to cause the text summary generator 914 to generate text summaries for record objects. As a trained large language model, zero-shot prompts and/or few-shot prompts can be used to cause the text summary generator 914 to generate text summaries.

The text summary generator 914 can generate text summaries of text strings for different topics of the list or lists of topics that correspond to the opportunity type(s) and/or product(s) of the record object 904. In some embodiments, in doing so, the text summary generator 914 can retrieve the text strings from the database 911. For example, the story generator 902 can identify the list or lists of topics that correspond to the opportunity type(s) and/or product(s) of the record object 904 from memory. The story generator 902 can input the identified list or lists of topics and the text strings generated by the text string generator 910 from the electronic activities 906 into the large language model. The text summary generator 914 can apply the weights and/or parameters (e.g., trained weights and/or parameters) on the text strings and opportunities to automatically generate text summaries for each of the topics of the list or lists of topics. The text summary generator 914 can generate the text summaries for each topic based on the text strings generated by the text string generator 910 that correspond to the respective topic. In this way, the text summary generator 914 can automatically assign text strings to individual topics associated with the record object 904 and generate text summaries for the text strings for and/or under each of the topics.

In some embodiments, the text summary generator 914 can pre-sort the text strings into different topics. The text summary generator 914 can do so using the same large language model or a different large language model to the large language model that generates the text summaries. For example, the text summary generator 914 can input the text strings from the electronic activities 906 into a large language model with the list or lists of topics selected for the record object 904. The large language model can automatically sort the different text strings into different topics, such as by outputting the list or lists of topics with text strings organized underneath the topics to which the text strings correspond. In some cases, the large language model can sort a text string into the multiple topics, such as when the content of the text string corresponds to multiple topics. The text summary generator 914 can apply the same or a different large language model to the list of topics with the organized text strings to generate text summaries from the text strings for each topic.

In some embodiments, the text summary generator 914 can generate text summaries for participants of the record object 904. For example, when generating the text summaries for the different topics for the record object 904, the text summary generator 914 can additionally or instead generate text summaries for individual participants. The text summary generator 914 can generate text summaries for different participants by identifying the text strings that identify or name individual entities (e.g., individual people and/or group entities). The text summary generator 914 can sort the text strings based on the name of the entities identified in the text strings. In text strings in which multiple entities are identified, the text summary generator 914 can sort duplicates of the same text string into each entity named or identified in the text string. The text summary generator 914 can sort text strings using a second large language model to identify the participants and then provide the names of the participants as input and/or automatically sort the text strings during execution of the large language model when generating the text summaries. The text summary generator

914 can generate the text summaries for each participant from text strings that identify the participant. The text summary generator 914 can output the summary with the participant (e.g., output the text summaries underneath the names of the participants to which the text summaries pertain). In one example, the text summary generator 914 can generate a text summary of a buyer person or a buyer group of the opportunity associated with the record object 904. The text summary generator 914 can generate the text summaries for the participants with the text summaries of the topics. The text summary generator 914 can do so using the same large language model or models or different large language models (e.g., large language models specifically trained to output text summaries for participants, such as by using zero-shot prompts and/or few-shot prompts).

In some embodiments, the text summary generator 914 can generate text summaries that identify competitors of one or more of the participants in an opportunity. For example, in processing (e.g., via a large language model) the text strings for the record object 904, the text summary generator 914 can identify one or more entities that correspond with an insight indicating the one or more entities are competitors. An example of such an insight can be a text string that negatively discusses a group entity that is not a part of the opportunity (e.g., not a buyer or a seller in the opportunity). The text summary generator 914 can identify any text strings that identify the competitor or any other such competitor and generate text summaries of text strings that identify or mention the competitors. The text summary generator 914 can output a label for the competitors and/or text summaries for the competitors indicating the text summaries are for competitors and not participants in the opportunity.

In some embodiments, the text summary generator 914 can generate text summaries that identify pain points in an opportunity. For example, in processing (e.g., via a large language model) the text strings for the record object 904, the text summary generator 914 can identify one or more text strings that indicate problems (e.g., pain points) that a participant (e.g., the buyer or the seller) is having in completing the opportunity of the record objects. Examples of such problems can include unresponsive participants, undesirable portions of the opportunity, or the opportunity is moving too slowly. The text summary generator 914 can identify any text strings with content that correspond to such problems and generate a text summary of the text strings that correspond to each of the identified problems. The text summary generator 914 can do so using a large language model of the text summary generator 914 (e.g., a large language model that has been trained to identify and summary text strings for specific pain points, such as using zero-shot prompting or few-shot prompting). The text summary generator 914 can output a label for the pain points indicating the pain points to which the text summaries correspond.

In some embodiments, the text summary generator 914 can generate text summaries for different time periods. The text summary generator 914 can generate text summaries for text strings that correspond with timestamps within different time periods (e.g., predetermined time periods). In doing so, the text summary generator 914 can aggregate the text strings that correspond with timestamps within the different time periods and generate text summaries of the text strings that correspond with the different time periods. For example, when the text string generator 910 generates text strings for the electronic activities 906, the text string generator 910 can assign (e.g., store in memory) timestamps to the text strings that indicate the times and/or days of the electronic activities 906 from which the text strings were generated and/or transmitted. Such timestamps can be in the body of the electronic activities 906, for example. The story generator 902 can input the timestamps with the text strings into the text summary generator 914. The text summary generator 914 can sort the text strings into different time periods that include the timestamps of the text strings. The text summary generator 914 can automatically generate text summaries for separate time periods. The text summary generator 914 can generate the summaries by topic, participant, competitor, and/or pain point for each time period and/or generate general summaries for the time periods without sorting the text strings between such categories. In doing so, the text summary generator 914 can generate a timeline of events that have occurred over the course of the opportunity associated with the record object 904.

In some embodiments, the text summary generator 914 can adjust the length of the text summaries based on the time periods (e.g., weeks) to which the text summaries pertain. For example, a large language model of the text summary generator 914 can be configured or trained to generate text summaries of a defined lengths or of lengths that are within defined ranges. The defined ranges or lengths can vary based on the length of time that the time periods are from the current time (e.g., the time at which the text summary generator 914 is generating the summaries). For example, the large language model can be trained to generate shorter summaries for text strings that correspond with timestamps of earlier time periods than summaries for text strings that correspond with timestamps of later time periods. In some embodiments, the text summary generator 914 can generate the text summaries using separate large language models that have been trained to generate text summaries for different time periods relative to the current time and/or summaries of different lengths. By doing so, the text summary generator 914 can generate more detailed text summaries around more recent events of an opportunity and not focus on details that occurred far into the past. Thus, the text summary generator 914 can generate more relevant text summaries. The text summaries generated by the text summary generator 914 can be used by the text output generator 916 to generate textual outputs.

The text summary generator 914 can store the text summaries in the database 911. The text summary generator 914 can store the text summaries as vectors, in some cases with the text summaries themselves.

The text output generator 916 can be or include one or more large language models that are configured to generate textual outputs for record objects. Textual outputs can be or include documents or records (e.g., a file, document, table, listing, message, or notification) of text that describe the state of an opportunity at a point in time (e.g., the current point in time) or that otherwise describes an opportunity. The text output generator 916 can be or include a generic large language model or a large language model that has been trained to generate textual outputs based on text summaries generated by the text summary generator 914. As a generic large language model, few-shot prompting techniques may be used to cause the text output generator 916 to generate textual outputs for record objects. As a trained large language model zero-shot prompts and/or few-shot prompts can be used to cause the text output generator 916 to generate textual outputs.

For example, the text output generator 916 can generate a textual output for the record object 904. In doing so, the text output generator 916 can receive the text summaries generated by the text summary generator 914 for the record object 904 as input. In some embodiments, the story generator 902 can retrieve other data from the record object 904, such as data describing or characterizing the participants (e.g., the buyer or seller) of the opportunity associated with the record object 904, and input the retrieved data from the record object 904 into the text output generator 916 with the text summaries generated by the text summary generator 914. In some embodiments, the story generator 902 can input one or more of the text strings generated by the text string generator 910 into the text output generator 916. The text output generator 916 can apply the weights and/or parameters (e.g., trained weights and/or parameters) on the text summaries and/or retrieved data to automatically generate a textual output for the record object 904. The generated textual output can include data in a textual format, such as a description of a buyer company or group of the opportunity of the record object 904, a description of the opportunity (e.g., the stage, product, or revenue), text summaries generated based on time period and/or topic, text summaries generated based on participant (e.g., buyer), pain points, competitor mentions, profiles of the participants including data for each participant (e.g., title, company, level of activity, and/or role), the buyer, and/or text strings that were most recently generated (e.g., correspond with times within a defined time period of the current time). In some embodiments, the text output generator 916 can generate the textual output for the record object 904 in a format that can be used as a prompt into the recommendation generator 918 to predict insights and/or actions to take regarding the opportunity associated with the record object 904. The text output generator 916 can store the textual outputs in the database 911. The textual outputs can be used to train the large language model or large language models of the recommendation generator 918, as described herein.

The story generator 902 can transmit the textual output to the client device 908. The client device 908 can display the textual output on a user interface. A user accessing the client device 908 can view the textual output to determine different characteristics of the opportunity associated with the record object 904.

FIG. 9B illustrates an example textual output 920 generated by the text output generator 916 of FIG. 9A, according to embodiments of the present disclosure. The example textual output 920 can include a description 922 of a buyer or seller of an opportunity of the record object 904 and a description 924 of the opportunity. The text output generator 916 can generate the descriptions 922 and 924 based on data retrieved from the record object 904. The textual output 920 can include text summaries 926 for different topics, text summaries 928 for different participants, and text summaries 930 of recent activities. The text output generator 916 can generate the text summaries 926, 928, and 930 from electronic activities 906 that correspond with different time periods (e.g., days). The text summaries 926, 928, and 930 can include a count of the number of insights (e.g., text strings) from which the respective text summaries 926, 928, and 930 were generated or that relate to the respective text summaries 926, 928, and 930. The textual output 920 can include a description 932 of the activities of the participants. The text output generator 916 can generate the description 932 based on data from the record object 904, data from the node profiles of the participants stored in a node graph (e.g., the node graph 110) of the data processing system, and/or by summarizing statistics of the electronic activities 906. The text output generator 916 can generate textual outputs to include any type of data.

Referring to FIG. 9A, the recommendation generator 918 can be or include one or more large language models that are configured to generate recommendations and/or predictions regarding opportunities associated with record objects. The recommendation generator 918 can be or include a generic large language model or a large language model that has been trained to generate recommendations and/or predictions based on textual outputs generated by the text output generator 916. As a generic large language model, few-shot prompting techniques may be used to cause the text output generator 916 to generate recommendations or predictions for record objects. As a trained large language model, zero-shot prompt and/or few-shot prompts can be used to cause the recommendation generator 918 to generate such recommendations or predictions.

The recommendation generator 918 can be trained to generate recommendations based on data of record objects in the system of record 905 and/or any other system of record. For example, the story generator 902 can identify one or a plurality of record objects within the system of record 905. The story generator 902 can use the systems and methods described herein to generate a textual output (e.g., a second textual output) for each of the record objects based on electronic activities that are matched to the record objects. A user can generate a correct output (e.g., a ground truth) for the recommendation generator 918 to generate based on each of the textual outputs. The story generator 902 can input the textual outputs into the recommendation generator 918 and generate an output based on the textual outputs. The recommendation generator 918 can be trained based on the generated correct output by using a loss function and backpropagation techniques based on one or more differences between the actual output and the correct output. The recommendation generator 918 can adjust the weights and/or parameters of the recommendation generator 918 based on the differences, the loss function, and backpropagation techniques such that if the recommendation generator 918 receives the same textual output again, the recommendation generator 918 would generate an output that is closer to the correct output generated by the user.

In some embodiments, instead of using a user input to generate the ground truth of the training data, the story generator 902 can automatically determine the correct output or ground truth based on data of the record objects for which the textual outputs were generated. For example, one or more large language models of the recommendation generator 918 can be trained using scaled-up fine-tuning methods based on successful opportunities and/or based on successful and unsuccessful opportunities using reinforced learning training methods. The recommendation generator 918 can be trained to receive textual outputs from the text output generator 916 and automatically generate such timelines based on the textual outputs.

For example, the story generator 902 can generate a textual output for a record object in the system of record 905. The story generator 902 can additionally identify other data of the record object, such as a timeline of the events of the record object and/or an identification of whether the opportunity associated with the record object was successful (e.g., the deal closed). In some embodiments, the story generator 902 may identify such data prior to generating the textual output for the record object and only generate the textual output for training the recommendation generator 918 responsive to determining the deal closed (e.g., from a value indicating the close of the deal in the record object). The story generator 902 can automatically generate a correct output including a timeline of events that occurred in the opportunity up to the successful completion (e.g., closure) of the opportunity. The story generator 902 can generate the correct output based on the timeline (e.g., to include the timeline) and train the recommendation generator 918 to generate a timeline to a successful opportunity based on the textual output for the record object using the correct output.

In one example, a large language model of the recommendation generator 918 can be trained to generate predictions and/or recommendations using reinforcement learning. Such training can be performed using a reward model to determine recommendations for next steps and/or a timeline of a positive path for an opportunity. For example, the story generator 902 can generate rewards for a large language model of the recommendation generator 918 based on data in a system of record storing an opportunity record object associated with an opportunity. The story generator 902 can identify different events that occur for the opportunity by monitoring the opportunity record object. When the opportunity moves forward (e.g., to the next stage), the story generator 902 determine that to be a success (e.g., a reward) and when an opportunity closes, the story generator 902 can determine that to be a major success (e.g., a higher reward). The story generator 902 can additionally take time to advance an opportunity to a new stage or close a deal as a factor: earlier events that are far from outcomes may have lower absolute rewards assigned to them than later events. The rewards may be a number between [−1, 1] or any other range. The range may include negative values to indicate failures. The reward may take into account opportunity stages and win/loss of the opportunity. An example of a reward function is as follows:

$$R = \text{R\_stage} + \text{R\_win\_loss} + \text{R\_expert}$$

where R_stage is a reward computed based on advancement of the next stage, R_win_loss is a reward computed based on winning or losing the opportunity, and R_expert is a reward provided by a user. R_expert may be optional. R_stage can be calculated using the following function:

$$R\text{\_stage}=f1(t\text{\_to\_transition},\text{median\_}t\text{\_in\_phase},\text{stage\_num})*\text{time\_discount}$$

R_win_loss can be calculated using the following function:

$$\text{R\_win\_loss} = f2(\text{t\_to\_close, median\_t\_to\_close}) * \text{time\_discount}$$

The functions f1( ) f2( ) can be expressed in a variety of ways, but the functions may produce a higher reward for advancing a deal quicker, and lower reward or potentially even a negative reward for causing the deal to move slower or stall. An example of a time discount is gamma^days_to_transition, where gamma is a positive number smaller than 1. The story generator 902 can feed the rewards into the large language model for training based on queries to the large language model and responses by the large language model over time.

The recommendation generator 918 can be trained to generate any type of recommendations for opportunities. For instance, the recommendation generator 918 can generate one or more action items to be performed to push an opportunity towards completion. For example, the recommendation generator 918 can be trained to generate a recommendation to contact an individual associated with a record object. The individual can be a champion for one of the participants of the opportunity or otherwise an individual to push the opportunity to the next stage or stages towards a successful completion. The recommendation generator 918 can identify the individual as a champion, for example, by querying a node graph (e.g., the node graph 110) for node profiles of entities associated with a group entity (e.g., the buyer or seller) associated with the opportunity of the record object and identifying a node profile with a value in a champion field-value pair indicating the entity associated with the node profile is a champion for the group entity. In some cases, the recommendation generator 918 can identify the individual in the node profile for the group entity that lists the individual as a champion. The recommendation generator 918 can identify the individual to recommend in any manner. In some cases, the recommendation generator 918 can identify an individual that moved a previous opportunity forward to the next stage. For example, the recommendation generator 918 can identify data of a record object that an email to an individual A caused the opportunity of the record object to go to the next stage and/or otherwise be completed. The recommendation generator 918 can determine the stage of the opportunity of the current record object for which the recommendation generator 918 is generating a recommendation is the same or matches the stage of the previous record object. Based on the determination, the recommendation generator 918 can generate a recommendation to email individual A to move the opportunity toward completion. The recommendation generator 918 can use any method to recommend individuals to contact to push an opportunity toward completion.

The recommendation generator 918 can generate a recommendation to contact an individual associated with an opportunity associated with a record object. The recommendation generator 918 can do so, for example, by populating a template stored in a large language model of the recommendation generator 918. For example, the recommendation generator 918 can include a large language model that stores one or more templates for different recommendations that the large language model can generate. At least one of the templates can include text with a defined portion in which different portions can be filled in with a name of an individual to contact for a particular opportunity and/or contact information (e.g., phone number and/or email address) of the individual. Upon determining or selecting an individual to recommend to contact, the recommendation generator 918 can retrieve the contact information (e.g., from a node profile of the individual and/or from the system of record 905) for the individual and automatically populate the defined portions of the template with the name and/or contact information of the identified individual. In some cases, the recommendation generator 918 can retrieve the name and/or contact information and input the name and/or contact information into a large language model and the large language model may automatically generate a recommendation based on the name and/or contact information. The recommendation generator 918 can generate the recommendation in any manner.

In some embodiments, the recommendation generator 918 can automatically generate a message to an individual that the recommendation generator 918 is recommending to contact to move an opportunity toward completion. For example, the recommendation generator 918 can include a large language model that has been trained to automatically generate messages (e.g., emails, text messages, voicemails, or any other electronic activities) that an individual can send to contact an individual that the recommendation generator 918 recommends to contact to move an opportunity toward completion or otherwise the next stage. For example, the recommendation generator 918 can identify an individual to recommend to contact for an opportunity. Responsive to identifying the individual, the recommendation generator 918 can input the name and/or contact information of the individual into a large language model of the recommendation generator 918. The large language model can automatically generate a message directed to the individual. The large language model can generate the message in addition to or instead of with a recommendation to contact the individual as described above or a separate large language model can generate the recommendation. The large language models of the recommendation generator 918 may each be trained to generate such outputs (e.g., one large language model can be trained to generate a recommendation to contact an individual, and another large language model can be trained to generate a message that can be sent to the individual).

The story generator 902 can transmit the message and/or the recommendation to the client device 908. The story generator 902 can include electronic account information of the individual identified in the recommendation in the transmittal to the client device 908 (which the story generator 902 may retrieve from the node profile for the individual and/or from the record object 904 of the opportunity). A user accessing the client device 908 can view the message, update the message as necessary, if at all, and transmit the message (e.g., as updated) to an electronic account of the individual (e.g., transmit the message using information of the electronic account that the story generator 902 transmitted to the client device 908). In some embodiments, the recommendation generator 918 can automatically transmit the message to the electronic account of the individual instead of or in addition to transmitting the message to the client device 908.

The recommendation generator 918 can also generate one or more timelines of events to occur for an opportunity to be successful. For example, the recommendation generator 918 can be trained to generate a timeline indicating the individuals that need to be involved at specific times in the future, partners that need to be involved by specific times in the future, and/or times of stages at which the opportunities need to be in the future. The recommendation generator 918 can do so based on a textual output from the text output generator 916.

In some embodiments, the recommendation generator 918 can include separate large language models that are each trained to generate a timeline of events to occur for a different time period. For example, the recommendation generator 918 can include one large language model that is trained to generate timelines for seven days, another large language model that is trained to generate timelines for 30 days, and another large language model that is trained to generate timelines for a quarter. The recommendation generator 918 can include any number of large language models that are trained to generate timelines for any time periods (e.g., time periods of any length and/or at any point in the future). The timelines may include events of various granularity of significance for the completion of an opportunity. For example, a timeline for seven days may have smaller events that need to be completed, such as a person that needs to be contacted by a certain time, than event of a timeline for a quarter, such the next stage of the opportunity needs to be complete by a certain time). The story generator 902 can input textual outputs from the text output generator 916 into each of the large language models of the recommendation generator 918. The large language models can automatically output timelines based on the same textual output to give insights into the different events that need to occur for a successful completion of an opportunity. The recommendation generator 918 can input the same textual outputs into any number of large language models to generate recommendations for any number of actions.

In some embodiments, the recommendation generator 918 can be configured or trained to generate one or more record object indicators for record objects. Record object indicators can indicate a current status, stage, or context of opportunities associated with record objects. For example, the recommendation generator 918 can be trained (e.g., using the systems and methods described herein) to automatically generate, such as by using textual outputs from the text output generator as input, indicators of whether an opportunity is on a positive or negative path towards completion (e.g., the opportunity is likely to successfully complete or are unlikely to successfully complete) and summaries of why opportunities are on a positive or negative path towards completion. In some cases, the recommendation generator 918 can automatically generate identifications of pain points of opportunities, competitor mentions, and/or objections. The recommendation generator 918 can include progress tracking for account plans in the recommendations. The recommendation generator 918 can automatically generate recommendations for implementation tracking and sales enablement.

The recommendation generator 918 can generate such data in recommendations for the textual output generated for the record object 904 using a single large language model or multiple large language models that are trained to generate each aspect of the recommendation. The recommendation generator 918 can generate any combination or permutation of the record object indicators, timelines, and/or actions for the record object 904. The story generator 902 can transmit the generated data by the recommendation generator 918 to the client device 908. The client device 908 can display the generated data on a user interface. A user accessing the client device 908 can view the generated data to gain insight into the status of an opportunity associated with the record object 904.

In some embodiments, the client device 908 can view the recommendations and/or the textual output regarding the record object 904 on a chat interface displayed on the client device 908. The user can do so through the query manager 919. The query manager 919 can be any script, file, program, application, set of instructions, or computer-executable code that is configured to anonymize textual outputs generated by the story generator 902 prior to transmitting the textual outputs to the large language models 1104, 1106, and 1108. The query manager 919 can include one or more large language models to use to hold a conversation with users at a chat interface. The one or more large language models can be trained on data in the database 911. Because the one or more large language models can be trained based on such data, the large language models may provide more nuanced answers to questions and/or ask further questions related to opportunities at a chat interface than a generic large language model would be able to ask.

The chat interface can be a user interface through which the query manager 919 can display outputs and a user accessing the chat interface can provide inputs. The inputs at the chat interface can operate as prompts to the one or more large language models of the query manager 919. The query manager 919 can transmit the chat interface to the client device 908 to establish a communication connection between the story generator 902 and the user accessing the client device 908. Through the chat interface, the user can request different types of recommendations (e.g., timelines, messages, individuals to contact, messages to send individuals identified to contact, status indicators of an opportunity, and/or any other type of recommendation regarding an opportunity) through the chat interface. With the requests, the user can input an identification of an opportunity or record object in a prompt (e.g., a first prompt). The query manager 919 can receive the request or requests and, using the systems and methods described herein upon or responsive to identifying electronic activities matched to the record object associated with the input identification, the story generator 902 can automatically generate a textual output describing the current state of the opportunity and/or any requested recommended actions or status indicators for the opportunity (e.g., only generate recommendations using large language models that are trained to generate the requested recommendations and/or status indicators). The query manager 919 can transmit the requested data to the client device 908 for display at the chat interface. The user can input further requests regarding data of the opportunity or record object and the query manager 919 can respond using the further requests as input into the recommendation generator, in some cases with generated textual outputs, any number of times. Thus, the query manager 919 can operate a chat interface can operate as a communication channel between the story generator 902 and a user accessing the client device 908.

In some embodiments, the user can play out different scenarios for an opportunity using the systems and methods described herein. For example, the query manager 919 can generate a chat interface. Through the chat interface, the user can provide data to include or add to the textual summary generated by the text output generator 916 for the record object 904. Such data can be or include different assumptions, such as an assumption that a particular individual will not respond in time or that a particular event of a timeline recommended by the recommendation generator 918 will not occur by the specified time or day of the timeline. The query manager 919 can receive such inputs and add to or modify the textual output generated by the text output generator 916 according to the input assumptions. The query manager 919 can execute one or more large language models of the recommendation generator 918 using the modified textual output and generate one or more recommendations (e.g., a modified timeline, modified status indicators, and/or modified individuals to contact or modified messages). The story generator 902 can transmit the one or more recommendations to the client device 908. The user can add or retract different modifications to obtain to different recommendations to determine different scenarios in which an opportunity can play out and the consequences of each scenario.

Figure 9C:
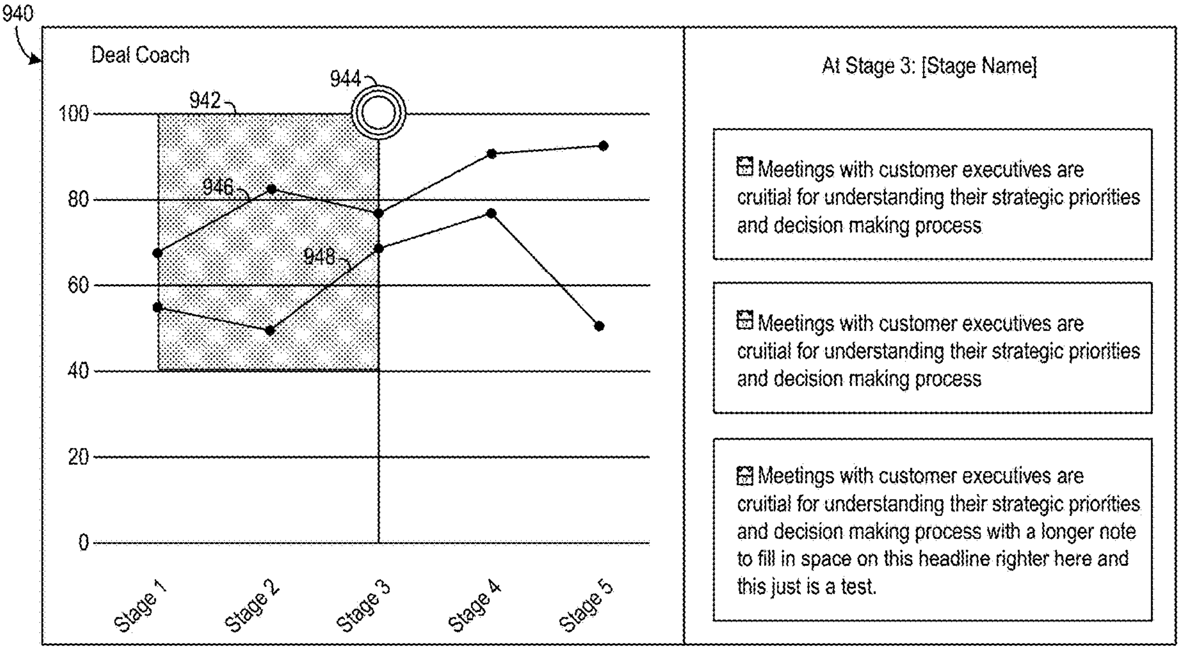
FIG. 9C illustrates a user interface for generating custom scenarios for generating recommendations based on a story according to embodiments of the present disclosure.

In one example, the data processing system can generate a user interface through which the user can provide different scenarios. An example of such a user interface is shown in FIG. 9C as user interface 940. The user interface 940 may enable a user to generate different scenarios based on which the recommendation generator 918 can generate one or more recommendations. For instance, the user interface 940 can include a graph 942 and a slider 944. The graph 942 can include an x-axis that indicates the different stages of an opportunity (e.g., a deal) and a y-axis that indicates a percentage of progress for the individual stages. A user can move the slider 944 along the x-axis to select different stages of the opportunity. The user can select a stage from the graph 942 by moving the slider 944 to a particular stage and stopping the movement. The data processing system can identify the stage at which the user stopped moving the slider 944. The data processing system can include the identified stage in a prompt (e.g., as an assumption) with a textual output generated for the same opportunity as the graph 942. The recommendation generator 918 can generate (e.g., using one or more large language models) one or more recommendations based on the prompt including the identified stage of the opportunity from the user interface 940 and the textual output for the opportunity. The graph 942 can include an optimal or recommended path line 946 that indicates how an opportunity should progress if the recommendations are followed and an actual path line 948 indicating how the opportunity did progress and/or is projected to progress if the participants in the opportunity continued along the same path.

The recommendation generator 918 can update the user interface 940 with recommendations that the recommendation generator 918 generates based on the prompt with the identified stage and textual output. For example, based on the prompt, the recommendation generator 918 can generate (i) a text output indicating positive or optimal characteristics of an opportunity that is on a positive path towards completion for the stage identified from the user interface 940, (ii) a description of the state of the opportunity at the identified stage, and (iii) recommendations to cause bring the opportunity towards the good or optimal characteristics. The recommendations can include, for example, recommendations of individuals to contact, teams to meet, draft messages that can be forwarded to recommended individuals to contact, or any other recommendations. The recommendation generator 918 can include the recommendations on the user interface 940. For example, the recommendation generator 918 can include the characteristics of the good or optimal path on the left side of the user interface 940 (e.g., to the left of the graph 942) and recommendations to improve the state of the opportunity on the right side of the graph 942. The recommendation generator 918 can place the data at any portion of the user interface 940. The user can move the slider 944 along the x-axis of the graph and stop at different stages to repeat the process for each stage, generating new recommendations for each stage and updating the user interface 940 for each generation accordingly.

In some embodiments, the recommendation generator 918 can generate recommendations for each of the stages prior to or while generating the user interface 940. For example, the recommendation generator 918 can automatically generate recommendations as described herein for each of the stages 1-5 of an opportunity based on a textual output for the opportunity. A user can move the slider 944 along the x-axis. As the user moves the slider 944 between stages, the recommendation generator 918 can update the user interface to include recommendations that the recommendation generator 918 had previously generated for each of the stages.

Referring to FIG. 9A, the story generator 902 can generate recommendations regarding different aspects of an opportunity. In one example, the recommendation generator 918 can generate recommendations that describe metrics (e.g., metrics that may be significant for an opportunity, such as cybersecurity and device health), economic buyer, decision criteria, decision process, pain points, champion, or competition, based on a textual output generated by the text output generator 916. An example of output recommendations describing metrics for an opportunity generated by a large language model based on a textual output is as follows:

Metrics (M): Jane has been trying to promote Acme's security benefits, including Multi-Factor Authentication (MFA), Single Sign-On (SSO) and device health features, implying that these might be significant metrics for Newco.

Economic Buyer (E): Individuals at high levels in the Acme organization are involved in the discussions, including John Smith (Director) and Jack Brown (COO), which suggests they could be part of the decision-making unit, but their exact roles in the purchasing decision are not clarified.

Decision Criteria (D): There are some hints at possible decision factors. Mike is interested in integrating Globex dashboards within Lumino, and there's an emphasis on aligning Globex's product stack with Acme's priorities. Also, security features like MFA, SSO, and device health, as promoted by Alissa for Security, may play a role.

Decision Process (D): Jack and Susan are coordinating on product understanding and evaluation. Susan sends a deck related to Acme and Globex growth to Mike. Alissa is communicating with various individuals about security.

Identify Pain (P): There are indications of pain points such as the need for more streamlined operations (mentioned by Mike), aligning business strategies and goals (discussed between John and Susan), and the need for better security solutions (as Alissa discusses Security benefits).

Champion (C): Susan from Globex is notably active in coordinating meetings, discussions, and information flow, and may be the champion for the vendor side. Jack and John from Acme also appear to be active participants in the discussion.

Competition (C): Globex and Security are both mentioned, it is unclear whether they are considered as competitors or as complementary offerings, as they seem to provide different services.

To target specific recommendations, a user can provide an input with a textual output. The user can provide the input at a chat interface. For example, a user can provide "What would be the best next steps for a Globex salesperson selling to Acme be based on the following context" and a textual output for an opportunity involving Globex and Acme as input. The story generator 902 (e.g., through the query manager 919) can receive the input and provide the input into the recommendation generator 918. The recommendation generator 918 can execute one or more large language models based on the input and generate a recommendation based on the user-provided request asking for the best next steps. The recommendation generator 918 can generate recommendations and/or predictions for opportunities. Examples of such recommendations and/or predictions can include running MEDDPIC (e.g., Metrics, Economic Buyer, Decision Criteria, Decision Process, Paper Process, Identify Pain, Champions, and Competition) or other analyses, building enablement materials, building account and deal transaction documents, building preparations for upcoming meetings (e.g., executive briefings), and summarizing whether and why an opportunity was won or lost. The textual outputs generated by the text output generator 916 may be used as an input to a large language model to determine a large number of characteristics for an opportunity.

In some embodiments, the story generator 902 may be configured to automatically generate such recommendations by adding a request to a textual output in an input into a large language model to generate an output. An example of such an output can be as follows:

Based on the context provided, here are some potential next steps for a Globex salesperson:

Continue Engagement with Key Participants: Continue follow-ups with key decision-makers and influencers within Acme like John, Jack, Mike, and Rima. Keep updating them on Globex's features, benefits, and use cases.

Demonstrate Alignment with Acme's GTM Priorities: Jack has shown interest in understanding how Globex's product stack aligns with Acme's Go-To-Market (GTM) priorities. Prepare a comprehensive demonstration of how the product offerings can be tailored to Acme's needs and contribute to their overall GM strategy.

Promote Integration Capabilities: Since Mike has shown interest in operationalizing Globex dashboards with Lumino, highlight how Globex integrates seamlessly with Lumino and can bring actionable insights directly into their CRM.

Provide more information on AI/ML-Based Data: Since Susan had followed up with Phil for a Globex session, make sure to provide more insights on how Globex leverages AI/ML for data enrichment, predictions, and generating actionable insights.

Outline Pilot Program: As Susan had outlined the next steps for pilot use cases on day 33, work on setting up the pilot program based on the agreed-upon use cases. Collaborate closely with Acme to ensure that the pilot addresses their key concerns and proves the value of Globex.

Discuss with Higher Executives: Continue to strive for a meeting with the higher-ups, such as Justin (COO) and Rachel (VP Architectures), to present how Globex can help Acme in their transformation initiatives. Edith seems to be helping with scheduling, so maintain communication with her.

Coordinate with Alissa Yee: Alissa seems to be trying to sell Security (owned by Acme) to various individuals. Try to understand if this is a separate initiative or can be tied into the wider sale, and if it's beneficial, consider a joint approach with Alissa.

Prepare for Renewal Discussions: There was a mention of a renewal discussion with Joseph on day 26. Make sure you're ready for these discussions and can demonstrate the ongoing value Globex delivers to justify the renewal.

Remember, success in selling to an organization like Acme would involve consistent follow-ups, regular demonstrations of value, and the ability to navigate their internal structure to get the right messages to the right people. Always keep the conversation focused on how Globex can help Acme meet its strategic objectives.

In another example, a user can provide "How should I enable a new salesperson at Globex that is taking over Acme account based on the following context" and a textual output for an opportunity involving Globex and Acme as input. The recommendation generator 918 can execute one or more large language models based on the input and generate a recommendation based on the user-provided request. An example of such an output can be as follows:

To enable a new salesperson at Globex who is taking over the Acme account, you should follow these steps:

1. Understand the context: Review the provided context carefully to gain insights into the ongoing activities, recent interactions, and key participants involved in the Acme account.

2. Review previous communications: Have the new salesperson familiarize themselves with the previous email exchanges and meetings between Globex and Acme participants. This will provide valuable context and help them understand the existing relationship and ongoing discussions.
3. Identify the key decision-makers and stakeholders: From the context provided, identify the key individuals at Acme who are involved in the decision-making process, such as John, Jack, Mike, Rima, and Briana.
4. Understand Acme's priorities: Review the insights and discussions related to business alignment and integration to understand Acme's priorities and requirements. This will help the salesperson tailor their approach and offerings accordingly.
5. Familiarize with Acme's product stack: The new salesperson should thoroughly understand Globex's product offerings, capabilities, and how they align with Acme's needs and GTM (Go-To-Market) priorities.

In another example, a user can provide "Build an account transition plan for a new salesperson to take over Acme account based on the following context" and a textual output for an opportunity involving Globex and Acme as input. The recommendation generator 918 can execute one or more large language models based on the input and generate a recommendation based on the user-provided request. An example of such an output can be as follows:

Account Transition Plan for New Salesperson Taking Over Acme Account:

1. Review Existing Context: The new salesperson should thoroughly review the provided context, including recent activities, ongoing discussions, and key participants involved in the Acme account.
2. Understand Acme's Needs and Priorities: Analyze the insights related to business alignment, integration, demos, pilot programs, and AI/ML-based data to understand Acme's current needs and priorities.
3. Familiarize with Acme's Product Stack: The new salesperson should gain a comprehensive understanding of Globex's product stack, capabilities, and how they align with Acme's GRM priorities.
4. Identify Key Stakeholders: Identify and prioritize key stakeholders within Acme who have been actively involved in the discussions, such as John, Jack, Mike, Rima, and Briana.
5. Establish Contact and Introduction: Initiate contact with key stakeholders and introduce the new salesperson as the point of contact for Globex's engagement with Acme.
6. Schedule One-on-One Meetings: Schedule one-on-one meetings with John, Jack, Mike, and other relevant stakeholders to understand their specific requirements and pain points.
7. Coordinate with Internal Teams: Engage with internal teams within Globex, such as customer success, sales engineering, and product specialists, to ensure adequate support during the account transition.
8. Review Previous Email Exchanges and Meetings: Thoroughly review previous email exchanges and meeting notes between Globex and Acme participants to gain valuable context and insights into the relationship.
9. Prepare Tailored Materials: Based on the insights gained, prepare tailored materials, presentations, and use cases that address Acme's specific needs and demonstrate how Globex's solutions can benefit them.
10. Offer Demonstrations and Pilot Programs: Offer live product demonstrations and pilot programs to showcase the value of Globex's solutions in addressing Acme's business challenges.
11. Develop a Sales Strategy: Develop a sales strategy that aligns with Acme's timeline, decision-making process and key milestones.
12. Maintain Regular Follow-ups: Regularly follow up with Acme stakeholders to answer questions, address concerns, and provide updates on progress.
13. Track and Monitor Progress: Utilize CRM tools or other tracking systems to monitor the progress of sales activities, opportunities, and engagement with Acme.
14. Coordinate with Customer Success: Collaborate with the customer success team to ensure a smooth transition for existing engagements and to ensure customer satisfaction.
15. Provide Continuity: Ensure continuity in communication and relationship-building with Acme stakeholders to maintain a positive and productive engagement.
16. Stay Informed about Acme: Stay updated with Acme's news, developments, and industry trends to be well-informed during discussions.
17. Continuously Improve Knowledge and Skills: Encourage the new salesperson to continuously improve their knowledge and skills through training and learning opportunities.
18. Seek Feedback: Actively seek feedback from both internal teams and Acme stakeholders to identify areas of improvement and enhance the sales process.
19. Establish Clear Communication Channels: Set up clear communication channels with Acme stakeholders for ease of interaction and quick responses.
20. Maintain Professionalism and Integrity: Above all, maintain a high level of professionalism and integrity in all interactions with Acme and Globex stakeholders.

By following this account transition plan, the new salesperson can effectively engage with Acme and drive successful outcomes for Globe's solutions with the account.

In another example, a user can provide "Generate an executive summary where we are with Acme for my upcoming forecast call based on the following context" and a textual output for an opportunity involving Globex and Acme as input. The recommendation generator 918 can execute one or more large language models based on the input and generate a recommendation based on the user-provided request. An example of such an output can be as follows:

Executive Summary for Acme Forecast Call:

As of today, day 38, our engagement with Acme is progressing positively, and we have made significant strides in aligning our offerings with their business priorities. Acme is a leading technology company with an annual revenue of 70 billion dollars and a global presence, making it a critical account for Globex.

Key Context: The discussions have primarily focused on business alignment, integration, demo sessions, pilot programs, and AI/ML-based data applications. These topics indicate a growing interest and potential for collaboration.

Stakeholders and Insights: Key stakeholders at Acme include John, (Director), Jack (Strategy Planning Manager), Mike, Rima, (Leader, Product owner, and Briana (Director, Strategy Planning). We have gathered valuable insights from their interactions with Susan (Accounts Director, Strategic at Globex), such as evaluating our product stack for Acme's GTM priorities, aligning on evaluations, and outlining next steps for pilot use cases.

Engagement Highlights: Our team has actively engaged with Acme stakeholders through email exchanges, meetings, and demos to address their specific needs. Alissa (Account Executive at Acme) has been in communication with Aman and Behezad, discussing how our Security solution can fulfill cybersecurity insurance requirements. This indicates a potential opportunity for cross-selling.

Recent Activities: Alissa has been proactive in scheduling meetings to discuss Security with Aman, Behezad, and Greg, highlighting the benefits of MFA, SSO, and unlimited integrations. This shows a strong focus on capitalizing on opportunities.

Next Steps: To advance our engagement with Acme, we should focus on addressing integration requirements, as indicated by Mike's interest in operationalizing Globex dashboards within Lumino. We should continue aligning on the business case and executive sponsors, following Rima alignment checklist. The updated Globex deck sent to Mike confirms our commitment to delivering value and growth for both Acme and Globex.

Overall Assessment: Our relationship with Acme is on a positive trajectory, and we have built essential connections with key decision-makers. There are potential opportunities to explore, particularly in cross-selling Security to address their cybersecurity insurance requirements. We must continue our strategic approach, leveraging insights and engagement activities to further solidify our position with Acme.

As we prepare for the forecast call, let's continue refining our sale strategy, ensuring alignment with Acme's GTM priorities, and establishing clear action plans for successful execution. By staying agile and responsive to Acme's needs, we can maximize our potential for success in this critical account.

The story generator 902 can generate textual outputs and/or recommendations and/or predictions for the record object 904 and/or any other record objects of the system of record 905 or other system of record responsive to an occurrence of an event (e.g., satisfaction of a condition). For example, the story generator 902 can generate a textual output and, in some cases, one or more recommendations or predictions, at predetermined time intervals. In doing so, the story generator 902 can automatically perform the systems and methods described herein to cause the text output generator 916 to generate a textual output and/or one or more recommendations and/or predictions at each time interval responsive to detecting the end of the time interval. The story generator 902 can generate such textual outputs at the set intervals for any number of record objects (e.g., for record objects that have been selected for monitoring, such as at a user interface). In another example, the story generator 902 can automatically generate a textual output and/or one or more recommendations and/or predictions for a record object responsive to detecting an update to a status or stage of the record object (e.g., a change from a first stage to a second stage, or a change in status from a positive outlook to a negative outlook). The story generator 902 can detect such changes by monitoring the record object in the system of record in which the record object is located. In another example, the story generator 902 can generate a textual output and/or one or more recommendations and/or predictions responsive to receiving a request, such as a request through the chat interface at the client device 908. In another example, the story generator 902 can generate a textual output and/or one or more recommendations and/or predictions in response to obtaining an electronic activity that is matched to a record object. The story generator 902 can generate textual outputs responsive to any event occurring.

In some embodiments, inputs to the chat interface can be added to the database 911. For example, over the course of a conversation with a user, the recommendation generator 918 can receive inputs from the user that include different facts regarding an opportunity. The recommendation generator 918 may determine the opportunity that corresponds to the inputs based on the user including an identification of the opportunity at the chat interface with the input fact or in a previous message at the chat interface during the same session. In some cases, the recommendation generator 918 can determine the opportunity based on a selection of an icon corresponding to the opportunity at a user interface that causes the recommendation generator 918 to generate the chat interface.

The user can input a fact at the chat interface and the recommendation generator 918 can receive the input. The recommendation generator 918 may analyze (e.g., using a large language model or other processing techniques) the input to determine the fact is a fact regarding the opportunity or determine the fact is a fact based on the user indicating to store the fact in memory in the input. In one example, a user can discuss an opportunity through the chat interface with the recommendation generator 918 can provide inputs regarding whom the user thinks is a champion or what is missing (e.g., what artificial intelligence is missing) for a deal. Responsive to determining the input is a fact, the recommendation generator 918 can generate a text string asking the user for permission to store the fact or a text string (e.g., an insight) associated with the fact in the database 911. Responsive to receiving an input from the user giving permission to store the fact, the recommendation generator 918 can store the fact in the database and/or the text string generator 910 can generate a text string from the fact and store the text string in the database 911. The recommendation generator 918 and/or the text string generator 910 can store metadata related to the fact as described herein, which the recommendation generator 918 may generate based on the input fact or based on user inputs by the user at the chat interface. In some embodiments, the recommendation generator 918 can request such metadata from the user after receiving the fact and store the requested data in the database 911. In some embodiments, the query manager 919 may request the facts from the user at the chat interface. The query manager 919 can be trained based on data of the database 911.

The large language model of the recommendation generator 918 and any other large language model of the story generator 902, if any, can be trained or fine-tuned based on the text strings and text summaries in the database 911. For example, over time, at set intervals or responsive to any other condition being satisfied, the story generator 902 can retrieve insights and/or text summaries from the database 911. In doing so, the story generator 902 can retrieve text strings and/or text summaries that were generated for specific opportunities and/or record objects. The story generator 902 can generate a textual output from the text strings and/or text summaries as described herein. In some embodiments, the story generator 902 can store previously generated textual outputs in the database 911. The story generator 902 can retrieve such textual outputs from the database 911. The story generator 902 can identify the record objects for which the textual outputs were generated, either from the system of record storing the record objects or from a shadow system of record maintained by the story generator 902. The story generator 902 can identify whether the opportunities associated with the record objects were successful or unsuccessful. The story generator 902 can label the textual outputs generated for the opportunities based on whether the respective opportunities were successful or unsuccessful. The story generator 902 can feed the labeled textual outputs into the large language model (e.g., the large language model of the recommendation generator 918) and use backpropagation techniques with a loss function to update the weights and/or parameters of the large language model. The story generator 902 can do so over time to tune the large language model over time to make more accurate predictions and/or recommendations. In some cases, in doing so, the large language model can predict individuals (e.g., roles of individuals) to contact, messages to generate, and/or timelines of successful opportunities by following steps that were recommended for previously successful textual outputs. The large language model can similarly learn to avoid the same recommendations for previously unsuccessful textual outputs. Thus, the large language model can be fine-tuned to generate predictions and/or recommendations based on textual outputs using data in the database 911.

In some embodiments, the large language model may be trained to generate outputs for a specific company. For example, the large language model may be trained based on opportunities (e.g., based only on opportunities) that a specific company was involved in (e.g., has an account record object linked to a record object for the opportunity). During the training, the textual outputs may include specific individuals and their roles within the company and other data about the company. Because the textual outputs include such data, the large language model may be trained to generate recommendations that specifically name the individuals of the company and/or be fine-tuned to generate recommendations that are more specific to the company.

In some embodiments, the chat interface can be used to provide responses to queries or prompts from users about opportunities. In particular, the chat interface can be configured to leverage a large language model to retrieve data from opportunity record object (e.g., opportunity record objects stored in a system of record or a shadow system of record). The chat interface can be made available to multiple users within an organization, thereby allowing the users with appropriate credentials to submit queries to the system of record (e.g., the CRM) for data regarding different opportunities. For example, a chief operating officer (CEO) of a company can determine the status of an opportunity via the chat interface and request information for specific individuals (e.g., buyer groups) and/or other recommendations relating to the opportunity.

Figure 9D:
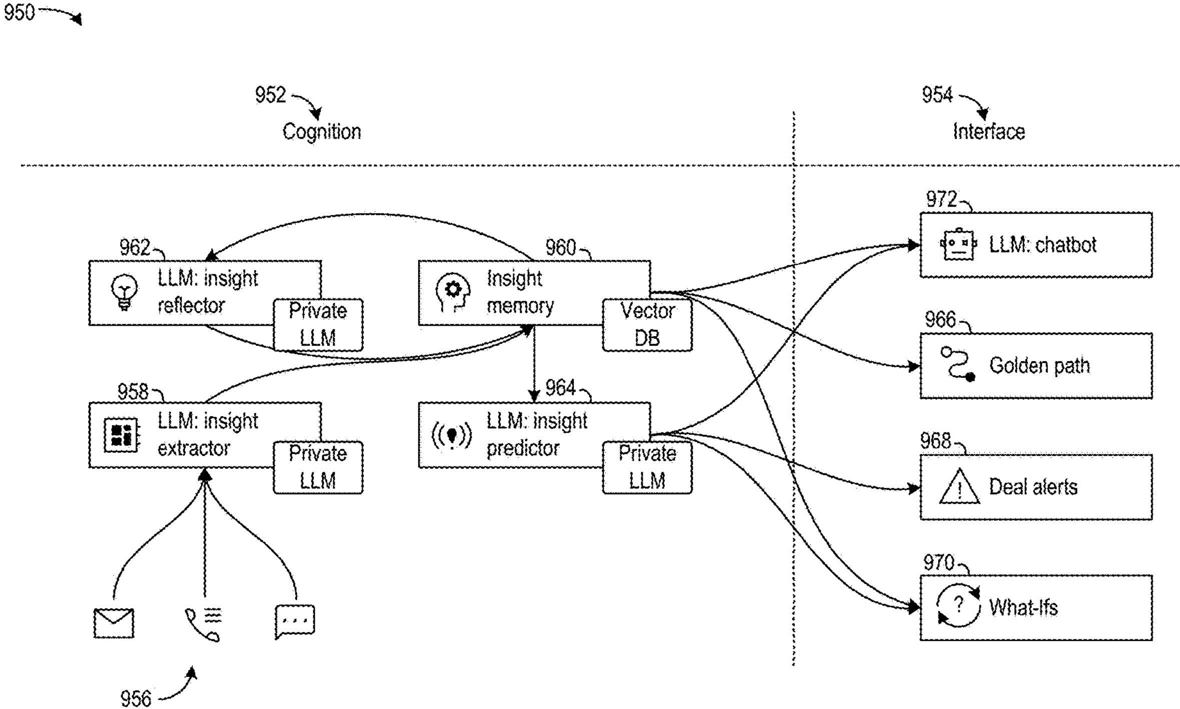
FIG. 9D illustrates a block diagram of an example system for automatically generating a story using one or more large language models according to embodiments of the present disclosure.

Referring now to FIG. 9D, a block diagram of a system 950 for automatically generating stories using one or more large language models, according to embodiments of the present disclosure. Some of the components of the system 950 may correspond to components of the data processing system 100 of FIG. 1. The system 950 can automatically generate textual outputs (e.g., stories) for record objects based on data of electronic activities matched to the record objects and/or data of the record objects themselves. The system 950 can include similar components and/or operate to perform functions to the system 900, shown and described with reference to FIG. 9A.

The system 952 can include cognition operational components 952 and interface components 954. The cognition operational components 952 can operate to generate textual outputs for different opportunities based on electronic activities (e.g., electronic activities that have been matched to record objects associated with the opportunities) and/or user inputs. The interface components 954 can include outputs from the cognition operational components 952 and an interface through which a user may view the outputs and/or provide inputs to hold a conversation with the components of the cognition operational components 952.

The cognition operational components can include electronic activities 956, an insight extractor 958, an insight memory 960, an insight reflector 962, and/or an insight predictor 964. The electronic activities 956 may be electronic activities that have been matched to record objects in a system of record. The electronic activities 956 can include any type of electronic activity. The components 958-962 may be components in memory of a data processing system (e.g., the story generator 902) that are configured to generate textual outputs (e.g., stories) for opportunities based on the electronic activities 956 and/or inputs by users at the interface components 954.

The insight extractor 958 can be any script, file, program, application, set of instructions, or computer-executable code that is configured to identify or extract insights from electronic activities. The insight extractor 958 can be or include a set of large language models (e.g., private large language models) that can produce insights from electronic activities. In some embodiments, the insight extractor 958 can include multiple large language models, a different model for each type of electronic activity. Such can be advantageous because emails may require different reasoning than call transcripts, for example. The electronic activities 956 can be routed to the insight extractor 958 to generate insights and store the insights in the insight memory 960.

The insight reflector 962 can be any script, file, program, application, set of instructions, or computer-executable code that is configured to generate text summaries from insights. The insight reflector 962 can include a large language model (e.g., a private large language model) that periodically pulls fresh insights from the insight memory 960 and generates text summaries from the retrieved insights, thus producing insights at a higher level. The insight reflector 962 can generate reflections for insights along axes relevant for advancing opportunities (e.g., advancing deals), such as: milestones achieved, who a champion is, what a buyer group looks like, what objections customers had and how they were overcome, customer pains, competitor sentiments. The insight reflector 962 can store the generated insights in the insight memory 960.

The insight memory 960 can be or include a database (e.g., a relational database or the database 911). The database can be a fact database. The insight memory 960 can be a database that stores insights (e.g., insights generated by the insight extractor 958) and text summaries (e.g., text summaries generated by the insight reflector 962. The insight memory 960 can include a semantic index (e.g., a vector database). The insight memory 960 can support semantic searches (via embeddings and cosine similarity). The insight memory 960 can also support filters by accounts, opportunities, dates, and/or people.

The insight predictor 964 can be any script, file, program, application, set of instructions, or computer-executable code that is configured to generate recommendations and/or predictions regarding an opportunity. The insight predictor 964 can look into the future for a deal or an account and predict which insights should happen this week, this month, or this quarter for the deal to move forward. The insight predictor

964 can generate a textual output (e.g., a story) from the insights and reflections for today's date. The insight predictor 964 can use a large language model (e.g., a private large language model) trained on customer data to predict future insights. These predictions can be used as guidance for an automated entity, for one-to-one planning, and/or for proactive alerts.

Examples predictions the insight predictor 964 can generate include a golden path 966, deal alerts 968, and what-ifs 970. Golden path 966 predictions can be or include recommendations on next steps to take to bring an opportunity to a successful conclusion and/or a timeline of events that should occur for the opportunity to be successful. In some cases, golden path 966 predictions can include example or draft messages for users to send different individuals to move an opportunity forward and/or indications of individuals (e.g., champions) to contact. Deal alert 968 predictions can be or include indications of characteristics of an opportunity, such as indications that an opportunity is currently in a positive state or a negative state. Deal alert 968 predictions can also include insights into actions that need to happen soon for the opportunity to continue successfully moving forward. What-if 970 predictions can be or include examples of scenarios where a user can provide different assumptions in a user interface that can be fed as input into the insight predictor 964 with a revenue story. The insight predictor 964 can generate different predictions, such as the golden path 966 and/or the deal alerts 968 based on the assumptions and revenue story. The insight predictor 964 can display the predictions through a chatbot 972 of the interface components 954.

The chatbot 972 can be any script, file, program, application, set of instructions, or computer-executable code that is configured to hold a conversation with a user accessing a user interface. The chatbot 972 can be or include a general purpose chat language learning model that can use the insight memory 960 and the insight predictor 964 as tools to generate outputs to the user interface. For example, if a user is working on an opportunity with Acme and wants to know what objections Acme had in the past, the user may type this question into the chatbot 972. In response, the chatbot 972 can send a semantic query to the insight memory 960. Responsive to identifying relevant insights from the insight memory 960, the chatbot 972 can generate an answer to the automated entity. If the user wants advice for the next step in their Acme opportunity, the chatbot 972 can ask for predictions from the insight predictor 964 and provide the predictions to the user. In one example, the insight extractor 958 can identify electronic activities 956 that have been matched to an opportunity record object associated with an opportunity.

The sequence performed by the system 950 can involve using a combination of multiple large language models and an insights database with a semantic index. At least a portion of the large language models may be generic large language models configured to process custom prompts regarding opportunities. Another portion of the large language models may be private large language models fine-tuned on customer data. By using private large language models, the system can effectively use learnings from customer data to operate on insights stored in the insights database.

Insights can be powerful in the sequence. For example, although an insight may aim to capture a single fact, however insignificant, the insight may also be adorned with metainformation. An example of an insight is "Mark sent the signed MSA to Jessica." The insight can correspond with a date, account identification, opportunity identification, and references to Mark and Jessica's identities. Such data of insights can be useful, for example, because the insights can capture useful facts for further processing, and the data can be extracted from any type of electronic activity, such as emails, call transcripts, and social media messages. Insights can further be useful because insights can be reflected upon to capture observations about people (e.g., who is a champion?, what does a buying group look like?), and milestones (e.g., when did we do the first demo?) and can be used to generate a textual output (e.g., a story) and predict what insights need to happen in the next week, month, and quarter for an opportunity to advance.

In performing the systems and methods described herein the story generator 902 may perform a large language model-based solution that would know everything that happened in past deals, would be able to recall details of past deals, compare the current deal with past deals, and would be able to advise for the best course of action for the current deal. The user interface can either be a chatbot or specialized widgets such as alerts, "deal golden path" visualizations, "what if planners," and so on.

Figure 10:
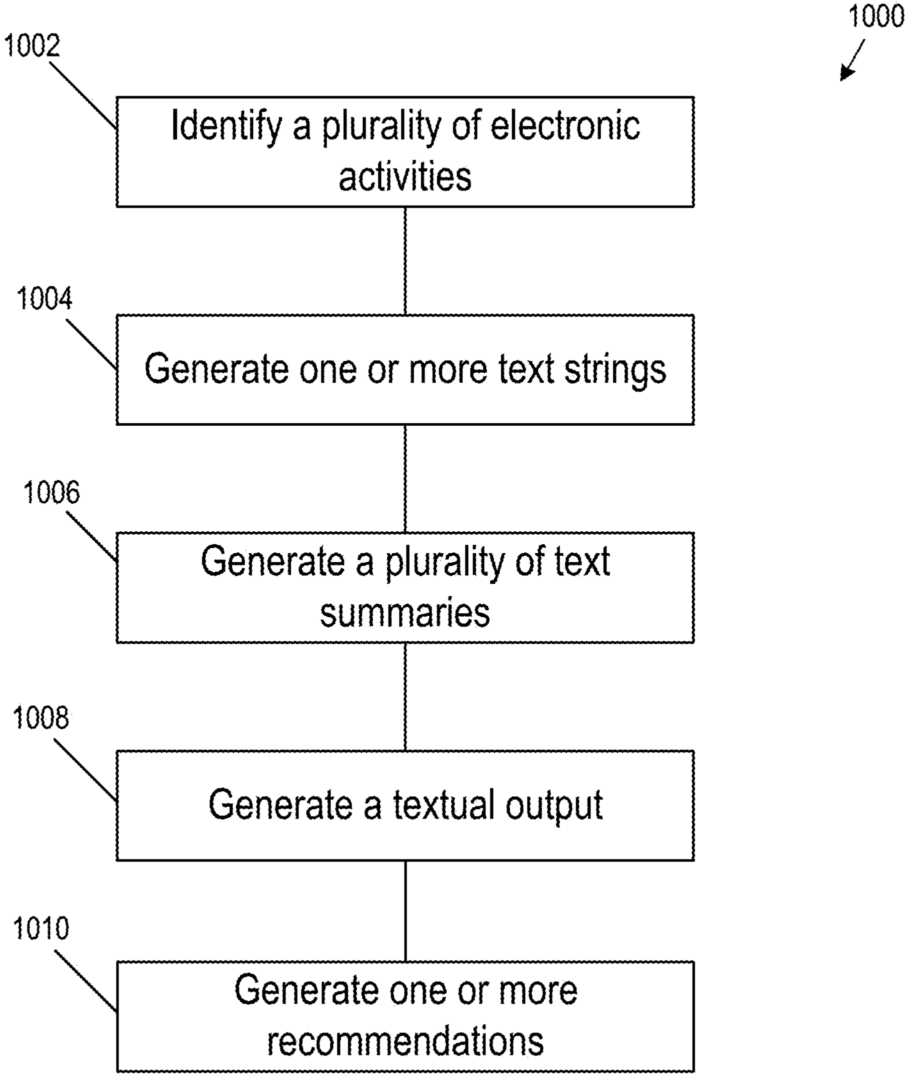
FIG. 10 illustrates a block diagram of an example method for automatically generating a story using one or more large language models according to embodiments of the present disclosure.

Referring now to FIG. 10, a flow diagram of an example method 1000 for automatically generating a story using one or more large language models is shown according to embodiments of the present disclosure. The method 1000 can be implemented or performed using any of the components described above in conjunction with FIGS. 1-9 (e.g., the data processing system 100) or the server system 2400 detailed below in conjunction with FIG. 24. In brief overview, a data processing system can identify a plurality of electronic activities (1002). The data processing system can generate one or more text strings (1004). The data processing system can generate a plurality of text summaries (1006). The data processing system can generate a textual output (1008). The data processing system can generate one or more recommendations (1010).

In further detail, a data processing system (e.g., the data processing system 100) can identify a plurality of electronic activities (1002). The electronic activities can be electronic activities that have been matched to a record object. The record object can be stored in a system of record (e.g., a CRM system) of a data source provider. The record object can correspond to or be associated with an opportunity. The data processing system can identify the electronic activities matched to the record object from the memory of the system of record responsive to determining the electronic activities are matched to (e.g., linked to or otherwise have a stored association with) the record object. For example, the data processing system can determine an event occurred (e.g., a predetermined time interval ended or a request for a recommendation or textual output was received) that corresponds with generating a textual output and/or one or more recommendations for the record object. In response to determining the event occurred, the data processing system can query the system of record or a shadow system of record matching the system of record and stored in memory of the data processing system for electronic activities that are matched to the record object. The data processing system can identify any electronic activities that are matched to the record object.

The data processing system can generate one or more text strings (1004). The data processing system can generate one or more text strings for each of the identified electronic activities that match the record object. To do so, the data processing system can feed the identified one or more electronic activities into one or one or more large language models. The one or more large language models may be generic large language models or large language models that have been trained to generate text strings for individual electronic activities. The text strings may be or include insights into the individual electronic activities or, if the one or more large language models are not able to determine an insight for an electronic activity, an indication that an insight could not be generated for the electronic activity. The data processing system can feed the electronic activities matched to the record object into the one or more large language models either using a few-shot prompt input to guide the output or using a zero-shot prompt input and the one or more large language models can output one or more text strings for each of the electronic activities.

The data processing system can generate a plurality of text summaries (1006). The data processing system can generate the plurality of text summaries based on or otherwise using the text strings generated based on the electronic activities. The data processing system can generate the plurality of text summaries using the same or a different large language model from the large language model the data processing system used to generate the text strings.

The data processing system can generate the text summaries by topic, time period, and/or by participant. For example, the data processing system can retrieve one or more topics from memory. The data processing system can input the one or more topics with the text strings into a large language model. The large language model can sort the text strings by topic and generate a summary for each topic based on the content of the text strings of the respective topics. In another example, the data processing system can input the text strings into a large language model. The large language model can sort the text based on the participants that are identified in the respective text strings. The large language model can generate summaries for each of the participants based on the text strings that identify the individual participants. In another example, the data processing system can generate summaries of text strings based on the time periods (e.g., days, weeks, months, or years) with which the text strings correspond. The data processing system can identify timestamps of the electronic activities based on which the text strings are generated and assign the timestamps to the electronic activities. The data processing system can input the timestamps into the one or more large language models with the text strings, in some cases with instructions for time periods to generate text summaries, and the data processing system can automatically text summaries for the time periods from the text strings that correspond with timestamps within the respective time periods. The data processing system can use separate large language models to generate the summaries for topics, participants, and/or time periods.

The data processing system can generate a textual output (1008). The textual output can be a story or otherwise a description of the opportunity associated with the record object or the status, stage, or state of the opportunity. The data processing system can generate the textual output using the one or more large language models on the text summaries the data processing system generated for the record object. The data processing system can generate the textual output using a different large language model than the large language models used to generate the text summaries and/or the text strings. The large language model can be trained to generate the textual output.

In some embodiments, the data processing system can generate the textual output additionally using data from the record object itself. For example, the data processing system can retrieve data from the record object regarding the current stage or status of the record object and/or regarding different participants (e.g., the buyer and/or seller of the record object). The data processing system can include the text summaries and the retrieved data from the record object as input into the one or more large language models. In some cases, the data processing system can include one or more of the generated text strings in the input into the one or more large language models. The one or more large language models can generate a textual output based on the retrieved data, the textual summaries, and/or the text strings. The data processing system can transmit the textual output to a client device.

The data processing system can generate one or more recommendations (1010). The one or more recommendations can include a status of the opportunity associated with the record object or one or more action steps to take for the opportunity to be successfully completed. The data processing system can generate the one or more recommendations based on the textual output using the one or more large language models. The data processing system can generate the one or more recommendations using a different large language model than the large language models used to generate the text summaries, the text strings, and/or the textual output. The one or more large language models can be trained to generate the one or more recommendations. In some cases, different large language models can be trained to identify different types of recommendations.

For example, the data processing system can input the textual output into the one or more large language models. The one or more large language models can generate a status of the opportunity (e.g., a positive status indicating the opportunity is on a path to succeed or a negative status indicating the opportunity is on a path to fail), one or more timelines of events that need to occur for the opportunity to end successfully, an identification of an individual to contact next to move the opportunity forward towards a successful finish, and/or a message to send such an individual. The data processing system can transmit the one or more recommendations to a client device with instructions to display the one or more recommendations on the user interface. The client device can display the one or more recommendations. A user accessing the client device can view the one or more recommendations and/or the textual output to gain an understanding of the current state of the opportunity associated with the record object and/or any actions to take.

Figure 11:
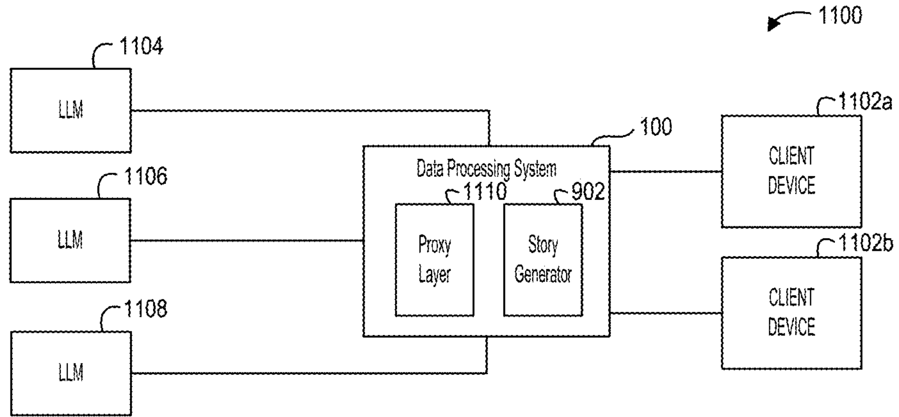
FIG. 11 illustrates a block diagram of an example system for using a proxy layer above large language models according to embodiments of the present disclosure.

FIG. 11 illustrates a block diagram of an example system 1100 for using a proxy layer above large language models, according to embodiments of the present disclosure. Some of the components of the system 1100 may correspond to components of the data processing system 100 of FIG. 1 and/or the system 900 of FIG. 9. The system 1100 can automatically generate textual outputs (e.g., stories) for record objects based on data of electronic activities matched to the record objects and/or data of the record objects themselves. The system 1100 can anonymize the data of the textual output and process the anonymized data to generate one or more predictions and/or recommendations for opportunities associated with the record objects. By anonymizing the data prior to processing, the system 1100 may process the textual outputs without sharing any confidential or proprietary data with public sources, such as public sources.

The system 1100 can include client devices 1102*a* and 1102*b* (together client devices 1102 and individually client device 1102), the data processing system 100, and large language models 1104, 1106, and 1108. The client device 1102 can be similar to or the same as the client device 908 and/or the client device 150. The large language models 1104, 1106, and 1108 can be large language models owned by other companies or corporations. The large language models 1104, 1106, and 1108 may be generic large language models that are not trained to specifically process data generated for opportunities, in some embodiments. The large language models 1104, 1106, and 1108 may be accessible to the public (e.g., via the Internet) such that any users may provide inputs to the large language models 1104, 1106, and 1108 and receive outputs. The data processing system 100 may execute the story generator 902 to generate textual outputs for different opportunities and transmit the textual outputs to one or more of the large language models 1104, 1106, and 1108 (e.g., to the computers respectively storing and executing the large language models 1104, 1106, and 1108), in some cases with further instructions (e.g., individual requests for specific recommendations or predictions for an opportunity) to use as input into the large language models 1104, 1106, and 1108. The data processing system 100 may receive such instructions to include in the input from the client device 1102, for example, or automatically generate such instructions. The large language models 1104, 1106, or 1108 may respectively receive the textual outputs and/or instructions and generate recommendations and/or predictions based on the textual outputs and/or instructions. In doing so, the data processing system 100 may utilize the textual outputs that the story generator 902 can generate predictions and/or recommendations for opportunities without using computer resources to store or train a large language model. The specific techniques used to generate the textual outputs for opportunities may enable "off-the-shelf" large language models to generate desired recommendations and/or predictions regarding opportunities for which the textual outputs are generated.

A technical problem that may occur when using public large language models to analyze textual outputs is that doing so may distribute confidential and/or proprietary data to the hosts of the public large language models. Because confidential and/or proprietary information may be included in the textual outputs generated by the story generator 902, the hosts of the large language models 1104, 1106, and 1108 may store such confidential and/or proprietary information upon receiving the stories. In some cases, the proprietary and/or confidential information may be used as training data for the large language models 1104, 1106, and 1106. Training the large language models 1104, 1106, and 1108 based on the proprietary and/or confidential information of companies may cause the confidential information and/or proprietary information to propagate to further entities that do not otherwise have the authorization to receive the data in outputs by the large language models 1104, 1106, and 1108.

To overcome the aforementioned technical problem, the data processing system 100 can implement a proxy layer 1110. The proxy layer 1110 can be any script, file, program, application, set of instructions, or computer-executable code that is configured to anonymize textual outputs generated by the story generator 902 prior to transmitting the textual outputs to the large language models 1104, 1106, and 1108. The proxy layer 1110 may be configured to receive textual outputs from the story generator 902. The proxy layer 1110 may identify proprietary and/or confidential information from the textual outputs and anonymize the identified proprietary and/or confidential information in the textual outputs. Responsive to the proxy layer 1110 anonymizing the textual outputs, the data processing system 100 can transmit the anonymized textual outputs to one or more of the large language models 1104, 1106, or 1108.

To anonymize the textual outputs, the proxy layer 1110 may identify confidential and/or proprietary information in the textual outputs. The proxy layer 1110 can do so based on a set of rules. For example, the proxy layer 1110 can store a set of rules identifying specific types of information that are confidential. Examples of such types of information may be, for example, company name, buyer name, seller name, company revenue, purchase price, product name, service name, participant name, company address, participant address, pronouns, etc. The proxy layer 1110 can use natural language processing techniques to identify such types of information from the textual outputs. The proxy layer 1110 can identify values (e.g., numbers, symbols, words, phrases, paragraphs, or any other type of text) of types of data from a textual output and anonymize the values, such as by converting the values into another value (e.g., another value of the same type, such as a name to a different name or an address to a different address).

In some embodiments, the proxy layer 1110 can use data in the node graph 110 or systems of record to identify confidential and/or propriety information. For example, the proxy layer 1110 may store in memory of the data processing system 100 specific object field-value pairs (e.g., proprietary and/or confidential information) to be anonymized. The proxy layer 1110 can identify a record object for which the proxy layer 1110 is anonymizing a textual output in memory (e.g., as a shadow record object) or in the system of record in which the record object is stored. The proxy layer 1110 can identify the object field-value pairs of the record object that the proxy layer 1110 had labeled for anonymizing. The proxy layer 1110 can identify the values of the identified object field-value pairs and query the textual output for the values. The proxy layer 1110 can identify any matching values to the identified values from the record object for anonymizing. The proxy layer 1110 can similarly anonymize matching field-value pairs of nodes of the entities (e.g., companies or individuals) associated with the record object.

The proxy layer 1110 may pseudo-randomly generate the values for the conversion or use any set of rules to do so. The proxy layer 1110 can replace the information in the textual output with the converted values to generate an updated textual output. The proxy layer 1110 can generate and/or maintain a mapping (e.g., a table indicating relationships between the initial values and the converted values, such as the initial values and the converted values in the same rows) of the changes in the textual output. In some embodiments, the proxy layer 1110 can generate a hash table with the defined values using a hashing function on the defined values.

The proxy layer 1110 can transmit (e.g., via an API) the updated textual output with any instructions (e.g., stored instructions or instructions received from the client device 1102) to a computer hosting one of the large language models 1104, 1106, or 1108. The large language model 1104, 1106, or 1108 can generate predictions and/or recommendations based on the converted textual output and transmit the converted textual output back to the data processing system 100. The data processing system 100 can similarly generate and transmit any number of updated textual outputs to the large language models 1104, 1106, and/or 1108 and receive predictions and/or recommendations in return in a record.

The proxy layer 1110 may revise or update the predictions and/or recommendations that the data processing system 100 receives from the large language models 1104, 1106, and 1108. For example, the proxy layer 1110 can identify the predictions and/or recommendations in the record. The proxy layer 1110 can compare the different values with the mapping that the data processing system 100 may have generated when initially updating the textual output. The proxy layer 1110 can identify the values that match values in the mapping and replace values from the recommendations and/or predictions with the associated values in the mapping. In doing so, the proxy layer 1110 can generate de-anonymized recommendations and/or predictions. The data processing system 100 may transmit a record of the de-anonymized recommendations and/or predictions to the client device 1102 or any other computing device (e.g., a computing device transmitted a request for such recommendations and/or predictions). In some embodiments, the data processing system 100 may store the de-anonymized recommendations and/or predictions in a database.

In some embodiments, the data processing system 100 can generate content items using the output from the large language models 1104, 1106, and 1108. These content items can be transmitted to the client device 1102 as a recommendation. In some embodiments, the data processing system 100 can select such a content item from a set of pre-generated content items. Each of the pre-generated content items may contain text with openings for different types of data (e.g., names or other data). The data processing system 100 can extract data from a recommendation that corresponds to the same type of data as the openings in the content item and insert the extracted data to into the corresponding openings of the selected content item. In this way, the system addresses the technical challenges resulting from The data processing system 100 itself may provide an additional layer of abstraction. For example, large language models 1104, 1106, and 1108 may be stored and executed by computers that host different websites. When client devices connect with the websites to access the large language models 1104, 1106, and 1108, the computers hosting the websites may be able to collect information about the computers such as the internet protocol (IP) addresses of the computers and/or other information related to the identity of the user accessing we respective websites. By submitting queries for recommendations and/or predictions to the large language models 1104, 1106, and 1108 through the data processing system 100, the client devices 1102 may avoid providing any such personally identifiable information to the hosts of the websites on which the large language models 1104, 1106, and 1108 are respectively accessed. The data processing system 100 may perform the API calls to access the LLMs 1104, 1106, and 1108 instead of the client devices 1102, which means the computers executing the large language models 1104, 1106, and 1108 may not be able to determine which individuals or organizations are transmitting the requests. The data processing system 100 can have a large API call limit to avoid getting disconnected from the websites hosting the large language models 1104, 1106, and 1108 as the data processing system 100 performs API calls and generates request for users over time.

The data processing system 100 can select which of the large language models 1104, 1106, or 1108 to use to generate predictions and/or recommendations. The data processing system 100 may do so based on historical predictions and/or recommendations made by the large language models 1104, 1106, and 1108. For example, over time, the data processing system 100 can transmit textual outputs (e.g., anonymized or updated textual outputs) to the computers hosting the different large language models 1104, 1106, and 1108. The large language models 1104, 1106, and 1108 can generate predictions and/or recommendations based on the textual outputs and the respective computers can transmit the predictions and/or recommendations back to the data processing system 100. The data processing system 100 can transmit the predictions and/or recommendations to different computing devices. Users accessing the computing devices can provide inputs indicating the accuracy (e.g., a binary indicating whether the recommendations and/or predictions are good or bad). The computing devices can transmit the indications to the data processing system. The data processing system 100 can identify the large language models that generated the different recommendations and/or predictions and the indications of whether the recommendations and/or predictions were accurate or not. The data processing system 100 can increment an accurate counter maintained by the data processing system 100 for each correct indication that the data processing system 100 receives for a recommendation and/or prediction by the large language model 1104, 1106, or 1108. The data processing system 100 can increment an inaccurate counter maintained by the data processing system 100 for each incorrect indication that the data processing system 100 receives for a recommendation and/or prediction by the large language model 1104. The data processing system 100 can maintain and increment such counters for each large language model 1104, 1106, and 1108 and any number of large language models.

The data processing system 100 can determine accuracies of the large language models 1104, 1106, and 1108. The data processing system 100 may do so based on the counters for the respective large language models 1104, 1106, and 1108. For example, for each large language model 1104, 1106, and 1108, the data processing system 100 can determine a ratio of the count of the accurate counter for the large language model to the count of the inaccurate counter of the large language model. The data processing system 100 can compare the ratios and determine which of the ratios is the highest based on the comparison. The data processing system 100 can identify the large language model that corresponds to the highest ratio. The data processing system 100 can transmit textual outputs to the identified large language model. Thus, the data processing system 100 can curate the large language models and select which large language models to use to generate the most accurate results.

In some embodiments, the data processing system 100 may select different models for different predictions. For example, the data processing system 100 can perform the above process of maintaining and incrementing counters for each large language model 1104, 1106, and 1108 for different types of outputs (e.g., different recommendations and/or predictions). The data processing system 100 can determine which counters to increment based on instructions the data processing system 100 includes with the textual outputs the data processing system 100 transmits to the different large language models 1104, 1106, and 1108. In one example, the data processing system 100 can include instructions to generate a summary for an opportunity win or loss with a textual output. A large language model 1104, 1106, or 1108 can generate the summary and the user can provide an indication that the summary is correct. The data processing system 100 can identify an accurate counter that corresponds to such a summary and increment the counter. The data processing system 100 can similarly increment inaccurate and/or accurate counters for any number of types of predictions or recommendations. The data processing system 100 can generate ratios for the large language models 1104, 1106, and 1108 based on the respective counters for each type of prediction and/or recommendation. The data processing system 100 can identify the large language model associated with the highest ratio for each type of prediction and/or recommendation.

The data processing system 100 can select which large language model to transmit a textual output with instructions based on the type of recommendation and/or prediction the data processing system 100 is requesting. For example, the data processing system 100 can receive a request for a golden path recommendation for an opportunity. Responsive to receiving the request, the data processing system 100 can generate a textual output for the opportunity. The data processing system 100 can identify the large language model associated with the highest ratio for golden path recommendations and transmit the textual output to the computer hosting (e.g., storing and/or executing) the large language model.

S. Systems and Methods for Automatically Generating Record Object Summaries Using One or More Large Language Models The systems and methods described herein can perform automatic summary generation for record objects (e.g., opportunity record objects) based on data from electronic activities matched to the record objects and/or data from the record objects themselves. The electronic activities can be matched using various systems and methods, with record objects stored in a CRM system. Conventional systems may extract data of record objects and apply rules to analyze and determine the characteristics or statuses of associated accounts or opportunities, such as identifying involved parties or the current state of the opportunity. Some attempts at analyzing and determining characteristics or statuses of accounts or opportunities includes processing electronic activities matched to record objects associated with the accounts or opportunities using one or more large language models. However, systems performing such attempts can face multiple technical difficulties in accurately and efficiently generating summaries of record objects using large language models. For example, large language models can be prone to "hallucinations," or responses that are factually incorrect, nonsensical and/or disconnected from an input prompt. Typical causes of hallucinations can include lack of context, misleading prompts, rare or uncommon inputs, exploiting biases, noise in the input data, and/or attempts at creative writing. Inputting large amounts of electronic activities into a large language model may aggravate these issues due to the variations and unpredictability in both the format and content of the electronic activities. In some cases, large language models can be limited by the amount of text they can ingest. Given the large number of electronic activities that may correspond to an opportunity, a large language model may not be able to ingest each of these activities, thereby limiting the amount of data the model can use to generate summaries. Accordingly, a system that attempts to generate summaries for record objects and actions to perform using large language models may be faced with unpredictable and incomplete outputs.

A computer (or a computer system) implementing the systems and methods described herein may overcome the aforementioned technical deficiencies associated with generating summaries of record objects. For example, the computer may implement (e.g., store and/or use) one or more large language models that have been trained to generate different types of outputs regarding record objects. The computer can identify multiple electronic activities that have been matched to a record object. The record object may be an opportunity record object associated with an opportunity account and may be stored in a system of record (e.g., a CRM system). The computer can reduce the large volume of electronic activities associated with the opportunity record object by individually inputting the electronic activities into the large language models to cause the large language models to generate text strings that summarize or identify the content of the respective electronic activities. The computer can divide the text strings into sets of text strings, or "chunks" of text strings, such as by dividing the text strings into sets of a common size (e.g., number of text strings) and/or based on the order in which the computer received the electronic activities from which the text strings were generated. The chunking process can allow the system to process each portion of data without exceeding the processing limits of the large language models as well as remove ancillary data from the electronic activities when generating topics or other inferences regarding the record object.

The computer can input the electronic activities into a large language model and execute the large language model to generate text strings that indicate or describe the content of the respective electronic activities. The text strings can indicate key points of discussion, entities involved, or actions mentioned in the electronic activities, for example. The computer can assign an identifier (e.g., a numeric, alphabetic, and/or alphanumeric identifier) to each text string and divide the text strings into different sets of text strings. The sets of text strings can be organized in sequential order based on the generation times of the electronic activities from which the text strings were generated or received by the computer, or through any other method. The computer can input a first set of text strings (e.g., the text strings that correspond to the oldest electronic activities) into the large language model and execute the large language model. Based on the execution, the large language model can generate (i) a first set of topics, (ii) a first set of references indicating one or more subsets of the first set of text strings, each subset of text strings corresponding to a different topic of the first set of topics, and (iii) an attribute for each of the first set of topics. For each text string in the subset of text strings corresponding to a topic, the large language model can generate a reference. Each reference can function as a pointer that identifies specific text strings within the first set of strings (e.g., chunk) that contributed to generating the topic. Each attribute for a topic can indicate a level of relevance of the topic to the opportunity record object.

The computer can repeat the chunking process iteratively for each set of text strings. After processing an initial set of text strings, the inferences from the large language model (e.g., topics and their corresponding subsets) can be used to update and/or fine-tune the analysis for subsequent sets of text strings. For instance, the computer can identify one or more subsets of text strings corresponding to highly relevant topics that the large language model identified based on the initial set of text strings. The computer can identify the one or more subsets based on their attributes indicating that the topics have a level of relevancy above a threshold with the record object and/or that the attributes of the topics satisfy some other criteria. The computer can retrieve the identified subsets of text strings via their respective references output by the large language model. The computer can input the retrieved subsets of text strings, along with a second set of text strings (e.g., a second set of text strings generated from electronic activities generated and/or received sequentially after the first set of electronic activities) that correspond to a different set of text strings from the first set of text strings, into the large language model. Based on the input, the large language model can generate a second set of topics, references to text strings from which the second set of topics were generated, and/or attributes for the second set of topics indicating a relevance of the second set of topics to the record object. The computer can iteratively repeat this process any number of times to until processing each set or chunk of text strings for the record object. By iteratively processing each chunk, the computer can improve the accuracy and context of the generated summaries while minimizing the risk of hallucinations. The technical solutions described herein can facilitate a large language model processing of large volumes of data effectively while avoiding hallucinations to generate summaries and recommendations for opportunity record objects.

In some cases, the large language model can process the first set of text strings and generate a first set of inferences, which can include topics, risks, and next steps. For each inference, the large language model can generate a set of references, where each reference can point to a specific text string within the first set of text strings that contributed to generating the inference. The large language model can assign an attribute to the inference, indicating the level of relevance of the inference to the opportunity record object. In response to receiving a selection of one of the inferences from the first set of inferences through a user interaction on a computing device, the computer can retrieve the reference text strings corresponding to the inference. The computer can input the retrieved text strings associated with the selected inference into the large language model. The large language model can process the input and generate a text output. The text output can provide details and insights based on the reference text strings corresponding to the selected inference. The generated text output can be transmitted back to the computing device for presentation to the user, allowing the user to gain an understanding of the selected inference and take actions accordingly.

Figure 12:
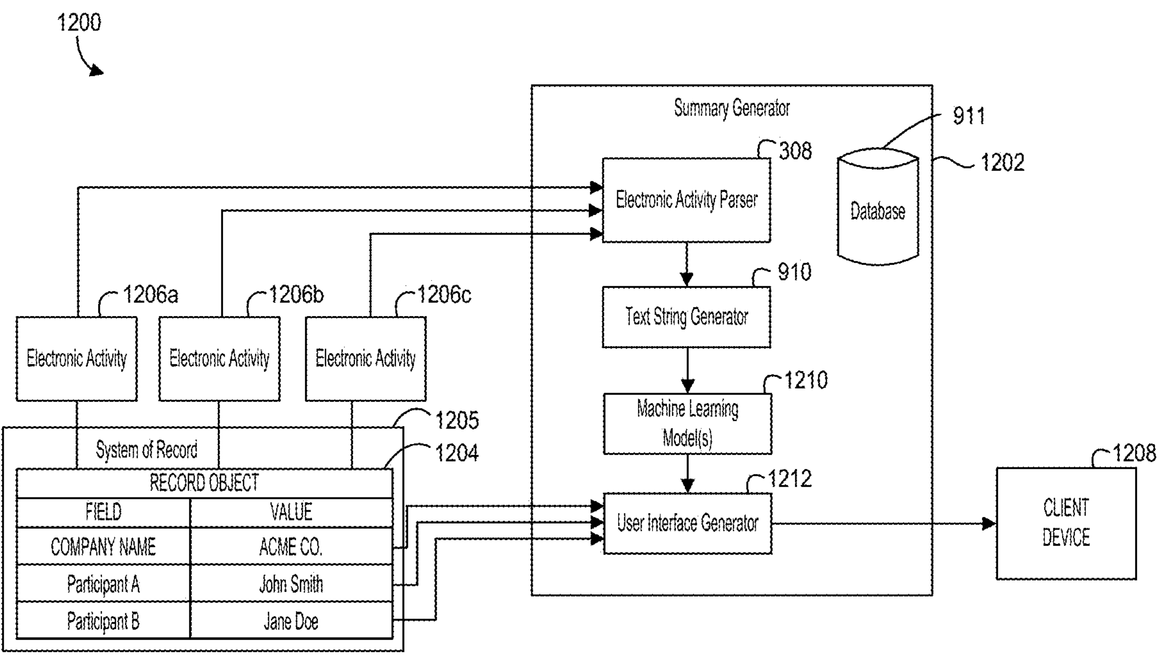
FIG. 12 illustrates a block diagram of an example system for automatically generating summaries for record objects using one or more large language models according to embodiments of the present disclosure.

FIG. 12 illustrates a block diagram of an example system 1200 for automatically generating record object summaries using one or more large language models, according to embodiments of the present disclosure. The system 1200 can summarize the opportunity or other record objects by generating topics, next steps, and risks for record objects based on the data of electronic activities matched to the record objects and/or data of the record objects themselves. Various components of the system 1200 shown in FIG. 12 may be similar to, and include any of the structure and functionality of, the system 900 of FIG. 9A. For example, the components of the summary generator 1202 may include some or all of the structure and functionality of their specific counterparts in FIG. 9A. For example, the summary generator 1202, similar to the story generator 902 shown in FIG. 9A, can include an electronic activity parser 308 and a text string generator 910. The summary generator 1202 can further include machine learning model(s) 1210 and a user interface generator 1212.

As described in further detail below, the summary generator 1202 can be configured to use one or more large language models (e.g., neural networks or transformers) to generate summaries indicating the current status and/or any other information regarding record objects (e.g., opportunity record objects stored in systems of record). The summary generator 1202 can parse electronic activities 1206*a-c* (together, the electronic activities 1206 and, individually, the electronic activity 1206) that have been matched to (e.g., associated with, linked to, or otherwise determined to pertain to) the record object 1204 to extract data from the electronic activities 1206. The summary generator 1202 can use one or more large language models to generate a textual output indicating characteristics of the opportunity associated with the record object 1204 based on the extracted data from the electronic activities 1206. The summary generator 1202 can transmit the textual output to a client device 1208, and the client device 1208 can display the textual output, and/or the summary generator 1202 can further process the textual output to generate recommendations and/or insights regarding the opportunity. The summary generator 1202 can transmit the recommendations to the client device 1208. The client device 1208 can include a processor and memory and can be or include any type and/or number of computing devices.

The record object 1204 can be stored in a system of record 1205. The system of record 1205 can be the same as or similar to the system of record 118, shown and described with reference to FIG. 1. The system of record 1205 can be, include, or be a component of a CRM system. The record object 1204 can be an account record object or an opportunity record object.

In some cases, the record object 1204 can be an opportunity record object. An opportunity record object can be a data structure that includes one or more fields for a given opportunity. An opportunity can indicate a possible or planned deal with a customer for which an account record object is already stored in a system of record. As an opportunity record object, the record object 1204 can include fields such as AccountId, Amount, CampaignId, CloseDate, Description, ExpectedRevenue, Fiscal, HasOpenActivity, IsClosed, IsWon, LastActivityDate, Name, OwnerId, Role, StageName, Territory2Id, and Type.

The electronic activities 1206 can be any type of electronic communication between individuals. The electronic activities 1206 can include, for example, real-time (or near real-time) electronic activities, asynchronous electronic activity (such as emails, text messages, among others) or synchronous electronic activities (such as meetings, phone calls, video calls), or any other electronic communication between two or more parties. The electronic activities 1206 can include text or voice messages between the different parties.

The electronic activity parser 308 can be any script, file, program, application, set of instructions, or computer-executable code that is configured to identify or extract data from electronic activities. The electronic activity parser 308 can be configured to parse data associated with electronic activities, such as emails and/or transcripts (e.g., transcripts of phone calls or video calls or conferences), and convert the extracted data into a format (e.g., a text format) suitable for inputting into one or more large language models. In this regard, the electronic activity parser 308 can parse (e.g., identify or extract) values from the electronic activities 1206. The electronic activity parser 308 can parse values from the electronic activities 1206 responsive to determining the electronic activities 1206 are matched to the record object 904. For example, the electronic activity parser 308 can identify the record object 1204 from a system of record 1205 storing the record object 1204. The electronic activity parser 308 can retrieve or identify electronic activities 1206 matched to the record object 1204 responsive to a condition being satisfied (e.g., responsive to a set time interval ending (e.g., detecting a set time interval ending) from the last time the summary generator 1202 generated a set of inferences for the record object 1204 or responsive to receiving a user input indicating to generate a textual output for the record object 1204). The electronic activity parser 308 can identify the electronic activities 1206 by identifying stored associations (e.g., links or other relationships) between the record object 1204 and the electronic activities 1206. The electronic activity parser 308 can identify any number of electronic activities 1206 matched to the record object 1204. The electronic activity parser 308 can input the identified electronic activities 1206 into the text string generator 910.

The text string generator 910 can be or include one or more large language models. A large language model can be a neural network, a transformer, or any other machine learning model capable of automatically generating text based on an input. A large language model of the text string generator 910 may be trained to generate one or more text strings for individual electronic activities. For example, the summary generator 1202 can feed (e.g., separately feed) the electronic activities 1206 into the text string generator 910. In doing so, the summary generator 1202 can input the body, subject line, and/or any address lines of the electronic activities 1206 into the text string generator 910. The text string generator 910 can generate one or more text strings based on the electronic activities 1206, such as by applying the parameters and/or weights of the text string generator 910 to the electronic activities 1206. In doing so, the text string generator 910 can generate 1 to N text strings for each electronic activity 1206, where N can be any number (e.g., the text string generator 910 can generate any number of text strings based on individual electronic activities 1206).

The text strings generated by the text string generator 910 can be or include insights (e.g., eurekas or summaries) for the electronic activities 1206. The insights can indicate the context or content of the electronic activities 1206. For example, the text string generator 910 can generate insights such as actions that are described in an electronic activity 1206, responsibilities that are established in an electronic activity 1206, the subject of an electronic activity 1206, or a summary of an electronic activity 1206. In some embodiments, in cases in which the text string generator 910 is not able to generate an insight for an electronic activity 1206, the text string generator 910 can generate a text string (e.g., only a single text string) indicating no insights could be determined.

The text string generator 910 can be a one shot or few-shot prompt large language model or a zero-shot prompt large language model. For example, the text string generator 910 can be a generic large language model that has been trained to generate insights based on the electronic activities 1206 using examples of insights from other electronic activities. Both the electronic activities 1206 and the examples can be inserted into the text string generator 910. Based on the input, the text string generator 910 can generate (e.g., automatically generate) one or more text strings based on the electronic activities 1206 and the examples. In doing so, the text string generator 910 can view the examples as guides for the type of output (e.g., guides to generate insights for the electronic activities) to generate based on the electronic activities 1206.

In another example, the text string generator 910 can be or include a large language model that has been specifically trained to generate insights in text strings. The text string generator 910 can be trained to do so by using supervised learning or unsupervised learning training techniques, for example, to adjust any internal weights and/or parameters to specifically generate insights based on input electronic activities. The training can enable the text string generator 910 to automatically generate text string insights for individual electronic activities with or without examples to guide the output (e.g., using a few-shot prompt or a zero-shot prompt). As referenced herein, a few-shot prompt can include a one-shot prompt. The text string generator 910 can generate one or more text strings as output responsive to receiving the electronic activities 1206 as input. The summary generator 1202 can input text strings generated by the text string generator 910 into one or more of the machine learning models 1210.

The text string generator 910 can store text strings (e.g., insights) that the text string generator 910 generates in the database 911. The database 911 can be a database (e.g., a relational database) with a semantic index. In some embodiments, the text string generator 910 can store the text strings themselves in the database 911 with identifiers (e.g., numerical, alphabetical, and/or alphanumerical identifiers) individually identifying each text string. In some embodiments, the semantic index can include word embeddings (e.g., vectors) in which words with similar meanings are represented closer to each other than other words. The text string generator 910 can store the text strings in the database 911 as vectors (e.g., the text string generator 910 can generate the embeddings, such as using machine learning techniques or a defined algorithm). The text string generator 910 can store the vectors in the database 911 with metadata regarding the text strings such as date, account identifications, opportunity identification, and references to any identities in the text strings from which the vectors were generated. In some cases, the text string generator 910 can store the text strings in hive tables or SQL tables that include the text strings themselves and the attributes for the respective text strings. In some embodiments, the text string generator 910 can store the electronic activities from which the text strings were generated and/or the text strings themselves in the database 911. The electronic activities and/or the text strings can be stored as metadata of the vectors, in some embodiments.

The text string generator 910 can be configured to aggregate individual text strings, extracted from the electronic activities, into smaller groups of text strings. These groups of text strings can be referred to as chunks or sets of text strings. The text string generator 910 can group the text strings into chunks of a fixed size and/or such that each chunk includes text strings up to a maximum size (e.g., up to 20 text strings, up to 40 text strings, etc.). The text string generator 910 can group text strings sequentially based on the times of generation or reception of the electronic activities from which the text strings were generated. For example, the text string generator 910 can group the text strings of the earliest received electronic activities into a first chunk, then the text strings of the subsequently received electronic activities into a second chunk, and so forth. The text string generator 910 can store indications or identifiers of the chunks into which the text strings were group with the text strings and/or move the text strings in memory to be stored adjacent to the text strings of the same chunk.

In some implementations, the text string generator 910 can adjust or reconfigure the chunks of text strings. For example, the text string generator 910 may initially generate a chunk of text strings for individual days. Responsive to determining a defined time period (e.g., 30 days or a month) has passed, the text string generator 910 can combine a defined number (e.g., seven) of the chunks (e.g., the defined number of the oldest chunks) to generate a text string or a predetermined number of text strings. The text string generator 910 can aggregate the text strings by inputting the text strings into one or more of the machine learning models 1210, or a large language model of the text string generator 910. The text string generator 910 can include instructions indicating a number of text strings to generate based on the input. Based on the input, the one or more machine leaning models 1210 or the large language model for the text string generator 910 can generate the number of text strings indicated in the instructions that summarize the input text strings. Subsequently, after another defined period of time (e.g., another month or a year), the combined text strings can be similarly condensed into a single text string or a chunk of text strings. In doing so, the text string generator 910 can conserve disk space by reducing the number of text strings that are stored in memory while maintaining a record of text strings that were generated based on earlier electronic activities.

The machine learning model(s) 1210 can include one or more large language models that can be trained on text data. For instance, the large language models can be trained to perform a variety of text processing tasks, including, but not limited to, generating text, comprehending and processing natural language inputs, and responding to queries with contextually relevant information. The machine learning model(s) 1210 can include one or more large language models that can perform some or all of the functionality of their specific counterparts in FIG. 9A. For example, one of the machine learning models 1210 can be similar to the topic generator 912 and can be configured to generate and/or modify a list of topics for a given record object. Another of the machine learning models 1210 can be similar to the recommendation generator 918 and can be configured to predict insights and/or actions to take regarding the opportunity associated with the record object 1204.

The summary generator 1202 can use the machine learning models 1210 to iteratively process chunks of text strings and determine inferences (e.g., topics, risks, or next steps) related to opportunity record objects. For example, for a first chunk (e.g., a first chunk that corresponds to the earliest received and/or generated electronic activities), the large language models 1210 can process the text strings included in the first chunk and generate a set of initial topics. The large language models 1210 can generate a set of references that point to and/or identify subsets of text strings from the first chunk that contributed to generating each topic. The large language models 1210 can generate a relevance score (e.g., an attribute) for each topic based on its level of relevance to the opportunity record object 1204.

The summary generator 1202 can leverage the initial topics to guide further analysis of subsequent chunks. For example, before initiating the processing of a second chunk of text strings (e.g., a chunk of text strings of electronic activities generated and/or received subsequent to the electronic activities of the first chunk of text strings), the summary generator 1202 can identify one or more topics that correspond to a relevance score that exceeds a threshold or satisfies another criterion (e.g., has a highest score of the generated relevance scores for the topics of the first chunk). The summary generator 1202 can identify the references generated from the identified one or more topics and use the references to retrieve the text strings corresponding to the one or more topics. The summary generator 1202 can input the retrieved text strings into the large language models 1210 with the second chunk of text strings. The summary generator 1202 can execute the large language models 1210 based on the input to generate a second set of topics, references to text strings corresponding to the second set of topics, and/or levels of relevance to the record object 1204 for the topics. The summary generator 1202 can then similarly use the references and relevance scores of the topics to identify text strings to include as input with a third chunk of text strings to repeat the process. The summary generator 1202 can store the data (e.g., topics, references, and/or attributes) for each iteration in memory (e.g., in the database 911). Accordingly, the summary generator 1202 can gradually input text strings into the large language models 1210 for different chunks (e.g., chunks of text strings from sequentially generated and/or received electronic activities), causing relevant topics to flow through for each execution. Because the summary generator 1202 can use the chunks in sequential order based on the times in which the electronic activities of the chunks were generated, the final execution will likely cause the topics the generated topics to be timely while still allowing important topics to flow through even when they are from older electronic activities.

The summary generator 1202 can similarly generate other types of inferences for the same chunks of text strings for the record object 1204. For example, in addition or instead of generating topics, the summary generator 1202 can generate sets of risks for the record object 1204. The summary generator 1202 can do so using a chunking technique as described with reference to the topics. For example, the summary generator 1202 can input the text strings of the first chunk of text strings into the machine learning models 1210 to cause the machine learning model 1210 to generate a first set of risks, a first set of attributes (e.g., levels of the risks to the record object 1204) of the risks, and/or references to text strings that correspond to the risks of the first set of risks. The summary generator 1202 can identify the risks that correspond to the highest level of risk, a level of risk that satisfies a threshold, and/or a risk with an attribute that satisfies any other criteria. The summary generator 1202 can use the references to the text strings that correspond to the identified risks to identify and/or retrieve the text strings based on which the summary generator 1202 generated the risks for the record object 1204. The summary generator 1202 can input the identified text strings from the first chunk with the text strings of the second chunk of text strings into the machine learning models 1210 to cause the machine learning models 1210 to generate a second set of risks, references to text strings that correspond to the risks of the second set of risks, and a second set of attributes of the risks of the second set of risks. The summary generator 1202 can then similarly use the references and levels of risk of the risks to identify text strings to include as input with a third chunk of text strings to repeat the process.

In another example, in addition or instead of generating topics and/or risks, the summary generator 1202 can generate sets of next steps for the record object 1204. The summary generator 1202 can do so using a chunking technique as described with reference to the topics and risks. For example, the summary generator 1202 can input the text strings of the first chunk of text strings into the machine learning models 1210 to cause the machine learning model 1210 to generate a first set of next, a first set of attributes (e.g., a relevancy score, such as a level of relevance, or a level of risk) of the next steps, and/or a references to text strings that correspond to the next steps of the first set of next steps. The summary generator 1202 can identify the next steps that correspond to the highest relevancy score, a relevancy score that satisfies a threshold, and/or a next step with an attribute that satisfies any other criteria. The summary generator 1202 can use the references to the text strings that correspond to the identified next steps to identify and/or retrieve the text strings based on which the summary generator 1202 generated the next steps for the record object 1204. The summary generator 1202 can input the identified text strings from the first chunk with the text strings of the second chunk of text strings into the machine learning models 1210 to cause the machine learning models 1210 to generate a second set of next steps, references to text strings that correspond to the next steps of the second set of next steps, and a second set of attributes of the risks of the second set of next steps. The summary generator 1202 can then similarly use the references and relevancy scores of the next steps to identify text strings to include as input with a third chunk of text strings to repeat the process.

The summary generator 1202 can generate topics, risks, and/or next steps (e.g., inferences) based on text strings in one of a few manners. For instance, in some embodiments, the machine learning models 1210 can include separate machine learning models that have each been trained and/or fine-tuned to generate a different one of risks, topics, and/or next steps. The summary generator 1202 can use the text strings with the respective machine learning models 1210 to generate the risks, topics, and/or next steps for the record object. In some embodiments, the summary generator 1202 may use a single machine learning model 1210 to generate the risks, topics, and/or next steps for the record object 1204. In doing so, the summary generator 1202 separately perform the process described herein for each type of inference, but provide instructions (e.g., a string) indicating which type of inference for the machine learning model 1210 to generate for each execution. The summary generator 1202 can generate inferences using the machine learning models 1210 in any manner.

In some implementations, the text string generator 910 and/or the machine learning models 1210 can include multiple different large language models. The summary generator 1202 can include the proxy layer 1110 or proxy engine that determines or selects a model to use to generate text strings and/or inferences based on text strings. For instance, the proxy engine can determine or select a model to use based on a configuration of the summary generator 1202 unless the summary generator 1202 receives an input or user selection indicating to use a different model. The summary generator 1202 can use the configured or selected model to generate the text strings and/or inferences as described herein. In one example, the summary generator 1202 can use a local large language model of the text string generator 910 to generate text strings based on electronic activities matched to a record object.

The summary generator 1202 can generate a prompt with the text strings and send the prompt to a remote computing system. In some cases, the summary generator 1202 can include data stored for the record object (e.g., object field-value pairs) in the prompt. The remote computing system can input the prompt with the text strings into a large language model stored on the remote computing system, in some cases performing the iterative chunking process of the text strings as described herein, to generate one or more inferences for the record object. The remote computing system can transmit the inferences back to the summary generator 1202 for display on a user interface. In some implementations, the summary generator 1202 can receive an API key for the remote computing system that enables the summary generator 1202 to interact with the large language model on the remote computing system and perform the iterative chunking process as described herein to generate inferences.

In some implementations, the machine learning model 1210 or another system component can generate a prompt to generate inferences as well as retrieve data (e.g., object value-pairs) regarding the record object to include in the prompt with text strings generated for the record object. The machine learning model 1210 can generate the inferences based on the prompt (e.g., using the prompt as input).

The user interface generator 1212 can be any script, file, program, application, set of instructions, or computer-executable code, which is configured to facilitate interaction between the summary generator 1202 and the client device 908. In some embodiments, to minimize latency and provide a seamless user experience, the summary generator 1202 can use a pre-emptive topic or other type of inference generation approach. For instance, using the machine learning models 1210 (or the large language models), the summary generator 1202 can iteratively process chunked communication data (emails, transcripts, etc.) and determine relevant topics, risks, and/or next steps related to a specific opportunity record object. This iterative processing can occur independently of user requests, and the summary generator 1202 can be configured to proactively generate insights for each opportunity record object. When a user requests access to a user interface generated by the user interface generator 1212, the user interface generator 1212 can retrieve the pre-generated topics, risks, and/or next steps associated with the specific opportunity record object and update or include the retrieved topics in the user interface, such as by populating the user interface with the retrieved topics according to a defined template.

In some embodiments, the user interface generator 1212 can take the output from the machine learning model 1210 and can translate this output into a format suitable for the client device 1208. For instance, this may include applying styles, fonts, and layouts to make the text visually readable on the client device 1208. In some embodiments, the user interface generator 1212 can receive the output from the machine learning model 1210 in a structured format, such as a table or a list with defined elements. The user interface generator 1212 can convert the data structure into a format that can be displayed on the client device 1208's user interface. In some embodiments, the user interface generator 1212 can configure the output of the machine learning models 1210 for specific devices, such as e-readers, by adjusting the text size and layout for reading or smart displays by presenting the output with visual aids. In some embodiments, the user interface generator 1212 can provide interactive elements for users on the client device 2308, allowing the users to navigate through the output of the machine learning models 1210, interact with characters, or customize their reading experience. In some embodiments, the user interface generator 1212 can facilitate a feedback loop between the summary generator 1202 and the client device 908. For instance, the user interface generator 1212 can receive user inputs, preferences, or selections made within the output generated by the machine learning model 1210 and can send the feedback back to the summary generator 1202. Generating the text strings may incur a large amount of time and/or processing power. Accordingly, the summary generator 1202 may generate the inferences for inclusion on a user interface at set time intervals (e.g., daily) or in response to matched electronic activities to the record object such that the inferences are available for display responsive to a request instead of the request cause the inference generation to begin.

Figure 13A:
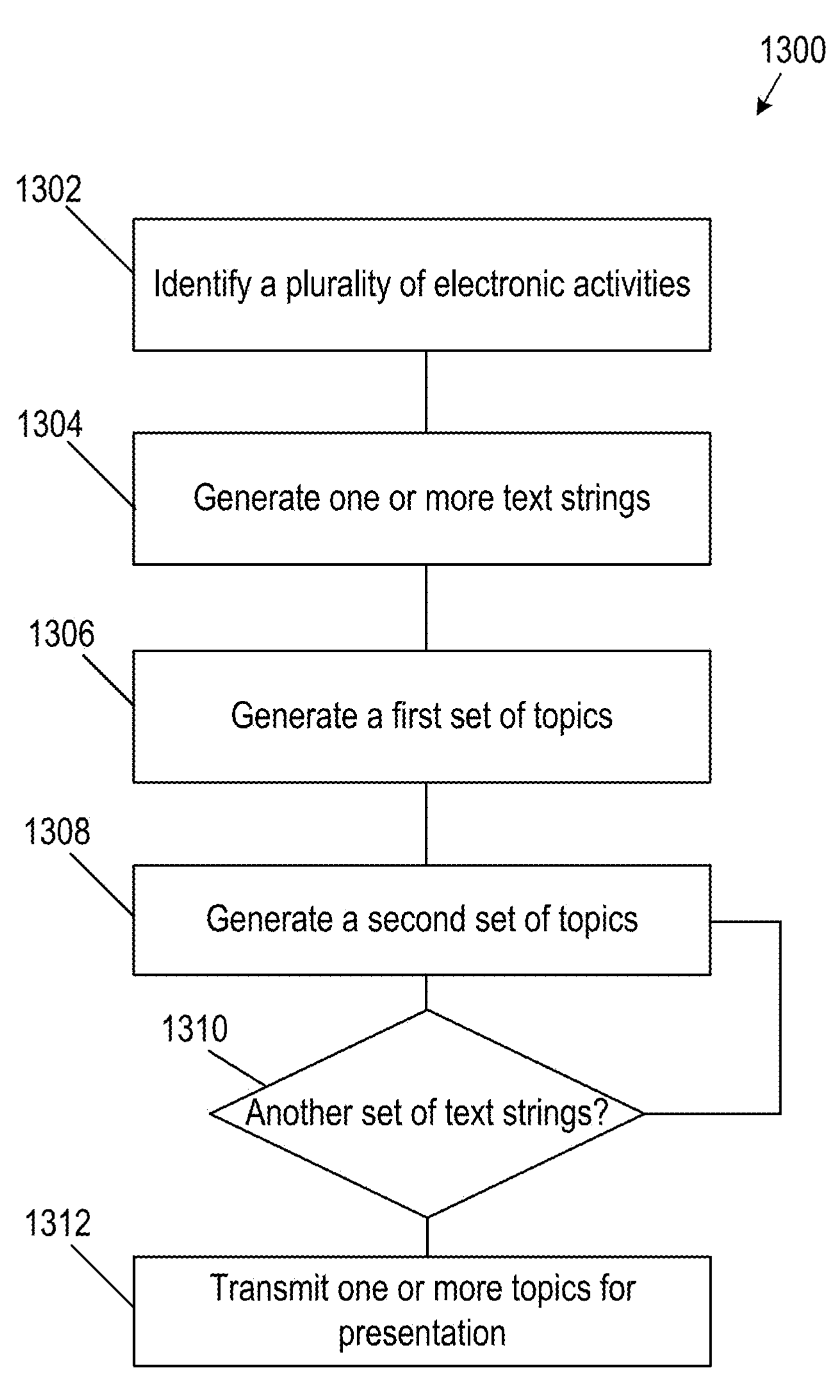
FIG. 13A illustrates a block diagram of an example method for automatically generating summaries for record objects using one or more large language models according to embodiments of the present disclosure.

Referring now to FIG. 13A, a flow diagram of an example method 1300 for automatically generating record object summaries using one or more large language models is shown according to embodiments of the present disclosure. The method 1300 can be implemented or performed using any of the components described above in conjunction with FIGS. 1-12 (e.g., the data processing system 100) or the server system 2400 detailed below in conjunction with FIG. 24. In a brief overview, a data processing system can identify a plurality of electronic activities (1302). The data processing system can generate one or more text strings (1304). The data processing system can generate a first set of topics (1306). The data processing system can generate a second set of topics (1308). The data processing system can determine whether there are any more sets of text strings (1310). The data processing system can transmit one or more topics for presentation (1312).

In further detail, a data processing system (e.g., the data processing system 100) can identify a plurality of electronic activities (1302). The electronic activities can be electronic activities that have been matched to a record object. The data processing system can identify the electronic activities automatically (e.g., at set time intervals) or responsive to receiving a request from a user device containing an identifier of the record object. The record object can be stored in a system of record (e.g., a CRM system) of a data source provider. The record object can correspond to or be associated with an opportunity. In some embodiments, the data processing system can be configured to search for and identify electronic activities such as emails, chats, and documents associated with a specific customer record object in the CRM system. The data processing system can identify the electronic activities matched to the record object from the memory of the system of record or from a shadow system in record matching the system of record stored in memory of the data processing system responsive to determining the electronic activities are matched to (e.g., linked to or otherwise have a stored association with) the record object.

For example, the data processing system can determine an event occurred (e.g., a predetermined time interval ended or a request for a recommendation or textual output was received) that corresponds with generating a textual output and/or one or more recommendations for the record object. In response to determining the event occurred, the data processing system can query the system of record or a shadow system of record matching the system of record and stored in memory of the data processing system for electronic activities that are matched to the record object. The data processing system can identify any electronic activities that are matched to the record object.

The data processing system can generate one or more text strings (1304). The text strings can provide information about electronic activities. The text strings can refer to a collection of text snippets generated based on the content of individual electronic activities. The text strings can summarize the individual electronic activities. The data processing system can generate one or more text strings for each of the identified electronic activities that match the record object. To generate one or more text strings, the data processing system can feed the identified one or more electronic activities matched to the record object into one or more large language models. The one or more large language models may be generic large language models or large language models that have been trained to generate text strings for individual electronic activities. The text strings may be or include insights into the individual electronic activities or, if the one or more large language models are not able to determine an insight for an electronic activity, an indication that an insight could not be generated for the electronic activity. The data processing system can feed the electronic activities matched to the record object into the one or more large language models either using a one-shot or few-shot prompt input to guide the output or using a zero-shot prompt input and the one or more large language models can output one or more text strings for each of the electronic activities.

The data processing system can aggregate generated text strings into sets of text strings, also referred to herein as chunks. The data processing system can be configured to generate chunks based on various factors, depending on the implementation. For instance, in some embodiments, the data processing system can be configured to group text strings chronologically such that the sequence of chunks can provide a narrative flow, especially for activities spanning multiple emails, transcripts, or call logs. In some embodiments, the data processing system can be configured to group text strings based on identified themes (e.g., product feedback, upcoming deadlines, opportunity milestones). In some embodiments, the data processing system can be configured to group text strings based on activity type (emails vs. call transcripts), depending on the desired analysis. The data processing system can select a chunk for initial processing by the large language model based on various factors, depending on the implementation. For instance, the data processing system can be configured to select the chunks or sets of text strings associated with the earliest electronic activities that provide a historical context for subsequent analysis. In some embodiments, the data processing system can be configured to select the chunks based on themes or keywords.

The data processing system can generate a first set of topics (1306). The data processing system can generate the first set of topics by inputting a first set of text strings (e.g., a set of text strings generated from the earliest electronic activities match to the record object) of the plurality of sets of text strings into the large language model. The data processing system can execute the large language model based on the input to cause the large language model to process the first set of text strings and generate a first set of topics. Each topic can be associated with the customer's interests or any other relevant theme identified within the electronic activities or corresponding text strings. In some cases, a topic can be a summary of an individual electronic activity or a group of electronic activities. Each topic can correspond to a subset of text strings from the first set of text strings that contributed to generating the topic. For example, the large language models may generate a topic of "Jack needs to call Amanda" based on three separate text strings indicating a need for Jack to call Amanda for the opportunity.

The large language model can generate a reference for each text string within a subset of text strings corresponding to a topic (e.g., a first topic). In some embodiments, the references can indicate one or more subsets of the set of text strings or point to the locations in memory in which the individual text strings are stored. Each text string can have its own reference, even if one or more text strings originate from the same electronic activity or correspond to the same topic. For example, in some embodiments, the data processing system can assign each text string generated from an electronic activity a numerical, alphabetical, or alphanumerical identifier as a reference. The references that the large language model generates can be or include the identifiers of the individual text strings.

The large language model can additionally or instead generate an attribute for each topic. The attribute for each topic can indicate the level of relevance of that topic to the record object or a relevancy score. The attribute can be a score or a numerical identifier generated based on several factors, including keyword frequency, sentiment analysis, or alignment with customer profiles, among others.

In some cases, the large language model can generate an aggregate attribute from multiple attributes for the individual topics or inferences. For example, the large language model can generate a value for scope, informativeness, and/or impact for each topic the large language model generates for the record object. For example, a risk can be "[Bill Smith, CRO, buyer] (bill@customer.com) has a strong preference for a competing product." The large language model can generate attributes as scope=strategic (or a numeric value), informativeness=medium (or a numeric value), and impact=exceptional (or a numeric value). The large language model can generate a score based on the values of the different attributes to generate an aggregate attribute. In some cases, the dates of the text strings that were used to generate the respective inferences or topics can be taken into account when generating the score, such as a multiplier that is higher the more recent the text strings (e.g., the more recent the average timestamps of the text strings that correspond to the same topic or inference).

In some embodiments, the data processing system can manage the generation and/or processing of text strings based on various factors. For instance, in some embodiments, predefined time intervals (e.g., daily, weekly, or monthly) can initiate the generation of a chunk. In some embodiments, opening an opportunity record or receiving a new email can initiate the generation of a chunk. In some embodiments, exceeding a predefined size threshold for generated text strings can initiate chunking. In some embodiments, the data processing system can use attribute values from the opportunity record object to initiate the generation and/or processing of chunks. In a non-limiting example, these chunks can include text strings associated with attributes that satisfy a predefined threshold or condition (e.g., prioritizing text strings by focusing on emails where the urgency flags are set to high). The data processing system can use the generated chunks for iterative processing using the large language model. For instance, a first chunk, based on chronological order (e.g., earliest activities), can be processed first for initial insights.

In some embodiments, the data processing system can be configured to rank the topics based on their level of relevance or other attribute (e.g., aggregate attribute). The large language model can generate attributes associated with each topic based on relevance factors, such as keyword frequency, sentiment analysis, or topic specificity. The attribute can indicate how closely each topic relates to the opportunity represented by the opportunity record object. The attribute can indicate how valuable each topic is in understanding and addressing customer interests, for example. In some embodiments, following the ranking, the data processing system can select a set of text strings for further analysis. For example, the data processing system can cause the large language model to process the text strings that are linked to (e.g., based on references generated by the large language model) the highest-ranked topics, which can be considered the most relevant to understanding customer sentiment, identifying product issues, or uncovering improvement opportunities. In some embodiments, the data processing system can select text strings for processing based on whether the level of relevance of a topic satisfies a threshold. The threshold can be predefined. For example, the predefined threshold can indicate the minimum level of importance or relevance a topic is to have for its associated text strings to be considered for further analysis.

In some embodiments, the data processing system can use a large language model to generate a first set of risks associated with the record object upon processing the text strings. The data processing system can do so using the same large language model as the large language model used to generate topics, but by using different instructions as an input prompt, or by using a different large language model configured to generate risks. The large language model can assign each generated risk an attribute that indicates its level of risk, or severity level (e.g., high, medium, or low), in relation to the impact the risk may pose to the opportunity record object. The large language model can generate subsets of references for the generated risks. Each reference can link the risk to a corresponding text string within the first set of text strings that contributed to generating the risk.

Figure 13B:
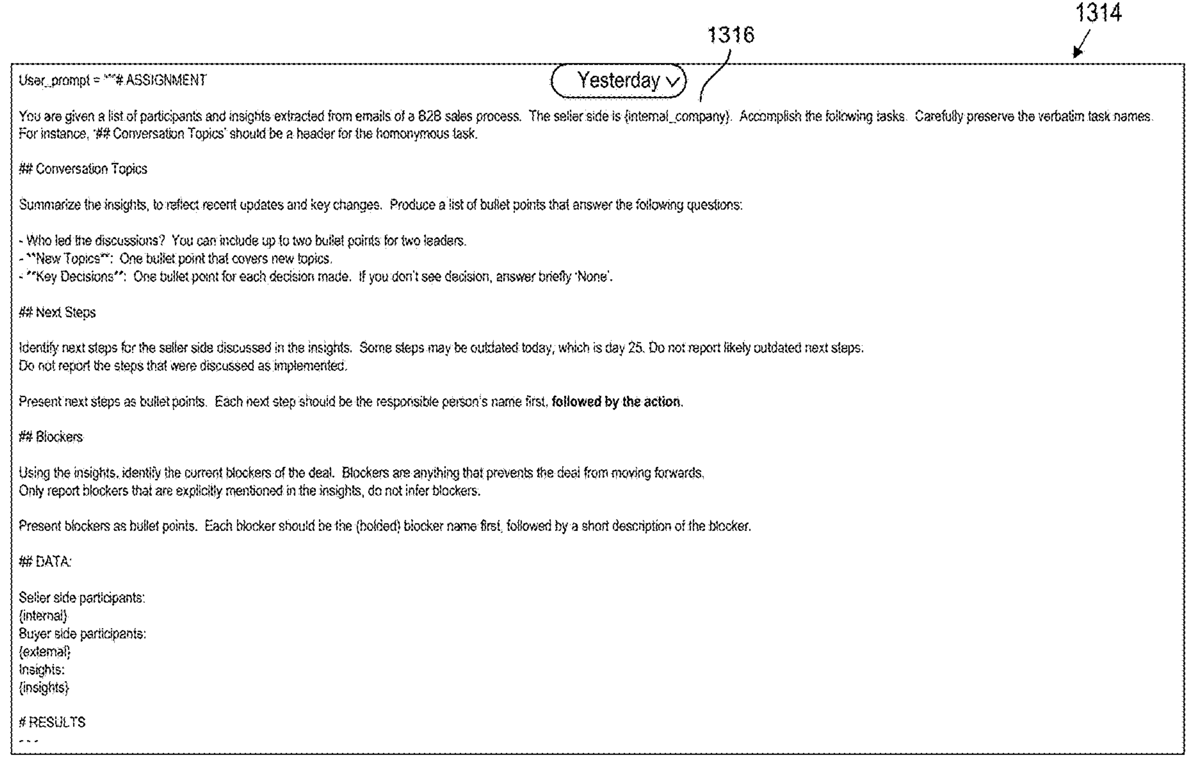
FIG. 13B illustrates an example prompt according to embodiments of the present disclosure.

In some embodiments, risk, next steps, etc., are generated using pre-defined prompts. The pre-defined prompts can include replaceable variables. The replaceable variables can indicate, point to, or otherwise correspond to specific record objects or data of or linked to the record objects. In some cases, the pre-defined prompts can include questions or tasks for the large language model to complete. In some cases, the data processing system can supplement the prompt with questions input by a user (e.g., via a chat interface or an interaction interface). The data processing system can include one or more text strings generated from electronic activities matched to a record object with the prompt. The data processing system can update the variables of the prompt by retrieving data corresponding to the record object from memory. The data processing system can input the supplemented prompt into the large language model. Based on the input, the large language model can generate an output that answers any questions or terms requested in the prompt. An example of such a prompt is illustrated in FIG. 13B, which may be or include a back end prompt 1314 that is used to generate the ultimate responses to the users. The prompt 1314 can include variables or tags, such as a variable 1316 that the data processing system can replace Using such supplemented prompts can be advantageous because the prompt operates as a baseline for asking detailed questions to a generic large language model that has not been trained specifically to respond to requests regarding record objects. Using and supplementing a predefined prompt can avoid data leak through large language model training. Additionally, implementing the prompt with the systems and methods described herein can facilitate condensing down large amounts of data into relevant information that is transmitted to the large language model in a state-specific manner for the large language model to return a response.

In some embodiments, the data processing system can cause a large language model to generate a first set of next steps recommended for advancing the record object, a first set of references for the first set of next steps, and/or a first set of attributes for the first set of next steps. The data processing system can do so using the same large language model as the large language model used to generate topics and/or risks, but by using different instructions as an input prompt, or by using a different large language model configured to generate risks. Similar to topics and risks, each next step can have an assigned attribute indicating its level of importance or relevance to the record object and/or a subset of references. Each reference can link the next step to corresponding text strings within the first set of text strings that contributed to generating the next step. The data processing system can store the generated first set of inferences and/or any data relating to the generated first set of inferences (e.g., the attributes, references and/or text strings corresponding to the inferences) in memory or in a database.

The data processing system can generate a second set of topics (1308). The data processing system can input a first subset of text strings for a first topic and a second set of text strings into the large language model to generate the second set of topics. The second set of strings can originate from additional or different electronic activities associated with the opportunity record object. The data processing system can be configured to generate a new set of text strings from electronic activities that occur after the electronic activities associated with the first set of text strings. The data processing system can select the first subset of text strings for the first topic (e.g., referenced for the first topic) from the first set of text strings based on the attribute of the first topic. For instance, the data processing system can identify the first topic based on the first topic corresponding to a level of relevance satisfying a threshold and/or some other criteria and identify the references of a first subset of text strings corresponding to the first topic. The data processing system can use the references to identify the first subset of text strings from memory, such as by using the references as a key in a look-up technique. The data processing system can input the identified first subset of text strings with any other subset of text strings corresponding to topics with an attribute that satisfies the threshold or other criteria into the large language model with the second set of text strings. Based on the input, the large language model can generate the second set of topics for the record object.

The data processing system can include the subsets of text strings of the most relevant topics from the first set of topics to increase the likelihood that highly relevant topics from the first set of topics may included in the second set of topics generated by the large language model. For example, the first set of topics may include an important topic, such as a deadline for a deal to close, that may not be mentioned in any of the second set of text strings. By including text strings from such important topics of the first set of topics with the second set of strings as input into the large language model, the data processing system can increase the likelihood that the important topics from the first set of topics are included in the second set of topics. That being said, to avoid overloading the number of topics and/or number of text strings to use as input in a future iteration of processing for another set of text strings, the data processing system may generate differing attributes (e.g., differing levels of relevance) for the topics included in both the first set of topics and the second set of topics but may differ between the two sets. The data processing system can filter out or remove text strings of topics that may lose importance (e.g., relative importance compared with other topics of the same set of topics) or relevance to the record object such that the final set of topics generated by the large language model can be the most important or relevant to the record object or the current state of the record object.

In addition to or instead of the second set of topics, the large language model can generate a set of references (e.g., a second set of references) for the second set of topics. The second set of references can correspond to subsets of text strings within the second set of text strings and/or any subsets of the first set of text strings that were included in the input to the large language model that contributed to generating the second set of topics. The large language model can assign an attribute (e.g., a second attribute) to each topic in the newly generated second set of topics. The attribute can be an aggregate attribute or otherwise indicate the level of relevance of the second topic to the opportunity record object. The data processing system can similarly generate a second set of risk and/or next steps based on the second set of text strings. The data processing system can store the second set of inferences and/or any data relating to the second set of inferences (e.g., the attributes, references and/or text strings corresponding to the second set of inferences) in memory or in a database.

The data processing system can determine whether there are any more sets of text strings (1310). For example, after generating the second set of topics based on the second set of text strings, the data processing system can determine whether there is another set of text strings (e.g., a set of text strings of electronic activities generated subsequent to the electronic activities of the second set of electronic activities) for record object. Responsive to determining there is another set of text strings (e.g., a third set of text strings), the data processing system can repeat operation 1310 using one or more subsets of text strings of the second set of text strings that the data processing system selects based on attributes of the topics of the second set of text strings satisfying a criterion (e.g., having a level of relevance exceeding a threshold). The data processing system can repeat operations 1310 and 1312 until determining there are not any further sets of text strings for the record object to use to generate a set of topics.

Responsive to determining there are no more sets of text strings to process, the data processing system can transmit one or more topics topics for presentation (1312). In some embodiments, the data processing system can be configured to select one or more topics from the second set of topics generated by the large language model to transmit. For instance, the data processing system can select a topic based on the topics being included in the second set of topics and not the first set of topics. The data processing system can be configured to identify new topics or sub-topics not captured in the first set of topics. In some embodiments, the data processing system can select a specific second topic from the second set of topics based on the relevance to the record object attributed to each topic (e.g., a defined number of topics having the highest level of relevance or topics with a relevance exceeding a threshold). In some embodiments, the data processing system can select the topics generated for the first set of topics, the topics generated for the second set of topics, and/or the topics generated for a third set of topics generated based on a third set of text strings, depending on the implementation. In some embodiments, the data processing system can similarly select and/or transmit sets of other types of references (e.g., next steps and/or risks). A user, via the client device, can send a request (e.g., a request containing a natural language query) to the data processing system that identifies a specific opportunity record object, which tracks details associated with a sales opportunity. Based on the received request identifying the record object, the data processing system can retrieve the most recently generated set of topics and/or other types of inferences, updating a user interface to include the sets of inferences, and transmit the user interface to the client device for display.

The data processing system can generate a text response by inputting the retrieved topics (e.g., including a range of themes related to the set of topics) with the specific query details into the large language model. The large language model can apply internal weights and/or parameters to the input topics to determine the broader context (topics) and the specific focus (record object). Based on this combined understanding, the large language model can generate a text response that highlights a relevant topic or explains the connection between the retrieved topics and the queried record object. The large language model can identify a single most relevant topic from the retrieved set in the context of the record object (e.g., based on the customer's purchase history in the record object, the most relevant topic from the retrieved set may be product recommendations for similar users.). In some embodiments, the large language model can retrieve data (e.g., object field-value pairs) from the record object, such as requested data that may not be included in the set of text strings generated for the record object. Examples of such data may be opportunity size, status, involved parties, or any other object field-value pairs in the record object. The large language model can process the retrieved data with the input query and/or topics or inferences to generate a response. In some embodiments, the large language model can provide a brief explanation of the relationship between the retrieved topics and the record object (e.g., the retrieved topics on shipping delays and customer support options may be relevant to the record object considering the recent order placed by the customer).

In some embodiments, the client device can send a request for one or more topics triggered by a user action within an application or program that interacts with the data processing system. In response to receiving the request, the data processing system can retrieve the relevant topics from the database based on the presence of specific keywords, for example. In some embodiments, the data processing system can store additional metadata for the topics in the database (e.g., timestamps, associated record IDs, etc.). The data processing system can use the metadata to retrieve the stored topics based on the client's request criteria. The data processing system can transmit the requested topic from the database to the client device via the generated text response. The format of the transferred data can depend on the communication protocol used between the data processing system and the client device. For instance, the data processing system can transmit the topic in a structured format or a simpler text-based format.

In some embodiments, the data processing system can process one or more text strings to identify a variety of entities, which can include people, organizations, or products, among others. For each identified entity, the data processing system can instantiate a separate counter to track how often that entity is mentioned across all text strings. As the data processing system processes each text string, the system can determine if any identified entities are mentioned. If an entity is found, the corresponding counter for that entity can be incremented by one, maintaining a tally of how frequently each entity appears. In some embodiments, the data processing system can be configured to implement predefined selection criteria, such as a specific number (e.g., identify entities mentioned more than three times) or a threshold percentage (e.g., identify entities that represent more than 3% of all mentions). The data processing system can identify a set of entities whose counter values satisfy the predefined criteria. The data processing system can transmit the identifications of the entities or frequent entities to the client device for presentation. In some embodiments, the data processing system can do so by including the identifications on the user interface that includes one or more of the inferences for the record object.

In some embodiments, the data processing system can use the generated inferences to generate responses to requests (e.g., natural language query) regarding the record object. For example, the data processing system can receive, via a chat interface presented on a client device, a request including a natural language query (e.g., a question in text) for information regarding a record object. Responsive to receiving the request and based on the identification of the record object, the data processing system can input a text string dataset for the record object, an opportunity summary including one or more inferences and/or object field-value pairs of the record object, and/or object field-value pairs from the record object itself into a prompt including the natural language query. In some cases, the data processing system can input the data into the prompt according to a defined template (e.g., by updating variables or tags based on various collected data regarding the record object). The data processing system can input the prompt into a large language model. Based on the input, the large language model can generate a response with the requested information regarding the record object. The data processing system can present the response on the chat interface presented on the client device.

In some embodiments, the data processing system can use data regarding different opportunities or record objects to generate a response to a request. For example, the data processing system can receive a request for a potential blocker from a security reviewer. In response to the request, the data processing system can identify record objects for opportunities that were closed or won, retrieve data (e.g., object field-value pairs, text string datasets, deal summaries, etc.) regarding the record objects, and generate suggestions or recommendations based on what was performed to close or win those opportunities.

Figure 14:
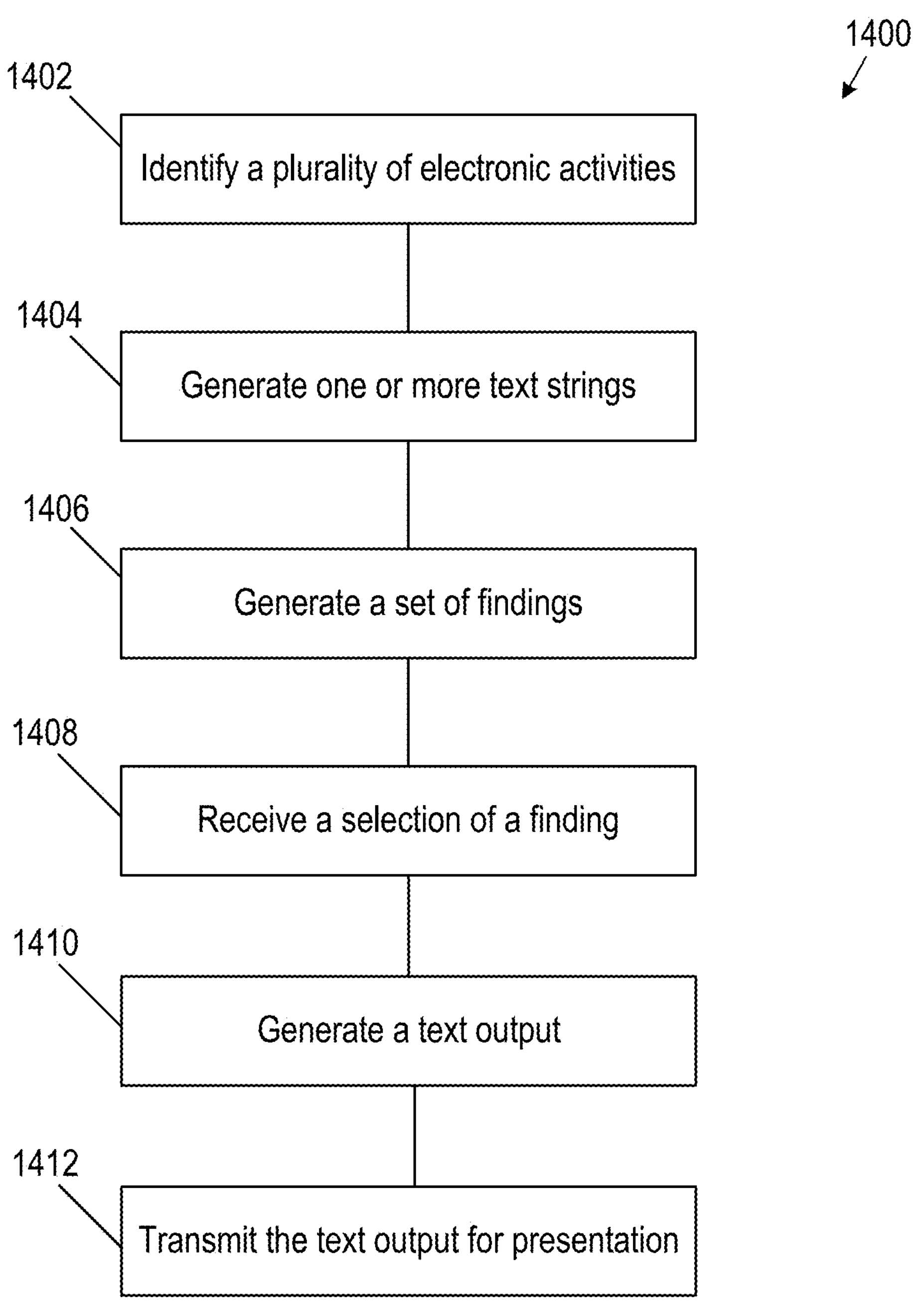
FIG. 14 illustrates a block diagram of another example method for automatically generating summaries for record objects using one or more large language models according to embodiments of the present disclosure.

Referring now to FIG. 14, a flow diagram of another example method 1400 for automatically generating record object summaries using one or more large language models is shown according to embodiments of the present disclosure. The method 1400 can be implemented or performed using any of the components described above in conjunction with FIGS. 1-12 (e.g., the data processing system 100) or the server system 2400 detailed below in conjunction with FIG. 24. In a brief overview, a data processing system can identify a plurality of electronic activities (1402). The data processing system can generate one or more text strings (1404). The data processing system can generate a set of inferences (1406). The data processing system can receive a selection of an inference (1408). The data processing system can generate a text output (1410). The data processing system can transmit the text output for presentation (1412).

In further detail, a data processing system (e.g., the data processing system 100) can identify a plurality of electronic activities (1402). The electronic activities can be electronic activities that have been matched to a record object. The data processing system can identify the electronic activities responsive to receiving a request from a user device containing an identifier of the record object and/or at set time intervals. The record object can be stored in a system of record (e.g., a CRM system) of a data source provider. The record object can correspond to or be associated with an opportunity. In some embodiments, the data processing system can be configured to search for and identify electronic activities such as emails, chats, and documents associated with a specific customer record object in the CRM system. The data processing system can identify the electronic activities matched to the record object from the memory of the system of record or from a shadow system of record matching the system of record stored in memory of the data processing system responsive to determining the electronic activities are matched to (e.g., linked to or otherwise have a stored association with) the record object. For example, the data processing system can determine an event occurred (e.g., a predetermined time interval ended or a request for a recommendation or textual output was received) that corresponds with generating a textual output and/or one or more recommendations for the record object. In response to determining the event occurred, the data processing system can query the system of record or a shadow system of record matching the system of record and stored in memory of the data processing system for electronic activities that are matched to the record object. The data processing system can identify any electronic activities that are matched to the record object.

The data processing system can generate one or more text strings (1404). The text strings can provide information about electronic activities. The text strings can refer to a collection of text snippets generated based on the content of individual electronic activities. The text strings can summarize the individual electronic activities. The data processing system can generate one or more text strings for each of the identified electronic activities that match the record object. To generate one or more text strings, the data processing system can feed the identified one or more electronic activities matched to the record object into one or more large language models. The one or more large language models may be generic large language models or large language models that have been trained to generate text strings for individual electronic activities. The text strings may be or include insights into the individual electronic activities or, if the one or more large language models are not able to determine an insight for an electronic activity, an indication that an insight could not be generated for the electronic activity. The data processing system can feed the electronic activities matched to the record object into the one or more large language models either using a one-shot or few-shot prompt input to guide the output or using a zero-shot prompt input and the one or more large language models can output one or more text strings for each of the electronic activities.

The data processing system can generate a set of inferences (1406). The data processing system can input a first set of text strings into the large language model. The large language model can process the text strings and generate a first set of inferences. The first set of inferences can include topics, risks, and next steps, among others. For each inference, the large language model can generate a set of references. Each reference can correspond to a specific text string within the first set of text strings that contributed to generating the inference. The large language model can generate an attribute for each inference. The attribute can indicate the level of relevance of the inference to the opportunity record object. In some embodiments, the data processing system can be configured to rank all the inferences based on their level of relevance. Based on the ranking, the data processing system can select the most relevant inference from the set for the user. In some embodiments, the data processing system can select the inferences that satisfy a minimum relevance threshold. For instance, the data processing system can be configured to select a highly relevant inference with respect to the opportunity record object.

The data processing system can receive a selection of an inference (1408). The data processing system can receive a selection of inferences from a computing device. For instance, a user can select a specific inference (e.g., a topic, risk, or next step) via the client device. In response to receiving the user selection, the data processing system can select a subset of the text strings that correspond to the selected inference. For instance, a subset of text strings can include text data points that contributed to generating the selected inference. The data processing system can be configured to retrieve the subset of text strings via the set of references corresponding to the subset of text strings. The data processing system can input the retrieved subset of text strings into the large language model. In some cases, the data processing system can receive questions (e.g., user input questions, such as in a text format in a natural language query via a chat or interaction interface) regarding or identifying the record object.

In some embodiments, the data processing system can input the retrieved subset of text strings into the large language model in response to determining whether a time interval is satisfied. The data processing system can be configured to wait for a specific time period to elapse before processing the retrieved text strings with the large language model. In some embodiments, the data processing system can input the retrieved subset of text strings into the large language model in response to determining whether the size of one or more text strings satisfies a threshold. For instance, the data processing system can be configured to initiate processing if the set of text strings reaches a certain size threshold to avoid overloading the large language model with small amounts of data for frequent updates.

In some embodiments, the data processing system can be configured to store the generated inferences (topics, risks, next steps) in a database for later reference. If a user searches for a specific customer record object (e.g., sales opportunity), the data processing system can retrieve relevant inferences from the database relating to that customer record object.

The data processing system can generate a text output (1410). The data processing system can cause the large language model to generate text output related to the selected inference. In this regard, the data processing system can input the retrieved subset of text strings corresponding to the selected inference into the large language model. The data processing system can generate a second attribute for the text output. The attribute can indicate how relevant the generated text output is to the specific customer record object (sales opportunity) the user is currently focused on.

In some embodiments, the data processing system can input two sets of text strings as input for the large language model. For instance, the data processing system can input a set of references identifying the subset of text strings that contributed to the selected inference and a second set of text strings corresponding to an additional set of text strings selected from the overall set of electronic activities. In some embodiments, the second set of text strings can be selected based on ranks or user-defined criteria. In some embodiments, the initial inference can influence which additional text strings can be used. For instance, if the inference is about risks, the data processing system can select additional text strings related to risks. Based on the input, the large language model can generate a second text output to provide a broader view compared to the text output generated from the retrieved subset alone.

The data processing system can transmit the text output for presentation (1412). The data processing system can transmit the generated text output to a computing device for presentation. The text output can be presented as a summary or detailed explanation of the selected inference. In some embodiments, the data processing system can transmit the retrieved inferences (topics, risks, next steps) to the client device. In some embodiments, the data processing system can be configured to identify various entities within the text strings, such as people, organizations, products or services mentioned, or locations, among others. For each entity identified, the data processing system can generate a counter to keep track of how many times that entity appears in the text data. Whenever the data processing system identifies the same entity again in the text data, the system can increment (increase) the corresponding counter. For example, the data processing system can transmit the identified set of entities to the computing device upon satisfying a minimum count threshold.

In some implementations, the data processing system can generate or output (e.g., via the large language model) drafts of emails, slide deck presentations, documents, or other formats requested by a user. The data processing system can include inferences (e.g., requested inferences, such as requested types of inferences) for the record object in the output.

In some embodiments, the data processing system can use previously generated answers to the concept of finding similar problems that were previously figured out to generate answers. For example, responsive to receiving a request regarding a record object, the data processing system can execute a large language model with the request as input. The large language model can determine a context or content of the request and query memory for similar context or content associated with other record objects. The large language model can identify a solution that was used regarding a record object corresponding to a similar or the same context or content. The large language model can generate a response based on the identified solution (e.g., to indicate the identified solution). The data processing system can transmit the response to the computing device that transmitted the original request.

Figure 15:
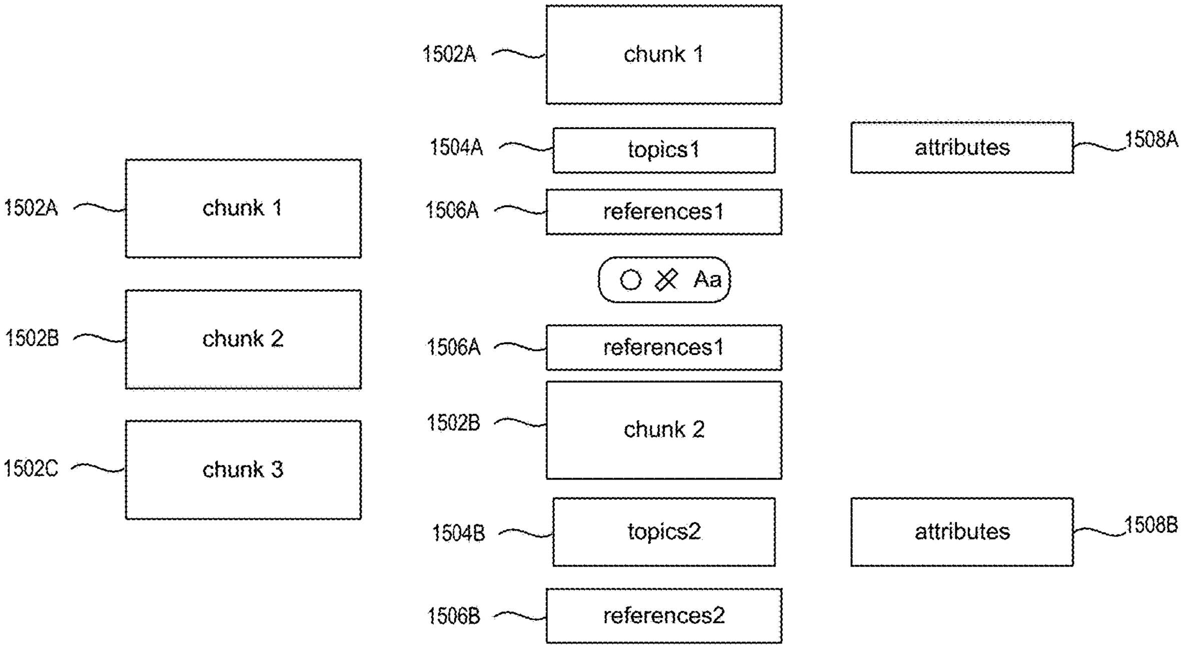
FIG. 15 illustrates an example implementation of processing text strings using one or more large language models according to embodiments of the present disclosure.

Referring now to FIG. 15, depicted is an example configuration of a data processing system using a large language model to process text strings. The machine learning models 1210 (e.g., the large language models 1210 in this example) can receive sequential chunks of text data (e.g., 1502A, 1502B, and 1502C) from the data processing system. Each chunk can include a discrete set of text strings. For instance, chunk 1502A can include a collection of text strings related to a sales opportunity (e.g., customer emails, product reviews, etc.). The large language model 1210 can process the text data in chunk 1502A and generate a set of relevant topics 1504A. The topics 1504A can represent the themes or subjects discussed within the text data. For each identified topic (e.g., topic 1504A), the large language model 1210 can generate a set of references 1506A. The set of references 1506A can include specific text strings from chunk 1502A that contributed to generating the corresponding topic 1504A. For instance, the large language model 1210 can extract or summarize key passages that exemplify each topic. The large language model 1210 can generate an attribute 1508A associated with each topic 1504A. The attribute 1508A can indicate the level of relevance of the corresponding topic 1504A to the opportunity record object. The attribute 1508A can be a score or a classification (e.g., highly relevant, somewhat relevant, not relevant, etc.) with respect to the opportunity record object.

The set of references 1504A can be used to retrieve text strings to input into the large language model with the chunk 1502B. For instance, the data processing system 100 can use the set of references 1504A to retrieve the relevant subset of text strings (e.g., the one corresponding to topic 1504A) based on the topic identified in the chunk 1502A. The data processing system 100 can input the retrieved subset of text strings via the set of references 1506A into the large language model 1210 with the text strings of the chunk 1502B and cause the large language model 1210 to process the chunk 1502B with the subset of text strings.

In response to processing the text data in chunk 1502B and the retrieved subset of text strings corresponding to topic 1054A, the large language model 1210 can generate a set of relevant topics 1504B. The topics 1504B can provide additional topics to the topics 1504A and/or one or more of the same topics as the topics 1504. In some cases, the large language model 1210 can generate the same topics as the topics that correspond to the referenced text strings 1506A based on the same text strings being included in the input to the large language model 1210. Accordingly, topics can flow through the different iterative executions of the large language model 1210 as the large language model 1210 processes different chunks of text strings. This flow through can lead to a larger set of related topics 1504B compared to the set of topics 1504A.

The large language model 1210 can generate references 1506B that include a subset of text strings from the chunk 1502B. The set of references 1506B can correspond to the subset of text strings that contributed to generating the topics 1504B. The large language model 1210 can generate an attribute 1508B indicating the relevance of each topic 1504B to the opportunity record object. The large language model can similarly process the chunk 1502C and/or perform the process any number of times to continue to add and/or remove topics for the record object.

Figure 16:
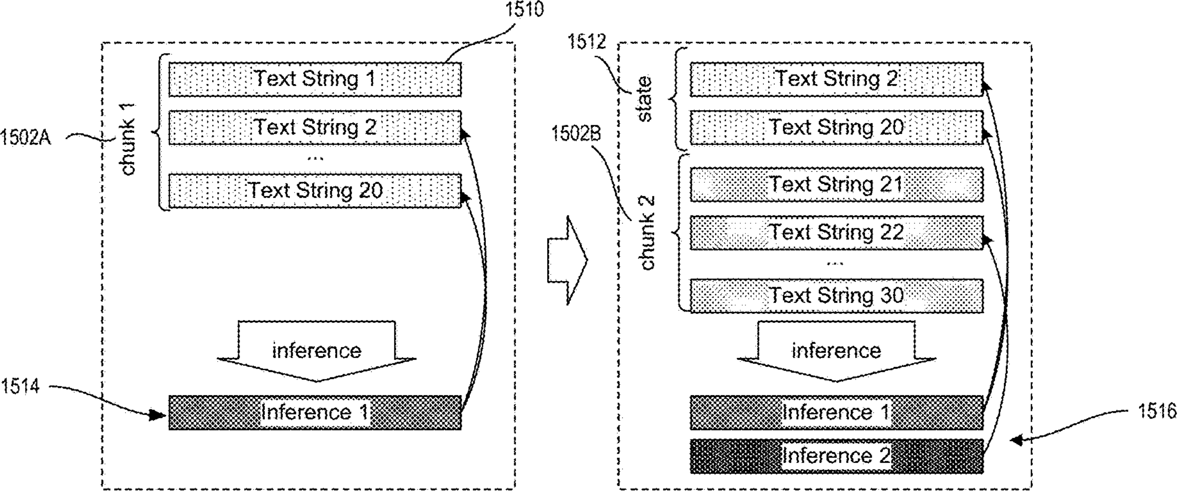
FIG. 16 illustrates an example implementation of determining inferences using one or more large language models according to embodiments of the present disclosure.

Referring now to FIG. 16, depicted is an example implementation of a large language model using state information to determine inferences across sets of text strings of data. As explained in connection with FIG. 15, the large language model 1210 can facilitate the processing of text data divided into chunks (e.g., 1502A, 1502B, 1502C, etc.). Each chunk can include a collection of text strings related to a specific context, such as a sales opportunity (e.g., emails, call transcripts, etc.). Within each chunk, there can be predefined numerical identifiers assigned to each text string 1510. Text strings 1510 can function as placeholders or markers for specific pieces of text data points within the chunk.

The data processing system 100 can cause the large language model 1210 to process the chunk 1502A, including a specific set of text strings 1510. The large language model 1210 can process the text data associated with the text strings 1510 and generate an initial inference 1514. The inference 1514 can correspond to various aspects, such as topics (e.g., identification of themes discussed within the chunks), risks (e.g., challenges or risks associated with the context), and next steps (e.g., recommended actions or decisions based on the text data), among others. The large language model 1210 can generate references to text strings 2 and 20 to indicate the text strings 2 and 20 were used to generate the inference 1514.

After processing chunk 1502A and generating inference 1514 and the references to text strings 2 and 20, the data processing system 100 can cause the large language model 1210 to process the chunk 1502B. In this regard, the data processing system 100 can provide the large language model 1210 with state information 1512 and chunk 1502B. The state information 1512 can represent the text strings 2 and 20 references for the inference 1514. By considering the state information 1512 and the new set of text strings 1510 within chunk 1502B, the large language model 1210 can generate a new set of inferences 1516 that may have an overlap with the references generated for the chunk 1502A (e.g., may include the inference 1514).

Figure 17:
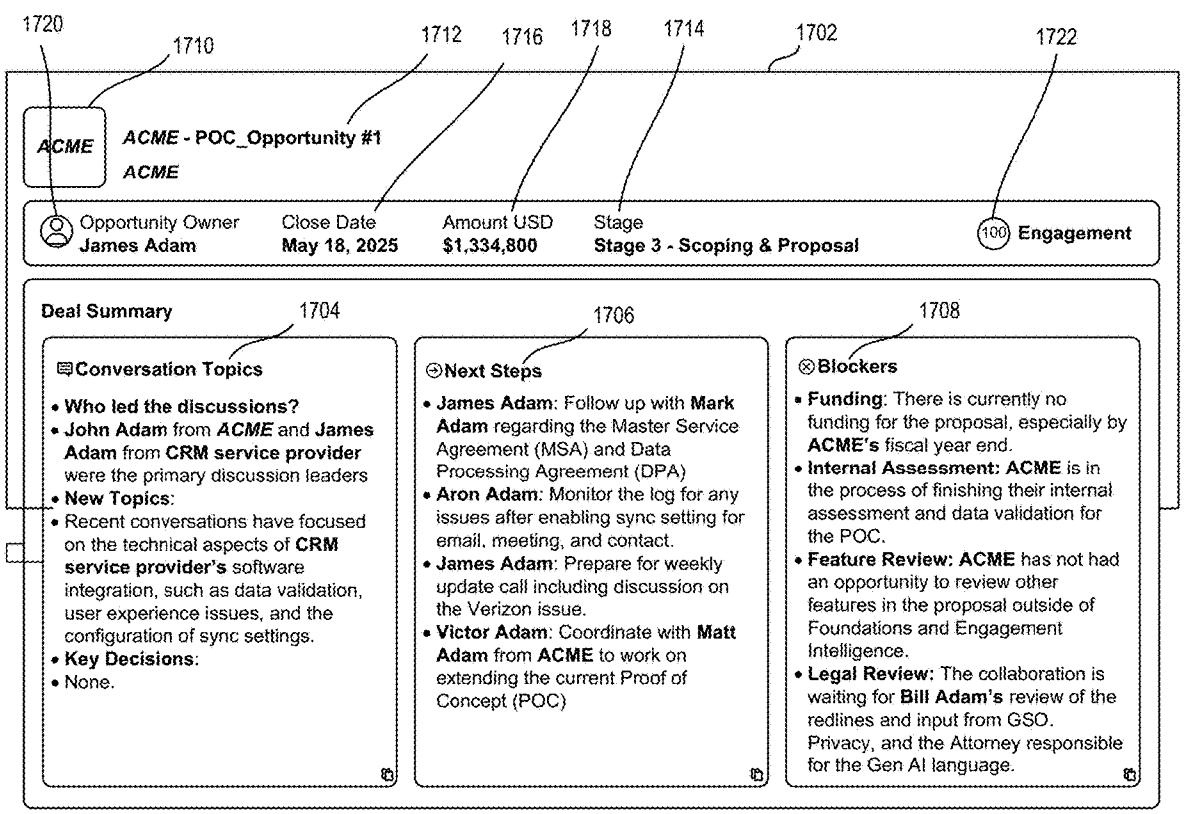
FIG. 17 illustrates an example user interface of a platform according to embodiments of the present disclosure.

Referring now to FIG. 17, depicted is a user interface illustrating an example platform. The data processing system 100 can configure the user interface 1702 to display key information and insights related to a specific sales opportunity. For instance, the data processing system 100 can configure the user interface 1702 to present details and insights about a business opportunity 1712 for a customer 1710. In this regard, the user interface 1702 can be configured to display stage 1714, close date 1716, deal amount 1718, and opportunity owner 1720, among others. The stage 1714 can present the current stage of the sales process (e.g., qualification, proposal, negotiation, etc.). The close date 1716 can present the expected closing date for the business opportunity. The deal amount 1718 can present the expected value of the deal. For every business opportunity, the user interface 1702 can be configured to present an opportunity owner 1720 responsible for managing that business opportunity within the CRM system. In some embodiments, the user interface 1702 can be configured to present an engagement level 1722. In this example, the engagement level 1722 can indicate the level of engagement with the customer based on predefined metrics (e.g., number of meetings held, emails sent/received, etc.) within a specific timeframe (e.g., past 30 days).

In response to receiving a request from a client device regarding or identifying a business opportunity 1712, the data processing system 100 can present the user interface 1702. In doing so, the data processing system 100 can retrieve the key topics 1704, next steps 1706, and blockers 1708 that were most recently generated from the business opportunity 1712 and include them on the user interface 1702. The data processing system can transmit the populated user interface 1702 to the client device. The keys topics 1704 can provide the key talking points or themes from recent customer interactions. In some embodiments, the key topics 1705 can include information related to who led the discussion (e.g., identifying key contacts related to the business opportunity), new topics (e.g., any new themes or issues raised by the customer during recent interactions), and key decisions, among others. The next steps 1706 can provide actionable insights based on the current stage and the gathered information. For instance, the next steps 1706 can include information related to action items (e.g., discuss pricing in the upcoming meetings), ownership assignments (e.g., indicate who needs to be involved in specific next steps, such as identifying the owners for the Master Service Agreement (MSA) and Data Processing Agreement (DPA), etc.). The blockers 1708 can provide risk or other issues that could hinder progress in the sales process, such as uncertainty with funding, delays in internal approvals within the customer's organization, or outstanding reviews, among others.

In one example, the data processing system 100 can generate the user interface in response to receiving a request (e.g., a request for one or more topics, next steps, blocks, risks, etc.) from an interaction interface (e.g., a portion of a user interface configured to receive and display text communication with a large language model (e.g., a chatbot) hosted by the data processing system 100 or a remote computing system). For example, the data processing system 100 can receive a text input identifying the business opportunity 1712. In response to receiving the input, the data processing system 100 can retrieve a template (e.g., the template depicted in FIG. 13B) containing text that can be used as input into the large language model. The data processing system 100 can additionally retrieve object field-value pairs that correspond with the record object for the business opportunity 1712. In some cases, the data processing system 100 can retrieve the object field-value pairs that correspond with the record object responsive to the input into the interaction interface identifying the business opportunity 1712. In some cases, the data processing system 100 can retrieve the object field-value pairs for the business opportunity 1712 in response to receiving the request from a user interface depicting data of the business opportunity 1712. The data processing system 100 can update the template to include the retrieved data for the record object. In some cases, the data processing system 100 can retrieve text strings generated from electronic activities matched to the record object for the business opportunity 1712. The data processing system 100 can include the text strings in the template. In some cases, the data processing system can retrieve previously generated topics, next steps, risks, blocks, etc., (e.g., as requested) for the record object for the business opportunity 1712 and include the retrieved inferences in the template. The data processing system 100 can input the updated template in the large language model to generate a result or an answer to the request. The data processing system 100 can present the result or answer on the interaction interface to the user.

Generating opportunities summaries using the iterative process described herein can address multiple technical shortcomings of approaches that attempt to process text string datasets as a whole to generate similar opportunity summaries. For example, the iterative processing can significantly reduce costs by eliminating the need for high-end large language models due to its smaller required context length. This capability also enables fine-tuning of smaller models, such as llama3-8b, further lowering operational expenses. Moreover, the reduction in token processing by avoiding repetitive handling of the same eurekas enhances overall efficiency. Second, the smaller required context length can prevent issues like forgetting in the middle of processing, ensuring continuous coherence in operations. Third, the ability to selectively retain summarized items using attributes and text string dates provides precise control over information management. Additionally, the stateful inference of the iterative processing can seamlessly integrate with electronic activities such as to summarize emails or calls in real-time, ensuring that summaries remain consistently updated. These advantages make stateful inference a natural and efficient solution for managing and summarizing ongoing activities effectively.

T. Systems and Methods for Automatic Story Generation and Implementation Using One or More Large Language Models The systems and methods described herein can perform automatic story (e.g., text string dataset) generation and implementation for using electronic activities matched to record objects (e.g., opportunity record objects). The stories can be generated based on data of electronic activities that have been matched to the record objects and/or data of the record objects themselves. Electronic activities can be matched to record objects using the systems and methods described herein or through any other system and method. The record objects can be record objects stored in a CRM system or otherwise be shadow record objects stored in a shadow CRM system that mirrors such a corresponding CRM system. A conventional system may extract data of record objects and apply a set of rules to analyze the data and determine characteristics or statuses of the accounts and/or opportunities associated with the record objects. The system may do so to determine the parties involved in an opportunity and/or a current state of the opportunity. In some cases, electronic activities may not include data that satisfies any rules that can be used to determine characteristics of an opportunity associated with a record object. In such cases, the system may not be able to provide or generate any insights regarding the opportunity or actions to take based on such insights.

A system may attempt to generate insights regarding an opportunity by implementing large language models. For example, such a system may input electronic activities matched with an opportunity record object into a large language model. The system may receive a request for information regarding the opportunity record object. Responsive to receiving the request, the system may input the electronic activities matched with the opportunity record object into one or more large language models with the request and execute the large language models. Based on the input, the large language models may automatically parse each of the electronic activities and generate an output responding to the request. However, such a system may face multiple difficulties in accurately and efficiently generating information in this manner. For example, large language models are often limited by the amount of text the models can ingest. Given the large number of electronic activities that may correspond to an opportunity, a large language model may not be able to ingest each of the electronic activities and therefore may be limited in the amount of data the model may use to generate recommendations. In another example, large language models are prone to "hallucinations." Typical causes of hallucinations may be lack of context, misleading prompts, rare or uncommon inputs, exploiting biases, noise in the input data, and attempts at creative writing. Inputting large amounts of electronic activities into a large language may meet each of these criteria given the variations and unpredictability in both the format and the content of the electronic activities on a large scale. Given that a large number of electronic activities may be matched to a record object, large language models may be susceptible to each of these difficulties when generating a response, whether the large language models are processing a large amount of data of the electronic activities, hallucinating with the response, or focusing on wrong aspects of the data. Accordingly, a system that attempts to generate insights and actions to perform using large language models may often be faced with unpredictable and incomplete outputs.

A computer implementing the systems and methods described herein may overcome the aforementioned technical deficiencies. For example, the computer may implement (e.g., store and/or use) one or more large language models that have been trained to generate text strings based on data of electronic activities. The data may be data in any portion of an electronic message, data of a transcript, and/or any other type of data. The computer can identify multiple electronic activities that have been matched to a record object. The record object may be an opportunity record object associated with an opportunity account and may be stored in a system of record (e.g., a CRM system). The computer can input the electronic activities into one or more large language models to generate one or more text strings for each electronic activity. The text strings can be or include (e.g., each be or include) an insight or summary of the content of the respective electronic activities. The computer can aggregate the text strings together into a set of text strings and store an association between the set of text strings and the record object. The computer can delete the electronic activities from which the computer generated the text strings from memory, which can conserve a substantial amount of computer memory resources. In this way, the computer can store a current state for the record object based on electronic activities matched to the record object without storing the electronic activities themselves.

The computer may update the set of text strings over time. The computer can update the set of text strings based on new text strings that the computer receives after generating the original set of text strings. For example, after generating the first set of text strings for the record object, the computer can identify a new electronic activity (e.g., a second electronic activity) that has been matched to the record object. The computer can determine a condition is satisfied, such as a time-based condition (e.g., an end to a time interval), or that the identification of the new electronic activity satisfies a condition. Responsive to the determination, the computer can input the new electronic activity into the one or more large language models and execute the large language models to generate a new text string for the new electronic activity. In instances in which the satisfied condition is a time-based condition, the computer can similarly generate text strings for each electronic activity matched to the record object during the time interval. The computer can add the new text strings to the first set of text strings to update the first set of text strings. In some cases, the computer can input the first set of text strings into the one or more large language models in response to the satisfied condition, with or separate from the new text strings. The computer can include instructions in the input to consolidate a subset of the set of text strings (e.g., a defined number of the oldest text strings or text strings that were generated at least a defined time length ago). The large language models can generate a summary of the subset of text strings, such as a summary text string, and replace the subset of text strings with the summary text string, thus conserving resources by reducing a total size of the set of text strings without losing the content for the set of text strings. The large language models may similarly update any number of individual and/or subsets of text strings of the set of text strings. The computer can store the generated text strings with any remaining text strings of the first set of text strings in memory as a second set of text strings with a stored association with the record object. In some cases, the computer can delete the original version of the first set of text strings from memory, further conserving memory resources while maintaining a new state of the record object that can be used to generate responses to queries.

The computer can use the set of text strings generated from the electronic activities matched to the record object to respond to natural language queries regarding or identifying the record object. For example, the computer can receive a request (e.g., from a chat interface) containing a natural language query and an identification of the record object. The computer can use the identification of the record object to identify the set of text strings based on the stored association between the record object and the set of text strings. The computer can retrieve one or more text strings or all of the set of text strings and one or more object field-value pairs from the record object, in some cases using the one or more large language models to determine the data and/or text strings to retrieve from the natural language query. The computer can input the natural language query with the retrieved text strings and/or retrieved data into the one or more large language models. The computer can execute the one or more large language models based on the input to generate an output (e.g., an output in a form indicated in the natural language query or a text output). Accordingly, the computer can use a combination of data in the stored record object and the set of text strings to generate responses to natural language queries, which can provide more detailed and more accurate (e.g., with fewer hallucinations) responses regarding record objects than systems that do not use text strings of electronic activities matched to the record objects and/or that do not implement a system of responding to requests using both data of electronic activities and data of record objects corresponding to the electronic activities. Thus, by using the set of text strings to generate responses to queries for an opportunity, the computer can generate insights based on complete and succinct data and reduce hallucinations by the large language models being used to perform the process.

In one example, when generating a response to a natural language query, the computer can input data from the record object into the one or more large language models with the set of text strings associated with the record object. For instance, the computer can retrieve data regarding the entities (e.g., the companies, groups, or organizations) involved in the opportunity associated with the record object and/or a status or stage of the opportunity. The computer can input such data into the one or more large language models with the sets of text strings and/or the natural language query. The one or more large language models can generate a text output or response in another format based on the data from the record object and the set of text strings. The text output can be a recommendation regarding the opportunity or otherwise include information regarding the opportunity. Because of the processing that is performed in generating the response and/or the retrieval of the data of the record object itself, the response can be used to generate more accurate and more detailed information and/or recommendations (e.g., reduce hallucinations) for next steps for the opportunity than if only the electronic activities were used to generate the recommendations.

Generating responses to queries using summaries (e.g., text string summaries) of electronic activities as described herein can substantially improve the accuracy and precision of responses to natural language queries regarding a record object. For instance, when a large language model is given summaries of documents instead of the full documents, it tends to hallucinate less. In one example, full documents can contain vast amounts of information, some of which may be irrelevant or tangential. This can overwhelm the model and increase the chances of it generating inaccurate or irrelevant responses. Summaries distill the essential information, making it easier for the large language model to focus on the key points. In another example, summaries are typically clearer and more concise, which helps the large language model understand and process the main ideas more effectively. This reduces the risk of the large language model misinterpreting complex or verbose text. In another example, large language models have a limited context window, meaning they can only process a certain number of tokens (words or characters) at a time. Summaries are shorter and fit within this context window more comfortably, ensuring the large language model has access to all relevant information simultaneously without losing context. In another example, full documents might contain conflicting information, ambiguous statements, or nuanced details that can confuse the model. Summaries usually resolve these ambiguities by presenting a coherent and unified perspective. In another example, summaries highlight the main arguments or findings, helping the large language model to prioritize the most important information. This guidance helps the large language model generate more accurate and relevant responses. In another example, documents often contain extraneous details, footnotes, references, and other information that may not be critical for understanding the main content. Summaries strip away this noise, allowing the large language model to concentrate on the core message. By providing summaries, the large language model can leverage the distilled, essential information, leading to more accurate and reliable responses with fewer hallucinations.

Figure 18:
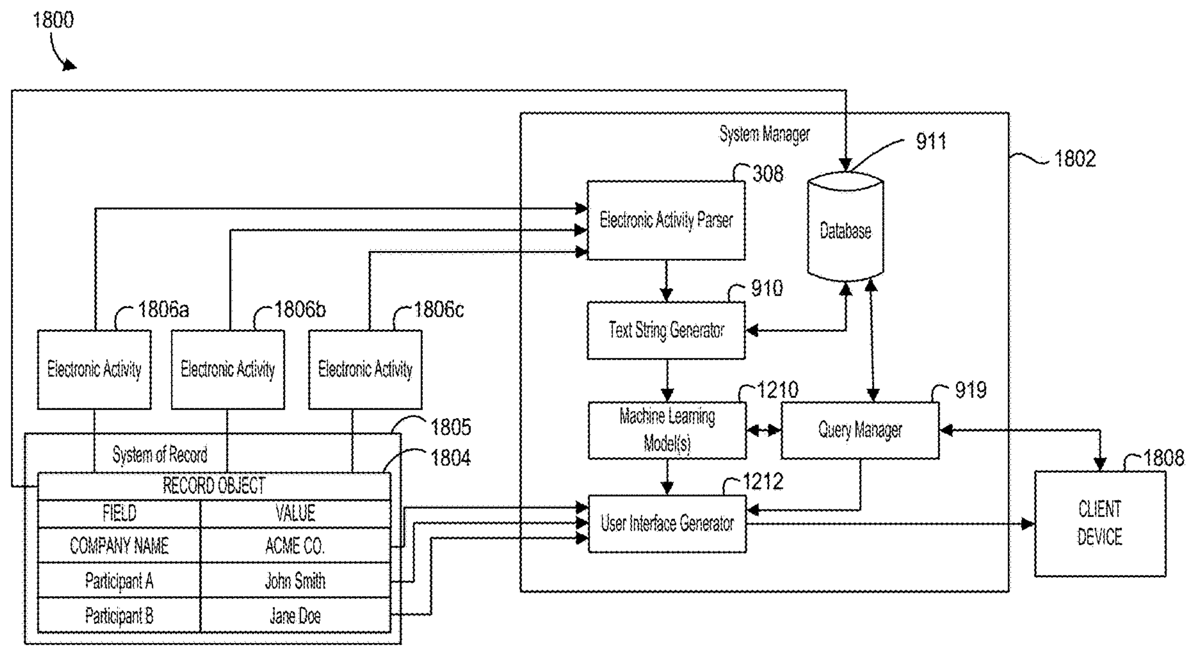
FIG. 18 illustrates a block diagram of an example system for automatically generating a story using one or more large language models according to embodiments of the present disclosure.

Referring now to FIG. 18, a block diagram of a system 1800 for automatically generating and implementing a story using one or more large language models is shown, according to embodiments of the present disclosure. Some of the components of the system 1800 may correspond to components of the data processing system 100 of FIG. 1 and/or the system 900 of FIG. 9. The system 1800 can automatically generate a set of text strings (e.g., stories) for record objects based on data of electronic activities matched to the record objects. The system 1800 can include a system manager 1802. Although not shown, the system 1800 may also include a data processing system (e.g., the data processing system 100), of which the system manager 1802 may be a component. The system manager 1802 can be any script, file, program, application, set of instructions, or computer-executable code that is configured to enable a computing device on which the system manager 1802 is executed to perform one or more functions of the system manager 1802 described herein. The system manager 1802 may be the same as, be similar to, or be a component of the insight engine 336, shown and described with reference to FIG. 3E, the story generator 902, shown and described with reference to FIG. 9, and/or the summary generator 1202, shown and described with reference to FIG. 12. The system can include a client device 1808. The client device 1808 can include a processor and memory and can be or include any type and/or number of computing devices.

As described in further detail below, the system manager 1802 can be configured to use one or more large language models (e.g., neural networks or transformers) to generate sets of text strings that each include an insight from or a summary of a different electronic activity. The system manager 1802 can parse electronic activities 1806*a-c* (together, the electronic activities 1806 and, individually, the electronic activity 1806) that have been matched to (e.g., associated with, linked to, or otherwise determined to pertain to) the record object 1804 to extract data from the electronic activities 1806. The system manager 1802 can use one or more large language models to generate a text string for each of the electronic activities 1806 based on the data of the respective electronic activities. Together, the generated text strings may be a set of text strings. The system manager 1802 can store the set of text strings in memory with a stored association with the record object 1804. Each text string of the set of text strings can be stored in memory in a separate data structure (e.g., a hive table) that includes attributes or other metadata regarding the text string. The system manager 1802 can update the set of text strings over time as the system manager 1802 identifies new electronic activities matched to the record object to maintain a state of the opportunity associated with the record object 1804. The system manager 1802 can use the set of text strings as input into the large language models to generate responses to queries (e.g., natural language queries). Using the set of text strings (e.g., including any other data of the data structures of the text strings) as input into the large language models to generate responses to queries can facilitate the large language models generating more precise responses with fewer hallucinations than in systems that input electronic activities themselves into large language models for similar response generation.

The record object 1804 can be stored in a system of record 1805. The system of record 1805 can be the same as or similar to the system of record 118, shown and described with reference to FIG. 1. The system of record 905 can be, include, or be a component of a CRM system. The record object 904 can be an account record object or an opportunity record object. In some cases, the record object 1804 can be a shadow record object and the system of record 1805 can be a shadow system of record. The shadow system of record and shadow record object can mirror or include the same data as is included in a system of record and record object stored in a remote computing system or remote computing device.

The record object 1804 can be an account record object and include fields associated with an account that is held with a data source provider. Such an account record object can be stored in the systems of record of the data source provider. As an account record object, the record object 1804 can include fields such as AccountNumber, Domain name, Postal Code, Company Name, BillingAddress, Description, Industry, Fax, DunsNumber, LastActivityDate, MasterRecordId, Name, NumberOfEmployees, Ownership, Website, YearStarted, and IsPersonAccount, among others. The record object 1804 can be stored or linked with one or more opportunity record objects.

In some cases, the record object 1804 can be an opportunity record object. An opportunity record object can be a data structure that includes one or more fields for a given opportunity. An opportunity can indicate a possible or planned deal with a customer for which an account record object is already stored in a system of record. As an opportunity record object, the record object 904 can include fields such as AccountId, Amount, CampaignId, CloseDate, Description, ExpectedRevenue, Fiscal, HasOpenActivity, IsClosed, IsWon, LastActivity Date, Name, OwnerId, Role, StageName, Territory2Id, and Type.

The electronic activities 1806 can be any type of electronic communication between individuals. The electronic activities 1806 can include, for example, real-time (or near real-time) electronic activities, asynchronous electronic activity (such as emails, text messages, among others) or synchronous electronic activities (such as meetings, phone calls, video calls, or transcripts of such electronic activities), or any other electronic communication between two or more parties. The electronic activities 1806 can include text or voice messages between the different parties.

The system manager 1802 can include the electronic activity parser 308, the text string generator 910, the database 911, one or more machine learning models 1210. The components 308-1212 of the system manager 1802 can operate to generate a set of text strings from data of the electronic activities 1806 matched to the record object 1804. The components 308-1212 can update the set of electronic activities as further electronic activities 1806 are matched to the record object 1804. The components 308-1212 can then use the set strings, in some cases in combination with data of the record object 1804 itself, to generate responses to queries regarding the record object 1804 from computing devices, such as the client device 1808. The system manager 1802 can perform the process described herein using a single large language model or multiple large language models. The large language model or large language models can be connected with adapters to facilitate performing the process.

The electronic activity parser 308 can be any script, file, program, application, set of instructions, or computer-executable code that is configured to identify or extract data from electronic activities. The electronic activity parser 308 can parse (e.g., identify or extract) values from the electronic activities 1806. The electronic activity parser 308 can parse values from the electronic activities 1806 responsive to determining the electronic activities 1806 are matched to the record object 1804. For example, the electronic activity parser 308 can identify the record object 1804 from the system of record 1805 storing the record object 1804. The electronic activity parser 308 can retrieve or identify electronic activities 1806 matched to the record object 1804 responsive to a condition being satisfied (e.g., responsive to a set time interval ending (e.g., detecting a set time interval ending) from the last time the system manager 1802 generated a set of text strings for the record object 1804 or responsive to receiving a user input indicating to generate a textual output for the record object). The electronic activity parser 308 can identify the electronic activities 1806 by identifying stored associations (e.g., links or other relationships) between the record object 1804 and the electronic activities 1806. The electronic activity parser 308 can identify any number of electronic activities 1806 matched to the record object 1804. The electronic activity parser 308 can input the identified electronic activities 1806 into the text string generator 910.

The text string generator 910 can be or include one or more large language models. A large language model can be a neural network, a transformer, or any other machine learning model capable of automatically generating text based on an input. A large language model of the text string generator 910 may be trained to generate one or more text strings for individual electronic activities. For example, the system manager 1802 can feed (e.g., separately feed) the electronic activities 1806 into the text string generator 910. In doing so, the system manager 1802 can input the body, subject line, and/or any address lines of the electronic activities 1806 into the text string generator 910. The text string generator 910 can generate one or more text strings based on the electronic activities 1806, such as by applying the parameters and/or weights of the text string generator 910 to the electronic activities 1806. In doing so, the text string generator 910 can generate 1-N text strings for each electronic activity 1806, where N can be any number (e.g., the text string generator 910 can generate any number of text strings based on individual electronic activities 1806). The text strings can be or include summaries for and/or insights of the respective electronic activities 1806.

The text strings generated by the text string generator 910 can be or include insights for the electronic activities 1806. The insights can indicate a summary or the context and/or content of the respective electronic activities 1806. For example, the text string generator 910 can generate insights such as actions that are described in an electronic activity 1806, responsibilities that are established in an electronic activity 1806, the subject of an electronic activity 1806, or a summary (e.g., an activity summary) of an electronic activity 1806. In some embodiments, in cases in which the text string generator 910 is not able to generate an insight for an electronic activity 1806, the text string generator 910 can generate a text string (e.g., only a single text string) indicating no insights could be determined.

The text string generator 910 can be a few-shot prompt large language model or a zero-shot prompt large language model. For example, the text string generator 910 can be a generic large language model that has been trained to generate insights based on the electronic activities 906 using examples of insights from other electronic activities. Both the electronic activities 906 and the examples can be inserted into the text string generator 910 and the text string generator 910 can generate (e.g., automatically generate) one or more text strings based on the electronic activities 906 and the examples. In doing so, the text string generator 910 can view the examples as guides for the type of output (e.g., guides to generate insights for the electronic activities) to generate based on the electronic activities 906.

In another example, the text string generator 910 can be a large language model that has been specifically trained to generate insights in text strings. The text string generator 910 can be trained to do so by using supervised learning or unsupervised learning training techniques, for example, to adjust any internal weights and/or parameters to specifically generate insights based on input electronic activities. The training can enable the text string generator 910 to automatically generate text string insights for individual electronic activities with or without examples to guide the output (e.g., using a few-shot prompt or a zero-shot prompt). As referenced herein, a few-shot prompt can include a one-shot prompt. The text string generator 910 can generate one or more text strings as output responsive to receiving the electronic activities 906 as input. The system manager 1802 can input text strings generated by the text string generator 910 into the topic generator 912.

The text string generator 910 can store text strings (e.g., insights) that the text string generator 910 generates in the database 911. The database 911 can be a database (e.g., a relational database) with a semantic index. The semantic index can include word embeddings (e.g., vectors) in which words with similar meanings are represented closer to each other than other words. The text string generator 910 can store the text strings in the database 911 as vectors (e.g., the text string generator 910 can generate the embeddings, such as using machine learning techniques or a defined algorithm). The text string generator 910 can store the vectors in the database 911 with metadata regarding the text strings such as date, account identifications, opportunity identification, and references to any identities in the text strings from which the vectors were generated. In some embodiments, the text string generator 910 can store the electronic activities from which the text strings were generated and/or the text strings themselves in the database 911. The electronic activities and/or the text strings can be stored as metadata of the vectors, in some embodiments.

In some embodiments, the text string generator 910 can store the text strings in the database 911 with identifications uniquely identifying the text strings within the database 911. The identifications can be numerical, alphabetical, and/or alphanumerical. The text string generator 910 can assign separate identification to each text string, incrementing or changing the identification for each assignment, as the text string generator 910 generates the text strings. In doing so, the text string generator 910 can generate identifications in ascending order over time. For instance, the text string generator 910 may assign a numerical identifier of one to the first text string that the text string generator 910 generates for the record object and a numerical identifier of two to the second text string that the text string generator 910 generates for the record object 1804. The order may be determined based on the times of the electronic activities (e.g., the times in which the electronic activities were generated or the times in which the electronic activities were received or matched to the record object) such that the text strings generated from the earlier electronic activities will be lower than the text strings generated from the later electronic activities. The text string generator 910 can store the text strings with the timestamps indicating such times, in some embodiments. The text string generator 910 can delete, discard, or remove from memory the electronic activities 1806 subsequent to generating the text strings to conserve memory resources.

The text string generator 910 can store the text strings in the database 911 in separate data structures. The data structures can be, for example, hive tables, configured to store the text strings and any attributes or metadata for the text strings. Examples of data that can be stored in the data structure can include identifiers of the text strings, attributes determined for the text strings, timestamps of the electronic activities from which the text strings were generated, individuals identified from the text strings, context of the text strings, etc. The text string generator 910 and/or the machine learning models 1210 can operate to determine data to add to the data structures for the text strings by processing the text strings individually and/or in combination with other text strings (e.g., other text strings of the same or a similar context).

The machine learning model(s) 1210 can include one or more large language models that can be trained on text data. For instance, the large language models can be trained to perform a variety of text processing tasks, including, but not limited to, generating text, comprehending and processing natural language inputs, and responding to queries with contextually relevant information. The machine learning model(s) 1210 can include one or more large language models that can perform some or all of the functionality of their specific counterparts in FIG. 9A. For example, one of the machine learning models 1210 can be similar to the topic generator 912 and can be configured to generate and/or modify a list of topics for a given record object. Another of the machine learning models 1210 can be similar to the recommendation generator 918 and can be configured to predict insights and/or actions to take regarding the opportunity associated with the record object 1804. In some cases, the text string generator 910 can be or include one of the machine learning models 1210 and/or perform the functionality described herein for the machine learning models 1210.

The system manager 1802 can use the machine learning models 1210 to process text strings generated by the text string generator 910 for record objects. For example, the system manager 1802 can identify the set of text strings that the text string generator 910 generated for the record object 1804 with the electronic activities 1806. The system manager 1802 can input the set of text strings into one or more of the machine learning models 1210. Based on the input, the machine learning models 1210 can generate reflections, or summary text strings (e.g., subset summaries) that summarize individual subsets of the set of text strings. The summary text strings can have or include a perspective, such as "risk identification" or "MEDDPIC assessment." The system manager 1802 can include the summary text strings in the set of text strings generated for the electronic activities 1806. The system manager 1802 can add the summary text strings to the set of text strings to provide more information regarding the record object in the set of text strings and/or replace the subsets of text strings with the summary text strings to reduce the memory resources required to store, maintain, and/or process the subsets of text strings.

The system manager 1802 and/or the machine learning models 1210 can determine or select subsets of text strings for which to generate summary text strings using one of a few criteria. In one example, the system manager 1802 can generate "mini-stories." Mini-stories can group and/or summarize multiple text strings to capture a single "mini-conversation" that happened within an opportunity and that was described or included in multiple electronic activities. The mini-stories can be or include summary text strings of the grouped text strings and/or the group of text strings themselves. In one example, Ellen can propose a demo in one email, Paul could accept the demo and invite other participants in another email, then, after completion of the demo, Ellen can send an email summarizing what was discussed during the demo. The system manager 1802 can determine the emails each pertain to the same demo or subject based on a context of the text strings generated from the email, such as by using one of the machine learning models 1210 on the text strings (e.g., the system manager 1802 can separately determine the text strings correspond to the same content by inputting the text strings into the machine learning models 1210 or the machine learning models 1210 can automatically determine the text strings belong to the same demo when processing the set of text strings input as a whole). In some embodiments, in addition to or instead of using context, the system manager 1802 or the machine learning models 1210 can similarly identify individual subsets of text strings that each identify the same or a common individual. The machine learning models can generate a summary text string for the group of text strings (e.g., subset of text strings) summarizing the group of text strings.

In another example, the system manager 1802 and/or the machine learning models 1210 can generate summary text strings based on subsets of text strings selected or determined based on time. For instance, the machine learning models 1210 can generate summary text strings for text strings generated from electronic activities associated with times within specific time intervals (e.g., days, weeks, months, etc.). The machine learning models 1210 and/or the system manager 1802 can identify such subsets of text strings based on timestamps that may be associated with the text strings in memory. In another example, the system manager 1802 can generate summary text strings for subsets of text strings that the system manager 1802 or the machine learning models 1210 based on the subsets having at least a defined size. In one example, the system manager 1802 can identify the first ten text strings and generate a summary text string based on the first ten text strings, then do the same for sequential sets of ten text strings. The system manager 1802 can generate summary text strings in any manner. The system manager 1802 can include the summary text strings in the set of text strings generated for the record object 1804 to aid in generating responses to queries.

The system manager 1802 can assign identifiers (e.g., text string identifiers) to the different text strings to maintain a trail indicating the history of how the text strings were generated. For instance, the system manager 1802 can assign identifiers to summary text strings generated from subsets of text strings. The identifiers can be numerical, alphabetical, or alphanumerical values that uniquely identify the texts strings in memory. The system manager 1802 can generate and assign identifiers using any method. In some cases, the system manager 1802 can include identifiers of any text strings based on which the system manager 1802 generated the summary text strings in the respective summary text strings. The system manager 1802 can similarly include activity identifiers of electronic activities based on which the text strings were generated in the respective text strings.

In some cases, the system manager 1802 and/or the machine learning models 1210 can include identifications of individuals and/or entities in the text strings or as attributes of the individual text strings. For example, there are two main ways in which people may be referenced in electronic activities. One type of reference is an implicit reference. For example, if Ellen Ripley has said in an email that she will be sending a revised document shortly, she is making an implicit reference to herself. Another type of reference is mentioning a person by name, such as "Burke needs a project update." Name mentions can be performed in a variety of ways, some of which may include a mention by just a first name, just a last name, various compounds such as EllenR, various partial names, diminutives, and so on. Individuals may be referenced in text strings in any manner. The system manager and/or the machine learning model 1210 can identify referenced people from text strings and label the text strings or store indications of the referenced people in data structures generated for the text strings identifying the people.

The system manager 1802 and/or the machine learning models 1210 can identify individuals referenced in text strings using methods based on the types of the references. For example, for implicit references, the system manager 1802 can identify the individuals during text string generation, such as by inputting the data of the electronic activities into the text string generator 910 and/or one of the machine learning models 1210. For instance, the text string generator 910 can be trained to generate the text strings converting implicit references into references with full names. For instance, the text string generator 910 can convert the text string "I agree to these terms" into the text string "Ellen Ripley agrees to these terms." In another example, for explicit references, the system manager 1802 can identify individuals from the from:/to:/cc: electronic message fields (or their counterparts in other types of electronic activities, such as transcripts of meetings or recordings). In some cases, the system manager 1802 can use object character recognition techniques on electronic messages to identify referenced individuals. The system manager 1802 can use the text string manager 910 or another machine learning model of the machine learning models 1210. The machine learning model can handle (e.g., automatically handle) various name variants, such as diminutives (e.g., "Jen" becomes "Jennifer"). The system manager 1802 can store identities or references to the "people" fields of data structures (e.g., hive tables) of the text strings from which the identities or references were identified.

In some cases, the system manager 1802 cannot resolve explicit references immediately. For instance, if the right individual was not involved in a conversation and was not listed as an official contact for the opportunity, the machine learning models 1210 of the system manager 1802 may not be able to identify the references. This may be likely for individuals of "gray eminence," for example "Van Leuwen will never agree to this." The system manager 1802 can resolve the references (e.g., identify the individuals) retroactively, such as by identifying Van Leuwen in a field of a subsequently received electronic message (e.g., in the CC) field of the electronic message (e.g., an electronic message that the machine learning models 1210 identify as being a part of the same mini-story). The system manager 1802 can update the data structure of the text string with the unresolved reference responsive to identifying the individual in a subsequently received electronic activity.

The system manager 1802 can identify explicit references at the text string level and propagate the identified individuals into summary text strings or other text strings when processing the text strings to generate summary text strings and/or generating other attributes regarding the text strings. The system manager 1802 can perform an individual resolution process for each new text string that the system manager 1802 generates, such as by identifying individuals explicitly named in the text string or the data of the electronic activity from which the text string was generated, determining whether the text string is a part of a mini-story of other text strings within the set of text strings, and/or determining whether the identified individual is an "unresolved individual" of any text strings of the mini-story. The system manager 1802 can update the status of the individual to a "resolved individual" such as by moving an identifier of the individual from an unresolved field to a resolved field or by removing a flag indicating the individual is unresolved. The system manager 1802 can additionally or instead perform the individual resolution process at set time intervals (e.g., hourly or daily). The identified individuals can aid in identifying individuals that are involved in an opportunity and/or the individuals corresponding to different text strings for the query agent to use to identify relevant text strings and/or determine individuals associated with the text string when generating a response to a request for information regarding the record object.

The system manager 1802 can update the set of text strings. For example, over time, new electronic activities can be matched to the record object 1804. The system manager 1802 can update the set of text strings based on the new electronic activities responsive to a trigger condition occurring or responsive to detecting satisfaction of a condition. For instance, the system manager 1802 can use a time-based condition to update the set of text strings. The time-based condition may indicate to update the set of text strings at set intervals (e.g., time intervals of a defined length). To do so, the system manager 1802 can detect or determine an end to a time interval (e.g., determined a defined length of time has occurred since the set of text strings was generated and/or the system manager 1802 previously updated the set of text strings). Responsive to the detection or determination, the system manager 1802 can identify one or more electronic activities (e.g., a second electronic activity) that are matched with the record object 1804 and/or correspond with the time interval (e.g., were matched with the record object 1804 during the interval, generated during the interval, and/or received during the time interval). In some embodiments, the system manager 1802 can input (e.g., separately input) the electronic activities into the text string generator 910 to generate text strings for the respective electronic activities. The system manager 1802 can add the generated text strings to the set of text strings, thus generating a second set of text strings. In some embodiments, the system manager 1802 can input the electronic activities into the machine learning models 1210 with the set of text strings. The machine learning models 1210 can process the electronic activities with the set of text strings to generate text strings for the respective new electronic activities and output a new set of text strings including the text strings of the initial set of text strings with the new set of text strings from the new electronic activities. The system manager 1802 can similarly update the set of text strings at the end of each time interval.

In some embodiments, the system manager 1802 can update the set of text strings for each new electronic activity that the system manager 1802 identifies as being matched with the record object 1804. For example, responsive to an electronic activity being matched to the record object 1804, the system manager 1802 can detect the match and automatically update the set of text strings based on the electronic activity. The system manager 1802 can do so by separately generating a text string for the electronic activity and adding the text string to the set of text strings or by inputting the electronic activity into the machine learning models 1210 with the set of text strings generated for the record object 1804. The system manager 1802 can similarly update the set of text strings for each electronic activity that the system manager 1802 identifies that is matched to the record object 1804. In some cases, the system manager 1802 may only generate datasets of text strings that correspond to record objects that are currently open or that correspond to pending opportunities to conserve processing resources of maintaining and updating the text string data sets for the different record objects.

For each update, the system manager 1802 can store an association between the updated set of text strings (e.g., the second set of text strings) and the record object 1804 in the database 911. For example, the system manager 1802 can store the updated set of text strings in the database 911. The system manager 1802 can include an identifier of the record object 1804 in the database 911 correlating the updated set of text strings with the record object 1804 (e.g., pointing to the record object 1804). The system manager 1802 can delete or remove the original or previous version of the set of text strings from the database 911. Because the updated set of text strings can include the same text strings as in the previous version of the set of text strings, the system manager 1802 can remove the original version of the set of text strings (e.g., remove the previous state of the opportunity of the record object 1804) from the database 911 without losing data.

The system manager 1802 can use the stored association between currently stored set of text strings and the record object 1804 to respond to queries. For example, the user interface generator 1212 can present a user interface at a client device 1808. The user interface can be a user interface of a software-as-a-service platform provided by the system manager 1802 or the data processing system 100 that operates as a CRM or otherwise to view data regarding different systems of record. The client device 1808 can access the pages of the software-as-a-service platform via an application. In some cases, the user interface can be a web page that the client device 1808 can access via a browser application. The user interface can include a chat interface through which users can provide inputs (e.g., text or natural language inputs) querying the system manager 1802 for data regarding different record objects and/or systems of record. A user accessing the client device 1808 can provide an input natural language query into the chat interface requesting information regarding the record object. An example of such a natural language query can be a request for a deal size, a current status of the opportunity associated with the record object, next steps, recommendations regarding the opportunity, etc. The client device 1808 can transmit the natural language query to the system manager 1802.

The query manager 919 can be any script, file, program, application, set of instructions, or computer-executable code that is configured to facilitate communication between client devices and large language models of the system manager 1802. The query manager 919 can include one or more large language models to use to hold a conversation with users at a chat interface, such as the chat interface of the user interface generated by the user interface generator. The one or more large language models can be trained on data in the database 911. Because the one or more large language models can be trained based on such data, the large language models may provide more nuanced answers to questions and/or ask further questions related to opportunities at a chat interface than a generic large language model would be able to ask.

The chat interface can be a user interface through which the query manager 919 can display outputs and a user accessing the chat interface can provide inputs. The inputs at the chat interface can operate as prompts to the one or more large language models of the query manager 919. The query manager 919 can transmit the chat interface to the client device 1808 to establish a communication connection between the system manager 1802 and the user accessing the client device 1808. Through the chat interface, the user can request different types of information regarding record objects in systems of record. The user can input such requests in natural language queries (e.g., text that requests specific types of information) and/or through other types of inputs, such as selections of options on the user interface.

The requests can include an identification of an opportunity or record object. The user can input the identification of the opportunity or record object in a natural language query or the client device 1808 can include the identifications of opportunity or record objects in the request based on pages of the platform the client device 1808 was accessing when submitting the requests. In one example, the user can input a natural language query of "tell me the current state of deal A." Deal A may be an opportunity of the record object 1804. The query manager 919 can identify the identifier of the opportunity or record object as "Deal A" from the natural language query, such as by using natural language processing techniques or by inputting the natural language query into the one or more of the machine learning models 1210. In another example, the user can be more general and not include any identification of the opportunity for which the user is requesting information in the natural language query. However, the request may still include an identification of the opportunity or record object pertaining to the natural language query. For instance, when submitting the query, the user may be viewing a page that includes information for Deal A served by the user interface generator 1212 or another component of the data processing system (e.g., the data processing system 100). The page may include code that automatically adds an identification of the opportunity or record object associated with the page (e.g., for which the page shows information) in any messages containing natural language queries or generated through the chat interface transmitted to the system manager 1802. The client device 1808 can transmit a message containing (e.g., in the body or payload of the message) the natural language query and/or the identification of the opportunity or record object to the system manager 1802. The query manager 919 can receive the request or requests and identify the identification of the record object or opportunity from the message.

The query manager 919 can use the systems and methods described herein to generate a response to the request from the client device 1808. For example, responsive to receiving the request, the query manager 919 can, in some cases using or via one or more of the machine learning models 1210, identify the identification of the opportunity associated with the record object 1804 or the record object 1804 itself. Based on the identification, the query manager 919 can identify the set of text strings (e.g., the first set of text strings or the second set of text strings) generated prior to receipt of the request based on the stored association between the set of text strings and the record object 1804. The query manager 919 can identify data relevant to the requested information, such as the requested information itself from the set of text strings and/or the record object 904, depending on the request. The query manager 919 can input the retrieved information into the machine learning models 1210, in some cases with the natural language query and/or the identification of the opportunity or record object 904. Based on the input, the machine learning models 1210 can generate a response (e.g., a natural language response or a response in a format requested in the natural language query or the request) that includes the requested information.

The query manager 919 can present, or transmit instructions to present, the response including the requested information in the chat interface at the client device 1808. In doing so, the query manager 919 can update the chat interface to include the requested information, in some cases in the format requested in the request. In some cases, the query manager 919 can update a different portion of the user interface with the requested information. For instance, the request can be for a table showing different values of specific object field-value pairs (e.g., size or expected close date) of the record object 1804 as well as contextual information about the record object 1804 (e.g., next steps, topics, risks, recommended contacts, etc.). The system manager 1802 can receive the request and execute the machine learning models 1210 using the request to generate a table matching the criteria. The system manager 1802 can update the user interface to include the table, such as in the chat interface or in another portion of the user interface. Other types of formats may include emails, slide deck presentations, documents, or other formats requested by a user.

In some cases, the user can input further requests (e.g., natural language queries) regarding data of the opportunity or record object. The query manager 919 can respond to such requests using the requests as input into the recommendation generator, in some cases with one or more previously generated outputs of the same thread (e.g., outputs of the same conversation with the user through the chat interface), any number of times. Thus, the query manager 919 can operate a chat interface as a communication channel between the system manager 1802 and a user accessing the client device 1808.

In some embodiments, the user can play out different scenarios for an opportunity using the systems and methods described herein. For example, the query manager 919 can generate a chat interface. Through the chat interface, the user can provide data to include or add to the output response generated by the machine learning models 1210 for the record object 1804. Such data can be or include different assumptions, such as an assumption that a particular individual will not respond in time or that a particular event of a timeline (e.g., a timeline recommended by the recommendation generator 918) will not occur by the specified time or day of the timeline. The query manager 919 can receive such inputs and add to or modify the response generated by the machine learning models 1210 according to the input assumptions. The query manager 919 can execute one or more large language models of the machine learning models 1210 using the modified textual output and generate information regarding the record object 1804 and/or one or more recommendations (e.g., a modified timeline, modified status indicators, and/or modified individuals to contact or modified messages) regarding the record object 1804. The system manager 1802 can transmit the generated response (e.g., the generated information and/or the one or more recommendations for the record object) to the client device 1808. The user can add or retract different modifications to obtain to different recommendations to determine different scenarios in which an opportunity can play out and the consequences of each scenario. Further examples of requests and responses that the query manager 919 can facilitate are described with reference to FIGS. 9A-9D.

In some cases, the system manager 1802 can store opportunity summaries for the individual record objects. The system manager 1802 can generate and/or update the opportunity summaries as described with reference to FIG. 12, such as by using sets of text strings generated for the different record objects. The system manager 1802 can generate and/or update the opportunity summaries at set time intervals or responsive to another criterion being satisfied. The opportunity summaries may include different inferences, such as topics, next steps, risks, blockers, important individuals, etc. The query manager 919 can use the opportunity summaries to generate responses to queries in addition to or instead of sets of text strings and/or data of record objects, such as by querying the opportunity summaries for data relevant to a query and inputting the retrieved data into the prompt input to the machine learning models 1210 to generate the response to the request.

In some embodiments, the system manager 1802 may use the text string dataset for the record object 1804 to generate a record object file. The record object file may contain different facts or inferences regarding the record object 1804 or the opportunity associated with the record object 1804. Examples of such facts or inferences can be or include the status of a deal, a change in status of a deal, an opportunity is deteriorating, etc. The record object file can additionally include information regarding the cause or basis for such facts or inferences. Examples of questions for which the record object file can include facts or inferences to answer is as follows: "What was the most recent interaction with the customer?", what were the biggest recent changes in this deal?", "What deal phase are we in?" What milestone activities have/haven't been completed?", "What did the customer communicate in the most recent interactions?", etc. The system manager 1802 can generate such record object files by processing the text string dataset for the record object using the machine learning models 1210.

The system manager 1802 can generate a record object file for the record object 1804 using the text string dataset generated from the electronic activities 1806 matched to the record object 1804. The system manager 1802 can do so, for example, using a prompt, such as "provide an up-to-date summary of what has happened in the opportunity associated with the record object, in a high-level dossier format and focusing on recent interactions." The system manager 1802 can input the prompt into the machine learning models 1210. Based on the prompt, the machine learning models 1210 can query the text string dataset and/or the record object 1804 to retrieve the data from the prompt. The machine learning models 1210 can generate the dossier with headings of, for example, recent happening & key changes, key players, and next steps. In some cases, the machine learning models 1210 can generate the dossier by querying an opportunity summary for the record object 1804. Under the headings, the machine learning models 1210 can include information that corresponds with the headings. For example, the machine learning models 1210 can include summaries of subsets of text strings that correspond to recent timestamps (e.g., within a defined time period of the current time) under the recent happenings and key changes heading. The machine learning models 1210 can include identifications of individuals that have an important role (which the machine learning models 1210 may identify role object field-values pairs in the record object 1804 and/or based on comments in the text strings of the dataset of text strings) in the opportunity and/or individuals that are frequently mentioned under the key players heading (e.g., based on key players identified in the opportunity summary for the record object 1804). The machine learning models 1210 can identify next steps to advance the opportunity to the next stage from the opportunity summary for the record object 1804 and/or from the text strings of the text string dataset for the record object 1804.

The system manager 1802 can generate the dossier at set time intervals. For example, the system manager 1802 can generate the dossier every day or another defined time interval, performing the same processing and/or queries based on the same prompt each time, which can ensure the dossier is up-to-date with any changes in the state of the opportunity. In generating the dossier, the system manager 1802 may only process or input text strings into the machine learning models 1210 from a defined time period prior to the current time (e.g., generated or associated with timestamps within the past 30 days). In some cases, the system manager 1802 can generate summaries (e.g., summary text strings) of one or more subsets of text strings that correspond to time stamps prior to the defined time period. The system manager 1802 can include such summary text string in the input into the machine learning models 1210 with the other text strings. Based on the input of the summary text strings in combination with the newer text strings, the machine learning models 1210 can determine comparative facts. For instance, the machine learning models 1210 can determine whether a topic was brought up for the first time, or whether or not the current key players have been involved in the past. The system manager 1802 can store each iteration of the dossier for the record object 1804 in memory to maintain a record of the evolution of the opportunity for the record object 1804 or the system manager 1802 can delete the previous dossier in each instance that the system manager 1802 generates a new opportunity dossier to conserve memory resources.

The system manager 1802 can execute the machine learning models 1210 to generate the dossier to include any type of information regarding the record object 1804. For example, the system manager 1802 can execute the machine learning models 1210 to identify important figures for the opportunity of the record object 1804, such as by identifying "recently-engaged people in the buying group," "which sellers are they engaging with the most?", "what do they talk about?", "mentioned stakeholders (e.g., Grey Eminence)", which may have been mentioned beyond the activity look-back period, "Are there any new people that need to be brought into the conversation?", "internal supporting team members," and/or "what are the selling team members doing recently?" The system manager 1802 can additionally or instead execute the machine learning models 1210 to query the text string dataset for the record object 1804 to determine recent happenings and/or key changes, such as to summarize the most recent interactions, identify who were involved in the most recent interactions, identify what topics were discussed in the recent interactions, summarize the most important changes, identify what new topics were brought up, identify what important decisions were taken? (e.g., any decision point, such as anything with the word "Approved/Approval/Green light" or "Rejected/Delayed"), and/or identify what important blockers were explicitly mentioned. The system manager 1802 can additionally or instead execute the machine learning models 1210 to query the text string dataset for the record object 1804 or the opportunity summary for the record object 1804 to determine next steps for the opportunity of the record and identify which next steps are still open. The system manager 1802 can additionally or instead execute the machine learning models 1210 to query the text string dataset for the record object 1804 or the opportunity summary for the record object 1804 to identify the current phase of the deal, determine what specific activities justify this designation, what topics are being discussed in this phase, identify past phases, identify which past phases have already been completed, and/or identify which past phases might not have been properly completed.

Other examples of information that may be included in the dossier for the record object include:

Confirming that the customer has budget for the purchase;

Confirming that key stakeholders are on board for the purchase;

Confirming when the deal could be closed, and comparing it against the current expected close date (timeline brought in, pushed out);

Immediate next action items—What meetings need to be scheduled, who should be invited, what the meeting should be about;

Immediate next action items—starting new discussion threads for a topic that was recently raised (e.g., Ostap raised the need to do xxx. Can we do it?");

Current open blockers;

Which use cases are not supported, and latest update on them;

What product gaps have been identified, and latest update on them;

Key players;

Recently-engaged people—

Recently-mentioned stakeholders ("Grey Eminence")—

Internal supporting team members—

Recent Developments/Key Changes;

Budget from OpEx approved;

Public sector topic introduced;

Next Steps; and

Exec meeting scheduled for [date] to discuss technology, AI vision.

The machine learning models 1210 can include any combination or permutation of such data, facts, or answers to questions when generating the dossier. The machine learning models 1210 can cause generation of the different combinations based on the prompt input into the machine learning models 1210 (e.g., the prompt may specifically request the types of data to include in the dossier or which templates of data to include in the dossier). In cases in which a user or a prompt requests data for which there are not any text strings that correspond to the request, the machine learning models 1210 can generate an output specifically for that portion of the prompt indicating there was insufficient data available. The query manager 919 can serve the dossier for the record object 1804 responsive to a request for the dossier, for example, such as by retrieving the dossier from memory and presenting the dossier on a user interface or chat interface responsive to receiving the request.

By generating the dossier prior to receiving any requests, the query manager system manager 1802 can reduce latency in provisioning the dossier in a response. Generating the dossier can be a time consuming process. By generating the dossier at set intervals (e.g., short time intervals), the query manager 919 can have up-to-date information in the dossier and respond with the dossier without taking the time or processing power to generate the dossier at receipt of the request. Thus, the pre-generation can reduce latency of generating and provisioning responses that may be received through a chat interface or another interface.

Figure 19:
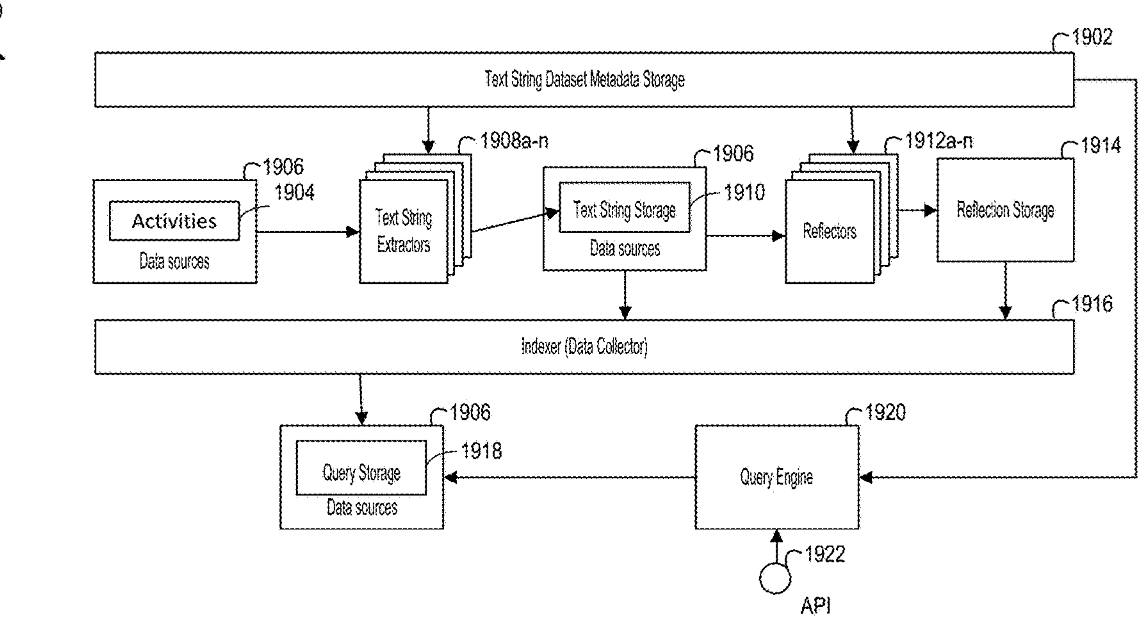
FIG. 19 illustrates a block diagram of an example sequence for automatically generating a story using one or more large language models according to embodiments of the present disclosure.

Referring now to FIG. 19, a block diagram of a system 1900 for automatically generating and implementing a story using one or more large language models, according to embodiments of the present disclosure. Some of the components of the system 1900 may correspond to components of the data processing system 100 of FIG. 1, the story generator 902, shown and described with reference to FIG. 9, the summary generator 1202, shown and described with reference to FIG. 12, and/or the system manager 1802, shown and described with reference to FIG. 18. The system 1900 can automatically generate sets of text strings for individual record objects based on data of electronic activities matched to the record objects and/or data of the record objects themselves.

The system 1900 can include a text string dataset metadata storage 1902. The text string dataset metadata storage 1902 can be a database (e.g., a Postgres database). The text string dataset metadata storage 1902 can store entity-specific (e.g., group entity-specific) or industry-specific data or other metadata. For example, the text string dataset metadata storage 1902 can store prompts that describe industry-specific risks for a deal, or the text string dataset metadata storage 1902 can store metadata about which machine learning model (e.g., which machine learning model 1210) to use for an entity, such as in cases in which an entity has one or more private models dedicated for use with the specific entities. The system 1900 can identify one or more models to use to generate a response responsive to receiving a request by identifying the source entity of the request (e.g., entity that owns or operates the computing device or account that submitted the response).

The system 1900 can include one or more data sources 1904. The data sources 1904 can include any type of data source and/or type of data. For instance, the data sources 1904 can include CRM data, engagement data for users, node graph data, a relationship map, etc. Data from the data sources can be used in different stages of the pipeline of generating a set of text strings and then using the set of text strings and/or data from the data sources to generate a response to a query.

The data sources 1904 can include one or more electronic activities 1906. The electronic activities 1906 can be or include electronic messages, meetings/transcripts for meetings, calls/transcripts for calls, messages from instant messaging applications, etc., matched to opportunities or accounts, for example.

The system 1900 can include one or more text string extractors 1908*a-n* (together, text string extractors 1908 and, individually, text string extractor 1908). The text string extractors 1908 can be or include models and/or separate large language models that are each configured to extract or generate text strings for different types of electronic activities. The text strings can be or include insights or summaries of the electronic activities 1906 from which they were extracted or generated.

In some cases, text string extractors 1908 can enrich the text strings. The text string extractors 1908 can enrich the text strings once the text strings are matched to respective record objects. The text string extractors 1908 can enrich the text strings with or using data from the respectively matched record objects, such as by adding context to the individual text strings. The context can include, for example, identities of individuals identified in the text string (e.g., references to nodes representing the individuals in the node graph maintained by the data processing system 100). In some cases, the text string extractors 1908 can calculate a "temperature" for the separate text strings, such as indications of whether an individual is upset or concerned or if an individual states something that appears to be important for the record object. The text string extractor 1908 can determine any type of context for text strings. The text string extractor 1908 can label the text strings with the determined context in the datasets including the text strings such that the context may be taken into account when generating responses to requests.

The text string extractors 1908 can store the text strings (e.g., enriched text strings) in a text string storage 1910. The text string storage 1910 can be or include a data structure or a hive table. An example schema for a how text strings for individual email electronic activities is below.

| Field name | Purpose |
|---|---|
| Org_id | Organization id |
| Uid | Unique ID of email |
| Model_version | Version of model used to generate text strings |
| Prompt_version | Version of prompt used to generate eurekas |
| Text strings | List of text strings |

Text strings for other types of electronic activities can each have their own tables with a similar structure. Enriched text strings for electronic activities (e.g., all electronic activities) can be stored in separate tables. An example of an enriched text string schema is below:

| Field name | Purpose |
|---|---|
| Id | Unique ID (out of all text strings either for the same record object or for all record objects of the same system of record or all systems of record in communication or that have a representative shadow system of record stored in the data processing system 100, including summary text strings and other types of text strings) |
| Account_id | Identifier of account record object |
| Opportunity_id | Identifier of opportunity record object |
| Is_new | The text string was not yet reflected on (e.g., processed for further determinations). |
| Is_deleted | List of text strings |
| Text | Raw text of the text string (e.g., "Ellen Ripley sent the NDA") |
| Text temperature | Metric of relative importance of the text string (e.g., checking if everything is normal should have low temperature, while raising concerns or accepting/rejecting the opportunity should have high temperature). Used to prioritize summary refreshing in case of an important update. |
| Labels | A list of topics/labels that this text string corresponds to |
| People | List of people involved, their identifies, titles, and affiliations |
| Has_unresolved_ people | Marker if the text string has unresolved people |
| Source | Source of the data (e.g., email: {org_id}: {uid} |

Any of the data in the text string storage can be used to generate responses to queries for individual record objects.

The system 1900 can include one or more reflectors 1912*a-n* (together, reflectors 1912 and, individually, reflector 1912). The reflectors can be or include one or more models and/or large language models that are each configured to generate reflections. The reflections can be additions or adjustments to text strings or enriched text strings. Examples of reflections can be or include mini-stories that identify sequential text strings that correspond to the same context and a summary of a buyer role (e.g., a "champion," or an "economic buyer"). Examples of enriching text strings with the reflectors can be attributes of the text strings, such as text string importance (e.g., how important the text string is, or the text string temperature) and string individual resolution (e.g., who is mentioned in the text string). The reflectors 1912 can generate such reflections as a background process at set time intervals (e.g., daily) and/or responsive to a user input.

Generated reflections can be stored in a reflection storage 1914. The reflection storage 1914 can be or include one or more hive tables for each of the individual reflections. The schema of the hive table for each reflection can depend on the type of the reflection and/or the object (e.g., account record object, opportunity record object, opportunity record object plus user, text string, etc.) related to the reflection. For instance, a possible schema for a mini-story reflection can be as follows:

| Field name | Purpose |
|---|---|
| Id | Unique identifier of mini-story |
| Opportunity_id | Opportunity id for the mini-story |
| People | People who are participants of the mini-story |
| Summary | Short description of the mini-story |
| Results | Outcome of the mini-story |
| sources | List of used text strings that were used to generate the mini-story |

Any of the data in the text string storage can be used to generate responses to queries for individual record objects. Together, the tables for the individual text strings, enriched text strings, and/or reflections can be a dataset for a record object that can be queried to generate responses to natural language queries.

The system 1900 can include an indexer 1916 (e.g., a data collector). The indexer 1916 can collect and/or aggregate text strings and reflections or summaries of individual and/or subsets of text strings. The indexer 1916 can prepare the data to be stored in a query storage 1918. The indexer 1916 can do so by organizing the data into a schema that is compatible for storage in the query storage 1918.

The system 1900 can include the query storage 1918. The query storage 1918 can be or include a data structure including all reflections and text strings that were enriched with additional data. The data stored for individual record objects in the query storage 1918 can be datasets for the respective record objects, for example. For instance, the query storage 1918 can be the same or similar to the database 911. The data can be stored in the query storage 1918 in a manner configured to simple or fast to query data to respond to natural language queries, for example. Query storage 1918 can be stored locally (e.g., within the data processing system 100) or remotely (e.g., in a cloud environment).

The system 1900 can include a query engine 1920. The query engine 1920 can be configured to facilitate communication with external users to generate responses containing requested information regarding different record objects. The query engine 1920 can be the same as or similar to the query manager 919. The query engine 1920 can receive such requests via an application programming interface 1922, for example. The query engine 1920 can query the data in the query storage 1918 including data from the text string storage 1910 and/or the reflection storage 1914 to generate responses to the queries. For instance, the query engine 1920 can receive a query requesting information (e.g., a size and temperature) regarding a particular record object. The query engine 1920 can retrieve the relevant information, or the text string dataset regarding the record object and/or any other data retrieved from the record object from the query storage 1918 to generate a response containing the requested information.

The query engine 1920 can generate responses with real-time data, such as data that represents the current state of a record object. For example, the data in the query storage 1918 may be recomputed at set time intervals (e.g., daily) based on newly matched electronic activities and/or updated record objects. The query engine 1920 can generate responses to queries using the currently updated version of the query storage 1918.

Figure 20:
FIG. 20 illustrates a block diagram of an example sequence for automatically generating a story using one or more large language models according to embodiments of the present disclosure.
Figure 20:
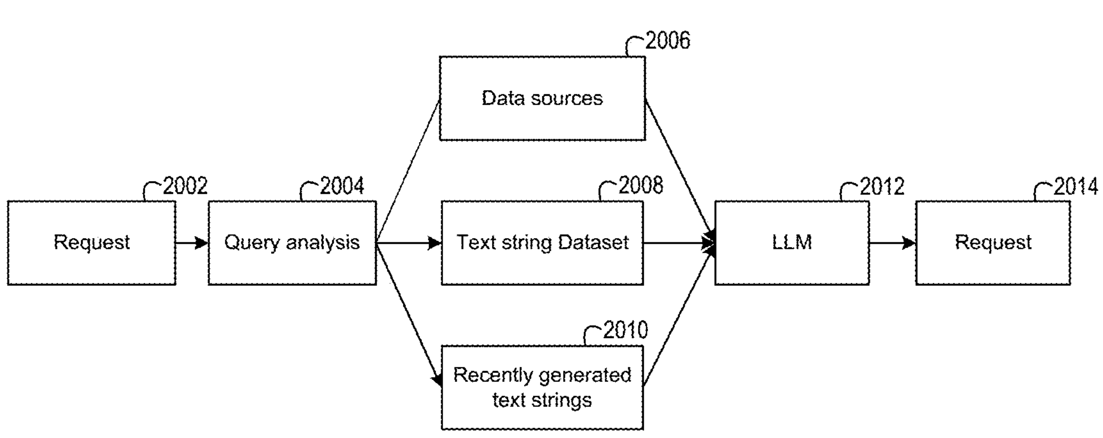

An example flow for generating a response to a request containing a query (e.g., a natural language query) is illustrated in a sequence 200 of FIG. 20. For example, the query engine 1920 can receive a request 2002 that contains a natural language query requesting information regarding a record object through the API 2022. The query engine 1920 can use API calls to retrieve data from a dataset stored in the query storage 1918 regarding the record object. For example, using API calls can be structured as follows: First, a /story/{opportunity|account}/{id} endpoint can allow retrieval of a specific dataset associated with either an opportunity record object or an account record object. When making a request to this endpoint, a JavaScript Object Notation (JSON) body is expected with a key, "context," containing text that identifies a dataset for a record object or opportunity identified in the request. Based on this context, the query engine 1920 can analyze parameters such as the requested time range, specific themes of interest, and key phrases that elaborate on the request. Second, an /deal-dossier/{opportunity_id} API call is made that is dedicated to fetching detailed information about a particular opportunity of product identified by opportunity_id, such as by querying the record object stored in a remote system of record or in a shadow system of record stored locally for requested object field-value pairs. This API is specifically designed to provide comprehensive data pertinent to a specific product or opportunity within their system. These APIs are useful for accessing targeted information tailored to user queries and specific opportunity contexts.

The query engine 1920 can generate and/or use queries (e.g., hive queries or SQL queries) to retrieve data from data sources 2006 (e.g., data from record objects, such as object field-value pairs), a dataset of text strings regarding the record object 2008 (e.g., containing enriched and/or unenriched text strings), and/or recently generated text strings 2010 (e.g., text strings generated within a defined time period, such as within the past week). The query engine 1920 can formulate or generate the queries based on the natural language queries of requests and/or identifications of record objects included in the requests, such as by inputting the natural language queries and/or identifications of record objects into a large language model with instructions to generate the queries. The query engine 1920 can use the queries to retrieve the data from the different sources 2006, 2008, and/or 2010. The query engine 1920 can aggregate or otherwise combine the retrieved data together, in some cases with the natural language query that initiated the retrieval, into a prompt.

Figure 21:
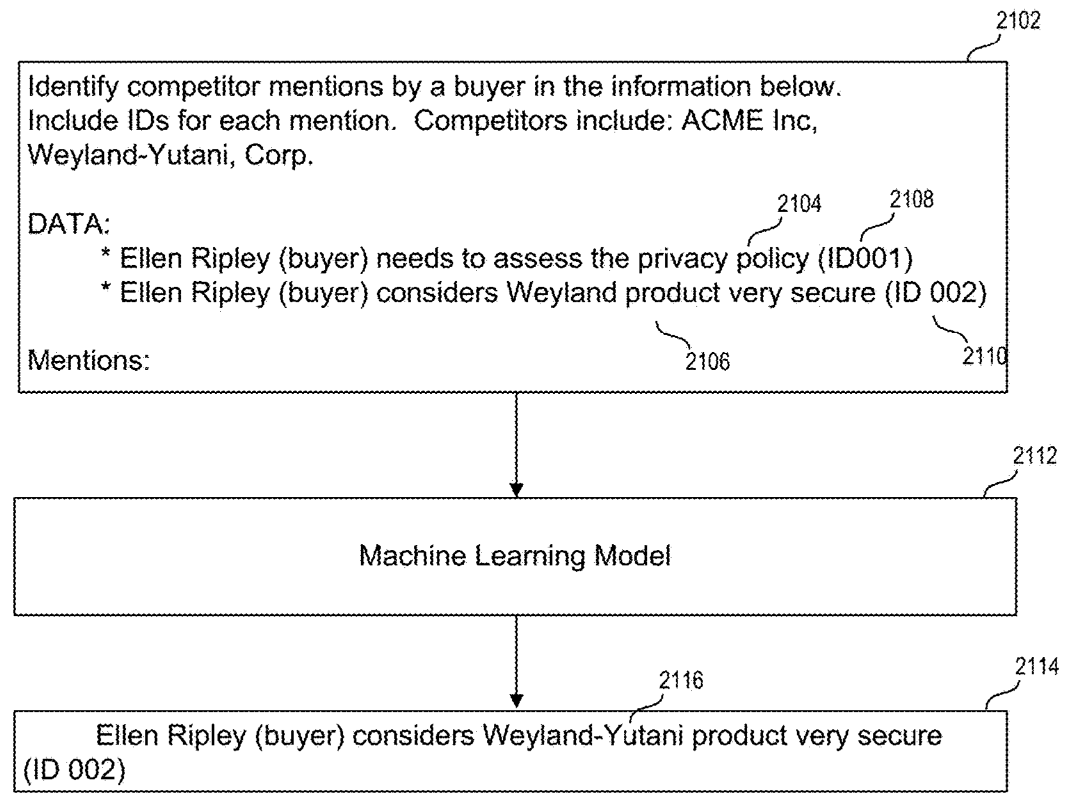
FIG. 21 illustrates an example sequence for generating a response based on a prompt input using one or more large language models.

In some cases, the query engine 1920 can dynamically generate the prompt to use as input into a large language model 2012 using references included in individual text strings retrieved from the query storage 1918. An example of such dynamic prompt generation is illustrated in FIG. 21. For instance, based on the natural language query received from the client device, the query engine 1920 can generate a prompt 2102. The prompt can include text strings (e.g., summary text strings) 2104 and 2106 that can respectively include identifiers 2108 and 2110 of text strings from which the text strings 2104 and 2106 were generated. The identifiers 2108 and 2110 can be localized identifiers to refer to the text strings from which the text strings 2104 and 2106. The query engine 1920 can convert the identifiers 2108 and 2110 to global identifiers subsequent to large language model processing of the prompt 2102 to generate a response. The query engine 1920 can update the prompt 2102 by executing one or more large language models using the text strings 2104 and 2106 as input. The query engine 1920 can input the prompt 2102 into a machine learning model 2112 (e.g., another large language model) that is configured to dynamically update the prompt 2102. The machine learning model 2112 can identify the text strings from which the text strings 2104 and 2106 were generated based on the identifiers 2108 and 2110. The machine learning model 2112 can update the text strings 2106 to generate the text string 2114 with additional detail 2116 that was not included in the initial prompt 2102 including the text string. The query engine 1920 can similarly update any number of text strings with extra data. In doing so, the query engine 1920 can ensure the prompt 2102 has enough data to generate a response that accurately and completely responds to the natural language query included in the initial request.

Referring back to FIG. 19, the query engine 1920 can input the prompt into the large language model 2012 (e.g., one of the machine learning models 1210). The query engine 1920 can execute the large language model 2012 based on the prompt to generate a response 2014. The query engine 1920 can transmit the response 2014 to the computing device that transmitted the initial request 2002.

The query engine 1920 can use both third-party APIs and proprietary, fine-tuned models developed internally to generate responses to queries. The query engine 1920 may use locally stored fine-tuned models in a default configuration due to their ability to handle larger large language model context buffers, thereby reducing the need for explicit examples in few-shot scenarios. In some cases, using fine-tuned models helps mitigate significant concerns related to user data security and privacy, as all customer data remains within our secure cloud infrastructure throughout the inference process. The query engine 1920 can use models that provide cost savings, such as by using strategies like employing smaller fine-tuned models, utilizing low-rank adaptation (LoRA) adapters, or implementing advanced optimization techniques such as draft models. These approaches help optimize resource allocation without compromising performance. Another consideration is inference stability. While large language models can be known for their lack of consistent portability, even minor updates to a large language model can lead to substantial variations in outcomes for the same input. By using and training fine-tuned models locally, the query engine 1920 can safeguard sets of data strings (e.g., enriched and/or unenriched sets of data strings) from disruptions caused by changes in underlying large language model frameworks. Additionally, fine-tuning models based on actual opportunity outcomes can facilitate tailoring the models to goals and continuously improve their effectiveness in advancing opportunities to subsequent stages.

The system manager 1802 can additionally use third-party large language model APIs to process or generate responses to natural language queries. For instance, the system manager 1802 can use third-party large language models to generate training data, assess quality through advanced models for automated evaluations, and/or when functionalities cannot be replicated with sufficient quality using fine-tuned models alone. The query engine 1920 can determine whether the local fine-tuned models have the capability of generating a response to a natural language query. In response to determining the local machine learning models cannot do so, the query engine 1920 can use a third-party API to transmit the dataset for the record object identified in the natural language query, the natural language query, and/or data from the record object. The query engine 1920 can execute, or cause execution of, the third-party large language model based on the input to generate a response to the natural language query based on the input data. In doing so, the system manager 1802 can ensure the system manager 1802 can maintain high standards of performance and efficiency during operation.

The data processing system can use data across record objects in one of a few manners. For instance, in some embodiments, the data processing system can use non-gradient learning. Non-gradient learning can involve prompting a large language model to generate ideas, which are then validated through text strings or summary text strings (e.g., summary text strings of mini-stories and/or other types of subsets of text strings) of the other record objects. This approach can be the same as or similar to a 'particle filter' method, where multiple hypotheses (e.g., particles) are maintained concurrently. Successful hypotheses are reinforced based on evidence, while linguistic and random modifications ensure a diverse and adaptive set of working ideas.

In some embodiments, the data processing system can use gradient learning to generate the responses. For example, the data processing system can fine-tune large language models based on the available data in memory for the different record objects (e.g., the object field-value pairs of the record objects, the text string datasets generated for the record objects, etc.). In some cases, the data processing system can use simulation followed by testing (SFT) techniques on successful opportunities or opportunities that advanced to the next stage. The data processing system can do so, for example, by applying a base model to text string datasets of progressing opportunities to predict future outcomes and provide actionable recommendations. In some cases, the data processing system can use reinforcement learning techniques on opportunity outcomes in which a reinforcement learning agent can learn to move opportunities into productive directions, and avoid non-productive directions. In some cases, the data processing system can fine-tune an instruction following model (e.g., a large language model). In such cases, the data processing system can train the model based on text string datasets generated for different record objects stored in memory to provide the model with 'intuition' regarding characteristics and/or events of different opportunities. The data processing system can use the model in a retrieval augmented generations scenario to generate responses to questions. Such fine-tuning may require new dialog data that can be generated using commonly asked questions and pre-generated text string datasets regarding different record objects, such as using a more powerful general purpose large language model (e.g., a large language model configured with more parameters and/or to process larger input prompts).

In one example, the data processing system can use data regarding different opportunities or record objects to generate a response to a request. For example, the data processing system can receive a request for a potential blocker from a security reviewer. In response to the request, the data processing system can identify record objects for opportunities that were closed or won, retrieve data (e.g., object field-value pairs, text string datasets, deal summaries, etc.) regarding the record objects, and generate suggestions or recommendations based on what was performed to close or win those opportunities.

Figure 22:
FIG. 22 illustrates a block diagram of an example method for automatically generating a story using one or more large language models according to embodiments of the present disclosure.
Figure 22:
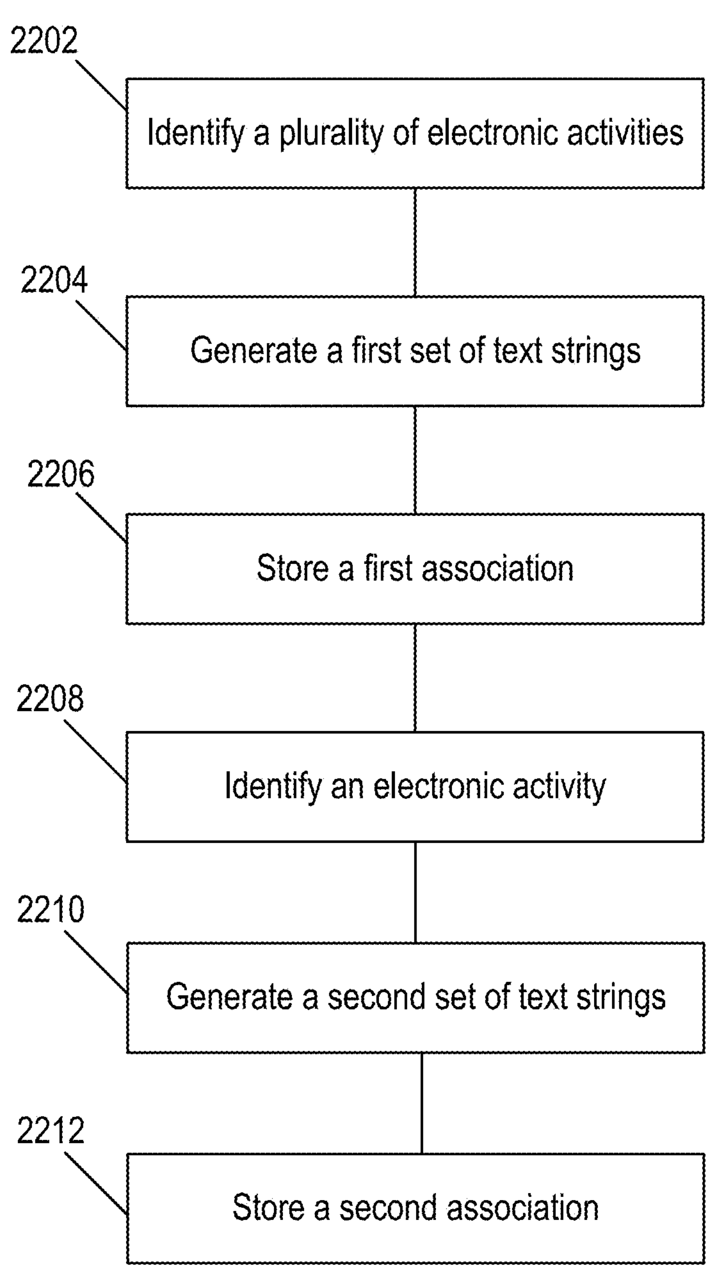

Referring now to FIG. 22, a flow diagram of an example method 2200 for automatically generating and implementing a story using one or more large language models is shown according to embodiments of the present disclosure. The method 2200 can be implemented or performed using any of the components described above in conjunction with FIGS. 1-21 (e.g., the data processing system 100) or the server system 2400 detailed below in conjunction with FIG. 24. In a brief overview, a data processing system can identify a plurality of electronic activities (2202). The data processing system can generate a first set of text strings (2204). The data processing system can store a first association (2206). The data processing system can identify an electronic activity (2208). The data processing system can generate a second set of text strings (2210). The data processing system can store a second association (2212).

In further detail, a data processing system (e.g., the data processing system 100) can identify a plurality of electronic activities (2202). The electronic activities can be electronic activities that have been matched to a record object. The data processing system can identify the electronic activities automatically (e.g., at set time intervals) or responsive to receiving a request from a user device containing an identifier of the record object. The record object can be stored in a system of record (e.g., a CRM system) of a data source provider or can be stored in a shadow system of record maintained or stored by the data processing system. The record object can correspond to or be associated with an opportunity. In some embodiments, the record object can be a shadow record object. In some embodiments, the data processing system can be configured to search for and identify electronic activities such as emails, chats, transcripts and/or documents associated with a specific customer record object in the CRM system. The data processing system can identify the electronic activities matched to the record object from the memory of the system of record or from a shadow system in record matching the system of record stored in memory of the data processing system responsive to determining the electronic activities are matched to (e.g., linked to or otherwise have a stored association with) the record object.

The data processing system can generate a first set of text strings (2204). Each of the text strings can provide information about electronic activities. The text strings can refer to a collection of text snippets generated based on the content of individual electronic activities. The text strings can summarize the individual electronic activities. The data processing system can generate one or more text strings for each of the identified electronic activities that match the record object. To generate the first set of text strings, the data processing system can feed the identified one or more electronic activities matched to the record object into one or more large language models. The one or more large language models may be generic large language models or large language models that have been trained to generate text strings for individual electronic activities. The text strings may be or include insights into the individual electronic activities or, if the one or more large language models are not able to determine an insight for an electronic activity, an indication that an insight could not be generated for the electronic activity. The data processing system can feed the electronic activities matched to the record object into the one or more large language models either using a one-shot or few-shot prompt input to guide the output or using a zero-shot prompt input and the one or more large language models can output one or more text strings for each of the electronic activities. The data processing system can discard or otherwise remove from memory the electronic activities used to generate the first set of text strings, thus conserving memory resources.

The data processing system can supplement the first set of text strings with data from other sources. For example, the data processing system can supplement the first set of text strings with object field-value pairs of the record object. The data processing system can supplement the first set of text strings, for example, by inputting the first set of text strings into the one or more large language models. The one or more large language models can process the first set of text strings and determine or identify individuals that are identified in the respective text strings, add object field-value pairs for the record to the first set of text strings, and/or assign or label the individual text strings with attributes of the text strings. Such data can aid in the querying the first set of text strings at a later time to generate responses regarding the record object.

In another example, the data processing system can supplement the first set of text strings by adding text strings that characterize or summarize the text strings initially in the first set of text strings. For example, the data processing system can input the first set of text strings into the one or more large language models. The one or more large language models may group the first set of text strings into subsets of text strings. The large language models can group the text strings, based on the subsets identifying the same individual, based on the subsets corresponding to the same topic or context, based on the subsets corresponding to the same time interval, etc. The large language models can generate summary text strings summarizing the text strings of the individual subsets. In some cases, the large language models can assign an attribute to subsets of text indicating that the subsets pertain to the same context (e.g., are mini-stories or sequential mini-stories). Such data can later be used to respond to queries for information regarding the record object.

The data processing system can store a first association (2206). In doing so, the data processing system can store (e.g., in one or more data structures) an association between the first set of text strings and the record object. The association can be a pointer or identifier in the first set of text strings to the record object and/or a pointer or identifier to the first set of text strings in the record object. The data processing system can store the association between the first set of text strings and the record object based on each of the first set of text strings being generated from an electronic activity that was matched to the record object. By storing the association between the record object and the first set of text strings in memory, the data processing system can store a mechanism that the data processing system can later use to generate chatbot responses to natural language queries regarding the record object, such as by retrieving data from the record object itself or retrieving data from a combination of the record object and the first set of text strings, thus making the responses more accurate and precise.

Subsequent to storing the association between the first set of text strings and the record object, the data processing system can identify an electronic activity (e.g., a second electronic activity) (2208). The data processing system can receive the electronic activity in a time period or time interval after the data processing system stores the association between the first set of text strings and the record object. The data processing system can match the electronic activity to the record object (e.g., the same record object as the plurality of electronic activities) based on the content of the electronic activity pertaining to the same opportunity as the record object, for example. The data processing system can otherwise match the electronic activity to the record object using the systems and methods described herein. The data processing system can identify the electronic activity responsive to the match, in some cases.

The data processing system can generate a second set of text strings (2210). The data processing system can generate the second set of text strings using the one or more large language models (e.g., the same one or more large language models used to generate the first set of text strings). The data processing system can generate the second set of text strings based on data of the electronic activity (e.g., the second electronic activity) received after generating the first set of text strings. In one example, the data processing system can input the data of the electronic activity into a large language model to generate a text string from the electronic activity. The data processing system can add the text string to the first set of text strings to generate the second set of text strings. In another example, the data processing system can input the data of the electronic activity with the first set of text strings into the large language model. The large language model can process the first set of text strings with the data of the electronic activity to generate the second set of text strings, such as by adding a text string generated from the electronic activity to the first set of text strings, removing one or more text strings that have been aged out, by updating any summary text strings of the first set of text strings based on the text string from the electronic activity, etc. The data processing system can generate the second set of text strings in any manner.

In some cases, the data processing system can generate the second set of text strings responsive to determining a condition is satisfied. For example, the data processing system can generate the second set of text strings responsive to determining the second electronic activity is matched to the record object. Responsive to the detection, the data processing system can update the first set of text strings to the second set of text strings as described herein. The data processing system can similarly update the set of text strings for each electronic activity that is matched to the record object (e.g., the same record object). In another example, the data processing system can generate the second set of text strings responsive to determining a time condition is satisfied. The data processing system can determine the time condition is satisfied by determining an end to a time interval, for example. Responsive to determining the time condition is satisfied, the data processing system can identify each electronic activity matched to the electronic activity within the time interval. The data processing system can generate one or more text strings from each electronic activity and update the first set of text strings to the second set of text strings as described herein with each of the text strings. In another example, the data processing system can generate the second set of text strings responsive to determining a size condition is satisfied. The data processing system can determine the size condition is satisfied by determining enough new electronic activities (e.g., electronic activities that have not been processed into text strings yet) have been matched to the record object to reach a threshold, for example. Responsive to determining the size condition is satisfied, the data processing system can identify each new electronic activity matched to the electronic activity. The data processing system can generate one or more text strings from each electronic activity and update the first set of text strings to the second set of text strings as described herein with each of the text strings. The data processing system can update the set of text strings responsive to any condition being satisfied.

The data processing system can store a second association (2212). In doing so, the data processing system can store (e.g., in the one or more data structures) an association between the second set of text strings and the record object. The second association can be a pointer or identifier in the second set of text strings to the record object and/or a pointer or identifier to the second set of text strings in the record object. The data processing system can store the second association between the second set of text strings and the record object based on each of the second set of text strings being generated from an electronic activity that was matched to the record object. By storing the second association between the record object and the second set of text strings in memory, the data processing system can store a mechanism that the data processing system can later use to generate chatbot responses to natural language queries regarding the record object, such as by retrieving data from the record object itself or retrieving data from a combination of the record object and the second set of text strings, thus making the responses more accurate and precise. Responsive to storing the second set of text strings and an association between the second set of text strings and the record object, the data processing system can delete the first set of text strings from memory, conserving memory resources.

Figure 23:
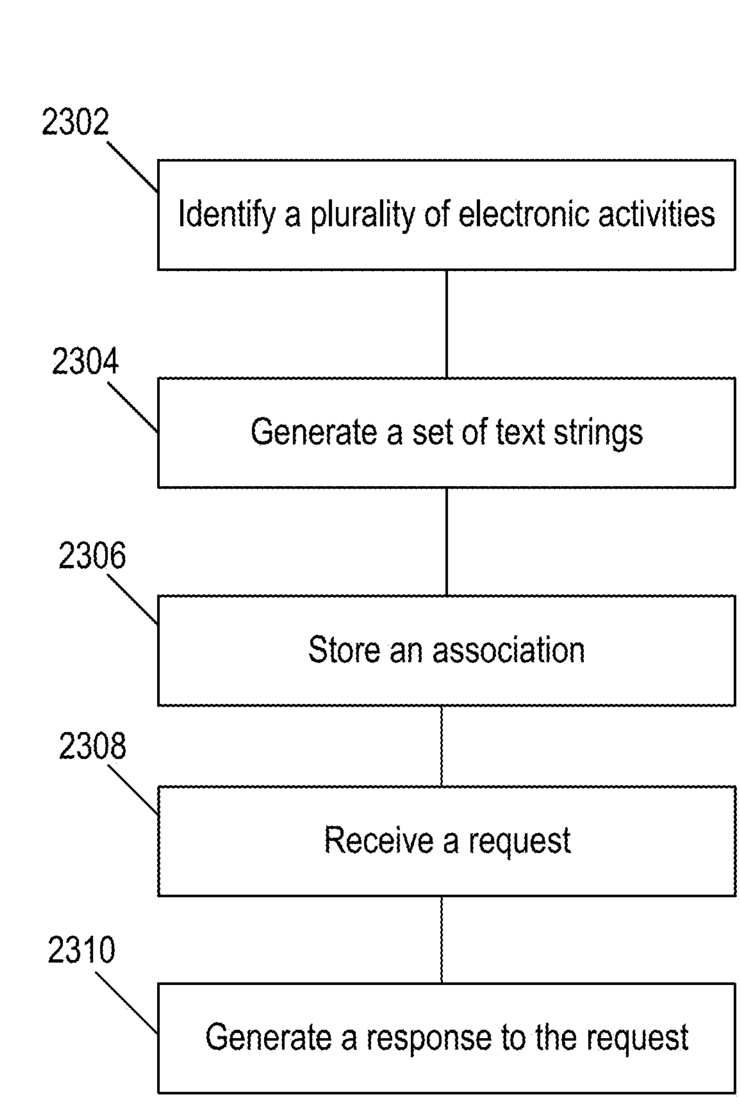
FIG. 23 illustrates a block diagram of an example method for using a story to generate a response to a natural language query according to embodiments of the present disclosure.

Referring now to FIG. 23, a flow diagram of an example method 2300 for automatically generating and implementing a story using one or more large language models is shown according to embodiments of the present disclosure. The method 2300 can be implemented or performed using any of the components described above in conjunction with FIGS. 1-22 (e.g., the data processing system 100) or the server system 2400 detailed below in conjunction with FIG. 24. In a brief overview, a data processing system can identify a plurality of electronic activities (2302). The data processing system can generate a first set of text strings (2304). The data processing system can store an association (2306). The data processing system can receive a request (2308). The data processing system can generate a response to the request (2310). The data processing system can perform 2302-2306 to generate a set of text strings for a record object in the same or a similar manner to 2202-2206.

The data processing system can receive a request (2208). The data processing system can receive the request from a client device. The request can include a natural language query. The natural language query can request information regarding a record object. For example, a user of the client device can view a chat interface. Through the chat interface, the user can type (e.g., into a keyboard) a request regarding a current status of an opportunity, such as the string "tell me the current status of Deal A." The user can select a submit button to cause the client device to transmit the request containing the natural language query to the data processing system.

The request can contain an identification of the opportunity or record object for which the user is requesting information. For example, the identification can be included in the natural language query itself. Taking the example above, the identification can be the term "Deal A." The data processing system can separately identify the identification of the opportunity or the record object by processing the natural language processing model or the data processing system can input the natural language query itself into one or more large language models to generate a response and the one or more large language models can identify the identification of the opportunity from the natural language query. In another example, the request can contain an identification of the record object or opportunity separate from the natural language query. The client device can include the identification in the request based on a selection of the identification from a user interface and/or based on the user selecting the submit button from a page corresponding to or displaying data regarding the record object, such as a page showing a deal summary for the record object. The data processing system can parse the identification from the request and include the identification in the prompt input into the one or more large language models with the natural language query for further processing.

The data processing system can generate a response to the request (2210). The data processing system can generate the response to the request using the one or more large language models (e.g., the same or different large language models), such as by inputting the natural language query from the request and/or the identification of the record object into the one or more large language models. The one or more large language models (e.g., via a query manager) can identify the identification of the record object from the input. Based on the identification, the one or more large language models can identify the stored association between the record object and the set of text strings (e.g., the set of text strings representing the current state of the opportunity associated with the record object) to identify the set of text strings for the record object and/or the record object itself. The one or more large language models can determine information that was requested in the natural language query and retrieve the requested information from the record object and/or the set of text strings. The one or more large language models can process the requested information, in some cases with the natural language query included in the request, to generate a response to the natural language query, in some cases in a format requested in the natural language query and/or in some cases based on the format in which the data processing system is configured to generate responses. The data processing system can transmit the generated response to the client device that transmitted the initial request. The client device can present the response on the chat interface and/or on a page that the chat interface overlays or that is a part of the same user interface as the chat interface.

U. Computer System

Figure 24:
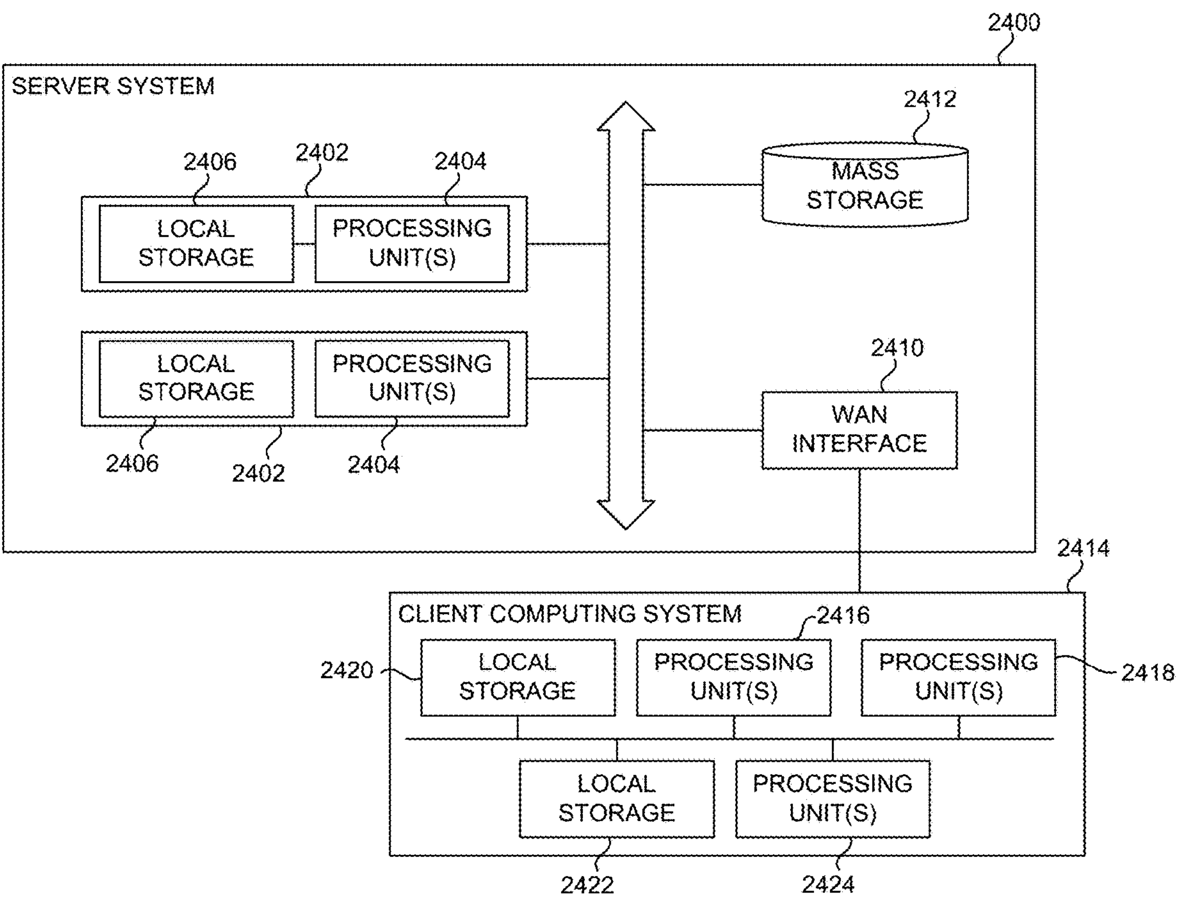
FIG. 24 illustrates a simplified block diagram of a representative server system and client computer system according to embodiments of the present disclosure.

Various operations described herein can be implemented on computer systems, which can be of generally conventional design. FIG. 24 shows a simplified block diagram of a representative server system 2400 and client computing system 2414 usable to implement certain embodiments of the present disclosure. In various embodiments, server system 2400 or similar systems can implement services or servers described herein or portions thereof. Client computing system 2414 or similar systems can implement clients described herein. The data processing system 100 and others described herein can be similar to the server system 2400.

Server system 2400 can have a modular design that incorporates a number of modules 2402 (e.g., blades in a blade server embodiment); while two modules 2402 are shown, any number can be provided. Each module 2402 can include processing unit(s) 2404 and local storage 2406.

Processing unit(s) 2404 can include a single processor, which can have one or more cores, or multiple processors. In some embodiments, processing unit(s) 2404 can include a general-purpose primary processor as well as one or more special-purpose co-processors such as graphics processors, digital signal processors, or the like. In some embodiments, some or all processing units 2404 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2404 can execute instructions stored in local storage 2406. Any type of processors in any combination can be included in processing unit(s) 2404.

Local storage 2406 can include volatile storage media (e.g., conventional DRAM, SRAM, SDRAM, or the like) and/or non-volatile storage media (e.g., magnetic or optical disk, flash memory, or the like). Storage media incorporated in local storage 2406 can be fixed, removable or upgradeable as desired. Local storage 2406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2404 need at runtime. The ROM can store static data and instructions that are needed by processing unit(s) 2404. The permanent storage device can be a non-volatile read-and-write memory device that can store instructions and data even when module 2402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 2406 can store one or more software programs to be executed by processing unit(s) 2404, such as an operating system and/or programs implementing various server functions such as functions of the data processing system 100 of FIG. 1 or any other system described herein, or any other server(s) or system associated with data processing system 100 of FIG. 1.

"Software" refers generally to sequences of instructions that, when executed by processing unit(s) 2404 cause server system 2400 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 2404. Software can be implemented as a single program or a collection of separate programs or program modules that interact as desired. From local storage 2406 (or non-local storage described below), processing unit(s) 2404 can retrieve program instructions to execute and data to process in order to execute various operations described above.

In some server systems 2400, multiple modules 2402 can be interconnected via a bus or other interconnect 2408, forming a local area network that supports communication between modules 2402 and other components of server system 2400. Interconnect 2408 can be implemented using various technologies including server racks, hubs, routers, etc.

A wide area network (WAN) interface 2410 can provide data communication capability between the local area network (interconnect 2408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 2406 is intended to provide working memory for processing unit(s) 2404, providing fast access to programs and/or data to be processed while reducing traffic on interconnect 2408. Storage for larger quantities of data can be provided on the local area network by one or more mass storage subsystems 2412 that can be connected to interconnect 2408. Mass storage subsystem 2412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2412. In some embodiments, additional data storage resources may be accessible via WAN interface 2410 (potentially with increased latency).

Server system 2400 can operate in response to requests received via WAN interface 2410. For example, one of modules 2402 can implement a supervisory function and assign discrete tasks to other modules 2402 in response to received requests. Conventional work allocation techniques can be used. As requests are processed, results can be returned to the requester via WAN interface 2410. Such operation can generally be automated. Further, in some embodiments, WAN interface 2410 can connect multiple server systems 2400 to each other, providing scalable systems capable of managing high volumes of activity. Conventional or other techniques for managing server systems and server farms (collections of server systems that cooperate) can be used, including dynamic resource allocation and reallocation.

Server system 2400 can interact with various user-owned or user-operated devices via a wide-area network such as the Internet. An example of a user-operated device is shown in FIG. 24 as client computing system 2414. Client computing system 2414 can be implemented, for example, as a consumer device such as a smartphone, other mobile phone, tablet computer, wearable computing device (e.g., smart watch, eyeglasses), desktop computer, laptop computer, and so on.

For example, client computing system 2414 can communicate via WAN interface 2410. Client computing system 2414 can include conventional computer components such as processing unit(s) 2416, storage device 2418, network interface 2420, user input device 2422, and user output device 2424. Client computing system 2414 can be a computing device implemented in a variety of form factors, such as a desktop computer, laptop computer, tablet computer, smartphone, other mobile computing device, wearable computing device, or the like.

Processor 2416 and storage device 2418 can be similar to processing unit(s) 2404 and local storage 2406 described above. Suitable devices can be selected based on the demands to be placed on client computing system 2414; for example, client computing system 2414 can be implemented as a "thin" client with limited processing capability or as a high-powered computing device. Client computing system 2414 can be provisioned with program code executable by processing unit(s) 2416 to enable various interactions with server system 2400 of a message management service such as accessing messages, performing actions on messages, and other interactions described above. Some client computing systems 2414 can also interact with a messaging service independently of the message management service.

Network interface 2420 can provide a connection to a wide area network (e.g., the Internet) to which WAN interface 2410 of server system 2400 is also connected. In various embodiments, network interface 2420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2422 can include any device (or devices) via which a user can provide signals to client computing system 2414; client computing system 2414 can interpret the signals as indicative of particular user requests or information. In various embodiments, user input device 2422 can include any or all of a keyboard, touch pad, touch screen, mouse or other pointing device, scroll wheel, click wheel, dial, button, switch, keypad, microphone, and so on.

User output device 2424 can include any device via which client computing system 2414 can provide information to a user. For example, user output device 2424 can include a display to display images generated by or delivered to client computing system 2414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 2424 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2404 and 2416 can provide various functionality for server system 2400 and client computing system 2414, including any of the functionality described herein as being performed by a server or client, or other functionality associated with message management services.

It will be appreciated that server system 2400 and client computing system 2414 are illustrative and that variations and modifications are possible. Computer systems used in connection with embodiments of the present disclosure can have other capabilities not specifically described here. Further, while server system 2400 and client computing system 2414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A system comprising:

memory; and one or more processors configured by machine-readable instructions stored in the memory to:

identify a plurality of electronic activities matched with a record object of a customer relationship management (CRM) system;

generate, by inputting data corresponding to the plurality of electronic activities into one or more large language models, a first set of text strings;

selecting a subset of the first set of text strings;

generating, by inputting the subset of the first set of text strings in the one or more large language models, a subset summary for the subset of the first set of text strings into the first set of text strings;

store, in one or more data structures, a first association between the first set of text strings including the subset summary for the subset of the first set of text strings and the record object based on the match between the record object and the plurality of electronic activities;

identify a second electronic activity that is matched with the record object subsequent to generating the first set of text strings;

generate, using the one or more large language models, responsive to determining that the second electronic activity is matched with the record object or a time condition is satisfied, a second set of text strings based on data corresponding to the second electronic activity and the first set of text strings; and store, in the one or more data structures, a second association between the second set of text strings and the record object.

2. The system of claim 1, wherein the one or more processors are configured by the machine-readable instructions to generate the first set of text strings by:

generating, for each of the plurality of electronic activities, an activity summary of the electronic activity by inputting data of the electronic activity into the one or more large language models.

3. The system of claim 1, wherein the one or more processors are configured by the machine-readable instructions to select the subset of the first set of text strings by:

selecting the subset of the first set of text strings based on each text string of the subset corresponding to a common time interval; or selecting the subset of the first set of text strings responsive to determining a size of the subset of text strings has reached at least a defined value.

4. The system of claim 1, wherein the one or more processors are configured by the machine-readable instructions to select the subset of the first set of text strings by:

selecting the subset of the first set of text strings responsive to determining each text string of the subset corresponds to a common context or identifies a common individual.

5. The system of claim 1, wherein the one or more processors are configured by the machine-readable instructions to generate the subset summary for the subset of text strings by:

assigning a summary identifier to the subset summary for the subset of text strings and a text string identifier to each of the text strings of the subset; and including the summary identifier and the text string identifier for each text string of the subset in the subset summary for the subset of the first set of text strings.

6. The system of claim 1, wherein the one or more processors are further configured by the machine-readable instructions to:

discard the plurality of electronic activities subsequent to generating the first set of text strings.

7. The system of claim 1, wherein the one or more processors are further configured by the machine-readable instructions to:

receive, via a chat interface, a request including a natural language query requesting information regarding the record object, the request comprising an identification of the record object; and generate, using the one or more large language models, a response to the natural language query containing the requested information using the identification of the record object and the stored association between the record object and the first set of text strings or the second set of text strings generated prior to the query.

8. The system of claim 7, wherein the one or more processors are further configured by the machine-readable instructions to generate the response to the natural language query by:

retrieving one or more text strings from the second set of text strings and one or more object field-value pairs from the record object; and generating the response by inputting the retrieved one or more text strings and one or more object field-value pairs of the record object into the one or more large language models.

9. The system of claim 1, wherein the one or more processors are further configured by the machine-readable instructions to generate the second set of text strings by:

generating, by inputting data of the second electronic activity into the one or more large language models, a second text string summarizing the data of the second electronic activity; and inserting the second text string into the first set of text strings.

10. The system of claim 1, wherein the one or more processors are configured by the machine-readable instructions to:

store the record object of the CRM system as a shadow record object of a shadow CRM system stored in memory, the shadow CRM system mapped to an external CRM system stored in a remote computing system, and wherein the one or more processors are configured to identify the plurality of electronic activities matched with the record object of the CRM system by identifying the plurality of electronic activities matched with the shadow record object of the shadow CRM system.

11. A computer-implemented method, comprising:

identifying, by one or more processors, a plurality of electronic activities matched with a record object of a customer relationship management (CRM) system;

generating, by the one or more processors, by inputting data corresponding to the plurality of electronic activities into one or more large language models, a first set of text strings;

selecting, by the one or more processors, a subset of the first set of text strings;

generating, by the one or more processors, by inputting the subset of the first set of text strings in the one or more large language models, a subset summary for the subset of the first set of text strings into the first set of text strings;

storing, by the one or more processors in one or more data structures, a first association between the first set of text strings including the subset summary for the subset of the first set of text strings and the record object based on the match between the record object and the plurality of electronic activities;

identifying, by the one or more processors, a second electronic activity that is matched with the record object subsequent to generating the first set of text strings;

generating, by the one or more processors, using the one or more large language models, responsive to determining that the second electronic activity is matched with the record object or a time condition is satisfied, a second set of text strings based on data corresponding to the second electronic activity and the first set of text strings; and storing, by the one or more processors, in the one or more data structures, a second association between the second set of text strings and the record object.

12. The method of claim 11, wherein generating the first set of text strings comprises:

generating, by the one or more processors for each of the plurality of electronic activities, an activity summary of the electronic activity by inputting data of the electronic activity into the one or more large language models.

13. The method of claim 11, wherein selecting the subset of the first set of text strings comprises:

selecting, by the one or more processors, the subset of the first set of text strings based on each text string of the subset corresponding to a common time interval; or selecting, by the one or more processors, the subset of the first set of text strings responsive to determining a size of the subset of text strings has reached at least a defined value.

14. The method of claim 11, wherein selecting the subset of the first set of text strings comprises:

selecting, by the one or more processors, the subset of the first set of text strings responsive to determining each text string of the subset corresponds to a common context or identifies a common individual.

15. The method of claim 11, wherein generating the subset summary for the subset of text strings comprises:

assigning, by the one or more processors, a summary identifier to a subset summary for the subset of text strings and a text string identifier to each of the text strings of the subset; and including, by the one or more processors, the summary identifier and the text string identifier for each text string of the subset in the subset summary for the subset of the first set of text strings.

16. The method of claim 11, further comprising:

discarding, by the one or more processors, the plurality of electronic activities subsequent to generating the first set of text strings.

* * * * *